US012206980B2

(12) United States Patent
Brown et al.

(10) Patent No.: US 12,206,980 B2
(45) Date of Patent: Jan. 21, 2025

(54) DEVICES, METHODS, AND GRAPHICAL USER INTERFACES FOR CAPTURING AND RECORDING MEDIA IN MULTIPLE MODES

(71) Applicant: Apple Inc., Cupertino, CA (US)

(72) Inventors: Matthew I. Brown, New York, NY (US); Jeffrey T. Bernstein, San Francisco, CA (US); William D. Lindmeier, San Francisco, CA (US); Lukas Robert Tom Girling, Bristol (GB)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/208,836

(22) Filed: Jun. 12, 2023

(65) Prior Publication Data

US 2023/0328359 A1   Oct. 12, 2023

Related U.S. Application Data

(63) Continuation of application No. 17/074,521, filed on Oct. 19, 2020, now Pat. No. 11,750,914, which is a
(Continued)

(51) Int. Cl.
*H04N 5/92* (2006.01)
*G06F 3/0485* (2022.01)
(Continued)

(52) U.S. Cl.
CPC ........... *H04N 23/62* (2023.01); *G06F 3/0485* (2013.01); *G06F 3/0488* (2013.01);
(Continued)

(58) Field of Classification Search
USPC .......................................... 348/36
See application file for complete search history.

(56) References Cited

U.S. PATENT DOCUMENTS

| 6,122,013 A | 9/2000 | Tamir et al. |
| 6,680,749 B1 | 1/2004 | Anderson et al. |

(Continued)

FOREIGN PATENT DOCUMENTS

| CN | 103139480 A | 6/2013 |
| CN | 103533216 A | 1/2014 |
| CN | 106231181 A | 12/2016 |

OTHER PUBLICATIONS

Office Action, dated Feb. 2, 2019, received in U.S. Appl. No. 15/691,701, 25 pages.
(Continued)

*Primary Examiner* — Nigar Chowdhury
(74) *Attorney, Agent, or Firm* — Morgan, Lewis & Bockius LLP

(57) ABSTRACT

A device displays, in a first display region of a camera user interface, a first live view from a first camera. While displaying the first live view from the first camera, the device detects movement of a first user input (e.g., a first contact on a touch-sensitive surface). In accordance with a determination that the movement of the first user input meets first movement criteria, the device moves the first live view in the first display region in accordance with the movement of the first user input, displays a second live view from a second camera, and moves the second live view in the first display region in accordance with the movement of the first user input.

47 Claims, 156 Drawing Sheets

Related U.S. Application Data continuation of application No. 16/711,138, filed on Dec. 11, 2019, now Pat. No. 10,848,661, which is a continuation of application No. 15/691,701, filed on Aug. 30, 2017, now Pat. No. 10,547,776.

(60) Provisional application No. 62/399,292, filed on Sep. 23, 2016.

(51) Int. Cl.

| | |
|---|---|
| G06F 3/0488 | (2022.01) |
| G06F 3/04883 | (2022.01) |
| G06F 3/04886 | (2022.01) |
| G11B 27/02 | (2006.01) |
| G11B 27/34 | (2006.01) |
| H04M 1/72403 | (2021.01) |
| H04N 1/21 | (2006.01) |
| H04N 5/91 | (2006.01) |
| H04N 7/01 | (2006.01) |
| H04N 23/62 | (2023.01) |
| H04N 23/63 | (2023.01) |
| H04N 23/667 | (2023.01) |
| H04N 23/695 | (2023.01) |
| H04N 23/698 | (2023.01) |
| G11B 27/32 | (2006.01) |
| H04N 101/00 | (2006.01) |

(52) U.S. Cl.
CPC ...... *G06F 3/04883* (2013.01); *G06F 3/04886* (2013.01); *G11B 27/02* (2013.01); *G11B 27/34* (2013.01); *H04M 1/72403* (2021.01); *H04N 1/2145* (2013.01); *H04N 5/91* (2013.01); *H04N 5/9201* (2013.01); *H04N 7/0122* (2013.01); *H04N 23/631* (2023.01); *H04N 23/633* (2023.01); *H04N 23/667* (2023.01); *H04N 23/695* (2023.01); *H04N 23/698* (2023.01); *G06F 2203/04808* (2013.01); *H04M 2250/22* (2013.01); *H04M 2250/52* (2013.01); *H04N 2101/00* (2013.01)

(56) References Cited

U.S. PATENT DOCUMENTS

| | | | |
|---|---|---|---|
| 6,741,911 B2 | 5/2004 | Simmons | |
| 7,319,480 B2 | 1/2008 | Akiyama et al. | |
| 7,714,925 B2 | 5/2010 | Kim | |
| 7,714,926 B2 | 5/2010 | Kobayashi et al. | |
| 7,729,608 B2 | 6/2010 | Okubo | |
| 8,478,347 B2 | 7/2013 | Kim et al. | |
| 8,666,223 B2 | 3/2014 | Momosaki | |
| 9,100,588 B1 | 8/2015 | Seymour | |
| 10,021,295 B1 | 7/2018 | Baldwin et al. | |
| 10,051,141 B2 | 8/2018 | Suzuki | |
| 10,127,632 B1 | 11/2018 | Burke et al. | |
| 10,645,294 B1* | 5/2020 | Manzari | H04N 23/74 |
| 2002/0012526 A1 | 1/2002 | Sai et al. | |
| 2002/0064387 A1 | 5/2002 | Miyake et al. | |
| 2003/0120183 A1 | 6/2003 | Simmons | |
| 2005/0007468 A1 | 1/2005 | Stavely et al. | |
| 2005/0193425 A1 | 9/2005 | Sull et al. | |
| 2007/0157089 A1 | 7/2007 | Van Os et al. | |
| 2008/0055416 A1 | 3/2008 | Aoki | |
| 2008/0055453 A1 | 3/2008 | Battles et al. | |
| 2009/0237547 A1 | 9/2009 | Misawa et al. | |
| 2010/0023851 A1 | 1/2010 | Schormann | |
| 2010/0074590 A1 | 3/2010 | Momosaki | |
| 2011/0032259 A1 | 2/2011 | Kim et al. | |
| 2011/0126105 A1 | 5/2011 | Isozu | |
| 2012/0093477 A1 | 4/2012 | M | |
| 2012/0218453 A1 | 8/2012 | Hosokawa | |
| 2012/0243738 A1 | 9/2012 | Sakata | |
| 2013/0201217 A1 | 8/2013 | Morinaga et al. | |
| 2013/0208143 A1 | 8/2013 | Chou et al. | |
| 2014/0009643 A1 | 1/2014 | Ito et al. | |
| 2014/0198027 A1 | 7/2014 | Edelstein | |
| 2014/0204243 A1 | 7/2014 | Hayashi | |
| 2014/0204244 A1 | 7/2014 | Choi et al. | |
| 2014/0218370 A1 | 8/2014 | Mishra et al. | |
| 2014/0351763 A1 | 11/2014 | Lee et al. | |
| 2014/0362274 A1 | 12/2014 | Christie et al. | |
| 2015/0042543 A1 | 2/2015 | Kim et al. | |
| 2015/0067596 A1 | 3/2015 | Brown et al. | |
| 2015/0145952 A1* | 5/2015 | Hirata | G03B 17/561 348/38 |
| 2015/0162048 A1* | 6/2015 | Hirata | G11B 20/10527 386/341 |
| 2015/0201134 A1 | 7/2015 | Carr et al. | |
| 2015/0271402 A1 | 9/2015 | Guo et al. | |
| 2015/0281296 A1 | 10/2015 | Takaichi et al. | |
| 2015/0334291 A1 | 11/2015 | Cho et al. | |
| 2015/0338988 A1 | 11/2015 | Lee et al. | |
| 2015/0350611 A1 | 12/2015 | Pearson et al. | |
| 2015/0358550 A1 | 12/2015 | Faber et al. | |
| 2016/0080643 A1* | 3/2016 | Kimura | G03B 17/18 348/207.1 |
| 2016/0241767 A1 | 8/2016 | Cho et al. | |
| 2016/0259497 A1* | 9/2016 | Foss | G06T 13/80 |
| 2016/0306511 A1 | 10/2016 | Park et al. | |
| 2016/0353012 A1 | 12/2016 | Kao et al. | |
| 2017/0019604 A1 | 1/2017 | Kim et al. | |
| 2017/0026539 A1 | 1/2017 | Chang et al. | |
| 2017/0034428 A1 | 2/2017 | Kwon et al. | |
| 2017/0075092 A1 | 3/2017 | Kim et al. | |
| 2017/0303002 A1 | 10/2017 | Esaylan, Jr. et al. | |
| 2018/0081502 A1 | 3/2018 | Sangco et al. | |
| 2018/0091728 A1 | 3/2018 | Brown et al. | |
| 2019/0042066 A1* | 2/2019 | Kim | H04M 1/725 |
| 2019/0182422 A1* | 6/2019 | Takahashi | H04N 23/64 |
| 2020/0167631 A1* | 5/2020 | Rezgui | B25J 9/0084 |
| 2020/0120265 A1 | 6/2020 | Brown et al. | |
| 2021/0051275 A1 | 2/2021 | Brown et al. | |

OTHER PUBLICATIONS

Notice of Allowance, dated Jun. 25, 2019, received in U.S. Appl. No. 15/691,701, 9 pages.

Notice of Allowance, dated Oct. 17, 2019, received in U.S. Appl. No. 15/691,701, 9 pages.

Office Action, dated Jul. 10, 2020, received in Chinese Patent Application No. 201780053139.4, which corresponds with U.S. Appl. No. 15/691,701, 12 pages.

Office Action, dated Apr. 23, 2021, received in Chinese Patent Application No. 201780053139.4, which corresponds with U.S. Appl. No. 15/691,701, 1 page.

Notice of Allowance, dated Aug. 5, 2021, received in Chinese Patent Application No. 201780053139.4, which corresponds with U.S. Appl. No. 15/691,701, 2 pages.

Patent, dated Oct. 29, 2021, received in Chinese Patent Application No. 201780053139.4, which corresponds with U.S. Appl. No. 15/691,701, 5 pages.

Office Action, dated Dec. 8, 2020, received in European Patent Application No. 17771920.0, which corresponds with U.S. Appl. No. 15/691,701, 6 pages.

Office Action, dated Jan. 28, 2020, received in European Patent Application No. 17771920.0, which corresponds with U.S. Appl. No. 15/691,701, 6 pages.

Intent to Grant, dated Jan. 2022, received in European Patent Application No. 17771920.0, which corresponds with U.S. Appl. No. 15/691,701, 10 pages.

Decision to Grant, dated Feb. 14, 2022, received in European Patent Application No. 17771920.0, which corresponds with U.S. Appl. No. 15/691,701, 4 pages.

Patent, dated Mar. 29, 2022, received in European Patent Application No. 17771920.0, which corresponds with U.S. Appl. No. 15/691,701, 2 pages.

(56) References Cited

OTHER PUBLICATIONS

Office Action, dated May 6, 2020, received in U.S. Appl. No. 16/711,138, 7 pages.
Notice of Allowance, dated Jul. 15, 2020, received in U.S. Appl. No. 16/711,138, 9 pages.
Office Action, dated Oct. 5, 2022, received in U.S. Appl. No. 17/074,521, 19 pages.
Notice of Allowance, dated Feb. 27, 2023, received in U.S. Appl. No. 17/074,521, 9 pages.
Office Action, dated Sep. 20, 2022, received in Chinese Patent Application No. 202111213035.X, which corresponds with U.S. Appl. No. 17/074,521, 2 pages.
Invitation to Pay Additional Fees, dated Dec. 7, 2017, received in International Patent Application No. PCT/US2017/049752, which corresponds with U.S. Appl. No. 15/691,701, 13 pages.
International Search Report and Written Opinion, dated Jan. 31, 2018, received in International Application No. PCT/US2017/049752, which corresponds with U.S. Appl. No. 15/691,701, 18 pages.
Notice of Allowance, dated Jun. 21, 2023, received in U.S. Appl. No. 17/074,521, 10 pages.
Notice of Allowance, dated Jun. 30, 2023, received in Chinese Patent Application No. 202111213035.X, which corresponds with U.S. Appl. No. 17/074,521, 2 pages.
Patent, dated Sep. 26, 2023, received in Chinese Patent Application No. 202111213035.X, which corresponds with U.S. Appl. No. 17/074,521, 4 pages.

\* cited by examiner

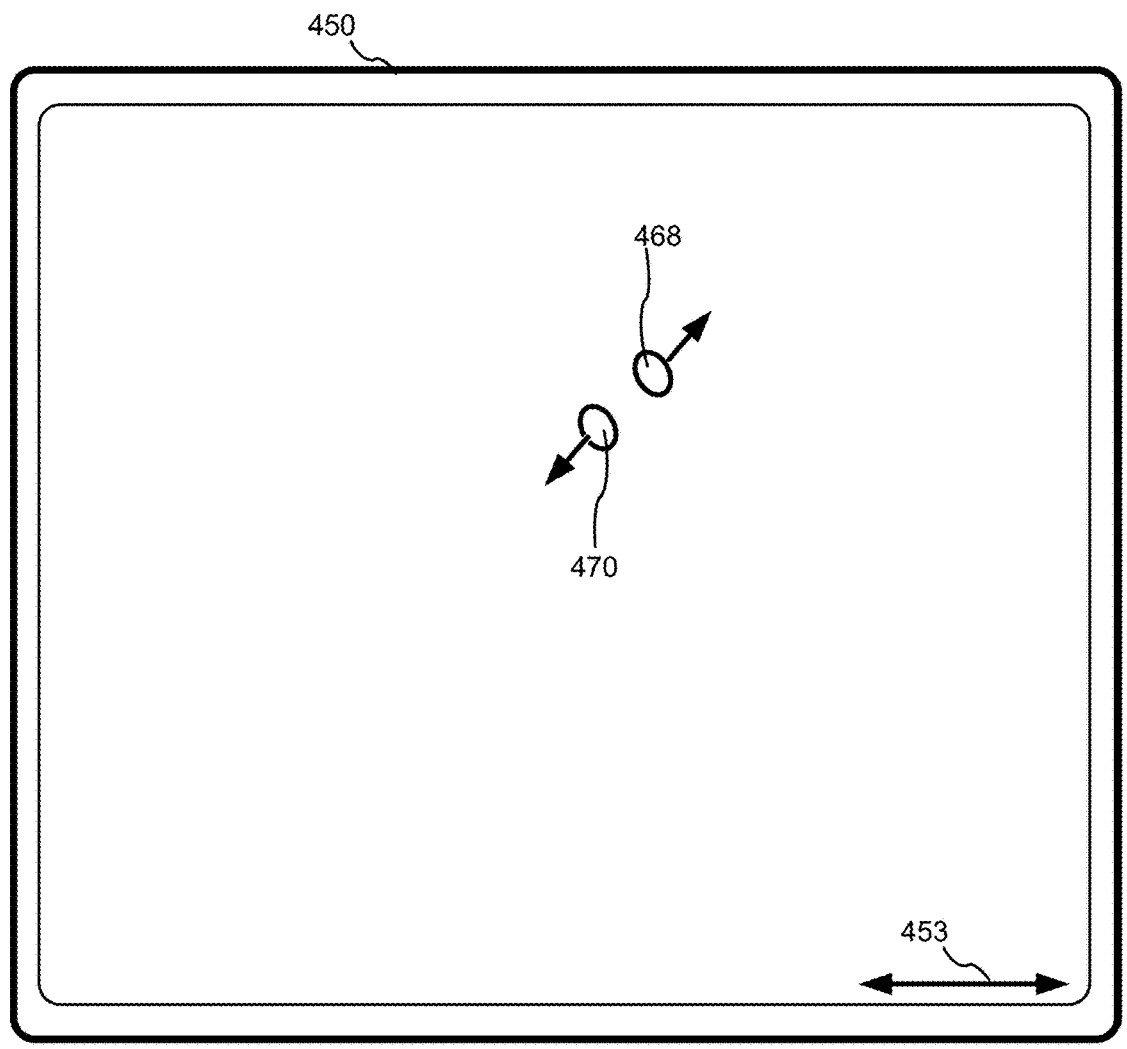
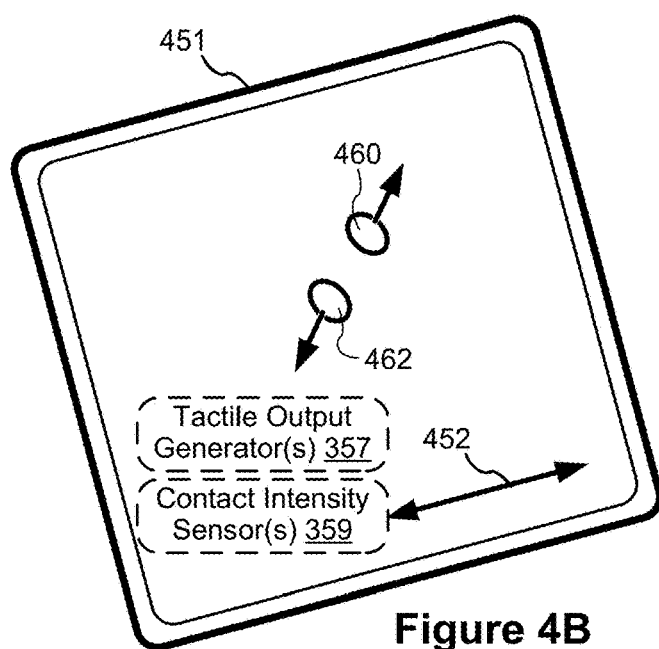
Figure 4B

1000

```
1002  Display a camera user interface on the touch-sensitive display, the camera
      user interface including a live view from the camera
```

```
1004  While displaying the live view from the camera:
        record media images that are captured by the camera, while continuing to
      display the live view from the camera; and
        display representations of a plurality of media images that were recorded
      while displaying the live view from the camera as frames scrolling across the
      display in a first direction (A)
```

```
1006  Prior to recording the media images that were captured by the camera:
        while displaying the live view from the camera:
            capture, without recording, media images that correspond to the live
      view from the camera; and
            detect a first input that activates recording of media images with the
      camera, wherein the recording of the media images is started in response to
      detection of the first input 1008  The display of the representations of the plurality of media images as
      frames scrolling across the display is started in response to the detection of
                                    the first input 1010  The display of the representations of the plurality of media images as
      frames scrolling across the display is started prior to the detection of the first
                                          input
```

1012 The representations of the plurality of images scrolling across the display as frames are overlaid on a portion of the live view from the camera 1014 Displaying the representations of the plurality of media images as frames scrolling across the display includes:
  scrolling a respective frame onto the display from a first side of the display;
  while scrolling the respective frame onto the display and prior to displaying an entirety of the respective frame, displaying a reduced-size copy of the live view from the camera within the respective frame; and
  upon a determination that the entirety of the respective frame has scrolled onto the display, replacing the reduced-size copy of the live view in the respective frame with a respective media image that corresponds to a current image in the live view 1016 The representations of the plurality of media images scrolling across the display as frames include less than all media images that are recorded by the camera 1018 While displaying the live view from the camera and the representations of the plurality of images as frames scrolling across the display:
  detect a second input while a focus selector is at a location that corresponds to a respective representation of a first media image that is currently scrolling across the display; and
  in response to detecting the second input, change an appearance of the respective representation of the first media image among the frames that are scrolling across the display to indicate that the first media image has been marked for later reference 1020 A copy of a respective marked media image is stored separately from a recorded video that includes the respective marked media image in the memory of the device 1022 The copy of the respective marked media image is configured to be displayed at a different aspect ratio from the recorded video that includes the respective marked media image

Figure 10B

1024 While displaying the live view from the camera and the representations of the plurality of images as frames scrolling across the display:
    detect a third input that marks a concurrently captured image; and
    in response to detecting the third input, display a respective representation of the concurrently marked and captured image, wherein an appearance of the respective representation of the concurrently marked and captured image is changed to indicate that the concurrently marked and captured image has been marked for later reference > 1026 The respective representation of the concurrently marked and captured image is displayed among the plurality of digital media images scrolling across the display, regardless of whether the respective representation of the concurrently marked and captured image would have been displayed if the concurrently marked and captured digital media image had not been marked 1028 While displaying the representations of the plurality of images as frames scrolling across the display in the first direction:
    detect a third input that causes movement of a focus selector in a second direction opposite of the first direction; and
    in response to detecting the third input, scroll the representations of the plurality of images as frames across the display in the second direction in accordance with the movement of the focus selector

Figure 10C

1030 While displaying the representations of the plurality of images as frames scrolling across the display:
    detect a fourth input that activates an image review mode; and
    in response to detecting the fourth input that activates the image review mode, replace display of the live view from the camera with display of a first recorded media image among the plurality of media images > 1032 In response to detecting the fourth input that activates the image review mode, create metadata that marks the first recorded media image among the plurality of media images > 1034 While displaying the first recorded media image in the image review mode:
>     detect a fifth input that causes movement of a focus selector in a third direction; and
>     in response to detecting the fifth input, replace display of the first recorded media image with a second recorded media image
>
> > 1036 While displaying the first recorded media in the image review mode:
> >     in response to detecting the fifth input that causes movement of the focus selector in the third direction, create metadata that marks the second recorded media image > 1038 The device continues to record media images with the camera, while displaying the first recorded media image in the image review mode > 1040 While displaying a respective recorded media image in the image review mode:
>     detect a sixth input that deactivates the image review mode; and
>     in response to detecting the sixth input that deactivates the image review mode, replace display of the respective recorded media image with the live view from the camera

Figure 10D

1042 While displaying the representations of the plurality of images as frames scrolling across the display in the first direction:
　　detect a seventh input that specifies a start and an end of a sequence of recorded media images;
　　in response to detecting the seventh input that specifies the start and the end of the sequence of recorded media images:
　　　　create metadata that marks the sequence of recorded media images as a unit of media of a first type; and
　　　　display an indication, in the plurality of images scrolling across the display as frames, that the sequence of recorded media images was marked as a unit of media of the first type > 1044 A copy of the sequence of recorded media images is stored separately from the recorded media images > 1046 The copy of the sequence of recorded media images is configured to be displayed at a different aspect ratio from the recorded media images 1048 While displaying the representations of the plurality of images as frames scrolling across the display:
　　detect an eighth input that activates a video review mode; and
　　in response to detecting the eighth input that activates the video review mode, replace display of the live view from the camera with playback of a first recorded video clip > 1050 The device continues to record media images with the camera, while playing back the first video clip > 1052 While playing back the first video clip, detect a ninth input that deactivates the video review mode; and
> 　　in response to detecting the ninth input that deactivates the image review mode, replace playback of the first video clip with the live view from the camera

1202 Display a camera user interface on the display, the camera user interface including a live view from the camera

1204 While displaying the live view from the camera, detect start of an input by a first contact that activates recording of media with the camera

1206 In response to detecting the start of the input by the first contact that activates recording of media with the camera, display a first indication that the camera is in a first media recording mode that corresponds to recording of a single image

1208 While displaying the first indication that the camera is in the first media recording mode, detect continuation of the input by the first contact

Figure 12A

1210 In response to detecting the continuation of the input by the first contact and before detecting termination of the input:

1212 In accordance with at least a determination that the continuation of the input meets a first predefined temporal threshold:

1214 Display a second indication that the camera is in a second media recording mode that corresponds to recording of a sequence of images contemporaneous with the continuation of the input by the first contact

1216 While displaying the second indication that the camera is in the second media recording mode, detect further continuation of the input by the first contact

1218 In response to detecting the further continuation of the input by the first contact and before detecting termination of the input:

1220 In accordance with at least a determination that the further continuation of the input meets a second predefined temporal threshold, display a third indication that the camera is in a third media recording mode that corresponds to recording of a video

1222 In accordance with a determination that the further continuation of the input does not meet the second predefined temporal threshold, maintain display of the second indication that the camera is in the second media recording mode

1224 In accordance with a determination that the further continuation of the input does not meet the second predefined temporal threshold, maintain display of the second indication that the camera is in the second media recording mode

Figure 12B

1226 In response to detecting the start of the input by the first contact that activates recording of media with the camera, start continuous capture of media images with a configuration that is compatible with multiple media recording modes including the first, second, and third media recording modes 1228 While displaying a respective one of the first, second, and third indications that corresponds to a respective one of the first, second, and third media recording modes, detect termination of the input by the first contact; and
    in response to detecting the termination of the input by the first contact:
        obtain, from the continuously captured media images, media of a first type that corresponds to said respective one of the first, second, and third media recording modes; and
        persistently store the obtained media of the first type 1230 In response to detecting the termination of the input by the first contact, cease the continuous capture of media images with the configuration that is compatible with multiple media recording modes 1232 The termination of the input by the first contact is detected while the camera is in the first media recording mode; and
    the media of a first type includes a single image with a first set of media properties 1234 The termination of the input by the first contact is detected while the camera is in the second media recording mode; and
    the media of a first type includes a sequence of two or more images with a second set of media properties 1236 The sequence of two or more images includes at least one image that had been captured before the camera entered the second media recording mode 1238 The termination of the input by the first contact is detected while the camera is in the third media recording mode; and
    the media of a first type includes a video with a third set of media properties 1240 The video includes at least one frame that had been captured before the camera entered the third media recording mode

Figure 12C

1242 Displaying the first indication that the camera is in the first media recording mode includes displaying a recording affordance with a first appearance;
  displaying the second indication that the camera is in the second media recording mode includes displaying the recording affordance with a second appearance that is different from the first appearance; and
  displaying the third indication that the camera is in the third media recording mode includes displaying the recording affordance with a third appearance that is different from the first appearance and the second appearance 1244 Displaying the first indication that the camera is in the first media recording mode includes displaying the live view from the camera with a first visual characteristic; and
  displaying the third indication that the camera is in the third media recording mode includes displaying the live view from the camera with a second visual characteristic that is different from the first visual characteristic 1246 Displaying the first indication that the camera is in the first media recording mode includes displaying a mode indicator in a first state;
  displaying the third indication that the camera is in the third media recording mode includes displaying the mode indicator in a second state; and
  the method includes, while detecting the continuation the input by the first contact, displaying an animated transition from the mode indicator in the first state to the mode indicator in the second state 1248 While displaying the third indication that corresponds to the third media recording mode, detect termination of the input by the first contact; and
  in response to detecting the termination of the input by the first contact:
    in accordance with a determination that a duration of the input meets a third predefined temporal threshold:
      continue to capture media images with the configuration that is compatible with multiple media recording modes until a termination input distinct from the first input is detected;
      obtain a first video from the continuously captured media upon detection of the termination input; and
      persistently store the obtained first video; and
    in accordance with a determination that the duration of the input does not meet the third predefined temporal threshold:
      cease the continuous capture of media images with the configuration that is compatible with multiple media recording modes;
      obtain a second video from the continuously captured media; and
      persistently store the obtained second video

1402 Display, in a first display region of a camera user interface, a first live view from a first camera of the electronic device 1404 While displaying the first live view from the first camera in the first display region of the camera user interface, detect movement of a first contact on the touch-sensitive surface 1406 In response to detecting the movement of the first contact on the touch-sensitive surface:
    in accordance with a determination that the movement of the first contact meets first movement criteria:
        move the first live view in the first display region in accordance with the movement of the first contact on the touch-sensitive surface;
        display a second live view from a second camera of the electronic device in the first display region; and
        move the second live view in the first display region in accordance with the movement of the first contact on the touch-sensitive surface

Figure 14A

1408 The first live view is displayed on a first side of a multi-sided user interface object;
    the second live view is displayed on a second side of the multi-sided user interface object; and
    moving the first live view and the second live view in accordance with the movement of the first contact on the touch-sensitive display includes rotating the multi-sided user interface object in accordance with the movement of the first contact on the touch-sensitive display 1410 The movement of the first contact includes a first portion of the movement in a first direction, and a second portion of the movement in a second direction opposite the first direction; and
    rotating the multi-sided user interface object in accordance with the movement of the first contact on the touch-sensitive display includes:
        rotating the multi-sided user interface object in the first direction in response to the first portion of the movement; and
        rotating the multi-sided user interface object in the second direction in response to the second portion of the movement 1412 After rotating the multi-sided user interface object in accordance with the first contact on the touch-sensitive display, detect lift-off of the first contact; and
    in response to detecting the lift-off of the first contact:
        in accordance with a determination that the movement of the first contact meets second movement criteria, continue to rotate the multi-sided user interface object after the lift-off of the first contact, until the second side of the multi-sided user interface object occupies an entirety of the first display region 1414 In response to detecting the lift-off of the first contact:
    in accordance with a determination that the movement of the first contact meets third movement criteria, reverse rotation of the multi-sided user interface object after the lift-off of the first contact, until the first side of the multi-sided user interface object reoccupies the entirety of the first display region

Figure 14B

1416 The first live view is displayed in a first panel of a multi-panel user interface object;
    the second live view is displayed in the second-panel of the multi-panel user interface object; and
    moving the first live view and the second live view in accordance with the movement of the first contact on the touch-sensitive display includes sliding the multi-panel user interface object in the first display region in accordance with the movement of the first contact on the touch-sensitive display 1418 The movement of the first contact includes a first portion of the movement in a first direction, and a second portion of the movement in a second direction opposite the first direction; and
    sliding the multi-panel user interface object in accordance with the movement of the first contact on the touch-sensitive display includes:
        sliding the multi-panel user interface object in the first direction in response to the first portion of the movement; and
        sliding the multi-panel user interface object in the second direction in response to the second portion of the movement 1420 After sliding the multi-panel user interface object in accordance with the movement of the first contact on the touch-sensitive display, detect lift-off of the first contact; and
    in response to detecting the lift-off of the first contact:
        in accordance with a determination that the movement of the first contact meets fourth movement criteria, continue to slide the multi-panel user interface object after the lift-off of the first contact, until the second panel of the multi-panel user interface object occupies an entirety of the first display region 1422 In response to detecting the lift-off of the first contact:
    in accordance with a determination that the movement of the first contact meets fifth movement criteria, reverse sliding of the multi-sided user interface object after the lift-off of the first contact, until the first panel of the multi-panel user interface object reoccupies the entirety of the first display region 1424 After sliding the multi-panel user interface object in accordance with the movement of the first contact on the touch-sensitive display, detect lift-off of the first contact; and
    in response to detecting the lift-off of the first contact, cease to slide the multi-panel user interface object after the lift-off of the first contact, wherein the first display region concurrently displays a part of the first panel of the multi-panel user interface object and a part of the second panel of the multi-panel user interface object

Figure 14C

1426 Detect lift-off of the first contact, wherein after lift-off of the first contact:
    in accordance with a determination that the movement of the first contact meets sixth movement criteria, the first live view ceases to be displayed in the first display region, and the second live view occupies an entirety of the first display region; and
    in accordance with a determination that the movement of the first contact meets seventh movement criteria, the first display region is split between displaying a part of the first live view and a part of the second live view 1428 The movement of the first contact is detected while video recording through the first camera is in progress 1430 Continue to record video after detecting the movement of the first contact on the touch-sensitive display 1432 Continuing to record video after detecting the movement of the first contact on the touch-sensitive display includes:
            continuing to record video captured by the first camera while moving the first live view and the second live view in accordance with the movement of the first contact 1434 Continuing to record video after detecting the movement of the first contact on the touch-sensitive display includes:
            ceasing to record video captured by the first camera when the first live view captured by the first camera is no longer displayed in the first display region; and
            starting to record video captured by the second camera when the second live view captured by the second camera is displayed in the first display region 1436 Continuing to record video after detecting the movement of the first contact on the touch-sensitive display includes:
            continuing to recording video as shown in the first display region, including recording the movement of the first live view and the second live view (A)

Figure 14D

1448 In response to detecting the movement of the first contact:
    in accordance with a determination that the movement of the first contact meets eighth movement criteria:
        change an aspect ratio of the first live view or an aspect ratio of the first display region in accordance with the movement of the first contact > 1450 Changing an aspect ratio of the first live view or an aspect ratio of the first display region in accordance with the movement of the first contact includes:
>     in accordance with a determination that the movement of the first contact meets ninth movement criteria, switching from a first aspect ratio to a second aspect ratio > 1452 Changing an aspect ratio of the first live view or an aspect ratio of the first display region in accordance with the movement of the first contact includes:
>     in accordance with a determination that the movement of the first contact meets tenth movement criteria, dynamically adjusting the aspect ratio of the first live view or the first display region in accordance with the movement of the first contact 1454 The movement of the first contact is in a first region on the touch-sensitive display that corresponds to locations within the first display region, and the method further includes:
    while displaying the first display region including the first live view captured by the first camera, detecting movement of a second contact in a second region on the touch-sensitive display that corresponds to locations outside of the first display region; and
    in response to detecting the movement of the second contact in the second direction, switching from a first media capture mode to a second media capture mode of the first camera in accordance with the movement of the second contact

1602 Display a camera user interface for recording media images in a plurality of media recording modes 1604 While displaying the camera user interface, capture media with one or more of the cameras 1606 In response to capturing the media:
    in accordance with a determination that the captured media is consistent with a first media recording mode of the plurality of media recording modes, display a first prompt in the camera user interface that prompts a user to take one or more actions associated with the first media recording mode; and
    in accordance with a determination that the captured media is consistent with a second media recording mode of the plurality of media recording modes, display a second prompt in the camera user interface that prompts the user to take one or more actions associated with the second media recording mode, wherein the first media recording mode is different from the second media recording mode 1608 The first media recording mode is a panorama recording mode 1610 The second media recording mode is a video recording mode 1612 The one or more actions associated with the first media recording mode include shifting a field of view of the camera to capture additional media for use in generation of a multi-image panorama 1614 The one or more actions associated with the second media recording mode include confirming or rejecting a suggestion of content to delete

Figure 16A

1616 The device makes the determination that the captured media is consistent with the first media recording mode while capturing of the media is in progress 1618 The device makes the determination that the captured media is consistent with the second media recording mode after capture of media is suspended or stopped 1620 Determine that a first portion of the captured media is consistent with the first media recording mode and that a second portion of the captured media is consistent with the second media recording mode, wherein:
    the device displays the first prompt in the camera user interface with regard to the first portion of the captured media, and
    the device displays the second prompt in the camera user interface with regard to the second portion of the captured media 1622 Capturing of the media is automatically started, without requiring manual activation of a media capture affordance by a user 1624 The one or more actions associated with the first media recording mode includes specifying a start of a media item to be recorded under the first media recording mode 1626 In response to capturing the media:
    in accordance with a determination that the captured media is consistent with the second media recording mode of the plurality of media recording modes, automatically identify a start of a media item to be recorded under the second media recording mode 1628 Display a live view from a first camera of the one or more cameras in the camera user interface, wherein the electronic device captures the media that corresponds to images in the live view

Figure 16B

1630 One or more visual characteristics of the camera user interface indicates one or more media recording modes that are currently active at the electronic device 1632 While capturing the media with one or more of the cameras:
store image data captured by the one or more cameras of the electronic device independent of the one or more media recording modes that are currently active at the electronic device 1634 Annotate the stored image data in accordance with the one or more media recording modes that are currently active at the electronic device 1636 Receive an instruction to display the stored image data; and, in response to receiving the instruction to display the stored image data, display a media summary of the stored image data, wherein:
the media summary is generated from the stored image data based on annotations of the stored image data, and
the media summary includes at least a first media item extracted from a first portion of the recorded image data in accordance with the first media recording mode that was activated at the time that the first portion of the image data was stored 1638 The media summary includes at least a second media item extracted from a second portion of the recorded image data in accordance with the second media recording mode that was not activated at the time that the second portion of the image data was stored (A)

1802 Display, on the display, a first user interface for presenting a sequence of media content that has a plurality of identified still images, wherein the first user interface includes:
    a representation of a first still image from the sequence of media content;
    a timeline that corresponds to the sequence of media content; and
    a plurality of image-adjustment objects, wherein:
        a first image-adjustment object has a first location on the timeline; and
        a second image-adjustment object has a second location on the timeline that is different from the first location

1804 While displaying the representation of the first still image, receive a request to move a respective image-adjustment object of the plurality of image-adjustment objects in the timeline

1806 In response to receiving the request to move the respective image-adjustment object in the timeline:
    in accordance with a determination that the respective image-adjustment object is the first image-adjustment object, move the first image-adjustment object in the timeline to a first updated location in accordance with the request and update the representation of the first still image to correspond to the first updated location of the first image-adjustment object on the timeline; and
    in accordance with a determination that the respective image-adjustment object is the second image-adjustment object, move the second image-adjustment object along the timeline to a second updated location in accordance with the request and update a representation of a second still image to correspond to the second updated location of the second image-adjustment object on the timeline

Figure 18A

1808 While displaying the first user interface, after receiving the request to move the respective image-adjustment object, receive a request to display a second user interface, wherein:
    the second user interface includes respective representations of a plurality of media items within the sequence of media content, and
    the respective representations of the plurality of media items includes at least a subset of the plurality of identified still images; and in response to receiving the request to display the second user interface that includes the respective representations of the plurality of media items, display the second user interface, wherein the respective representations of the plurality of media items include an updated still image that corresponds to an updated location of the respective image-adjustment object > 1810 Prior to displaying the first user interface for presenting the sequence of media content that has the plurality of identified still images, display the second user interface that includes the respective representations of the plurality of media items;
>     while displaying the second user interface that includes the respective representations of the plurality of media items, receive a request to display the first user interface for presenting the sequence of media content that has the plurality of identified still images; and
>     in response to receiving the request to display the first user interface for presenting the sequence of media content that has the plurality of identified still images, replace display of the second user interface with display of the first user interface 1812 Prior to receiving the request to move the respective image-adjustment object, receive a request to select the second image-adjustment object; and
    in response to the request to select the second image-adjustment object, replace display of the first still image with display of the second still image in the first user interface 1814 In response to receiving the request to move the respective image-adjustment object in the timeline:
    in accordance with a determination that the respective image-adjustment object is the first image-adjustment object:
        while moving the first image-adjustment object along the timeline to the first updated location in accordance with the request to move the respective image-adjustment object in the timeline, sequentially display one or more still images selected from the sequence of media content that correspond to one or more current locations of the first image-adjustment object on the timeline during the movement

Figure 18B

1816 The request to move the respective image-adjustment object includes a request to move the respective image-adjustment object such that the respective image-adjustment object passes another image-adjustment object of the plurality of image-adjustment objects in the timeline 1818 The first image-adjustment object of the plurality of image-adjustment objects in the timeline includes a representation of the first still image; and
    the second image-adjustment object of the plurality of image-adjustment objects in the timeline includes a representation of the second still image 1820 In response to receiving the request to move the respective image-adjustment object in the timeline:
    in accordance with a determination that the respective image-adjustment object is the first image-adjustment object:
        while moving the first image-adjustment object along the timeline to the first updated location in accordance with the request to move the respective image-adjustment object in the timeline, continuously update the representation of the first still image on the first image-adjustment object to correspond to a current location of the first image-adjustment object on the timeline during the movement of the first image-adjustment object 1822 Prior to displaying the first user interface for presenting the sequence of media content that has the plurality of identified still images:
    record the sequence of media content; and
    during recording of the sequence of media content, identify the plurality of still images 1824 In response to receiving the request to move the respective image-adjustment object, adjust an appearance of the respective image-adjustment object

Figure 18C

1826 Display, on the timeline that corresponds to the sequence of media content, a first video-adjustment object that corresponds to a first identified video segment from the sequence of media content 1828 Prior to displaying the first user interface for the sequence of media content that has the plurality of identified still images:
    capture the sequence of media content, and
    while capturing the sequence of media content, identify one or more video segments that include the first identified video segment 1830 While displaying the first user interface, detect a request to edit the first video-adjustment object; and
    in response to detecting the request to edit the first video-adjustment object, display a third user interface that includes at least one affordance for editing the first identified video segment that corresponds to the first video-adjustment object 1832 A visual characteristic of the first video-adjustment object corresponds to a length of the first video segment 1834 Detect a request to move the first video-adjustment object in the timeline; and
    in response to detecting the request to move the video-adjustment object in the timeline, adjust a start time of the first identified video segment that corresponds to the first video-adjustment object 1836 In response to detecting the request to move the video-adjustment object in the timeline, maintain a duration of the first identified video segment while adjusting the start time of the first identified video segment that corresponds to the first video-adjustment object 1838 The plurality of image-adjustment objects have different orientations on the timeline

Figure 18D

DEVICES, METHODS, AND GRAPHICAL USER INTERFACES FOR CAPTURING AND RECORDING MEDIA IN MULTIPLE MODES

RELATED APPLICATIONS

This application is a continuation of U.S. application Ser. No. 17/074,521, filed Oct. 19, 2020, now U.S. Pat. No. 11,750,914, which is a continuation of U.S. application Ser. No. 16/711,138, filed Dec. 11, 2019, now U.S. Pat. No. 10,848,661, which is a continuation of U.S. application Ser. No. 15/691,701, filed Aug. 30, 2017, now U.S. Pat. No. 10,547,776, which application claims priority to U.S. Provisional Application Ser. No. 62/399,292, filed Sep. 23, 2016, which are incorporated herein by reference in their entirety.

TECHNICAL FIELD

This relates generally to electronic devices with touch-sensitive surfaces and one or more cameras, including but not limited to electronic devices with touch-sensitive surfaces and cameras that capture and record images in multiple modes.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

For electronic devices that have one or more associated cameras, a camera user interface provides affordances for controlling various camera functions, such as choosing an image recording mode (e.g., photo, video, or panorama recording mode), and choosing when to snap a photo or when start and end a video recording. The camera user interface often includes a live view from a camera that is associated with the electronic device. The live view from the camera helps the user to see the images that are being captured by the camera, and decide whether the images should be recorded and saved as a corresponding media item. The camera user interface may include an affordance for switching between live views from different cameras. A separate media review interface or application is often used when a user wishes to review the media items that have been recorded using the camera user interface.

Current methods for controlling camera functions and reviewing recorded media items are cumbersome and inefficient. For example, using a sequence of inputs to access a desired image recording function or mode causes unacceptable delay and missed opportunities for capturing and recording desirable images. The user is required to make a decision and execute required actions within a very short window of time without sufficient information and assistance from the device, which places undue cognitive burden on the user and increases the chance of user mistakes. Often times, performing one function using the camera user interface (e.g., taking a still photo) will prevent concurrent performance of another function of the camera user interface (e.g., taking a video). In addition, these methods take longer than necessary, thereby wasting energy. This latter consideration is particularly important in battery-operated devices.

SUMMARY

Accordingly, there is a need for electronic devices with faster, more efficient methods and interfaces for capture and record images in multiple modes. Such methods and interfaces optionally complement or replace conventional methods for capture and record images in multiple modes. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device having one or more processors, memory, a display, and a camera. The method includes displaying a camera user interface on the display, the camera user interface including a live view from the camera. While displaying the live view from the camera, the method includes recording media images that are captured by the camera, while continuing to display the live view from the camera; and displaying representations of a plurality of media images that were recorded while displaying the live view from the camera as frames scrolling across the display in a first direction.

In accordance with some embodiments, an electronic device includes a display unit configured to display user interfaces and to detect contacts, a camera unit configured to capture media, and a processing unit coupled to the display unit and the camera unit. In some embodiments, the processing unit includes a detecting unit, a recording unit, a capturing unit, a scrolling unit, a replacing unit, a changing unit, and a creating unit. The processing unit is configured to: enable display of a camera user interface on the display unit, the camera user interface including a live view from the camera unit; while displaying the live view from the camera unit: record media images that are captured by the camera unit, while continuing to display the live view from the camera unit; and enable display of representations of a plurality of media images that were recorded while displaying the live view from the camera unit as frames scrolling across the display unit in a first direction.

In accordance with some embodiments, a method is performed at an electronic device having one or more processors, memory, a camera, and a display. The method includes displaying a camera user interface on the display, where the camera user interface including a live view from the camera. While displaying the live view from the camera, the method further includes detecting start of an input by a first contact that activates recording of media with the camera. In response to detecting the start of the input by the first contact that activates recording of media with the camera, the method further includes displaying a first indication that the camera is in a first media recording mode that corresponds to recording of a single image. While displaying the first indication that the camera is in the first media recording mode, the method includes detecting continuation of the input by the first contact. In response to detecting the continuation of the input by the first contact and before detecting termination of the input, the method further includes: in accordance with at least a determination that the continuation of the input meets a first predefined temporal threshold: displaying a second indication that the camera is in a second media recording mode that corresponds to recording of a sequence of images contemporaneous with the continuation of the input by the first contact; while displaying the second indication that the camera is in the second media recording mode, detecting further continuation of the input by the first contact; in response to detecting the further continuation of the input by the first contact and before detecting termination of the input: in accordance with at least a determination that the further continuation of the input meets a second predefined temporal threshold, displaying a third indication that the camera is in a third media recording mode that corresponds to recording of a video.

In accordance with some embodiments, an electronic device includes a display unit configured to display user interfaces, a camera unit configured to capture media, and a processing unit coupled to the display unit and the camera units. In some embodiments, the processing unit includes a detecting unit, a capturing unit, an obtaining unit, and a storing unit. The processing unit is configured to: enable display of a camera user interface on the display, the camera user interface including a live view from the camera unit. While displaying the live view from the camera unit, the processing unit is configured to detect start of an input by a first contact that activates recording of media with the camera unit. In response to detecting the start of the input by the first contact that activates record of media with the camera unit, the processing unit is configured to enable display of a first indication that the camera unit is in a first media recording mode that corresponds to recording of a single image. While displaying the first indication that the camera unit is in the first media recording mode, the processing unit is configured to detect continuation of the input by the first contact. In response to detecting the continuation of the input by the first contact and before detecting termination of the input, the processing unit is configured to: in accordance with at least a determination that the continuation of the input meets a first predefined temporal threshold: enable display of a second indication that the camera unit is in a second media recording mode that corresponds to record of a sequence of images contemporaneous with the continuation of the input by the first contact; while displaying the second indication that the camera unit is in the second media recording mode, detect further continuation of the input by the first contact; in response to detecting the further continuation of the input by the first contact and before detecting termination of the input: in accordance with at least a determination that the further continuation of the input meets a second predefined temporal threshold, enable display of a third indication that the camera unit is in a third media recording mode that corresponds to record of a video.

In accordance with some embodiments, a method is performed at an electronic device with a display, a touch-sensitive surface, and one or more cameras. The method includes displaying, in a first display region of a camera user interface, a first live view from a first camera of the electronic device. While displaying the first live view from the first camera in the first display region of the camera user interface, the method includes detecting movement of a first contact on the touch-sensitive surface. In response to detecting the movement of the first contact on the touch-sensitive surface, the method includes: in accordance with a determination that the movement of the first contact meets first movement criteria: moving the first live view in the first display region in accordance with the movement of the first contact on the touch-sensitive surface; displaying a second live view from a second camera of the electronic device in the first display region; and moving the second live view in the first display region in accordance with the movement of the first contact on the touch-sensitive surface.

In accordance with some embodiment, an electronic device includes a display unit configured to display user interfaces, a touch-sensitive surface unit configured to detect contacts, one or more camera units (including a first camera unit and a second camera unit) configured to capture media, and a processing unit coupled to the display unit, the touch-sensitive surface unit, and the camera units. In some embodiments, the processing unit includes a detecting unit, a moving unit, a rotating unit, a sliding unit, a recording unit, a changing unit, a switching unit, and an adjusting unit. The processing unit is configured to: enable display of, in a first display region of a camera user interface, a first live view from a first camera unit of the electronic device. While displaying the first live view from the first camera unit in the first display region of the camera user interface, the processing unit is configured to detect movement of a first contact on the touch-sensitive surface unit. In response to detecting the movement of the first contact on the touch-sensitive surface unit, the processing unit is configured to: in accordance with a determination that the movement of the first contact meets first movement criteria: move the first live view in the first display region in accordance with the movement of the first contact on the touch-sensitive surface unit; enable display of a second live view from a second camera unit of the electronic device in the first display region; and move the second live view in the first display region in accordance with the movement of the first contact on the touch-sensitive surface unit.

In accordance with some embodiments, a method is performed at an electronic device with a display and one or more cameras. The method includes: displaying a camera user interface for recording media images in a plurality of media recording modes. While displaying the camera user interface, the method includes capturing media with one or more of the cameras. In response to capturing the media, the method includes: in accordance with a determination that the captured media is consistent with a first media recording mode of the plurality of media recording modes, displaying a first prompt in the camera user interface that prompts a user to take one or more actions associated with the first media recording mode; and in accordance with a determination that the captured media is consistent with a second media recording mode of the plurality of media recording modes, displaying a second prompt in the camera user interface that prompts the user to take one or more actions associated with the second media recording mode, where the first media recording mode is different from the second media recording mode.

In accordance with some embodiments, an electronic device includes a display unit configured to display user interfaces, one or more camera units configured to capture media, and a processing unit coupled to the display unit and the one or more camera units. In some embodiments, the processing unit includes a capturing unit, a shifting unit, a confirming unit, a determining unit, a playing unit, a specifying unit, an identifying unit, a storing unit, a detecting unit, an annotating unit, a receiving unit, a generating unit, an extracting unit, a moving unit, and an expanding unit. The processing unit is configured to: enable display of a camera user interface for recording media images in a plurality of media recording modes. While displaying the camera user interface, the processing unit is configured to capture media with the one or more cameras units. In response to capturing the media, the processing unit is configured to: in accordance with a determination that the captured media is consistent with a first media recording mode of the plurality of media recording modes, enable display of a first prompt in the camera user interface that prompts a user to take one or more actions associated with the first media recording mode; and in accordance with a determination that the captured media is consistent with a second media recording mode of the plurality of media recording modes, enable display of a second prompt in the camera user interface that prompts the user to take one or more actions associated with the second media recording mode, where the first media recording mode is different from the second media recording mode.

In accordance with some embodiments, a method is performed at an electronic device with a display. The method includes: displaying, on the display, a first user interface for presenting a sequence of media content that has a plurality of identified still images, where the first user interface includes: a representation of a first still image from the sequence of media content; a timeline that corresponds to the sequence of media content; and a plurality of image-adjustment objects, where: a first image-adjustment object has a first location on the timeline; and a second image-adjustment object has a second location on the timeline that is different from the first location. While displaying the representation of the first still image, the method includes receiving a request to move a respective image-adjustment object of the plurality of image-adjustment objects in the timeline. In response to receiving the request to move the respective image-adjustment object in the timeline, the method further includes: in accordance with a determination that the respective image-adjustment object is the first image-adjustment object, moving the first image-adjustment object in the timeline to a first updated location in accordance with the request and updating the representation of the first still image to correspond to the first updated location of the first image-adjustment object on the timeline; and in accordance with a determination that the respective image-adjustment object is the second image-adjustment object, moving the second image-adjustment object along the timeline to a second updated location in accordance with the request and updating a representation of a second still image to correspond to the second updated location of the second image-adjustment object on the timeline.

In accordance with some embodiments, an electronic device includes a display unit configured to display user interfaces and a processing unit coupled to the display unit. In some embodiments, the processing unit includes a receiving unit, a moving unit, a replacing unit, an updating unit, a recording unit, an identifying unit, an adjusting unit, a detecting unit, a maintaining unit, and a capturing unit. The processing unit is configured to: enable display of, on the display unit, a first user interface for presenting a sequence of media content that has a plurality of identified still images, where the first user interface includes: a representation of a first still image from the sequence of media content; a timeline that corresponds to the sequence of media content; and a plurality of image-adjustment objects, where: a first image-adjustment object has a first location on the timeline; and a second image-adjustment object has a second location on the timeline that is different from the first location. While displaying the representation of the first still image, the processing unit is configured to receive a request to move a respective image-adjustment object of the plurality of image-adjustment objects in the timeline. In response to receiving the request to move the respective image-adjustment object in the timeline, the processing is configured to: in accordance with a determination that the respective image-adjustment object is the first image-adjustment object, move the first image-adjustment object in the timeline to a first updated location in accordance with the request and update the representation of the first still image to correspond to the first updated location of the first image-adjustment object on the timeline; and in accordance with a determination that the respective image-adjustment object is the second image-adjustment object, move the second image-adjustment object along the timeline to a second updated location in accordance with the request and update a representation of a second still image to correspond to the second updated location of the second image-adjustment object on the timeline.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for capturing and recording images in multiple modes, thereby increasing the effectiveness, efficiency, and user satisfaction with such devices. Such methods and interfaces may complement or replace conventional methods for capturing and recording images in multiple modes.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 10A-10E are flow diagrams illustrating a method of concurrently capturing and editing digital media in accordance with some embodiments.

FIGS. 12A-12D are flow diagrams illustrating a method of capturing digital media in different imaging modes in accordance with some embodiments.

FIGS. 14A-14F are flow diagrams illustrating a method of switching between camera live views during image capture in accordance with some embodiments.

FIGS. 16A-16H are flow diagrams illustrating a method of automatically detecting and prompting for user action(s) regarding an image recording mode in accordance with some embodiments.

FIGS. 18A-18D are flow diagrams illustrating a method of adjusting selected images and video clips from a video recording in accordance with some embodiments.

DESCRIPTION OF EMBODIMENTS

A camera user interface is provided which includes a live view from a camera. When media capture is started, images captured by the camera are displayed concurrently with the live view as frames scrolling across the display, e.g., forming a live frame stream. The frame stream provides feedback to the user regarding the images that have just been captured. The user may interact with the images represented in the frame stream to mark the images as media items to be stored persistently under different media recording modes, to review the media items, and to otherwise manipulate the images (e.g., to delete blurry images) without interrupting the ongoing media capture and/or recording.

When an input directed to a live view in the camera user interface is detected, the duration of the input is used to determine which media recording mode is to be activated and what type of media item will be recorded at the end of the input. The device automatically switches from one recording mode to the next without specific instruction or other inputs from the user, making the recording experience more streamlined and efficient.

When a device has multiple associated cameras, switching between live views from the multiple cameras is performed in response to movement of contacts on a live view display object that displays live views from one or more of the cameras. Movement of contacts on the live view display object causes adjustment to the aspect ratio of a live view that is currently displayed. In some embodiments, switching between live views from different cameras and adjusting an aspect ratio of a currently displayed live view are performed without interrupting ongoing media capture and/or recording.

The electronic device automatically prompts the user for actions associated with one or more image recording modes that are detected based on analysis of device movement and images captured by the camera. Images captured by the camera are automatically processed and arranged into one or more media summaries with media items recorded under different image recording modes, some of which have been automatically generated by the device based on an analysis of the device movement and image features of the captured images without user intervention.

When assisting a user in choosing representative still images for a sequence of media content, a user interface switches between a grid view and a timeline view, where in the timeline view, media-adjustment objects (e.g., image-adjustment objects and video-adjustment objects) are moved along the timeline to update the still images that are selected to represent the sequence of media content. The timeline view provides an intuitive and efficient way for the user to scrub through a large amount of content to identify suitable still images to represent the sequence of content, and the grid view provides direct full overview of the still images that are current identified.

Figure 2:
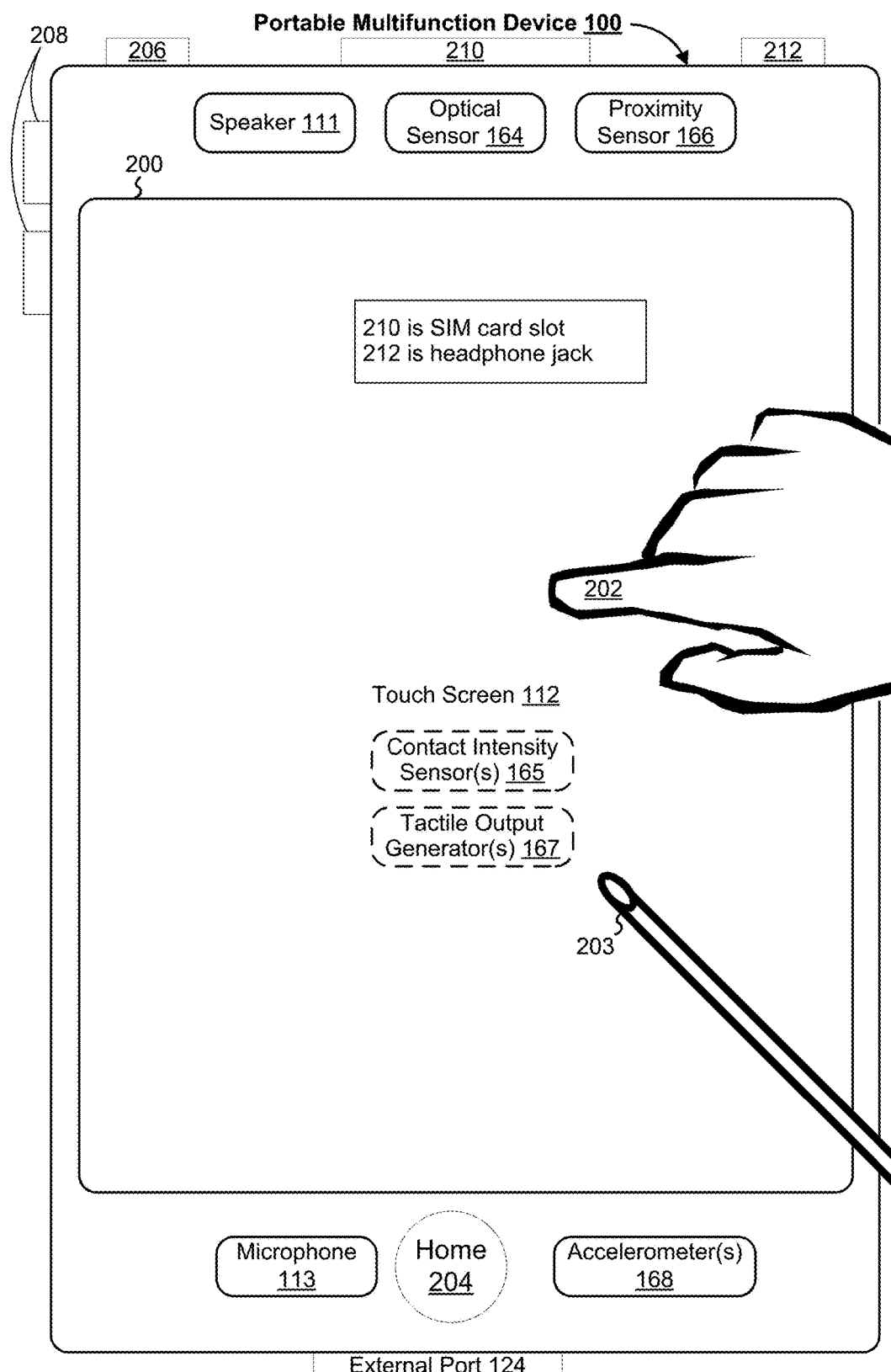
FIG. 2 illustrates a portable multifunction device having a touch screen in accordance with some embodiments.
Figure 3:
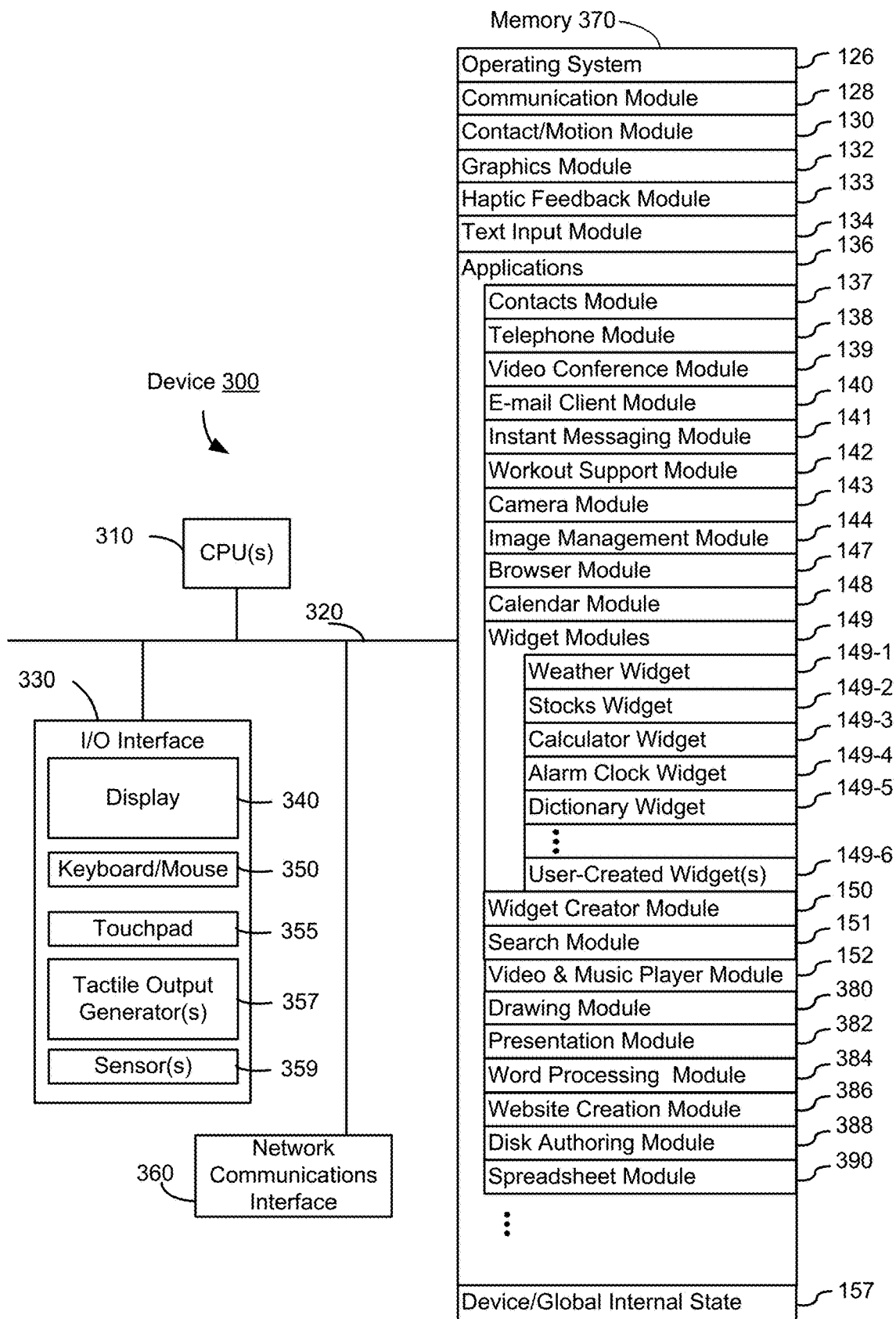
FIG. 3 is a block diagram of an example multifunction device with a display and a touch-sensitive surface in accordance with some embodiments.
Figure 4A:
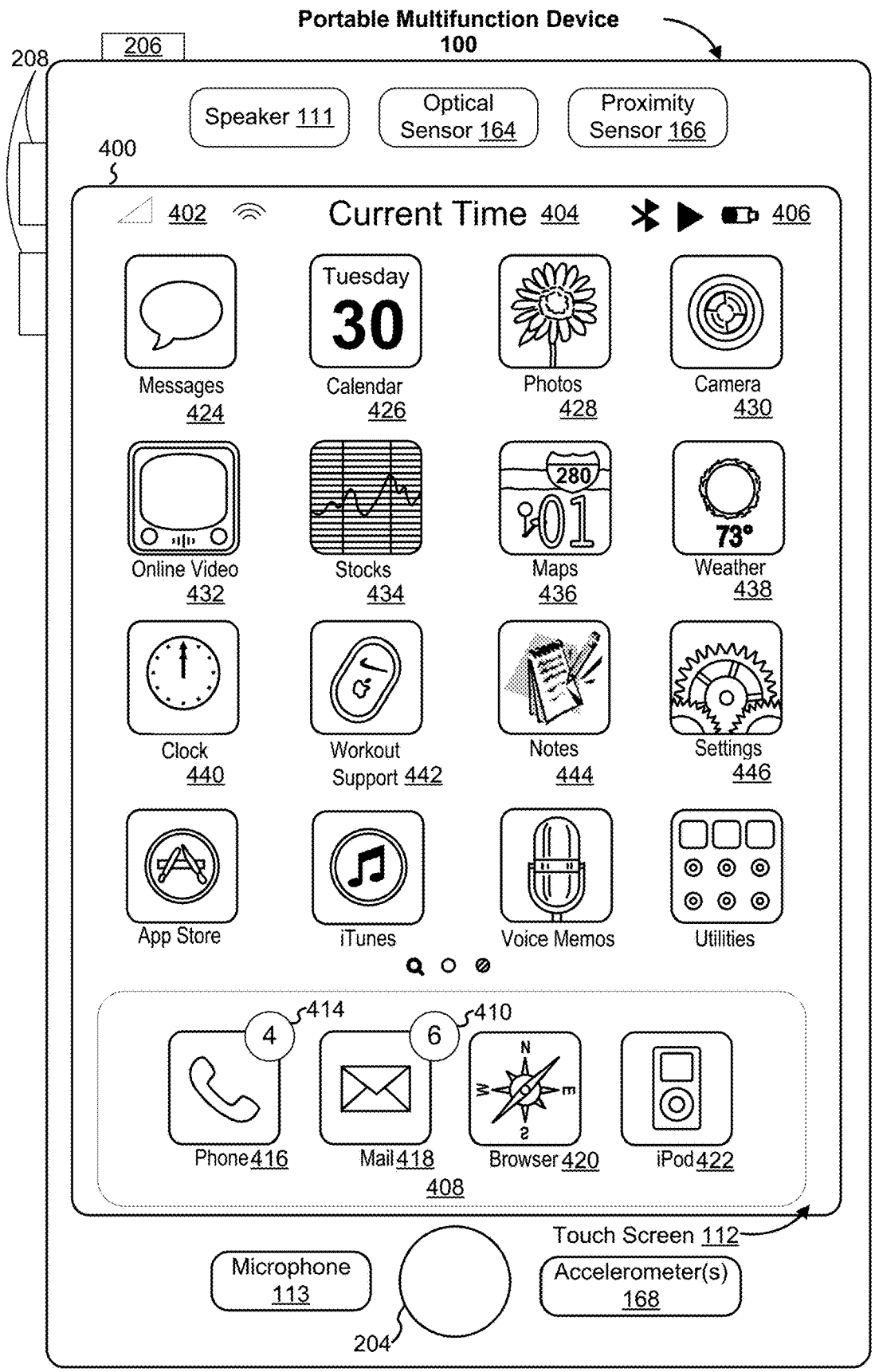
FIG. 4A illustrates an example user interface for a menu of applications on a portable multifunction device in accordance with some embodiments.
Figure 5A:
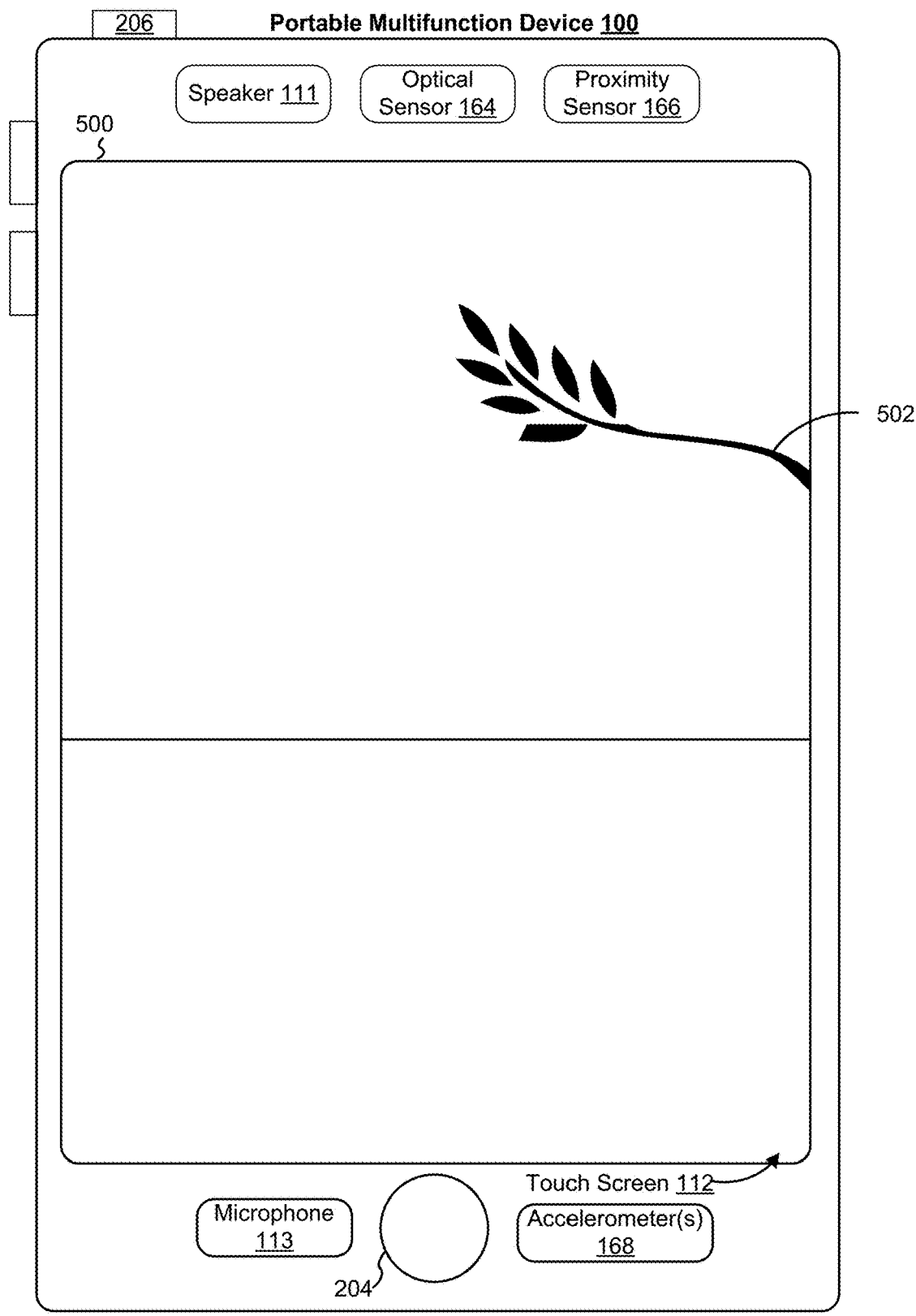
FIGS. 5A-5AG illustrate example user interfaces for concurrently capturing and editing digital media in accordance with some embodiments.
Figure 5B:
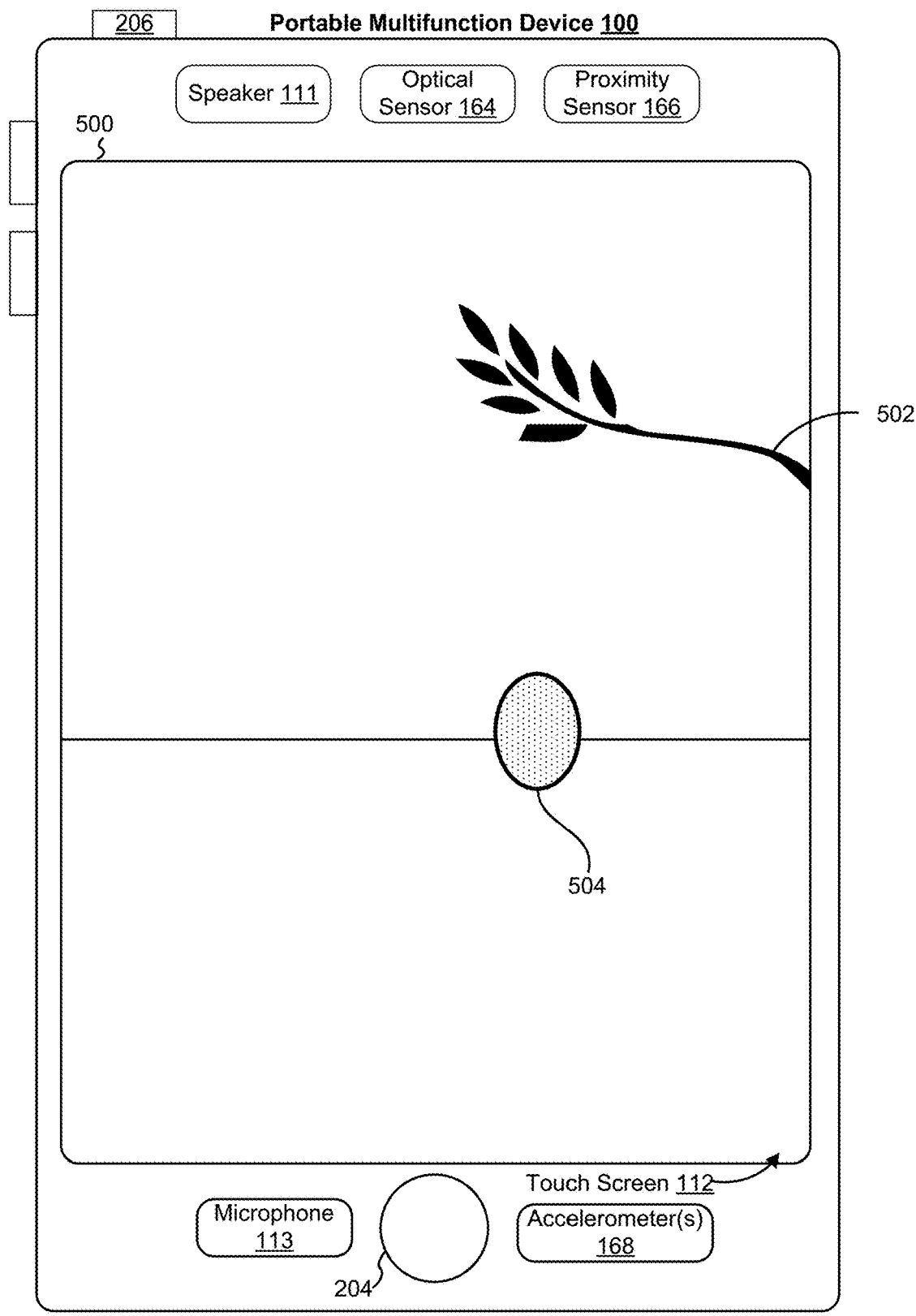

Below, FIGS. 1A-1B, 2, and 3 provide a description of example devices. FIGS. 4A-4B illustrate example user interface on a portable multifunction device in accordance with some embodiments. FIGS. 5A-5AG, 6A-6S, 7A-7R, 8A-8AC, and 9A-9S illustrate example user interfaces for capturing, recording, and reviewing images in accordance with some embodiments. FIGS. 10A-10E are flow diagrams illustrating a method of concurrently capturing and editing digital media in accordance with some embodiments. FIGS. 12A-12D are flow diagrams illustrating a method of capturing digital media in different imaging modes in accordance with some embodiments. FIGS. 14A-14F are flow diagrams illustrating a method of switching between camera live views during image capture in accordance with some embodiments. FIGS. 16A-16H are flow diagrams illustrating a method of automatically detecting and prompting for user action(s) regarding an image recording mode in accordance with some embodiments. FIGS. 18A-18D are flow diagrams illustrating a method of adjusting selected images and videos from a video clip in accordance with some embodiments. The user interfaces in FIGS. 5A-5AG, 6A-6S, 7A-7R, 8A-8AC, and 9A-9S are used to illustrate the processes in FIGS. 10A-10E, 12A-12D, 14A-14F, 16A-16H, and 18A-18D. FIGS. 11, 13, 15, 17, and 19 are functional block diagrams of electronic devices that perform the methods described in FIGS. 10A-10E, 12A-12D, 14A-14F, 16A-16H, and 18A-18D.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touch-pads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
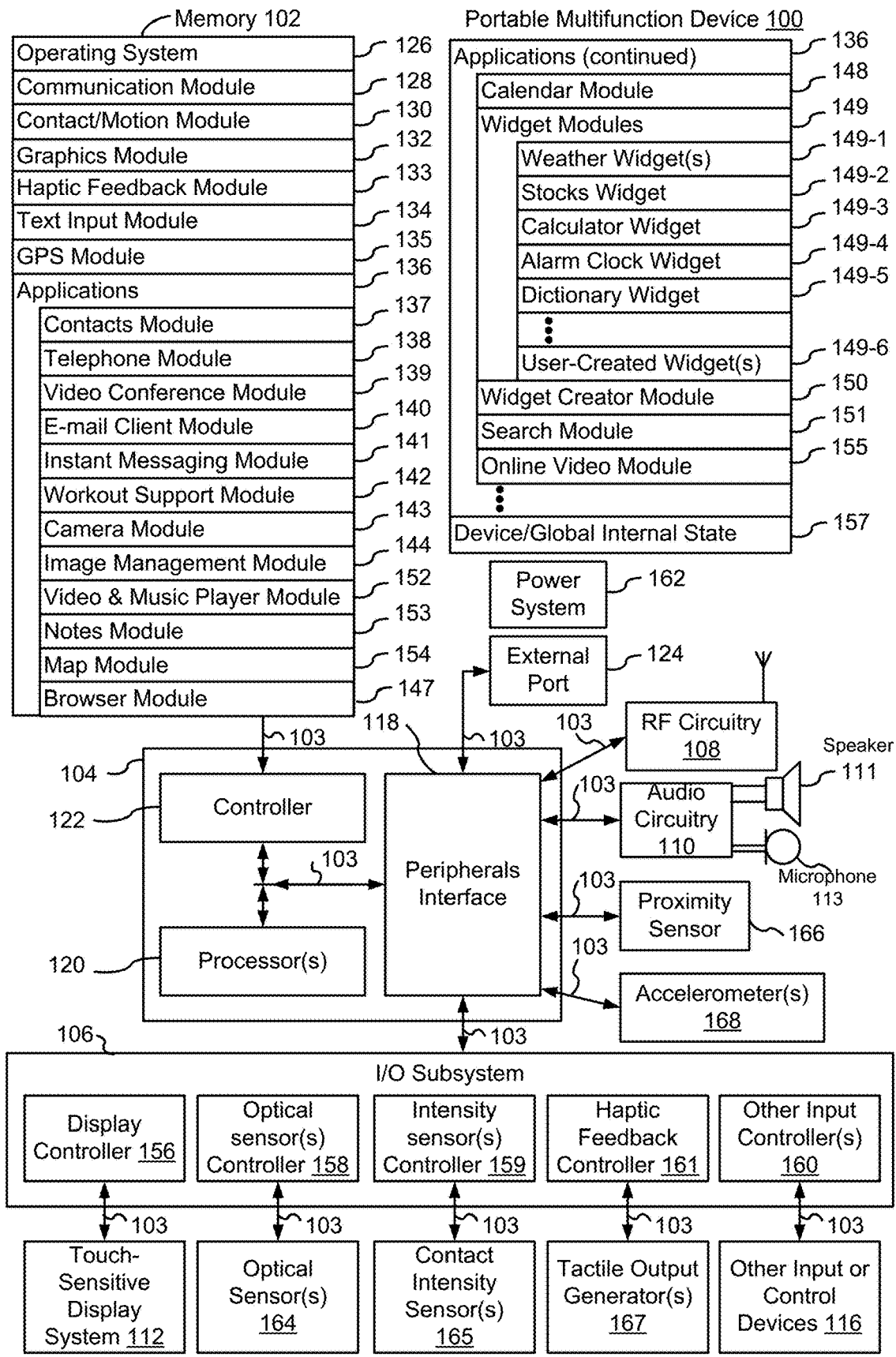
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" is physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
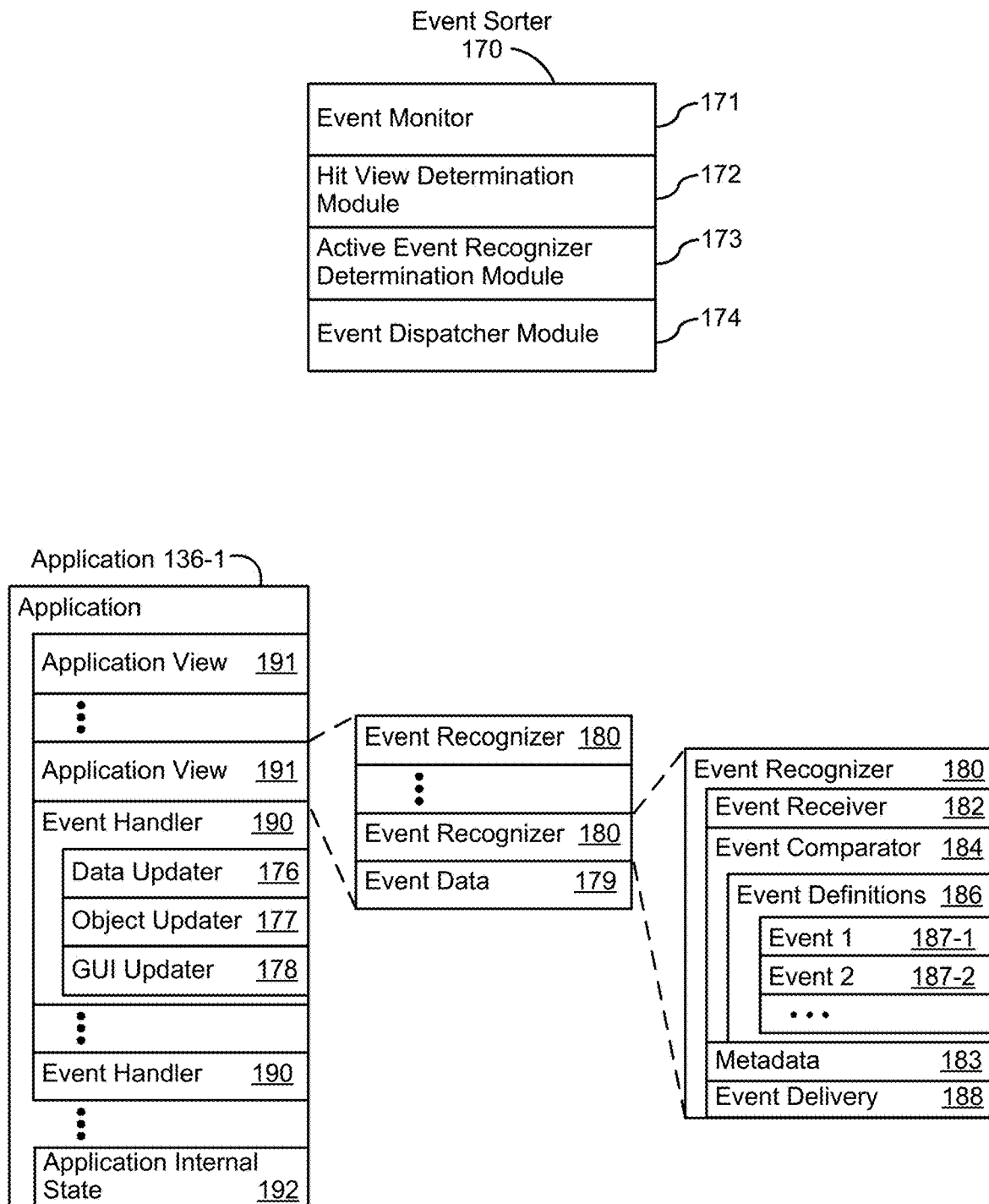
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions;

detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Map;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

USER INTERFACES AND ASSOCIATED PROCESSES

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

FIGS. 5A-5AG illustrate exemplary user interfaces for concurrently capturing and editing digital media, in accordance with some embodiments. The user interfaces in these figures are used to illustrate the processes described below, including the processes in FIGS. 10A-10E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5J and 5O-5AA, and 5AE-5AG illustrate exemplary user interface 500 for a digital camera application. The user interface includes a live view from an associated digital camera (e.g., optical sensor 164) of device 100, and the live view includes a live display of tree branch 502, cat 510, bird 522, and eagle 542. The user interface also includes a scroll 506 of previously captured images 508 et al. across the bottom of user interface 500 (e.g., overlaid on the bottom portion of the live view). Tapping on an image in scroll 506 opens the previously captured image on the display and/or marks the image (e.g., for review at a later time and/or for long-term storage as an image separate from other images captured during the recording session). Similarly, tapping on the live display creates a timestamp, marking the image(s) captured concurrent with detection of the contact. FIGS. 5K-5N and 5AB-5AD illustrate exemplary user interfaces 526 and 568 for reviewing previously captured images and video clips, within the digital camera application.

Figure 5C:
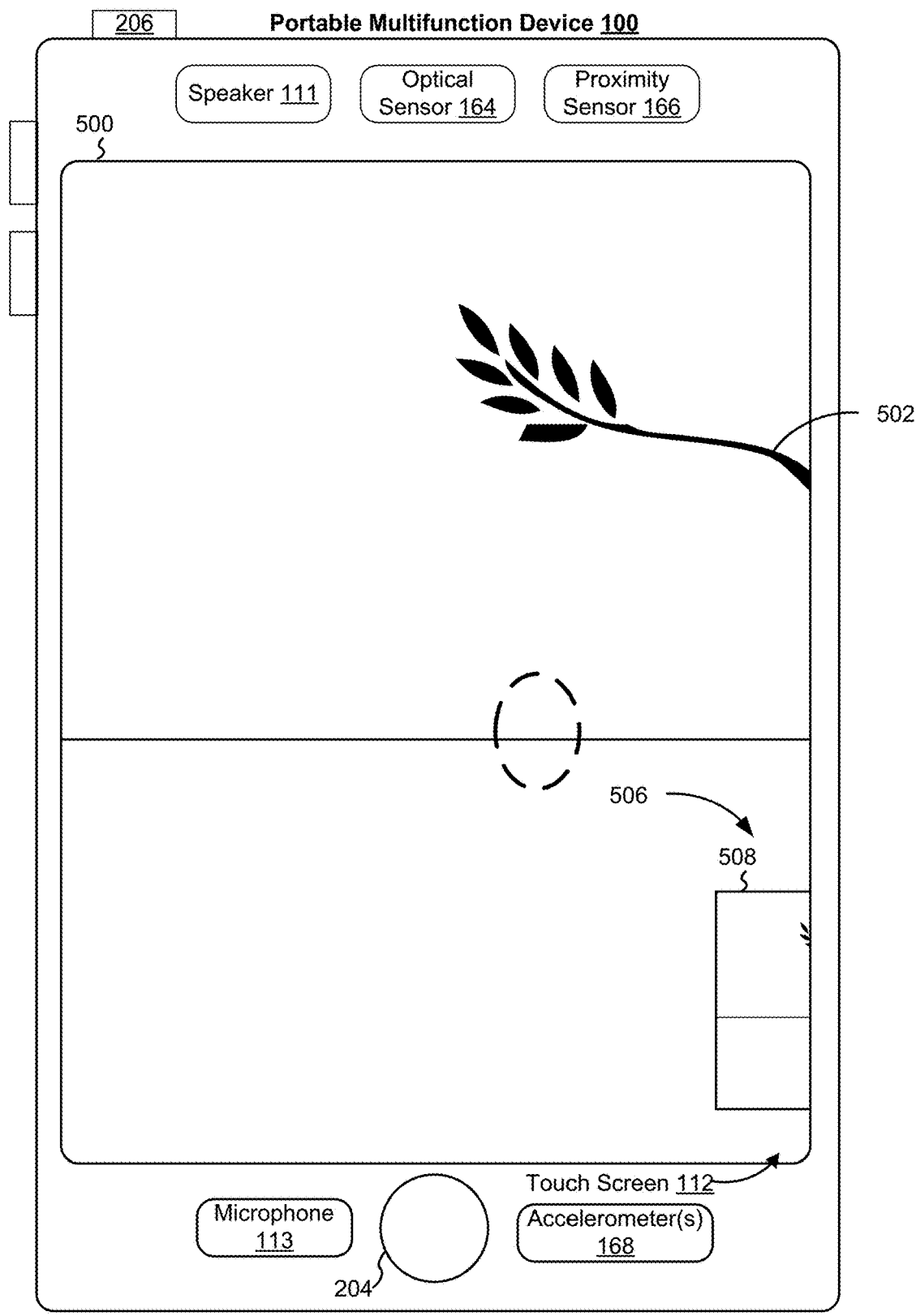
Figure 5D:
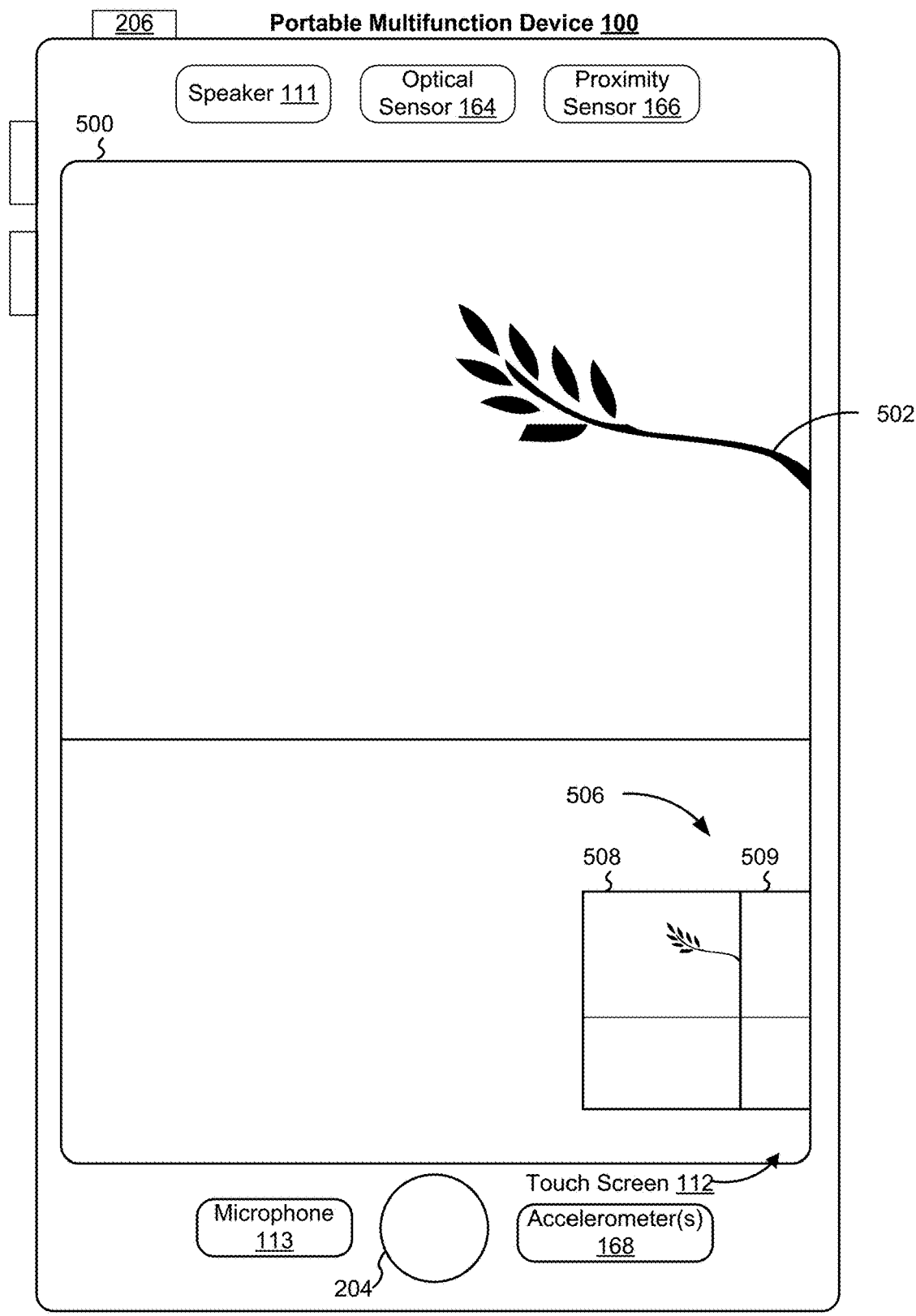

FIGS. 5A-5G illustrate an exemplary embodiment where the device concurrently captures live images from an associated digital camera, and displays frames corresponding to a subset of the captured image overlaid on the live display. In FIG. 5A, the device displays a live image of branch 502 in user interface 500. In response to detecting contact 504 on the live view from the camera in FIG. 5B, the device begins capturing the live images from the camera (e.g., for subsequent processing for long-term storage) and starts displaying frames of captured images. In some embodiments, in addition to capturing live images, the device begins to record the live images from the camera for long-term storage in response to detecting contact 504 on the live view from the camera in FIG. 5B. As illustrated in FIGS. 5C-5D, frame 508 displaying a captured image of tree branch 502 appears to scroll onto the display from the lower right portion, followed by frame 509 of a subsequently captured image.

Figure 5E:
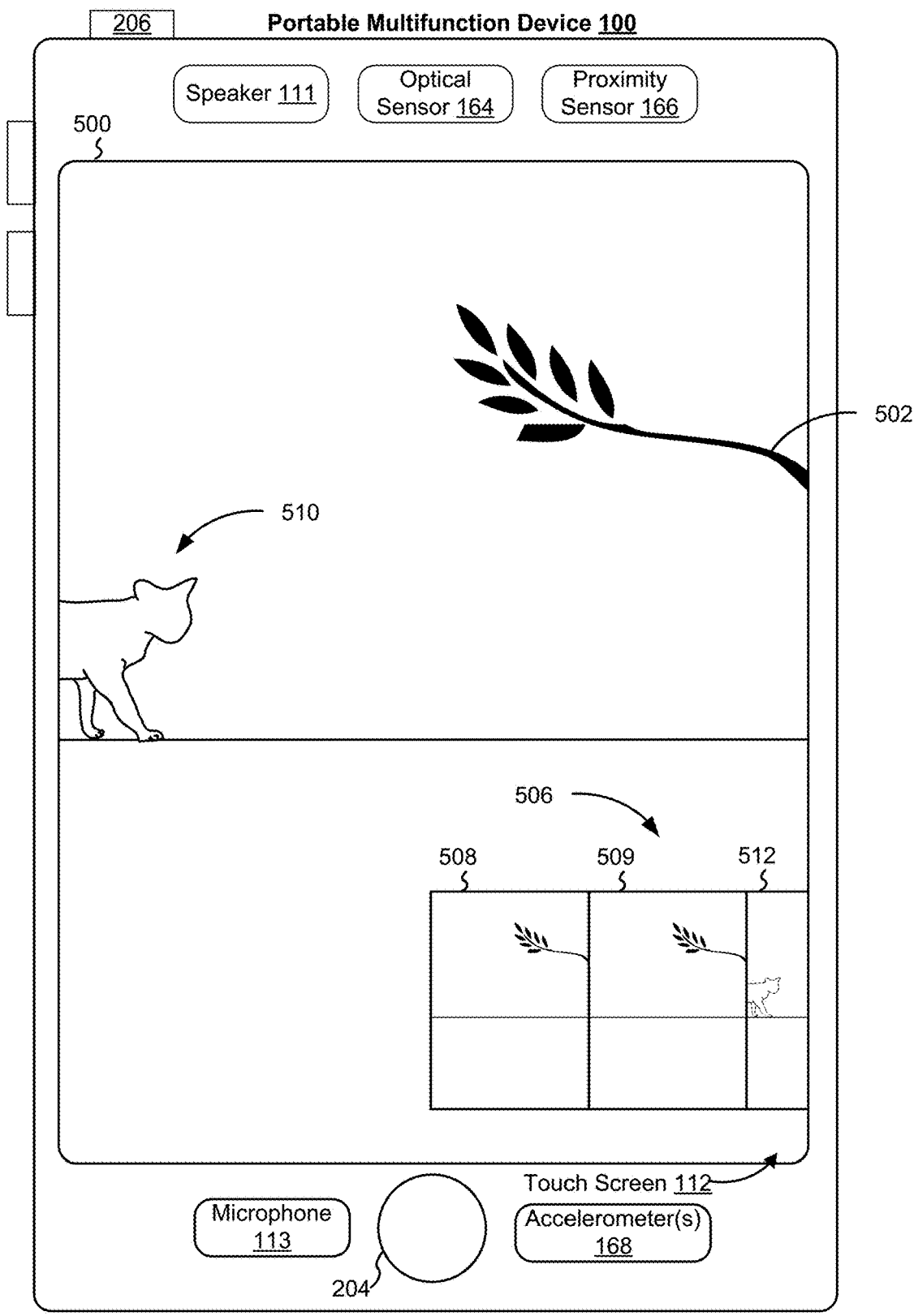
Figure 5F:
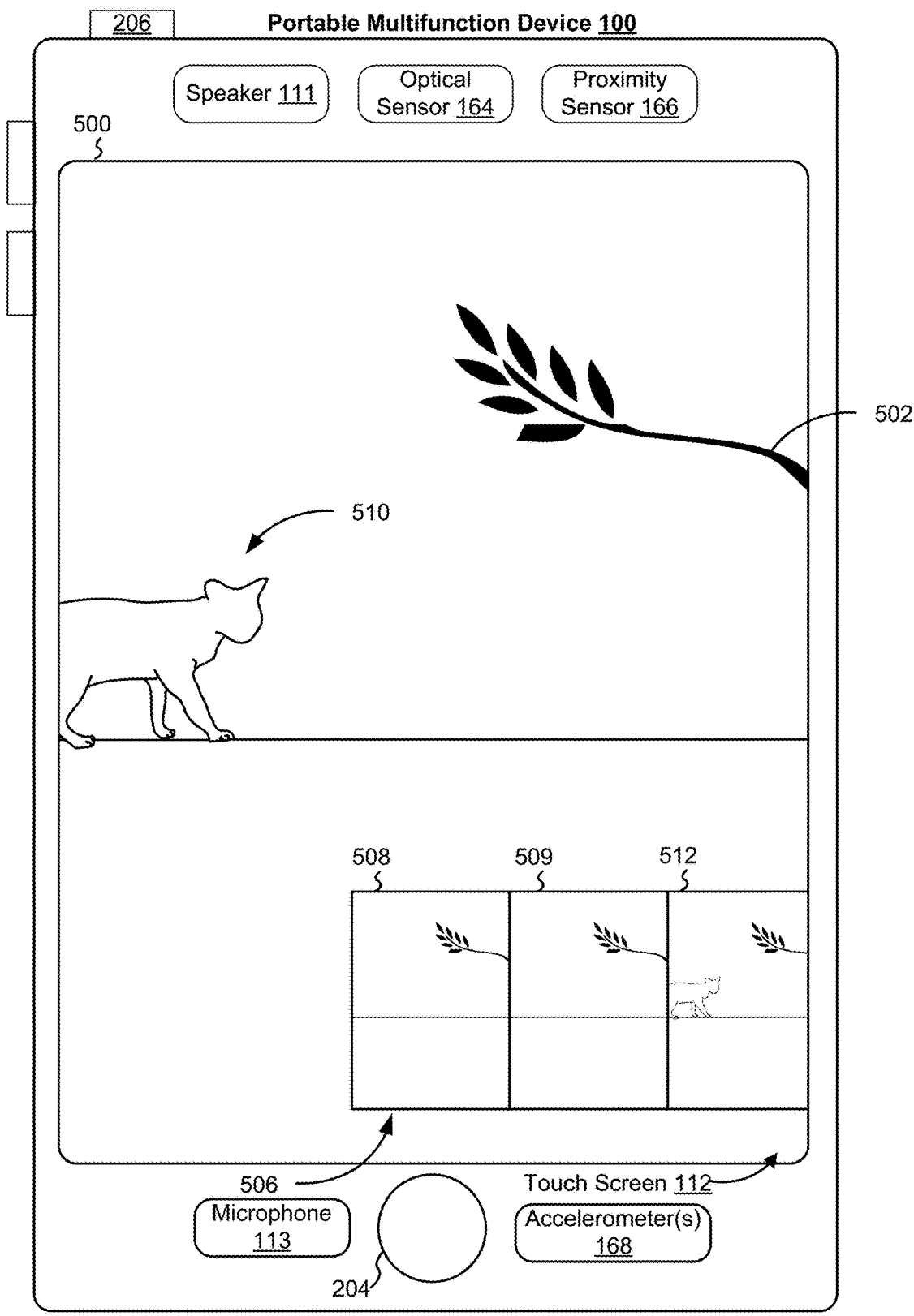
Figure 5G:
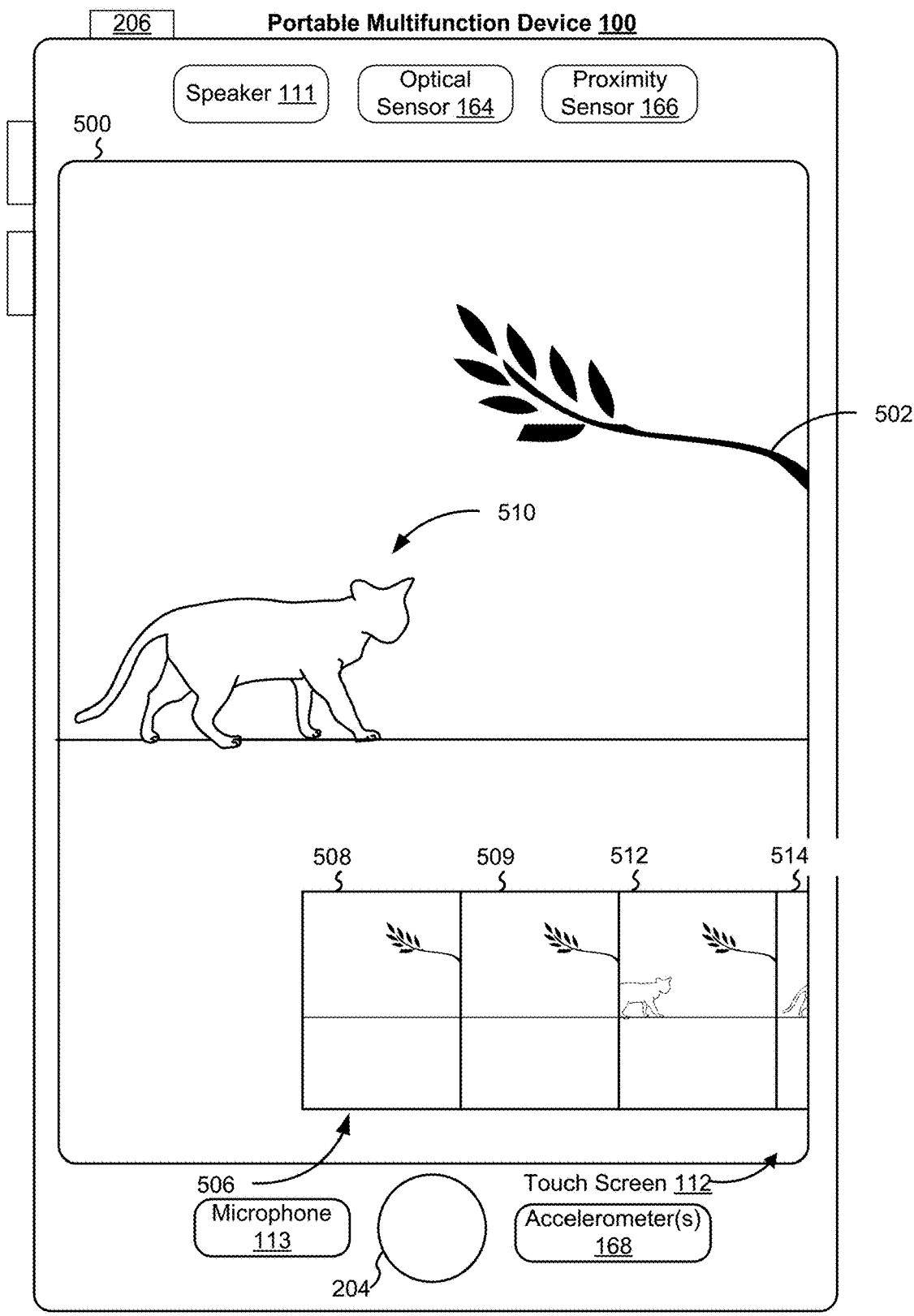

As illustrated in FIGS. 5E-5G, as frame 512 starts to scroll onto the screen it displays a live image from the digital camera that mirrors the larger live image on the screen. For example, as cat 510 appears in the live view from the camera, in FIG. 5E, it is also shown appearing in the image in frame 512. As cat 510 continues to enter the live view in FIG. 5F, frame 512 is similarly updated to show the cat's movement (e.g., frame 512 shows two legs of the cat in FIG. 5E and three legs of the cat in FIG. 5F). When frame 512 is fully revealed on the screen, as illustrated in FIG. 5G, the live image displayed in frame 512 is frozen at that point in time. For example, all four legs of cat 510 are seen in the live view in FIG. 5G, but only three legs of the cat are visible in frame 512 because the image was frozen as soon as the frame migrated entirely onto the screen.

Figure 5H:
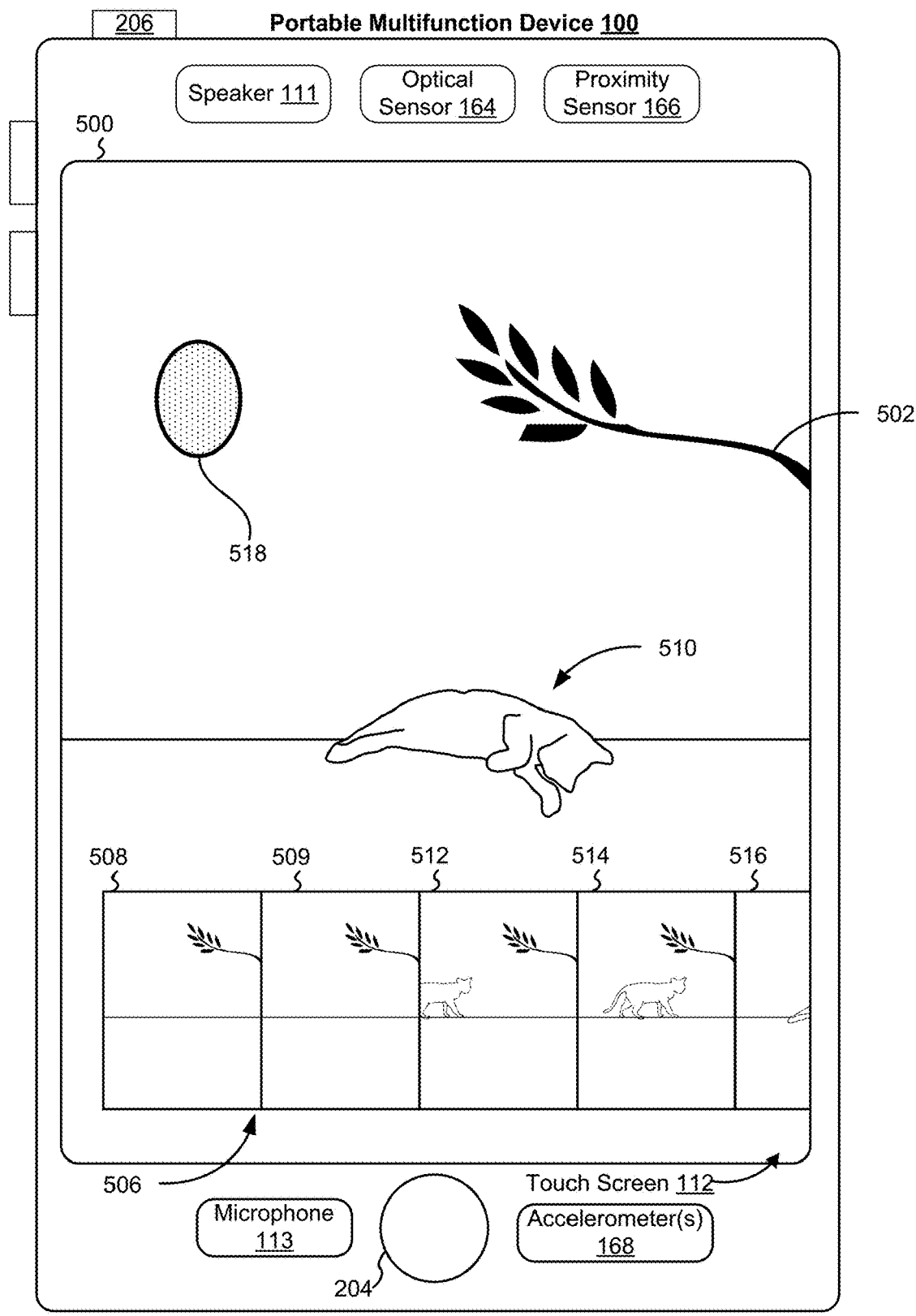
Figure 5I:
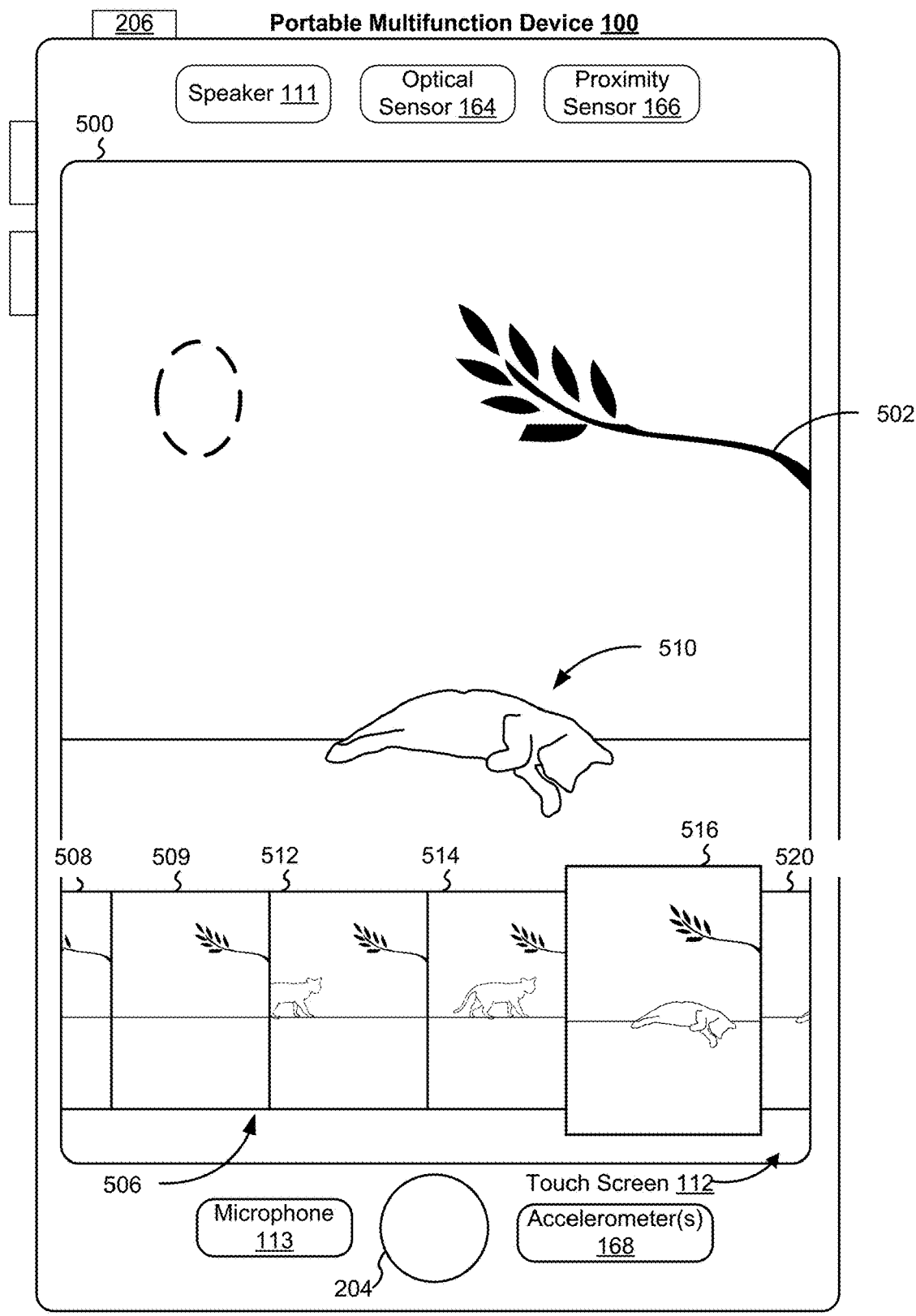

FIGS. 5H-5I illustrate an exemplary embodiment where tapping on the live image in the live view marks a concurrently captured image. The device detects tap gesture by contact 518 on the live image in FIG. 5H and, in response, marks the image captured at that point in time. Frame 516, corresponding to the marked image, is displayed larger in scroll 506, as illustrated in FIG. 5I Metadata is created in association with the marked image, such that the marked image can be identified from the captured images during subsequent processing. In some embodiments, the marked image is stored separately from the rest of the captured images.

Figure 5J:
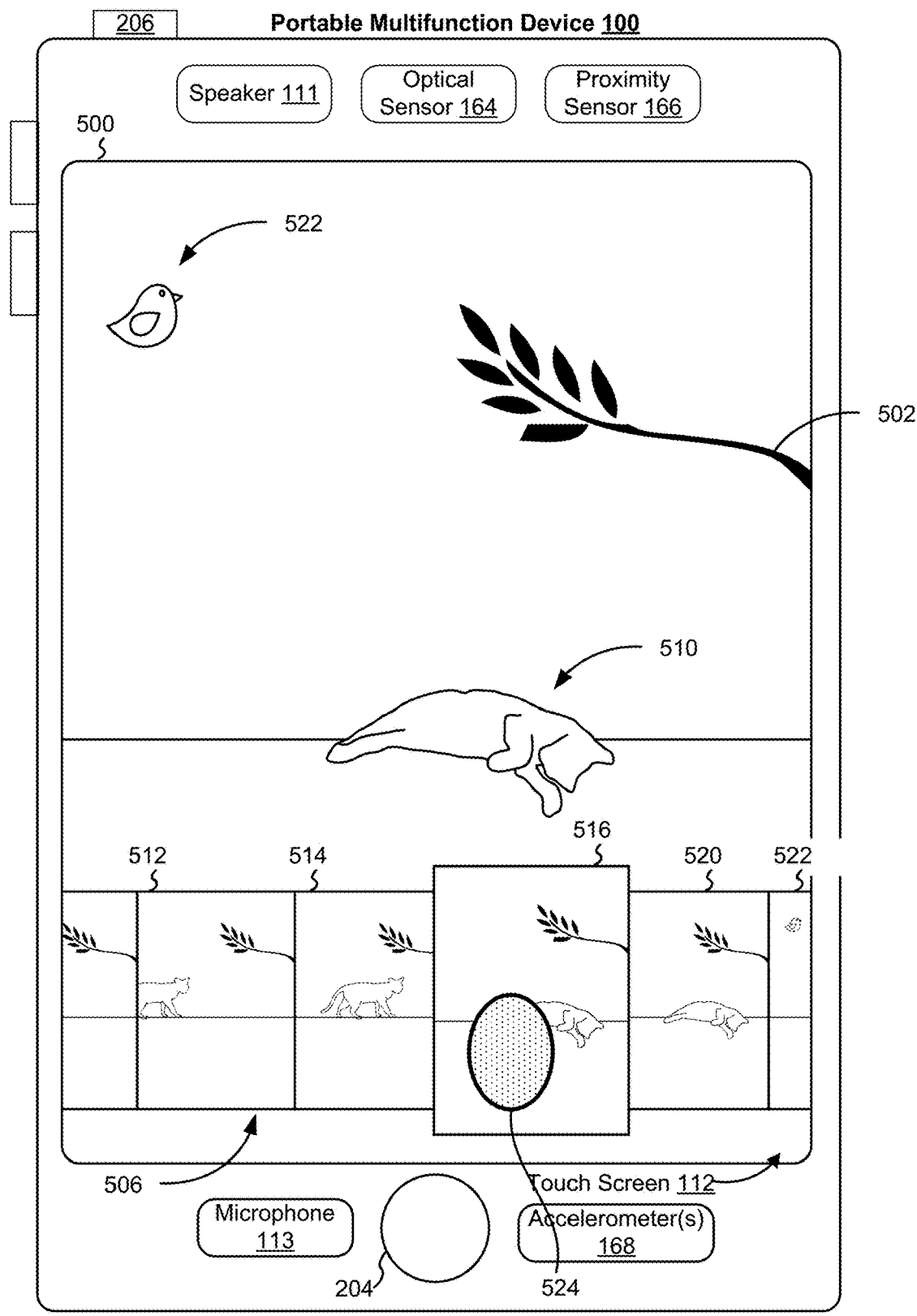
Figure 5K:
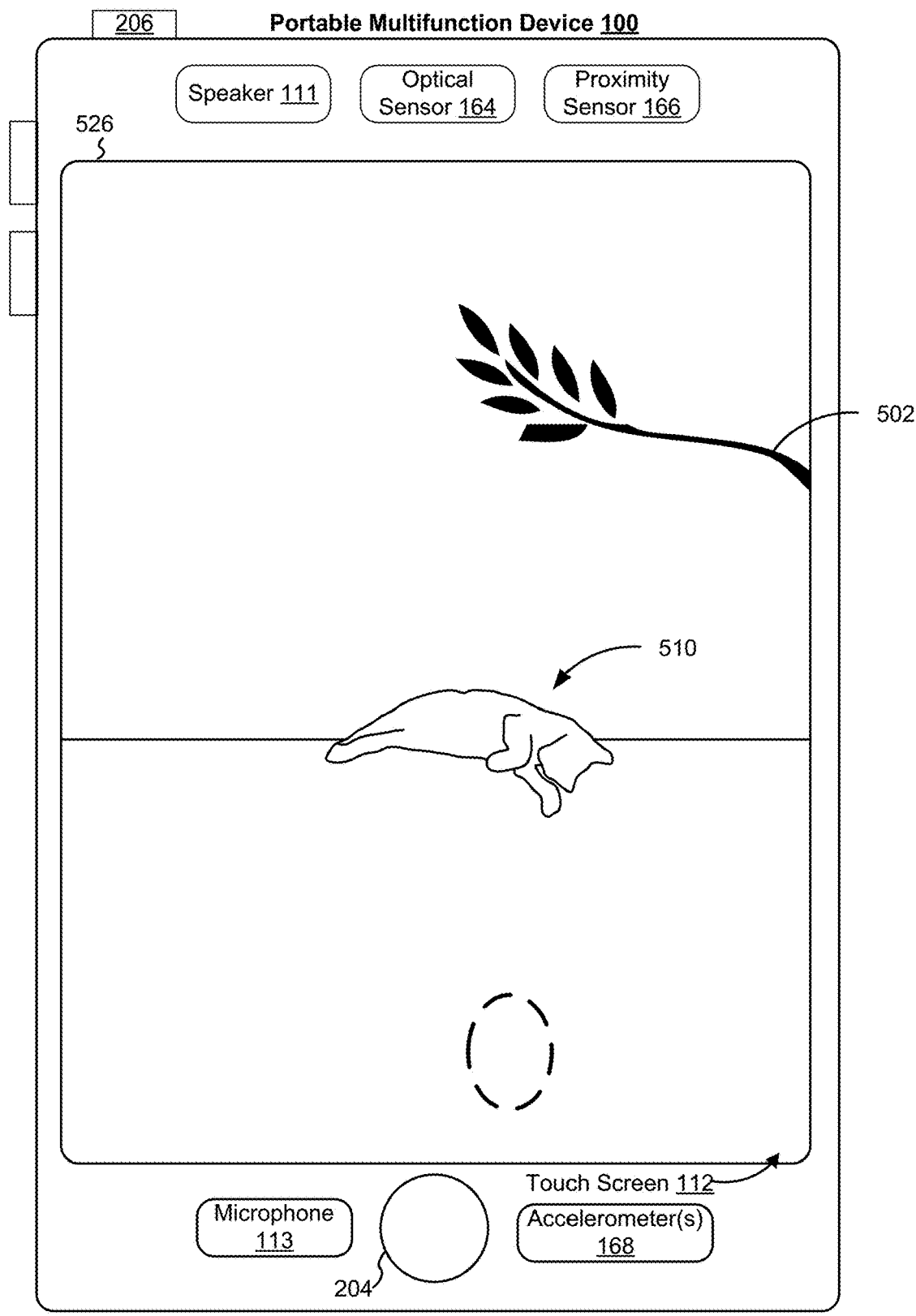
Figure 5L:
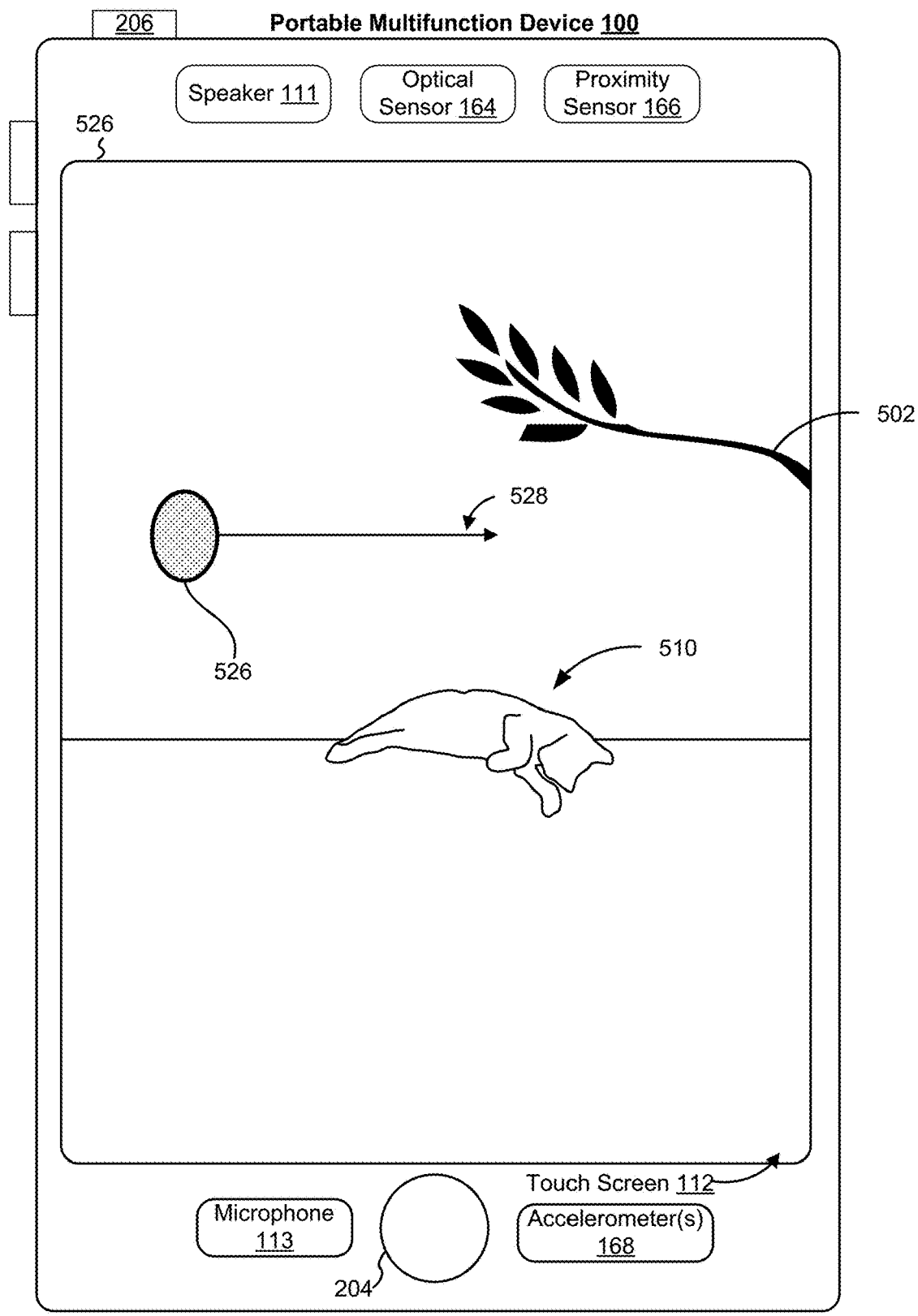
Figure 5M:
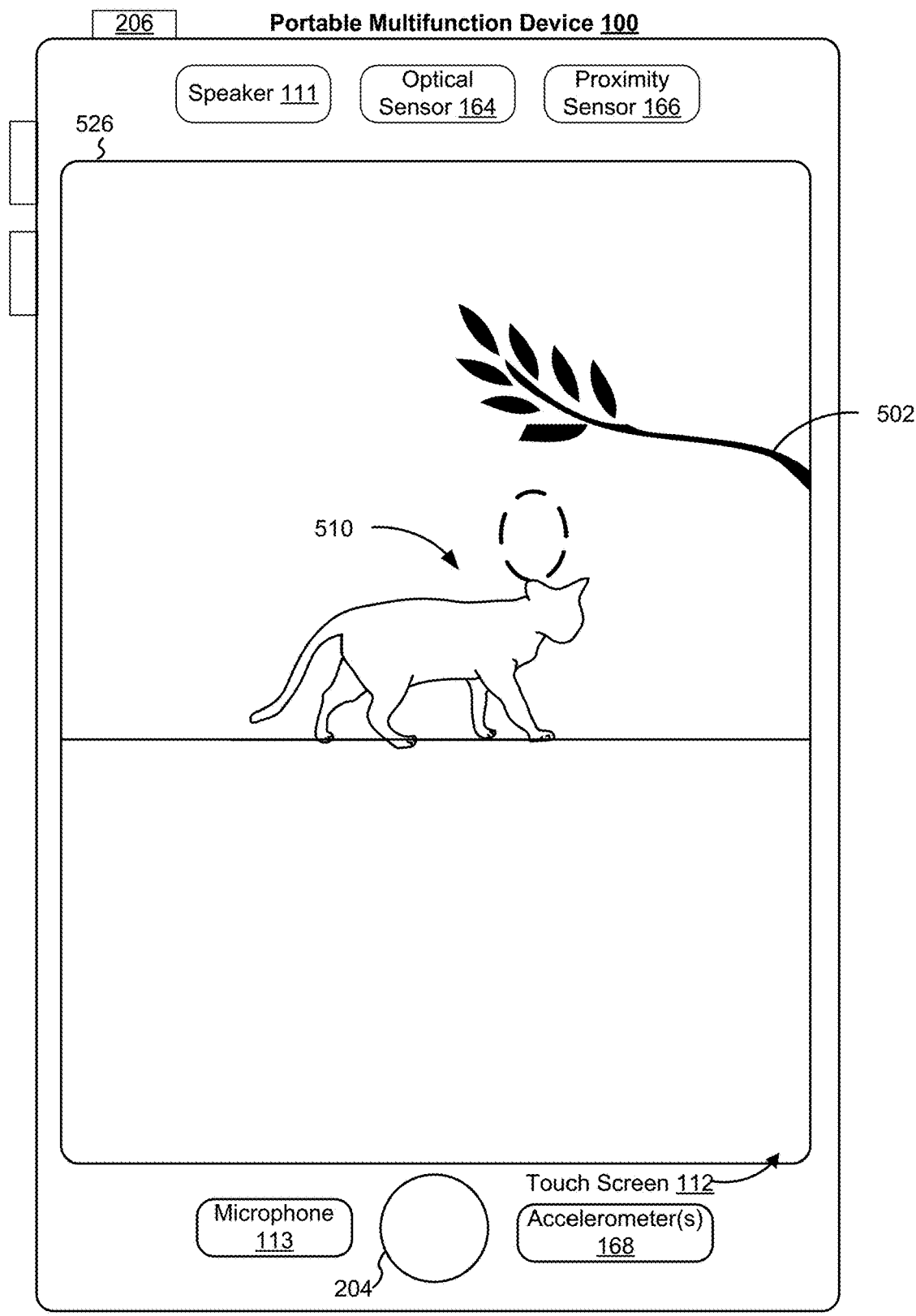
Figure 5N:
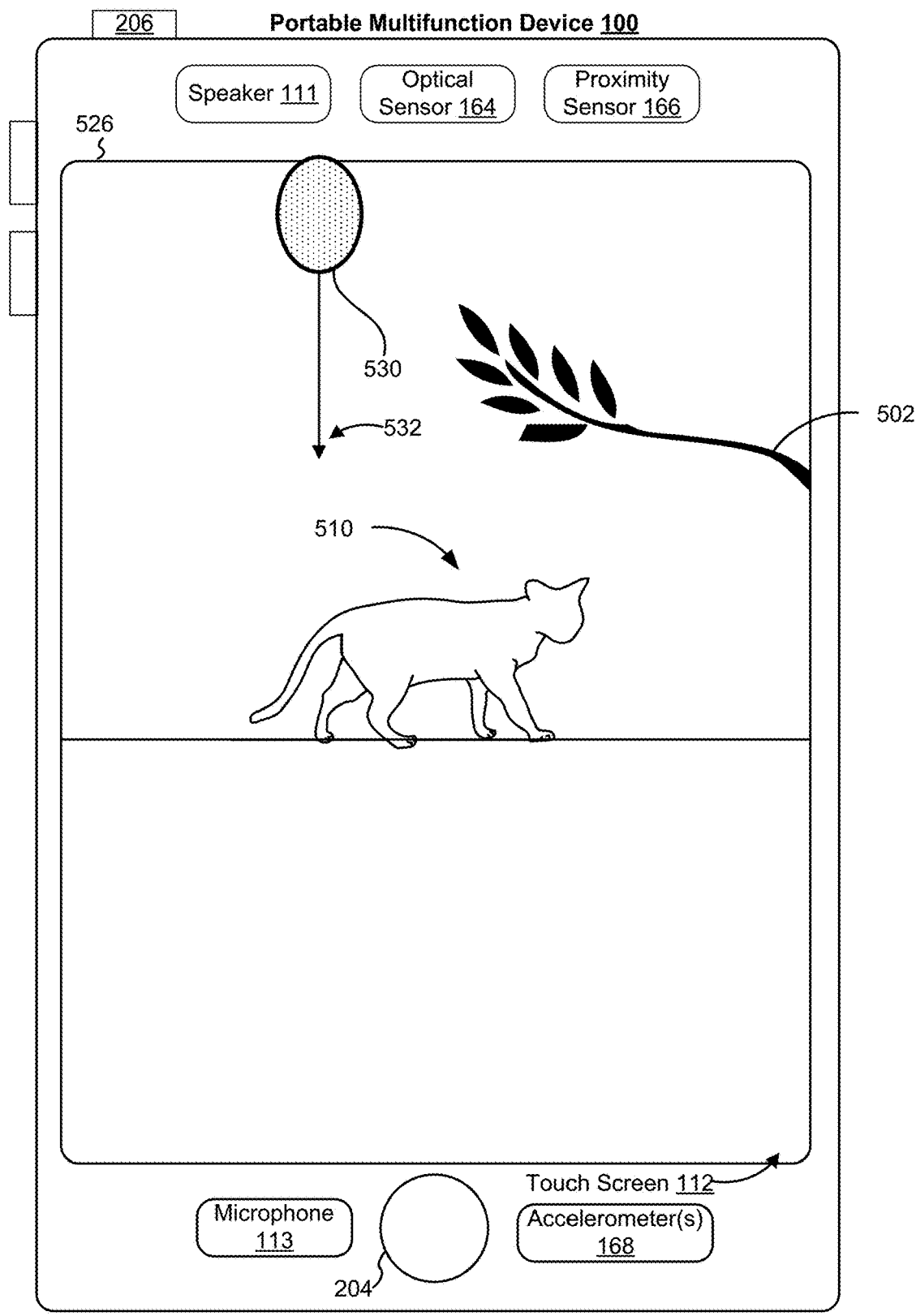
Figure 5O:
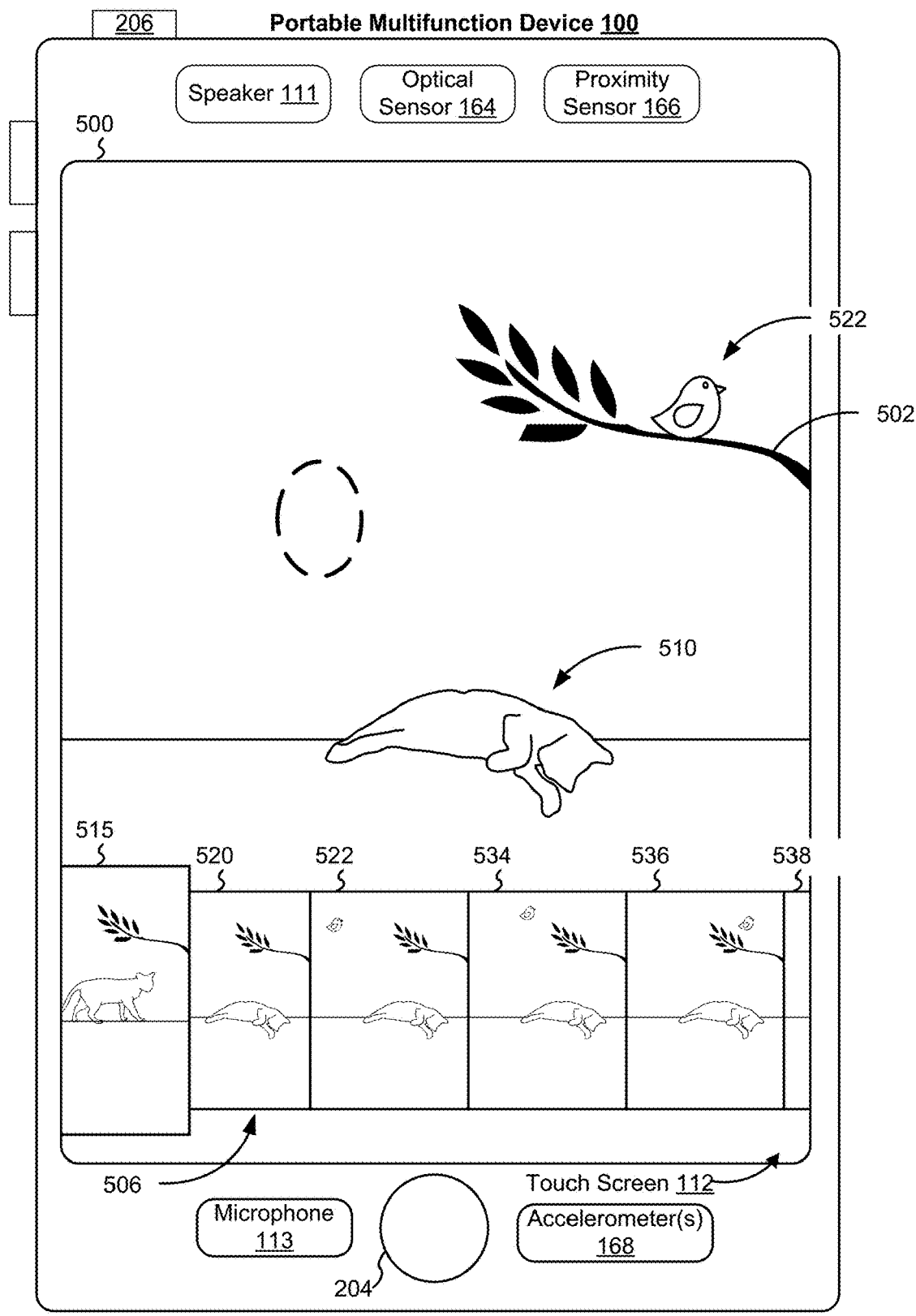

FIGS. 5J-5O illustrate an exemplary embodiment where tapping on a frame activates an image review mode, opens the image associated with the frame on the display, and allows manual navigation of captured images within the image review mode. As illustrated in FIG. 5J, the device detects tap 524 on marked frame 516 and, in response, opens the image associated with frame 516 in image review user interface 526, as illustrated in FIG. 5K. As illustrated in FIG. 5L, the device then detects a swipe gesture including movement 528 of contact 526 to the right and, in response, navigates to an earlier captured image, e.g., of cat 510 right before it lays down on the ground, as illustrated in FIG. 5M. The device then detects a swipe gesture including movement 532 of contact 530 down from the top of the display in FIG. 5N and, in response, returns to the live view in user interface 500, as illustrated in FIG. 5O.

As evidenced by the advanced status of image scroll 506 (e.g., showing bird 522 fly into the image and land on branch 502), the device continued to capture live images from the camera while displaying image review user interface 526. Navigation between images in image review user interface 526 also changed what image was marked by the time stamp created upon detection of tap 518 (e.g., as displayed in FIG. 5H), as reflected by replacement of frame 516 (which was enlarged in FIG. 5I in response to detection of tap 518) with frame 515 (which was displayed just prior to exiting the image review user interface 526 (e.g., the image captured right before cat 510 laid down) in scroll 506.

Figure 5P:
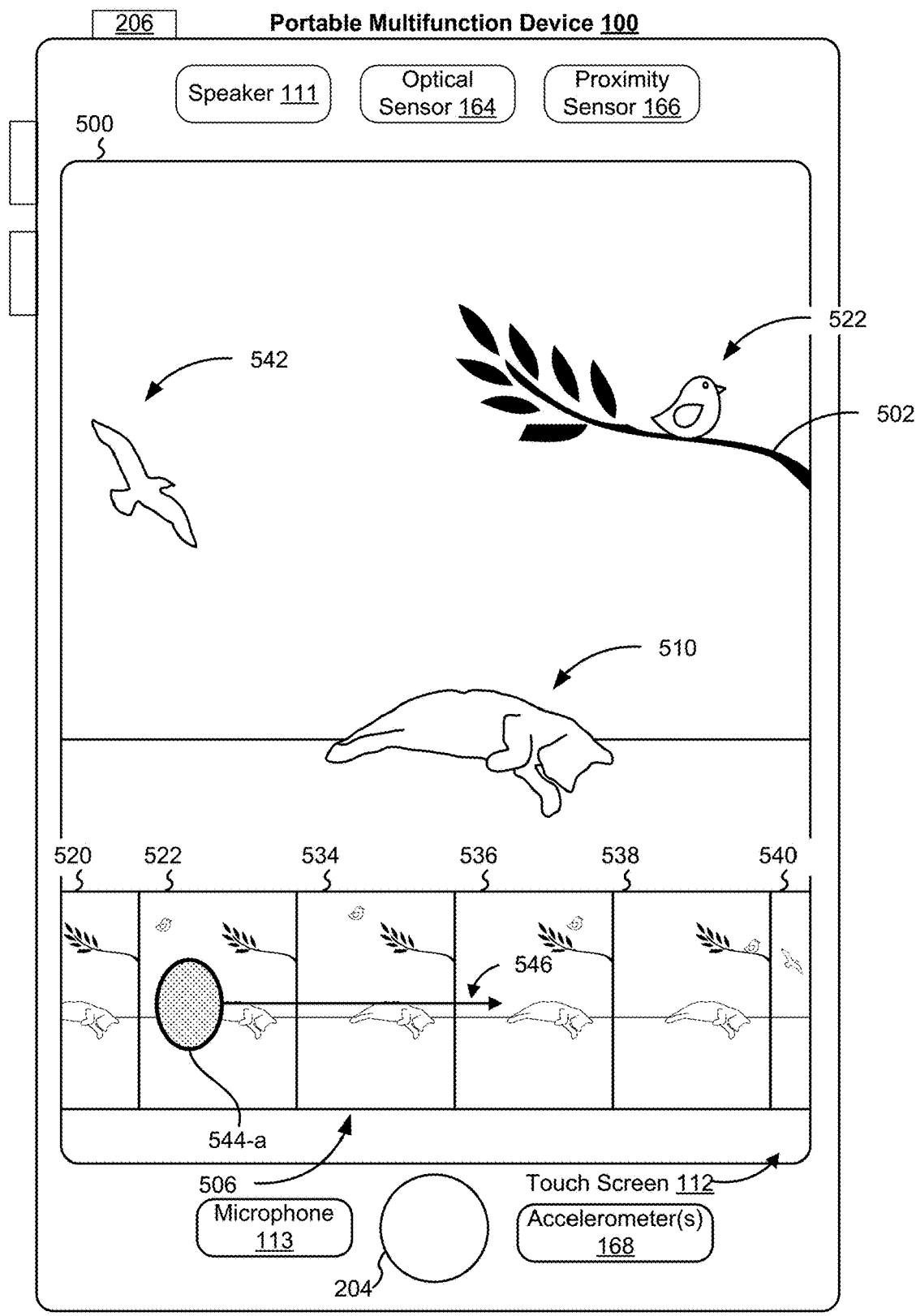
Figure 5Q:
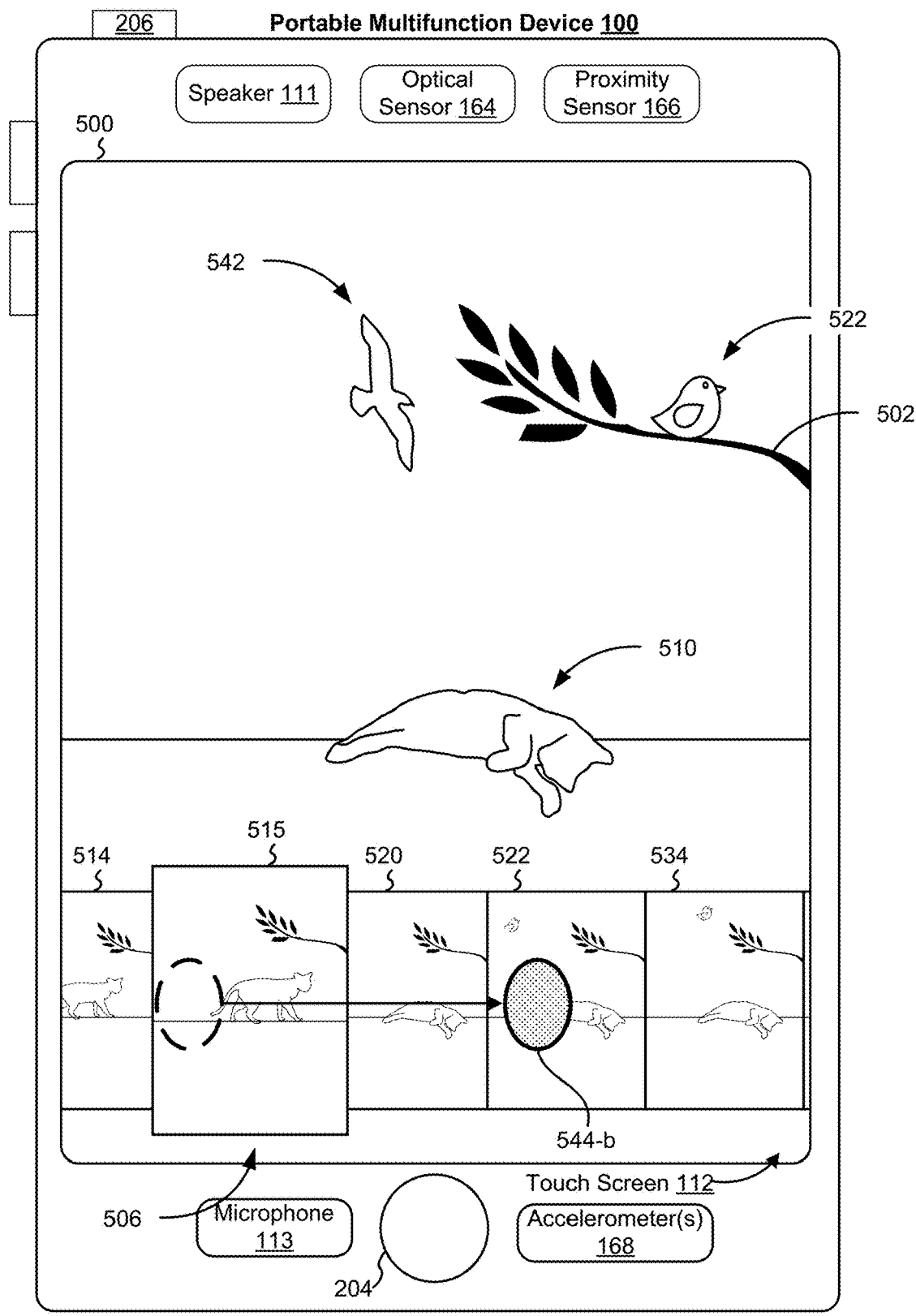
Figure 5R:
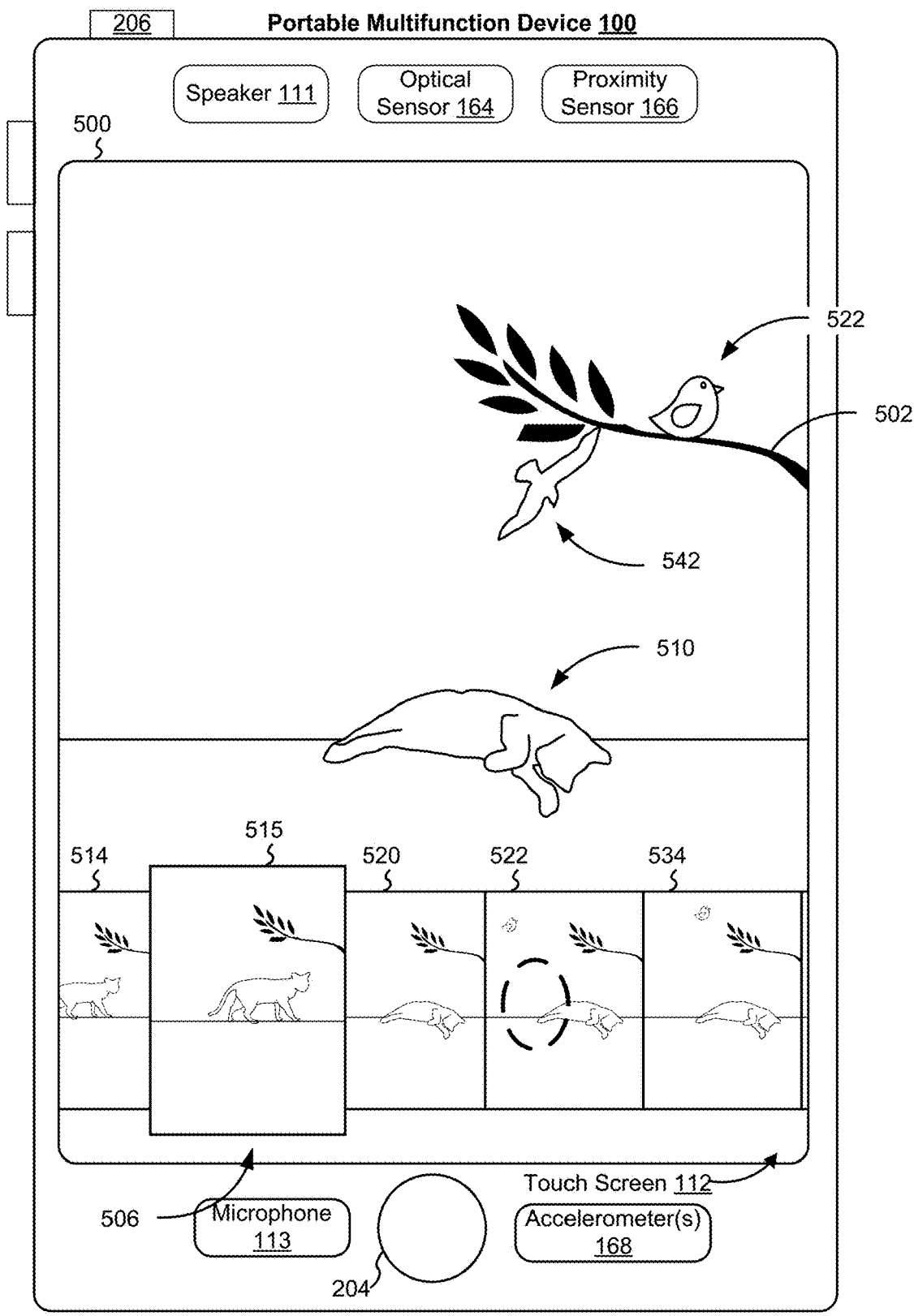
Figure 5S:
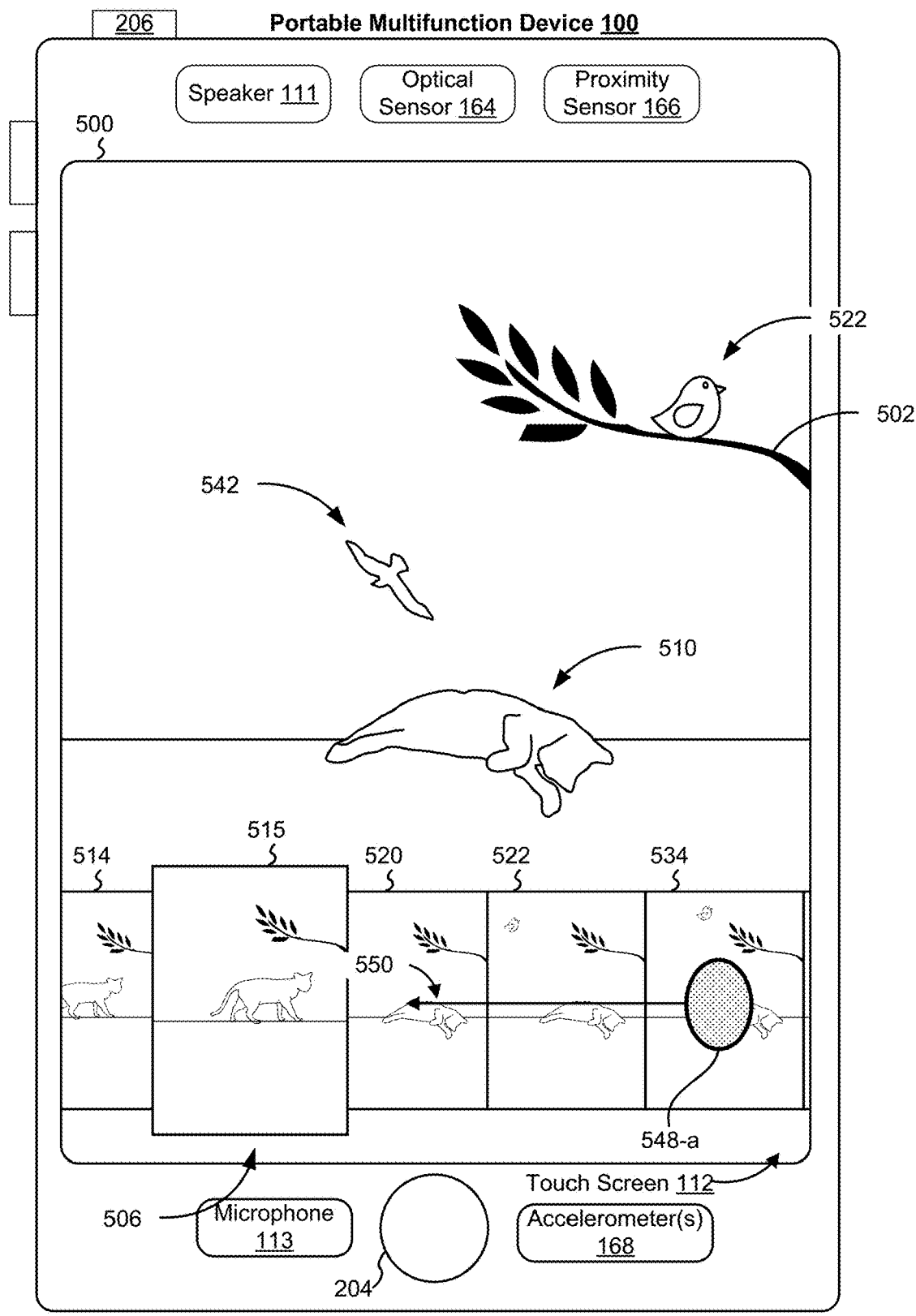
Figure 5T:
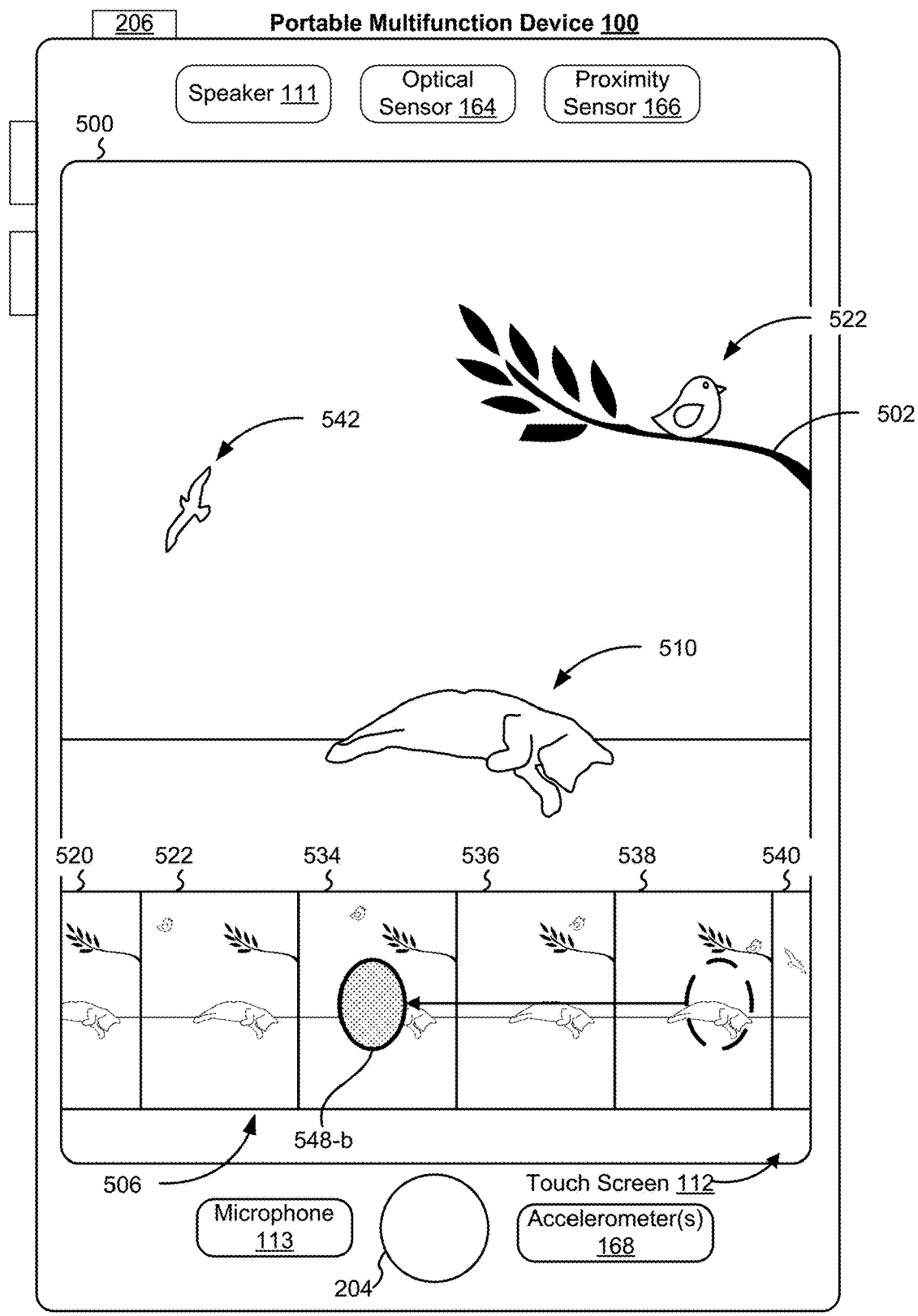
Figure 5U:
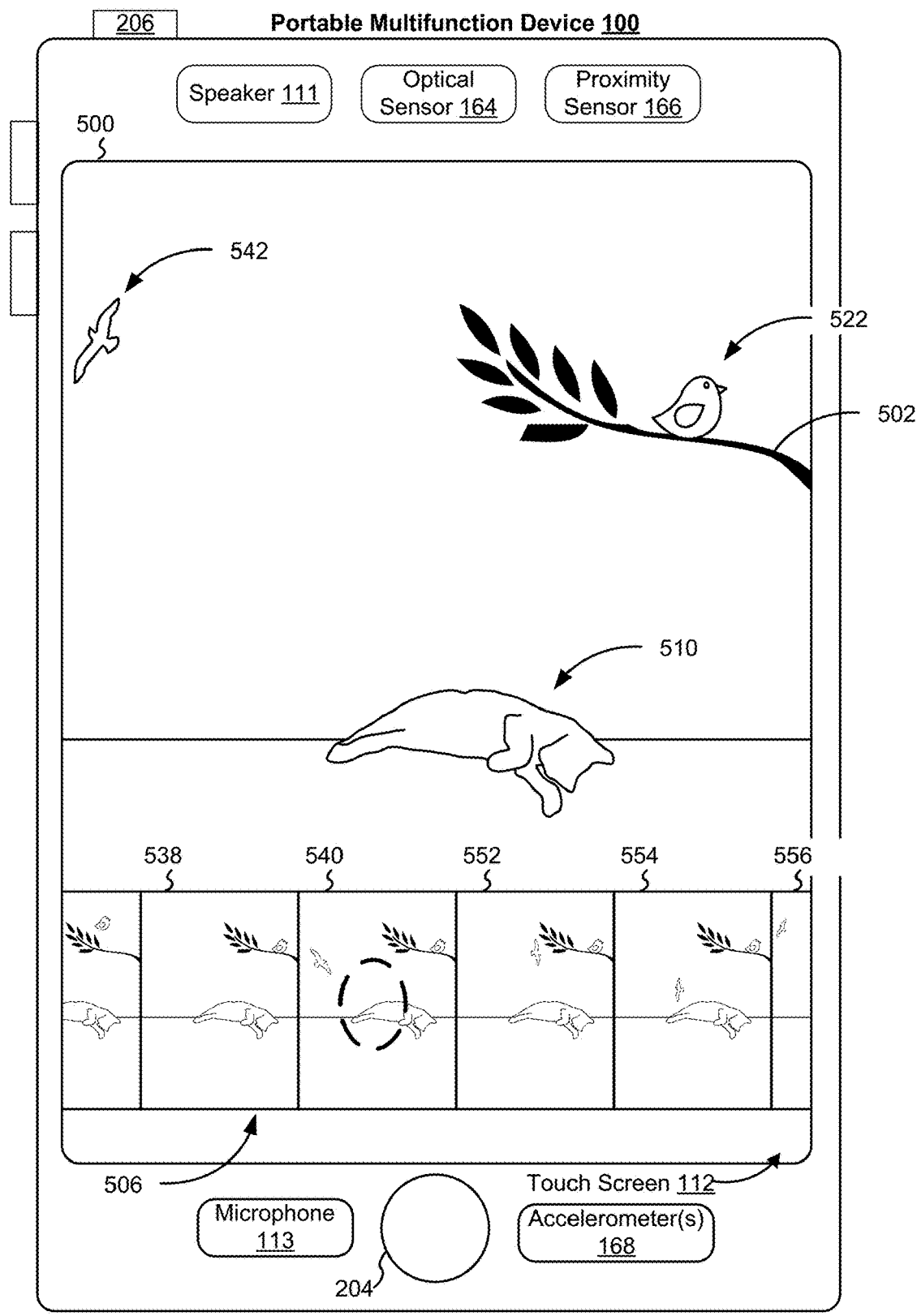

FIGS. 5P-5U illustrate exemplary embodiments where the scroll of frames along the bottom of the screen is navigated separately from the live image in the live view. As illustrated in FIG. 5P, the device detects a swipe gesture including movement 546 of contact 544 to the right on scroll 506. In response, the device navigates scroll 506 backwards in time (e.g., moves scroll 506 to the right), as shown by the reappearance of frames 515 and 514 in FIG. 5Q. The automatic advancement of the scroll to the left is also paused during the navigation, as shown by the static nature of the frames after completion of the swipe gesture, as illustrated in FIGS. 5R and 5S.

The device then detects a second swipe gesture including movement 550 of contact 548 to the left on scroll 506, as illustrated in FIG. 5S. In response, the device navigates the scroll forwards in time, as shown by the reappearance of frames 536, 538, and 540, in FIG. 5T. After lift-off of contact 548, the scroll continues to move forward in time according to simulated inertia, as shown by the appearance of new frames 554 and 556, in FIG. 5U.

Figure 5V:
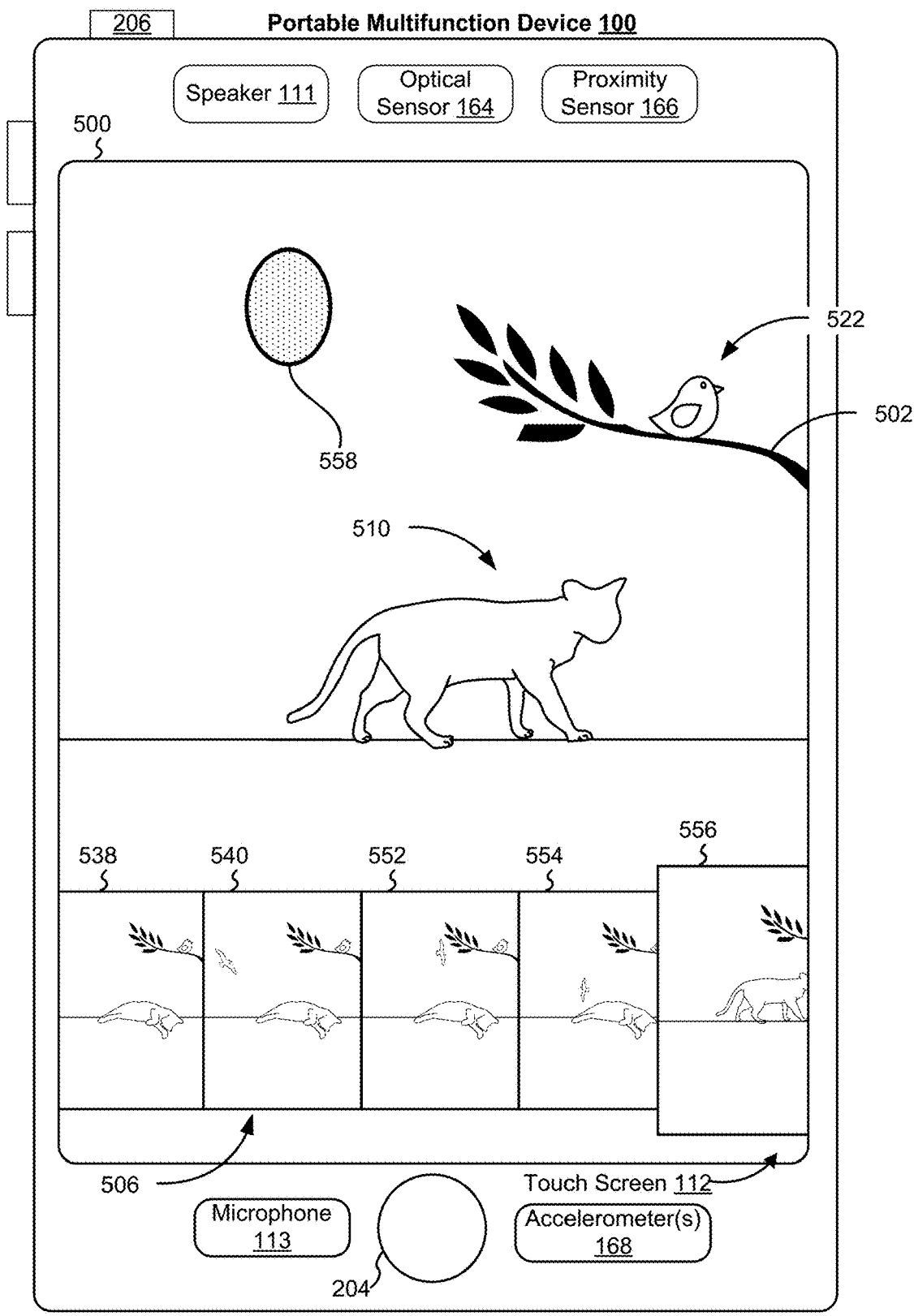
Figure 5W:
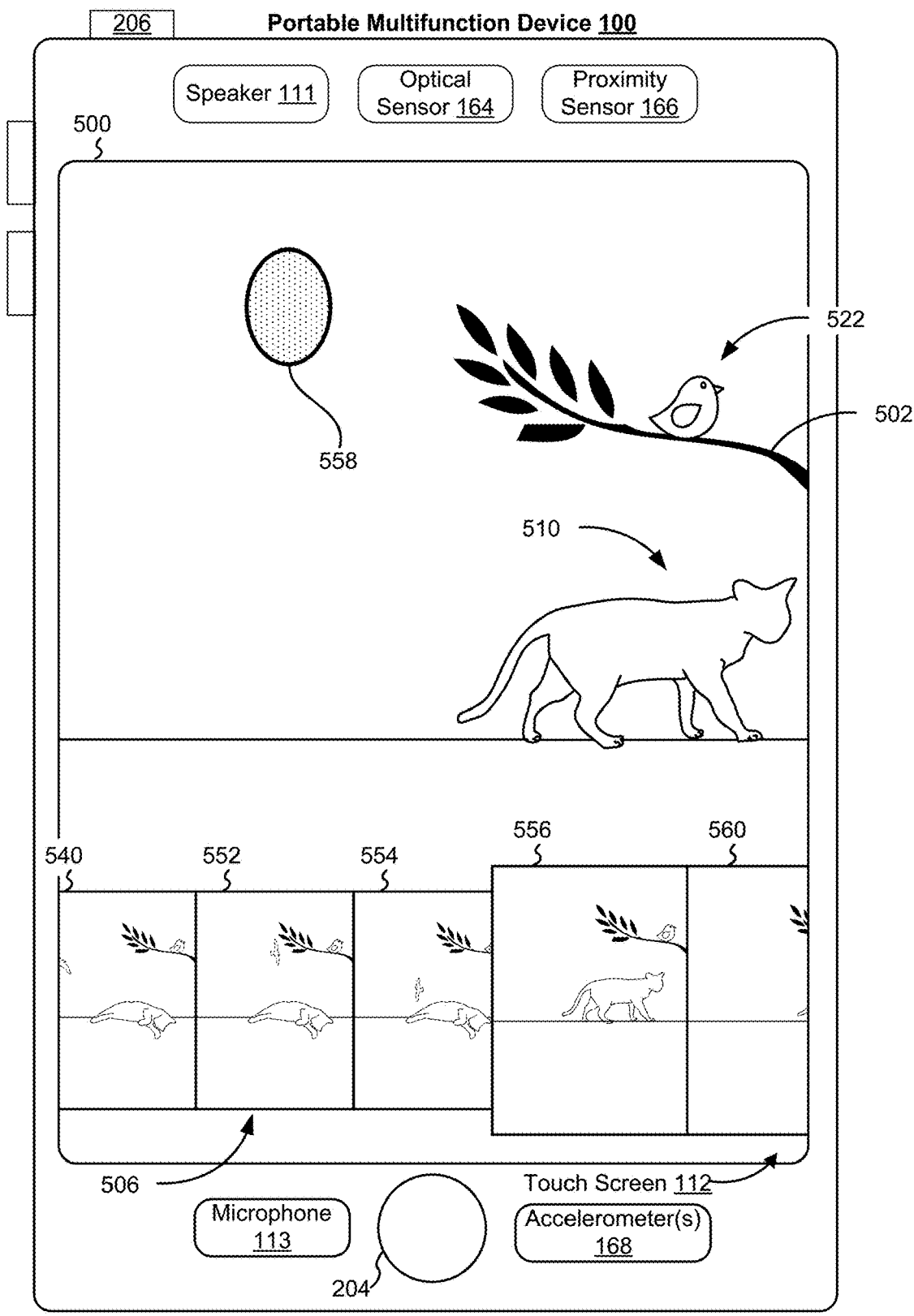
Figure 5X:
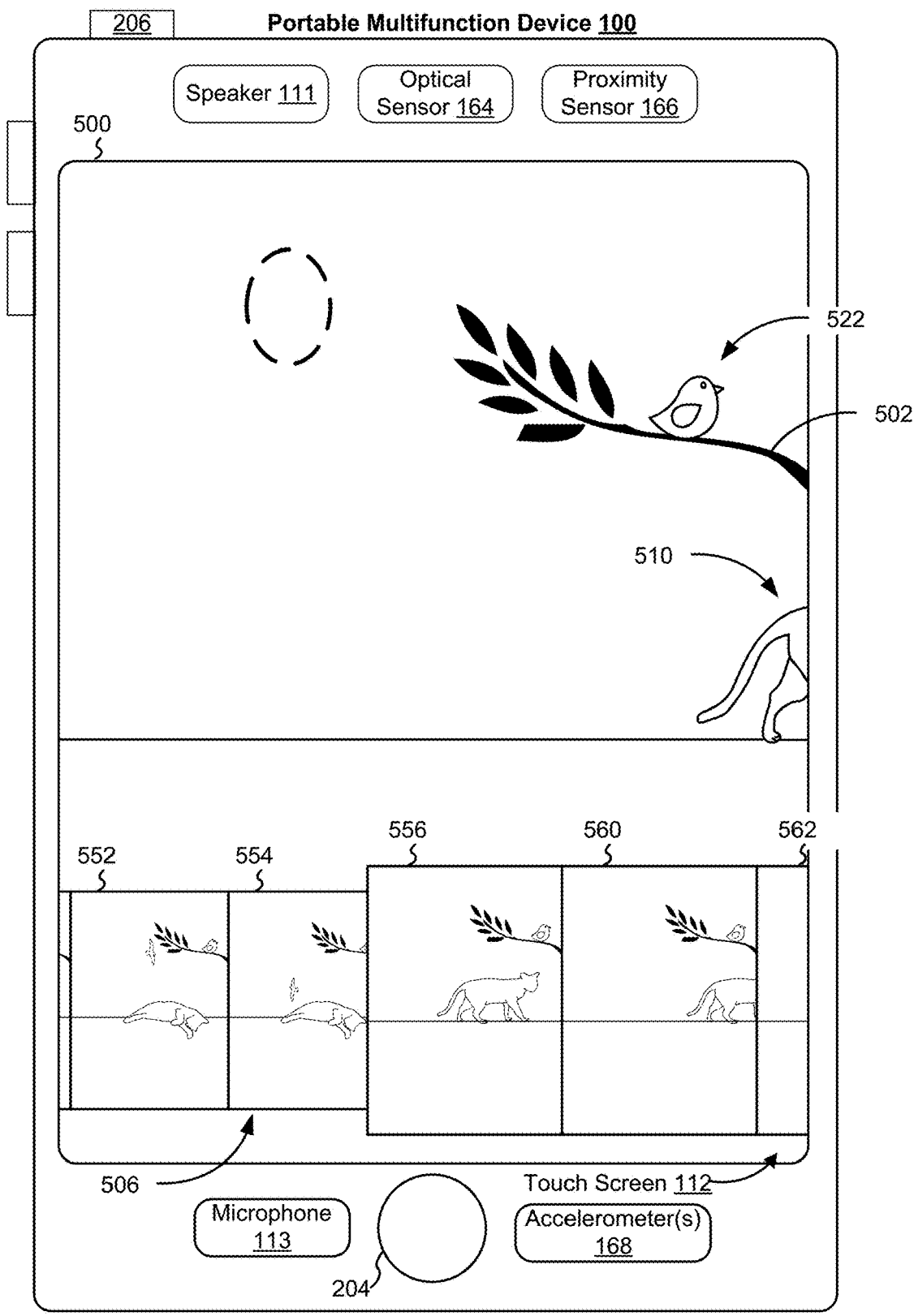

FIGS. 5V-5Z illustrate an exemplary embodiment where maintaining a contact on the live image marks a concurrently captured video clip for subsequent processing and long term storage. The device detects contact 558 on the live image in the live view from the camera in FIG. 5V and, in response, begins marking images captured while detecting the contact. Frame 556, corresponding to the first image marked while detecting contact 558 is displayed larger in scroll 506. As the device continues to detect contact 558 on the live image, subsequent frames 560 and 562 are also displayed larger in scroll 506, as illustrated in FIGS. 5W-5X, indicating that the images corresponding to those frames are included in the marked video clip.

Figure 5Y:
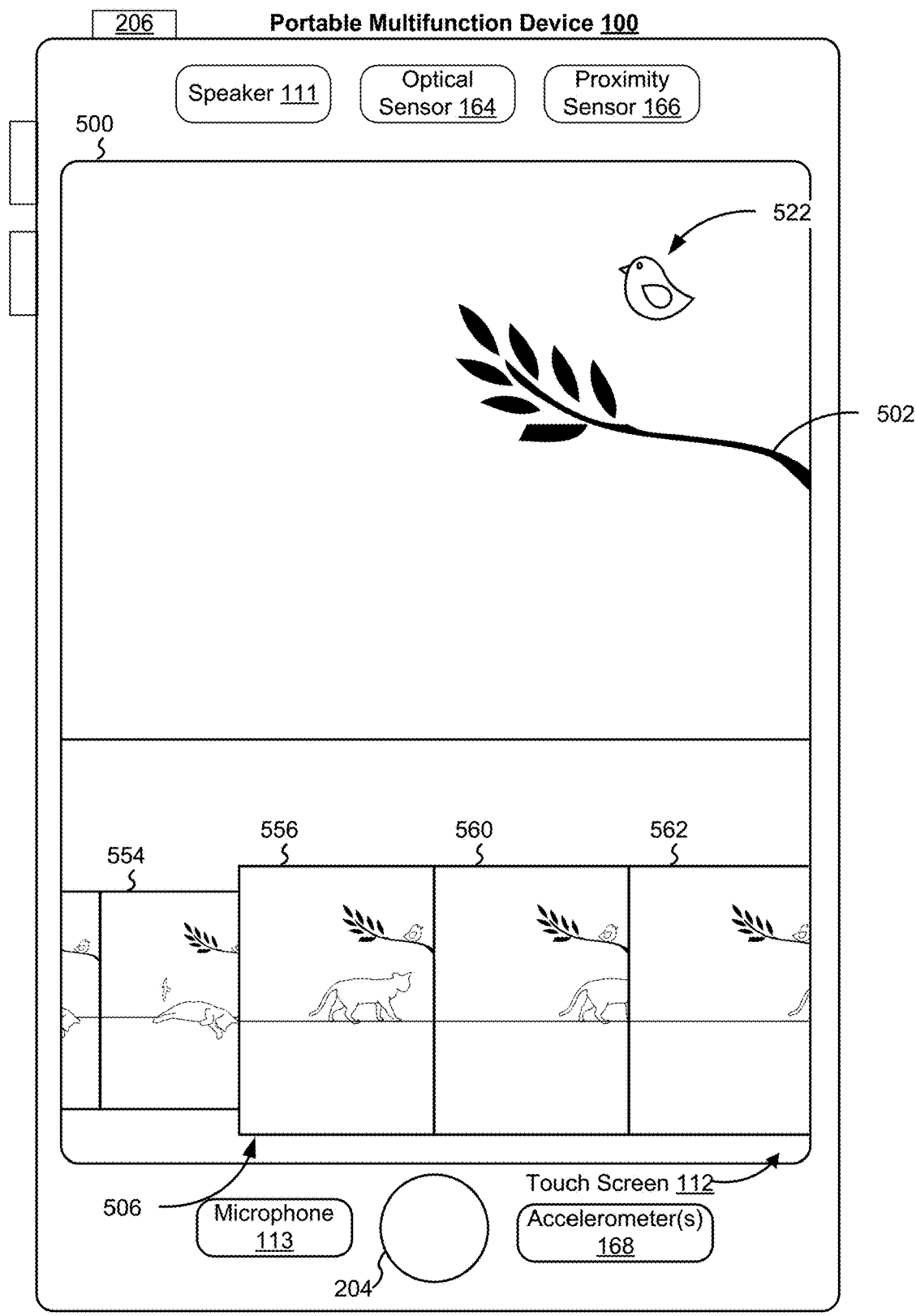
Figure 5Z:
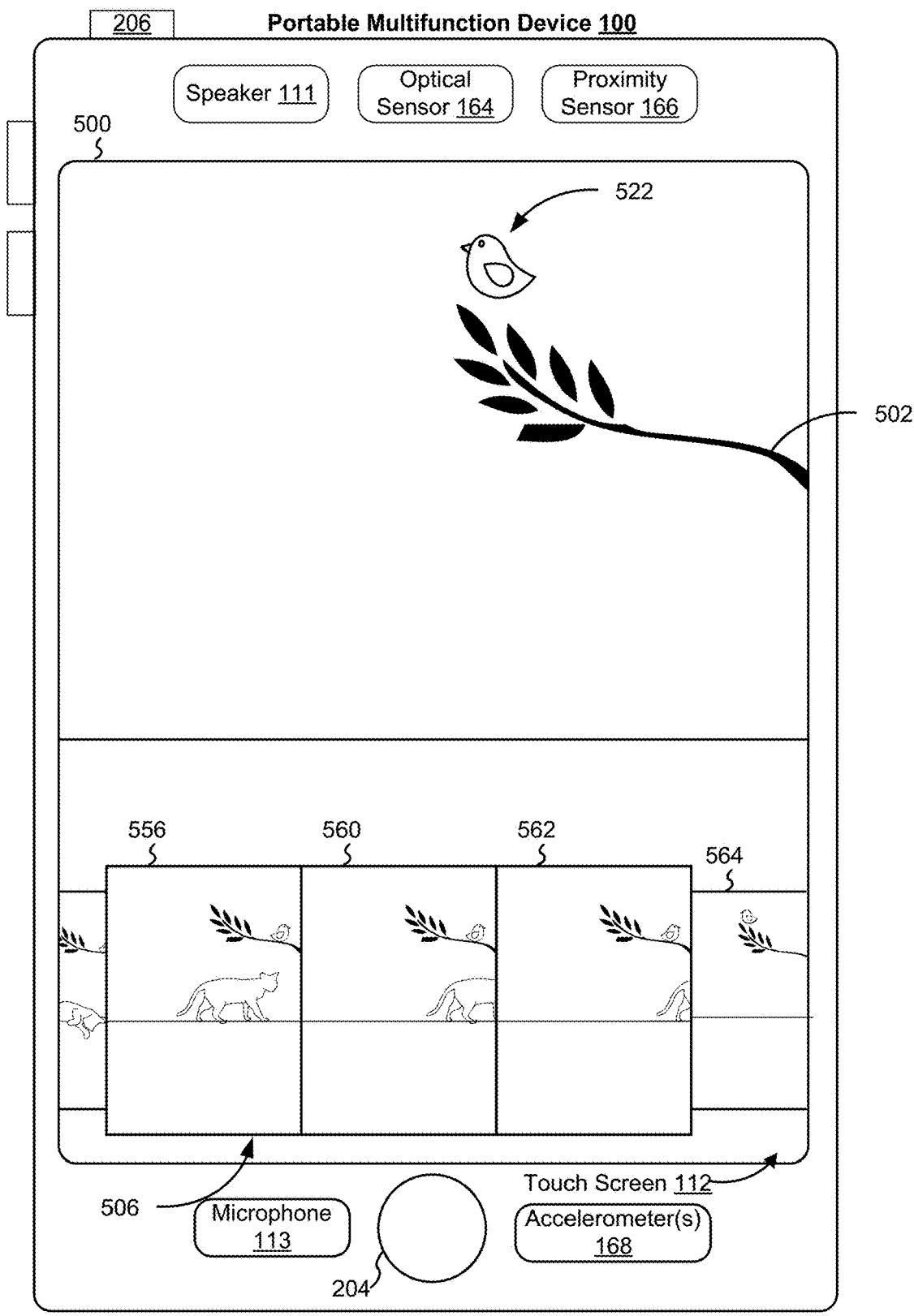
Figure 5A:
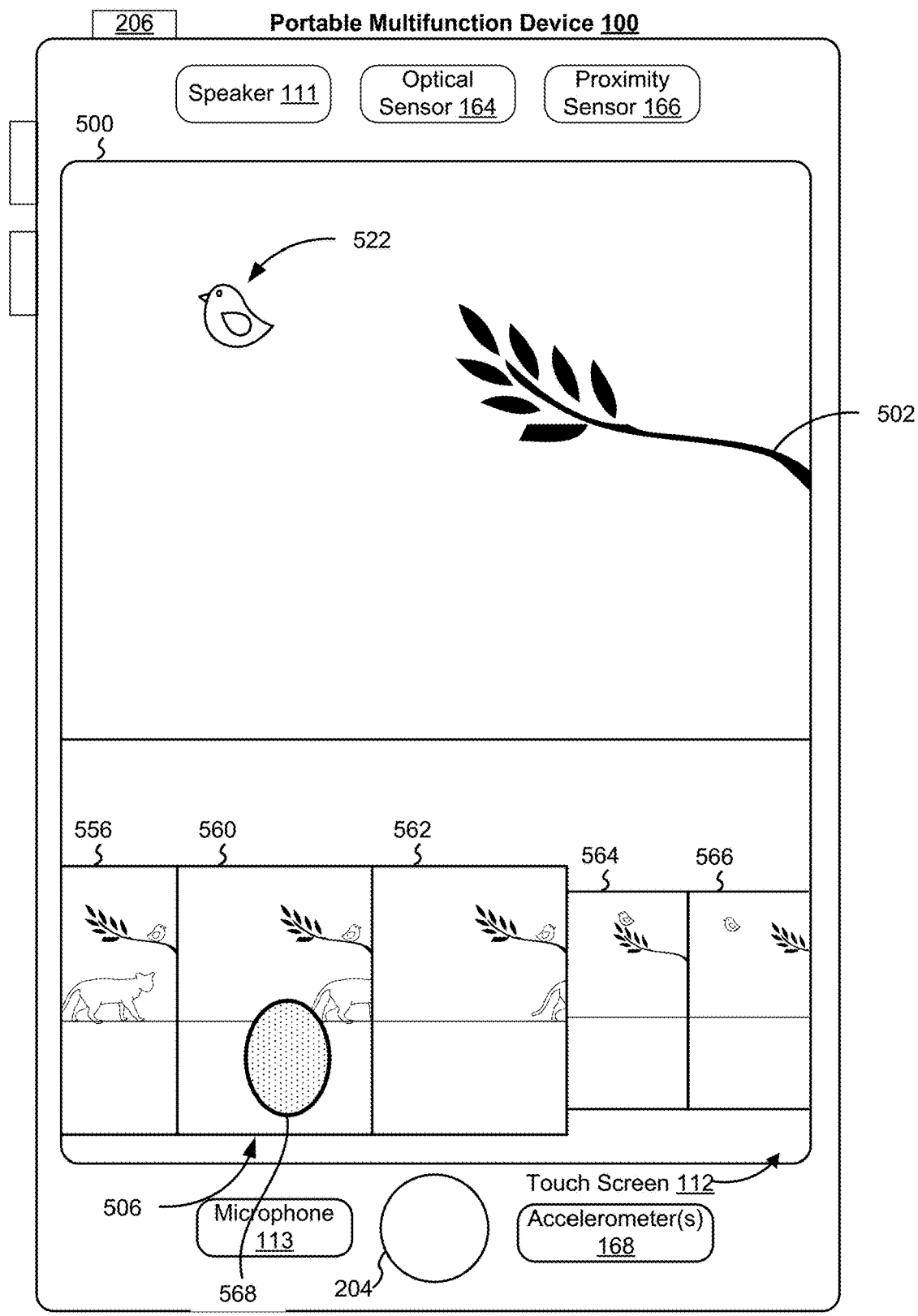
Figure 5A:
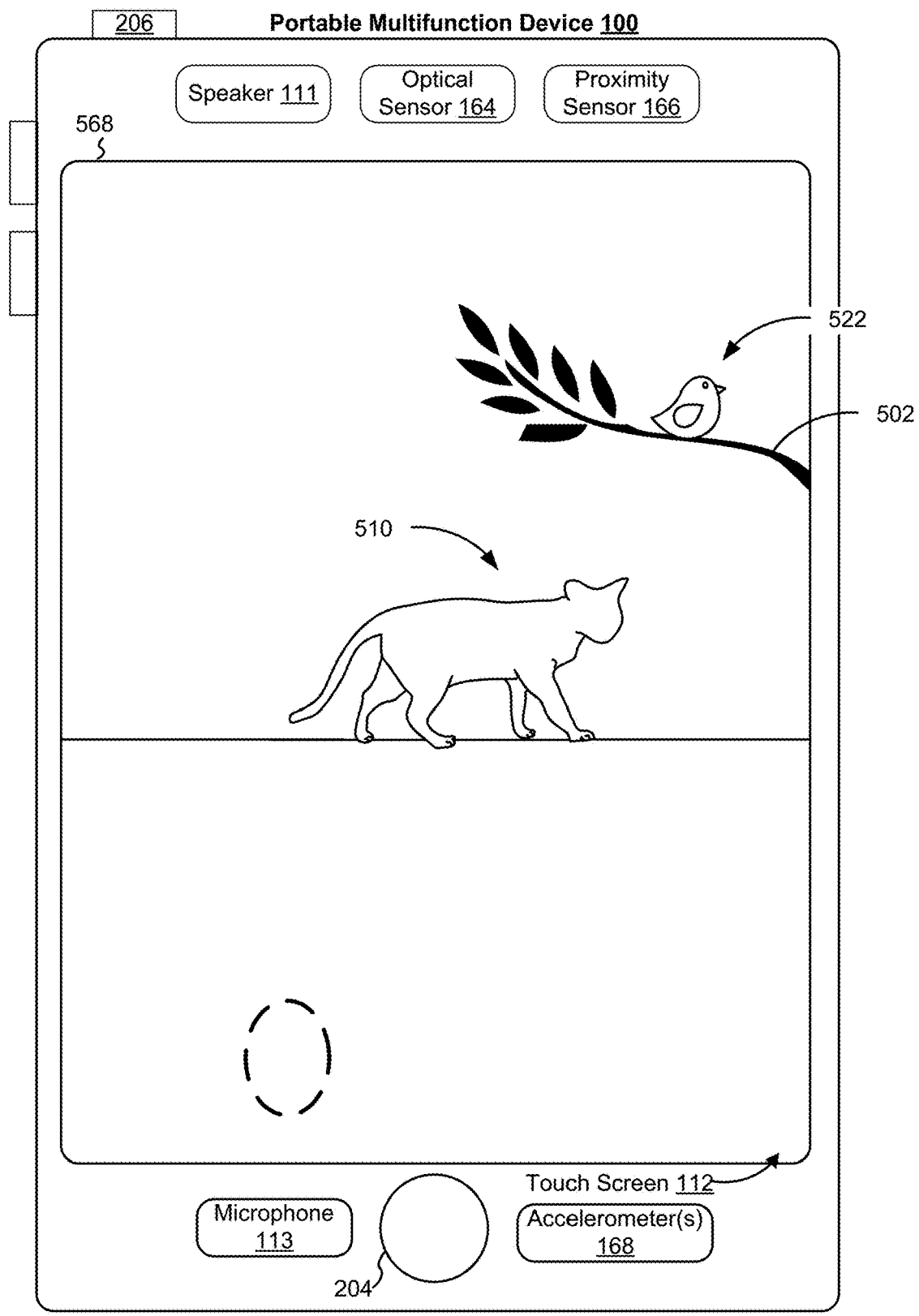
Figure 5A:
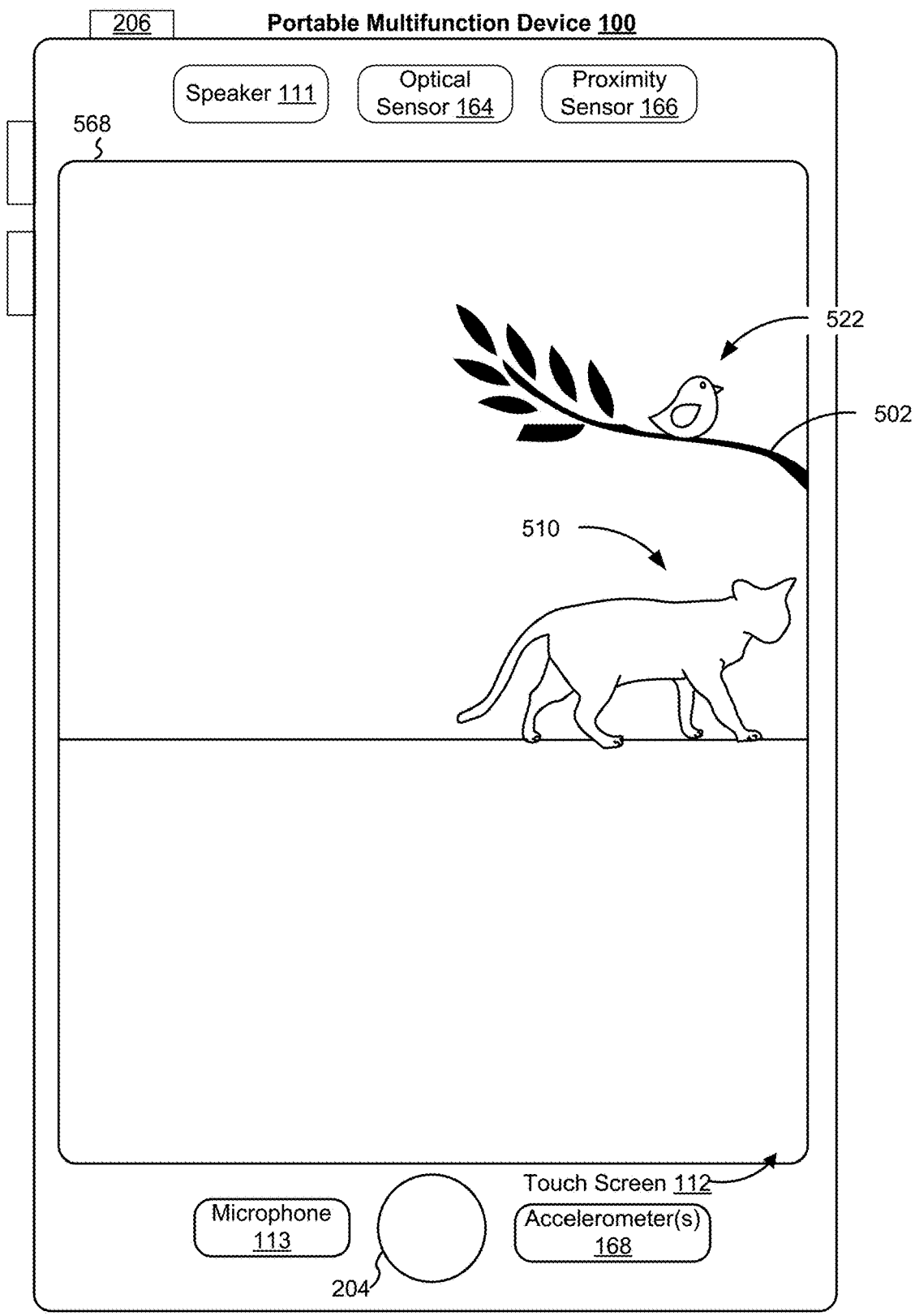
Figure 5A:
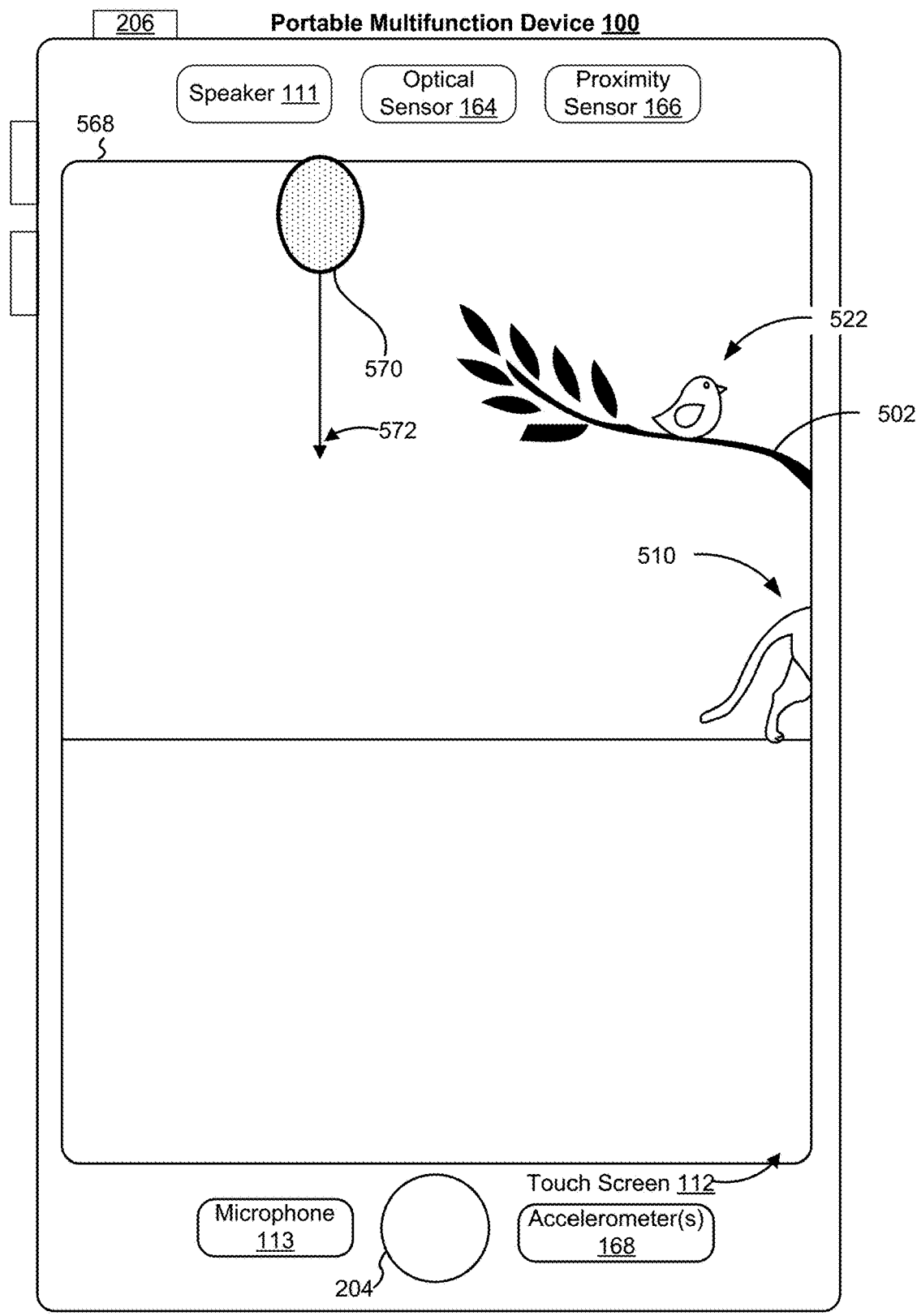
Figure 5A:
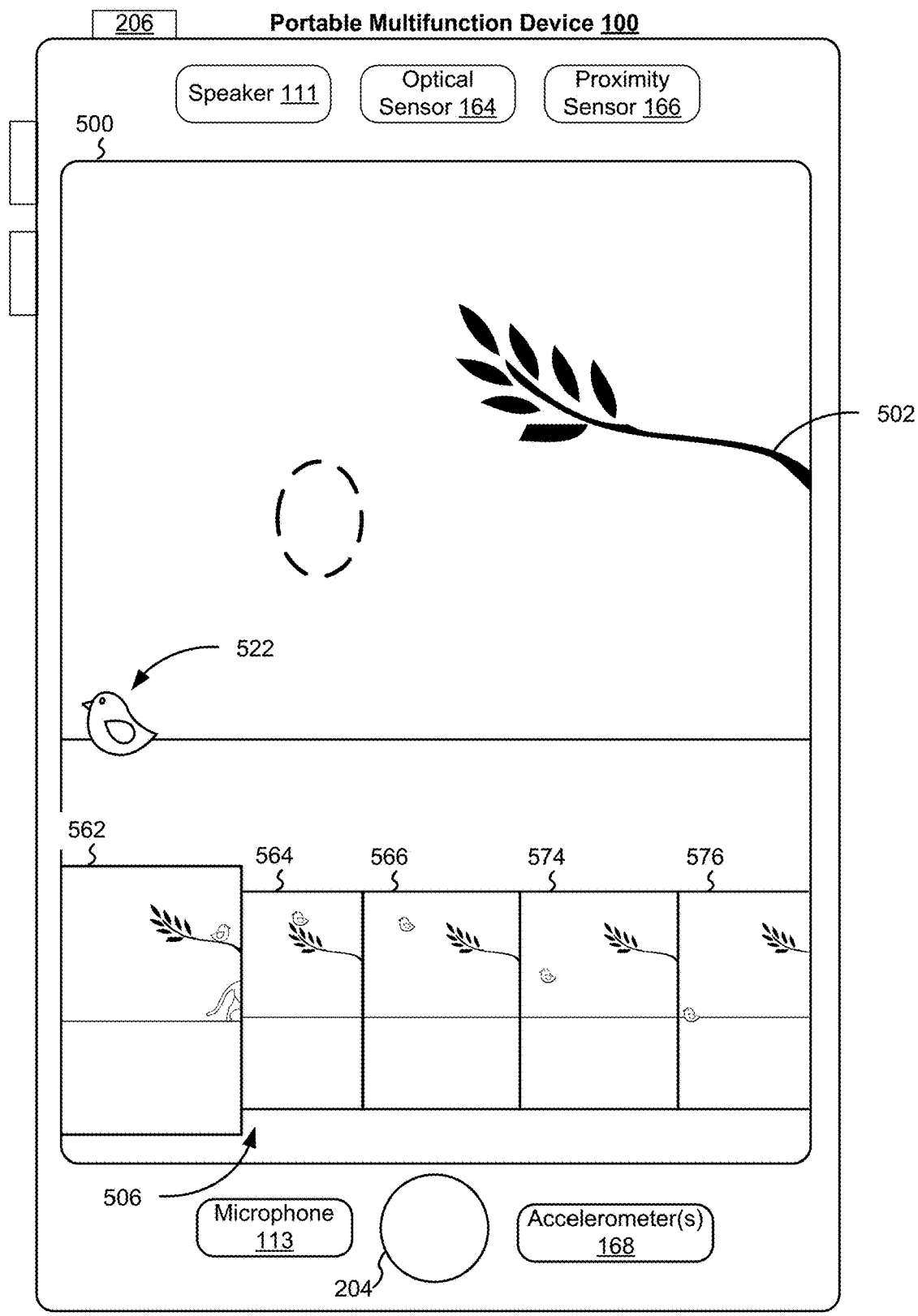
Figure 5A:
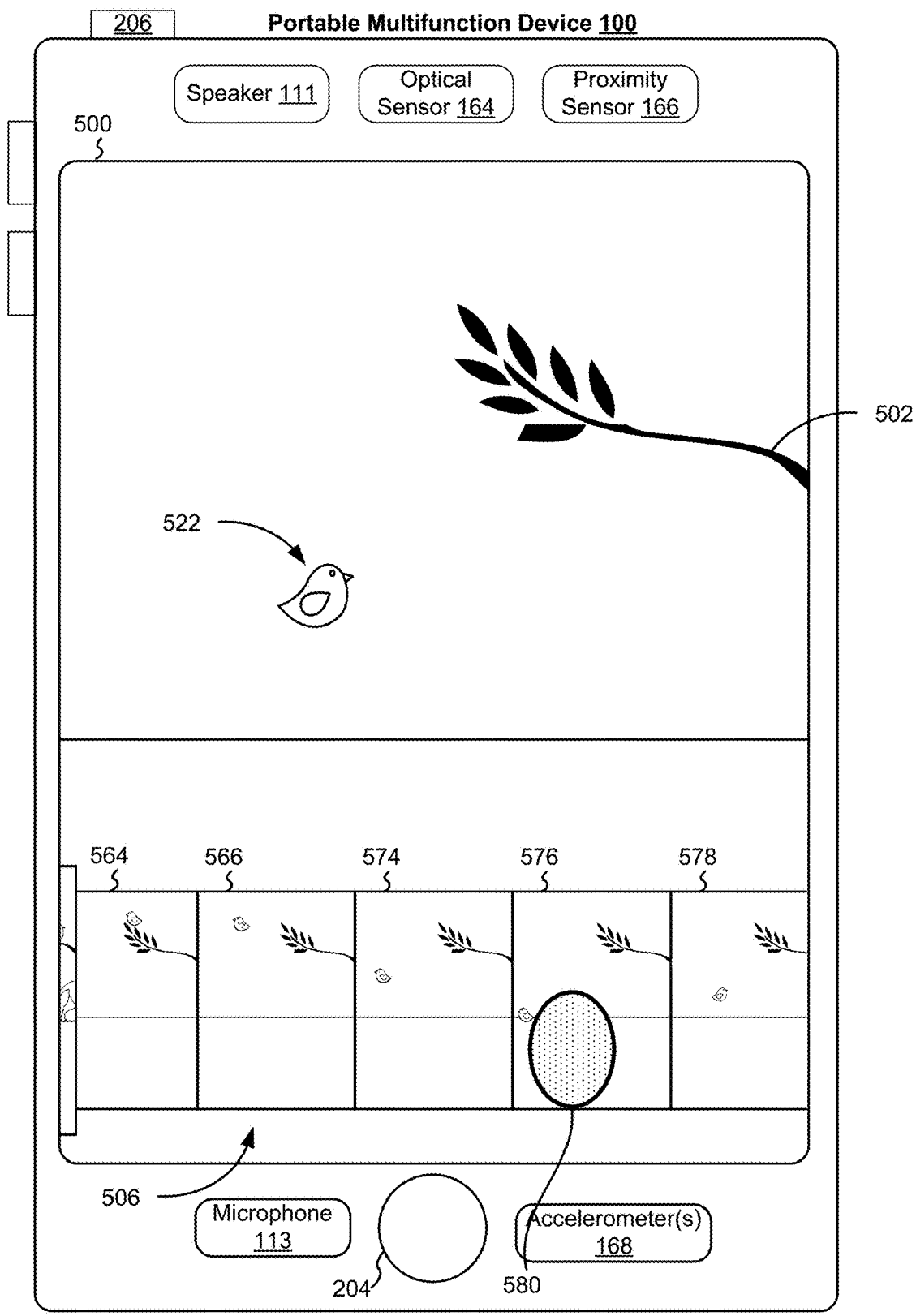
Figure 5A:
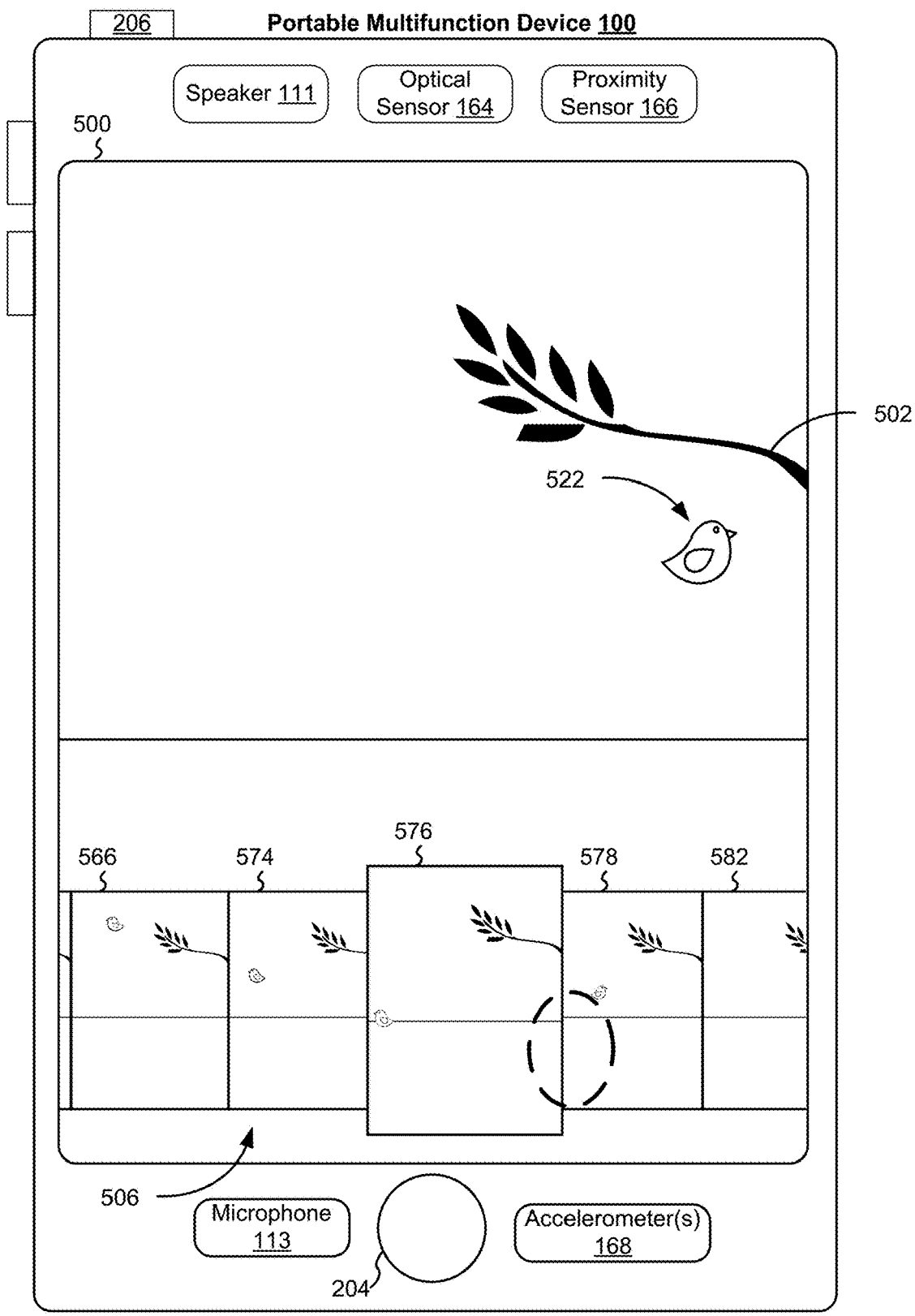

The device then detects lift-off of contact 558 in FIG. 5X and, in response, stops marking concurrently captured images as part of the video clip. The device also freezes the image in frame 562 upon lift-off of the contact, as illustrated in FIG. 5Y where the image in frame 562—which would otherwise show a live image because it has not fully migrated onto the screen—shows the tail of cat 510, even though the cat has left the live image above. In FIG. 5Z, next frame 564 is displayed at a normal size because the device is no longer marking the video clip.

Although not shown in FIGS. 5V-5X, in some embodiments, the device analyzes the images in the marked video clip in real-time, and automatically identifies frames that are of poor quality (e.g., images that are blurry due to camera movement or fast motion of objects in the live view). When frames of poor quality are detected, the device displays a prompt (e.g., a pop-up text box above scroll 506) asking whether the user would like to remove the frames of poor quality. The user may confirm or reject the suggestion to remove the blurry frames by a single tap (e.g., on a confirmation affordance) or ignore the prompt.

FIGS. 5AA-5AE illustrate an exemplary embodiment where tapping on a frame corresponding to a marked video clip opens the video clip on the display. As illustrated in FIG. 5AA, the device detects a tap gesture by contact 568 on marked frame 560, which corresponds to a marked video clip spanning the images corresponding to marked frames 556 to 562. In response, the device opens the associated video clip in video review user interface 568, illustrated in FIG. 5AB. The device then plays the video clip, as illustrated by walking of cat 510 off the screen in FIGS. 5AC-5AD. The device then detects a swipe gesture including movement 572 of contact 570 down from the top of the display in FIG. 5AD and, in response, returns to the live view in user interface 500, as illustrated in FIG. 5AE.

FIGS. 5AF-5AG illustrate an exemplary embodiment where tapping on an unmarked frame in the scroll marks the image associated with the frame, without opening the image in the image display user interface. The device detects a tap gesture by contact 580 on unmarked frame 576 within scroll 506, in FIG. 5AG. In response, the device marks the image associated with frame 576 and increases the size of the frame to indicate that the associated image was marked. Unlike the response to the tap gesture by contact 516 in FIG. 5J—where the device displayed the image corresponding to frame 516 in FIG. 5K because frame 516 was marked prior to detecting the tap gesture—the device does not display the image corresponding to frame 576 in FIG. 5AG in the image review user interface because the image was not previously marked.

Figure 6A:
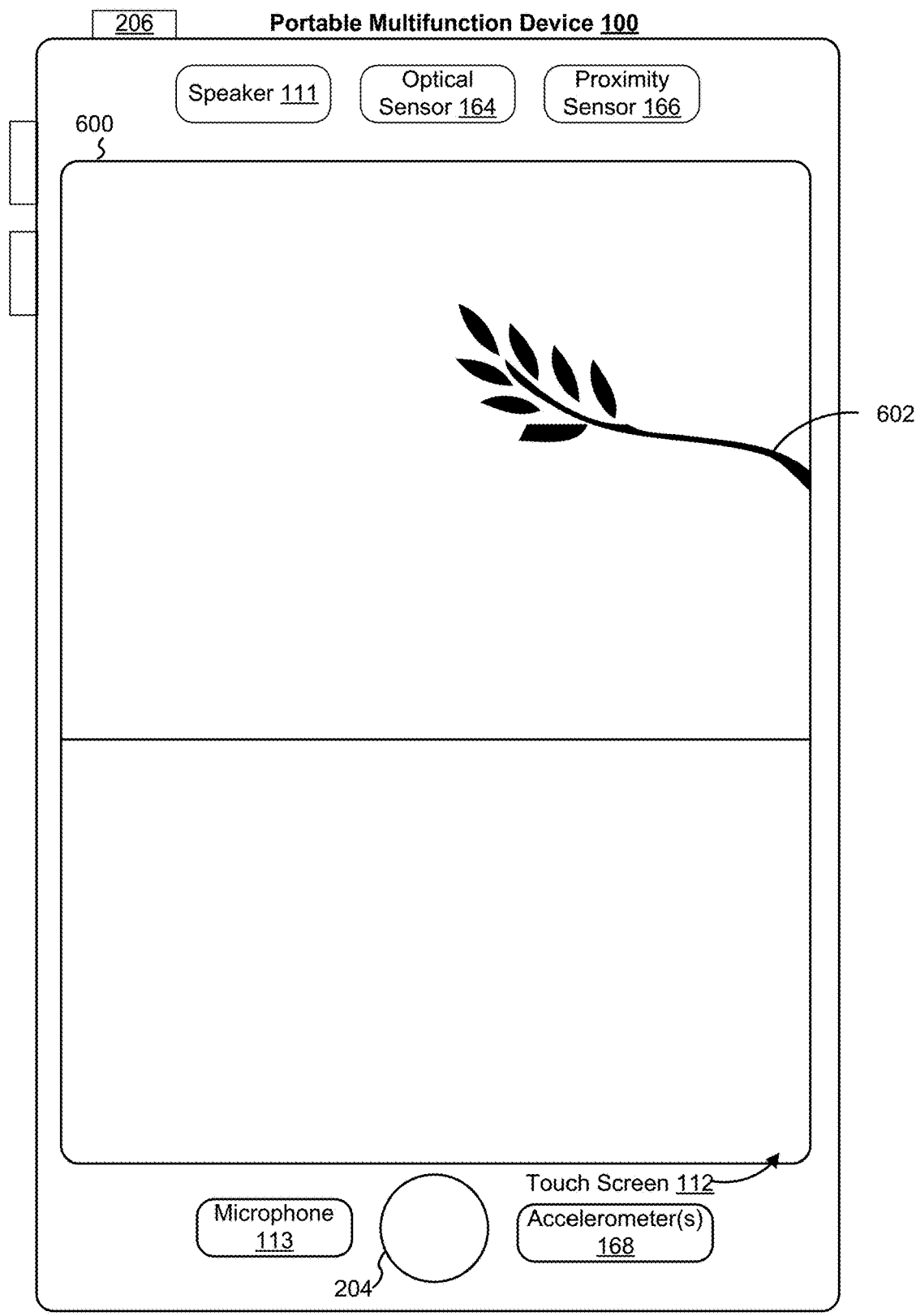
FIGS. 6A-6S illustrate example user interfaces for capturing digital media in different imaging modes in accordance with some embodiments.
Figure 6B:
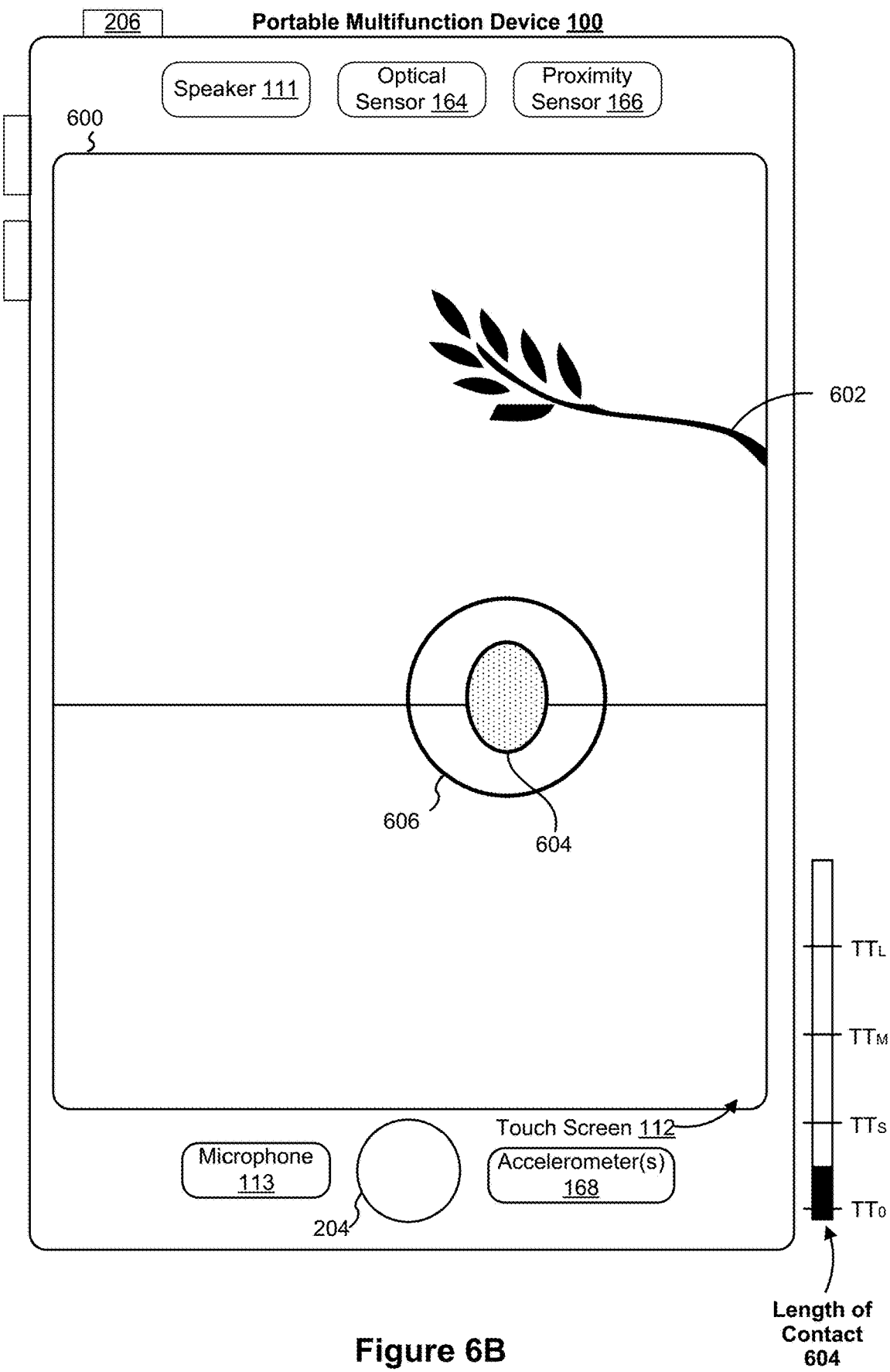
Figure 6C:
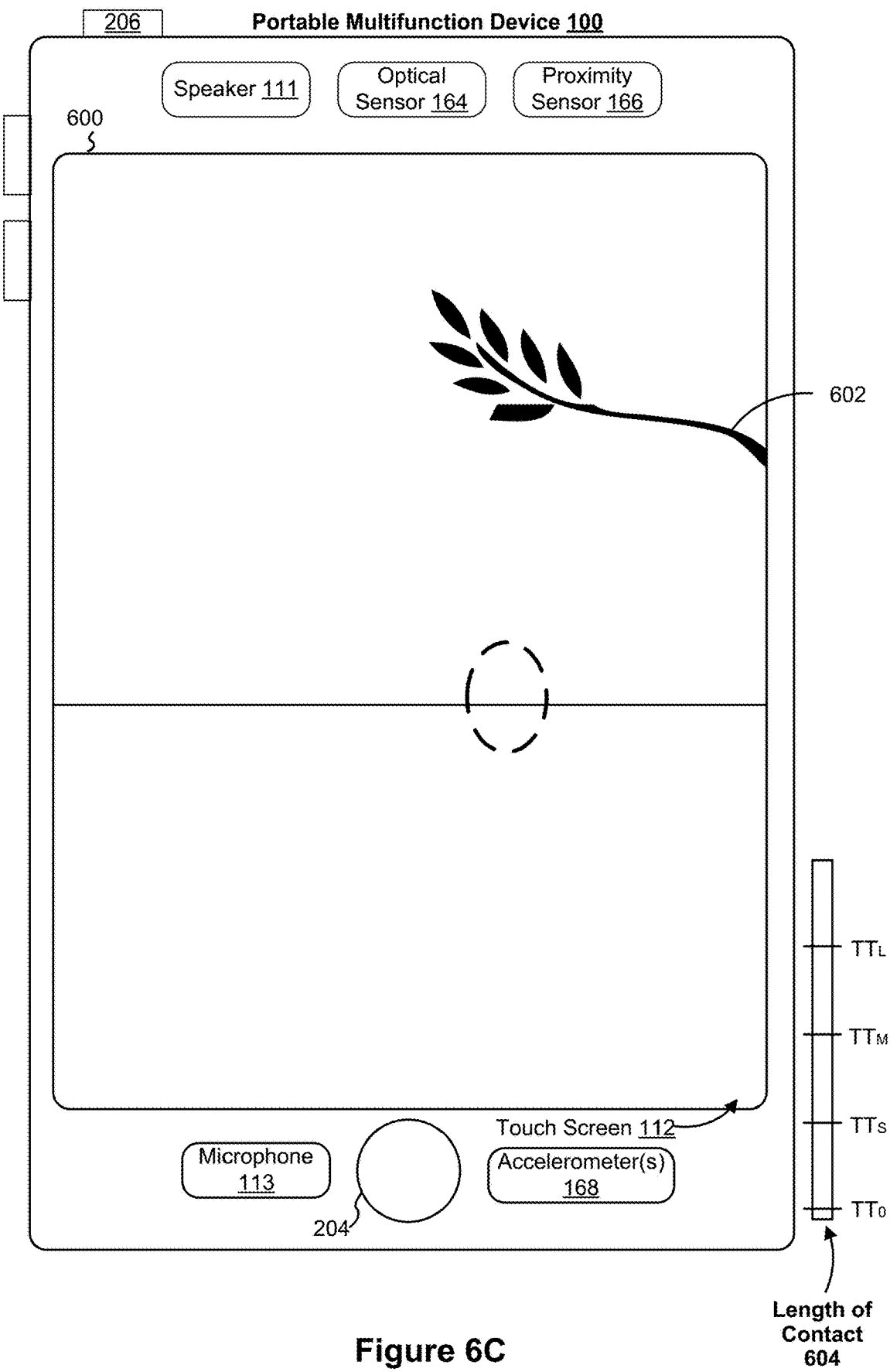
Figure 6D:
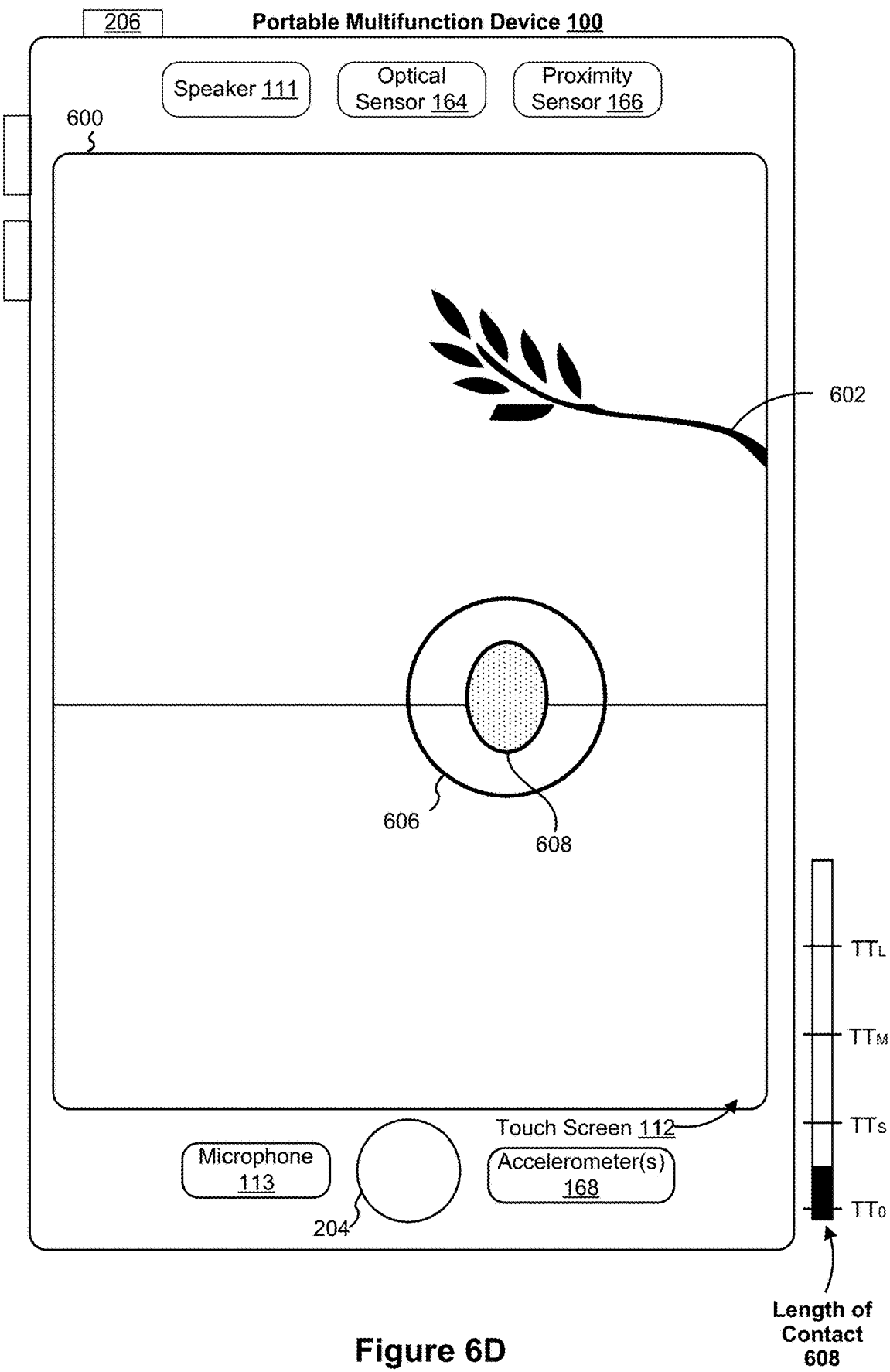
Figure 6E:
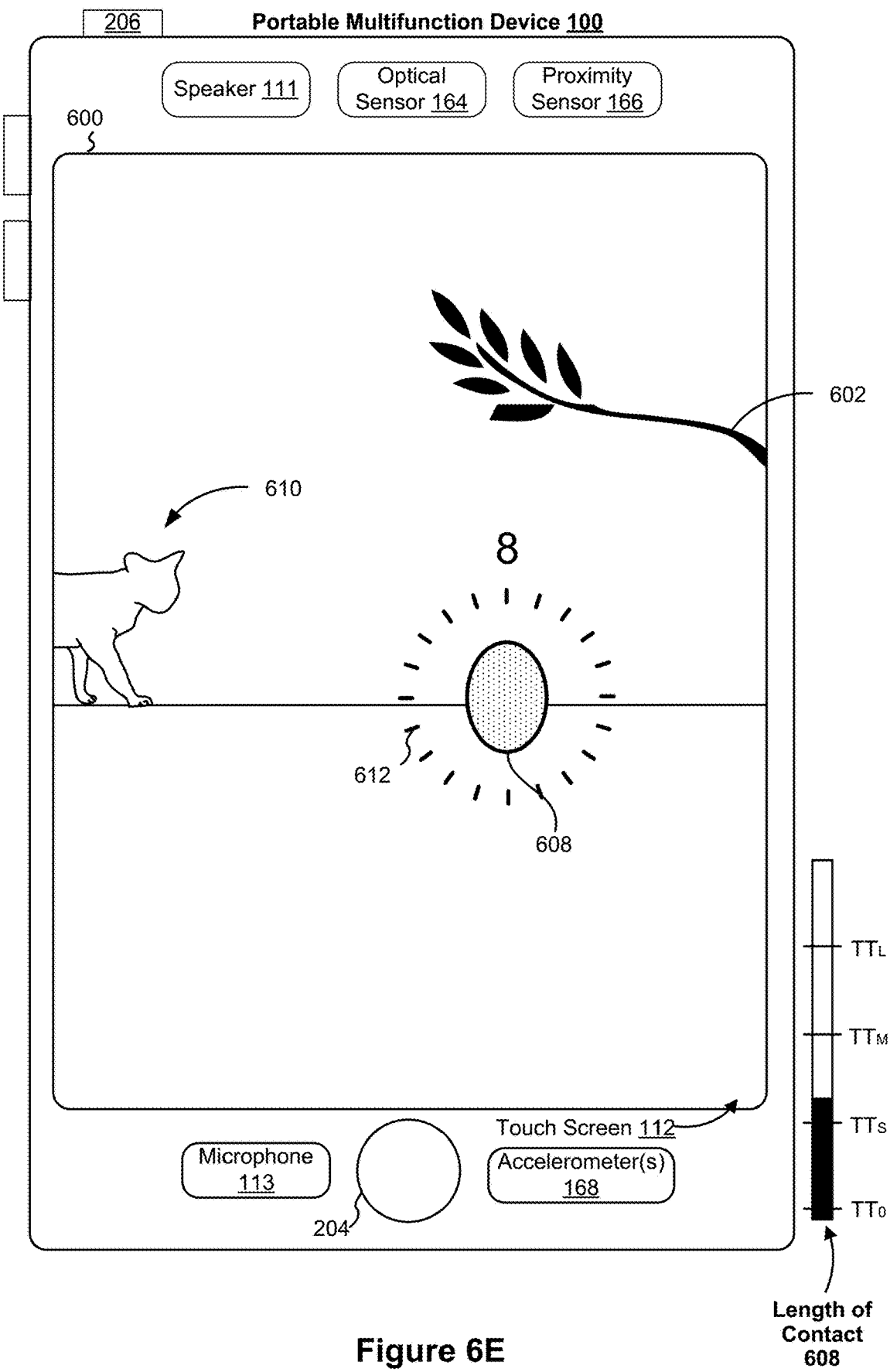
Figure 6F:
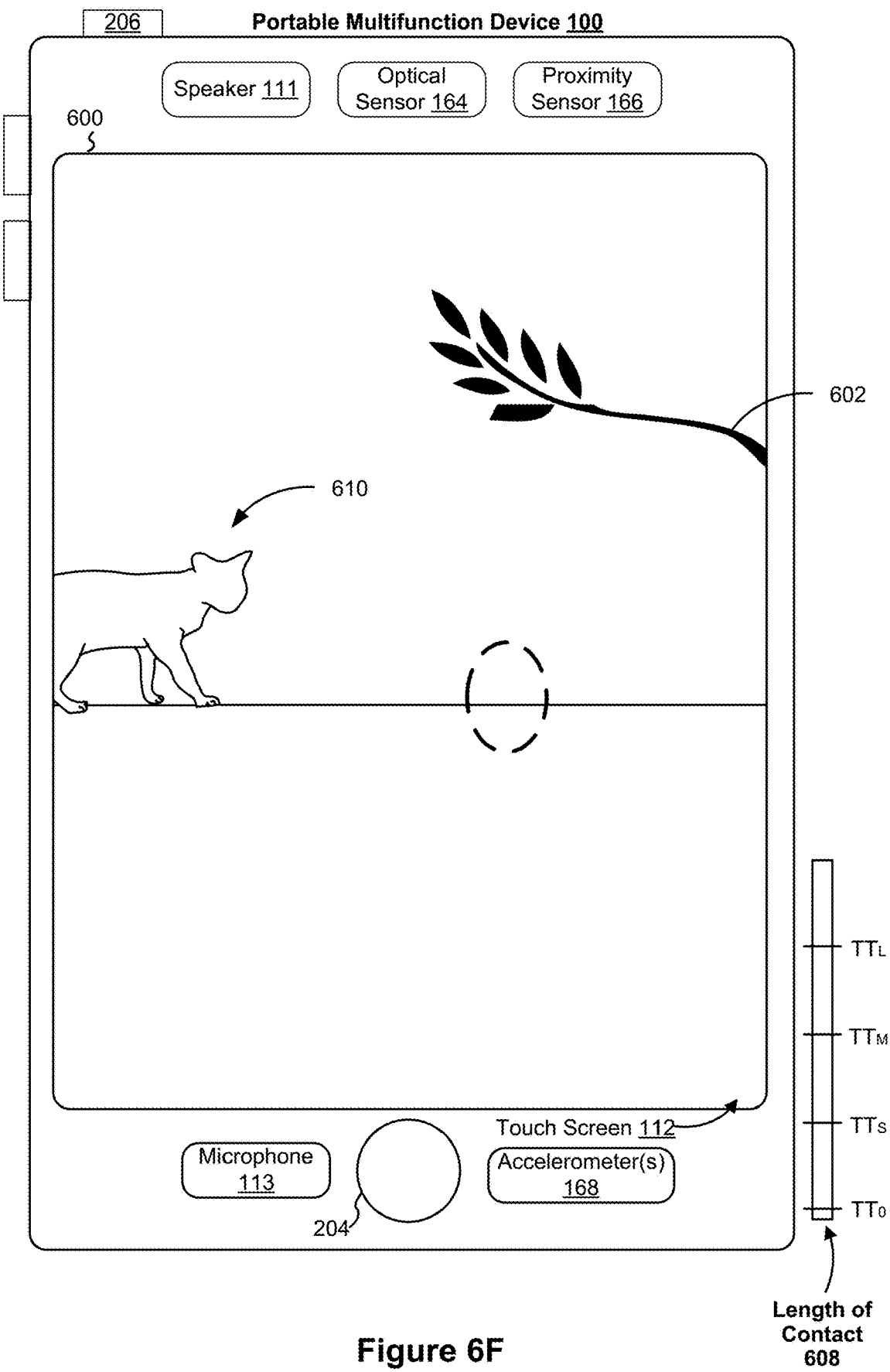
Figure 6G:
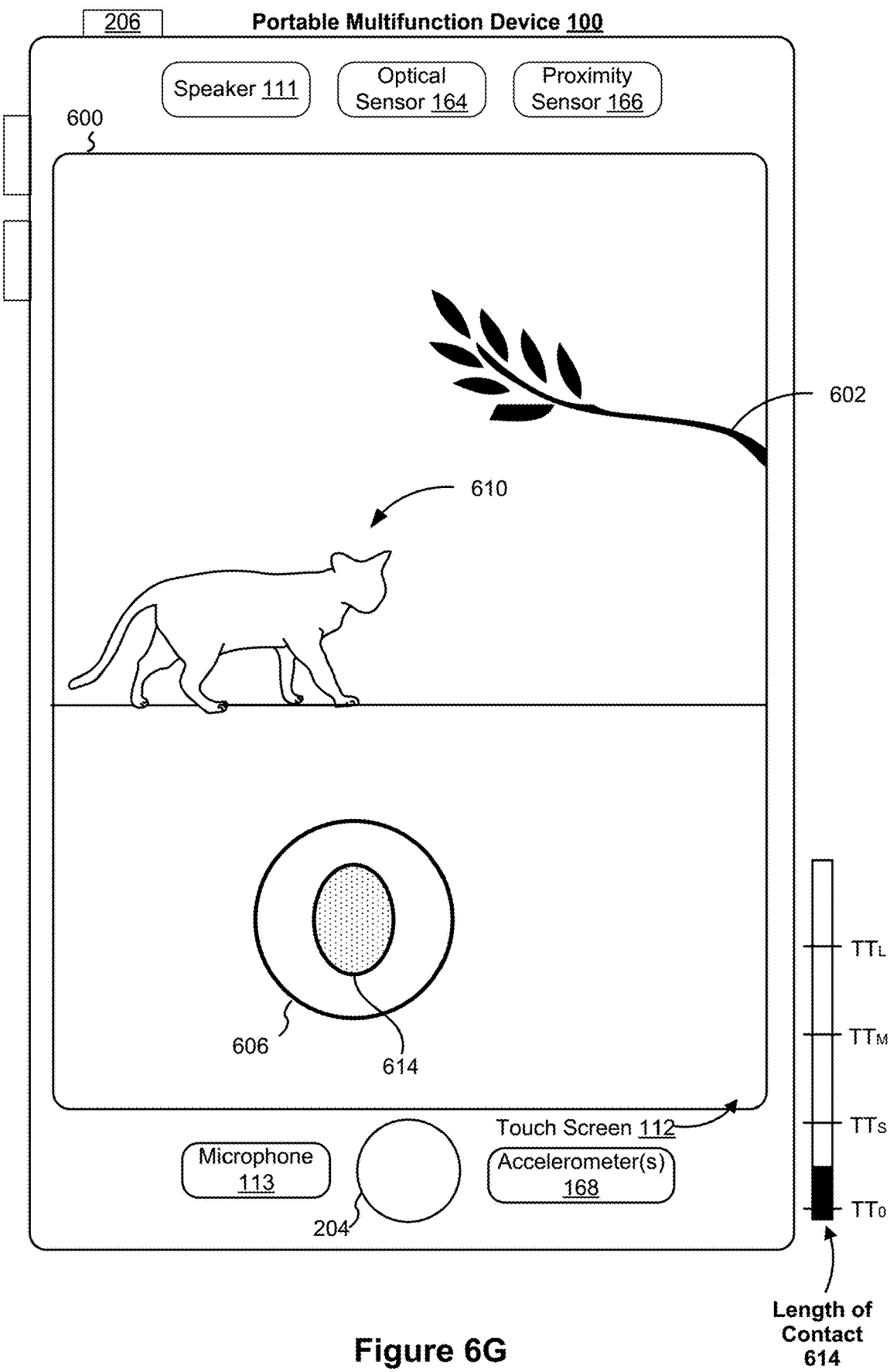
Figure 6H:
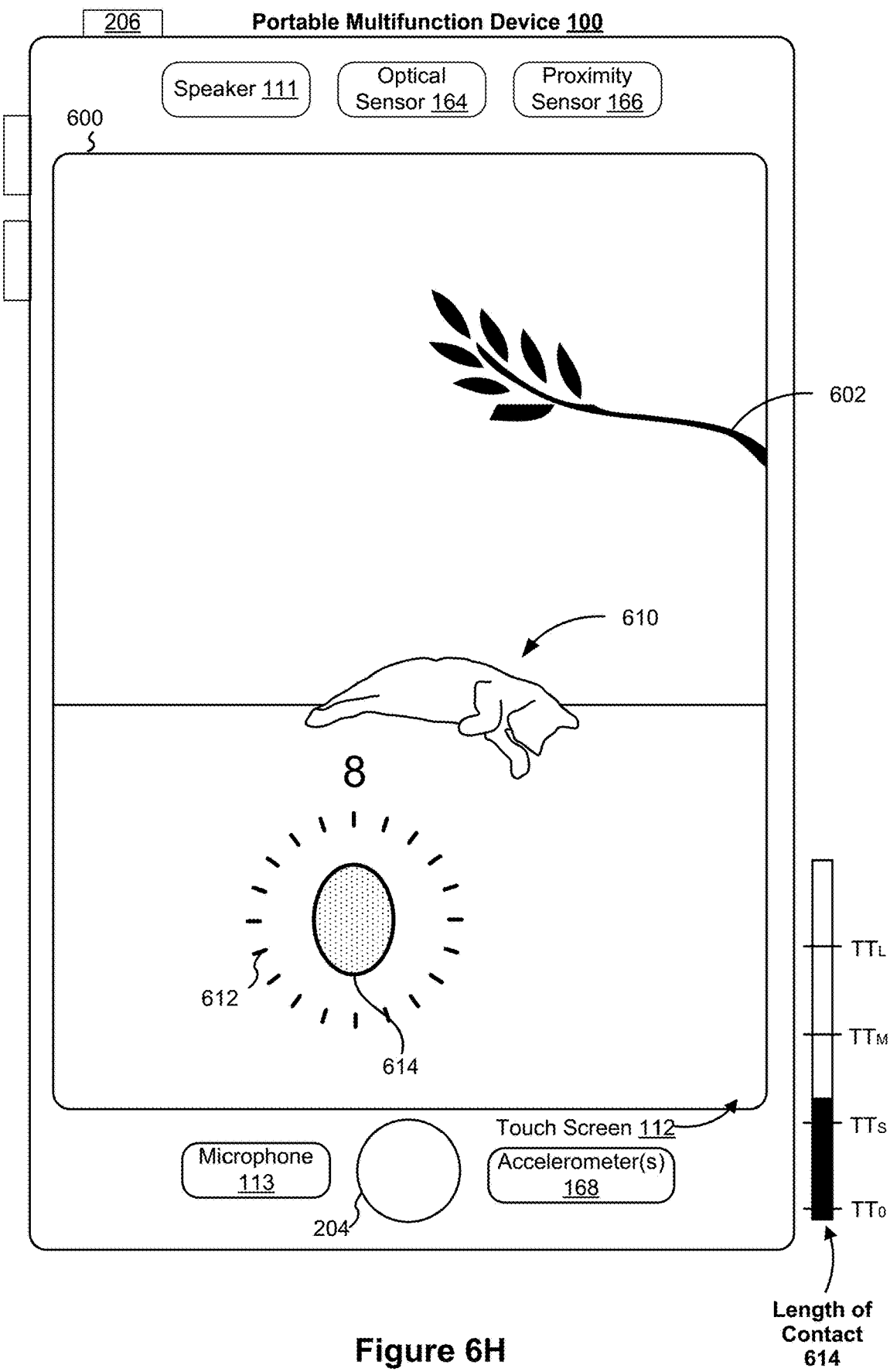
Figure 6I:
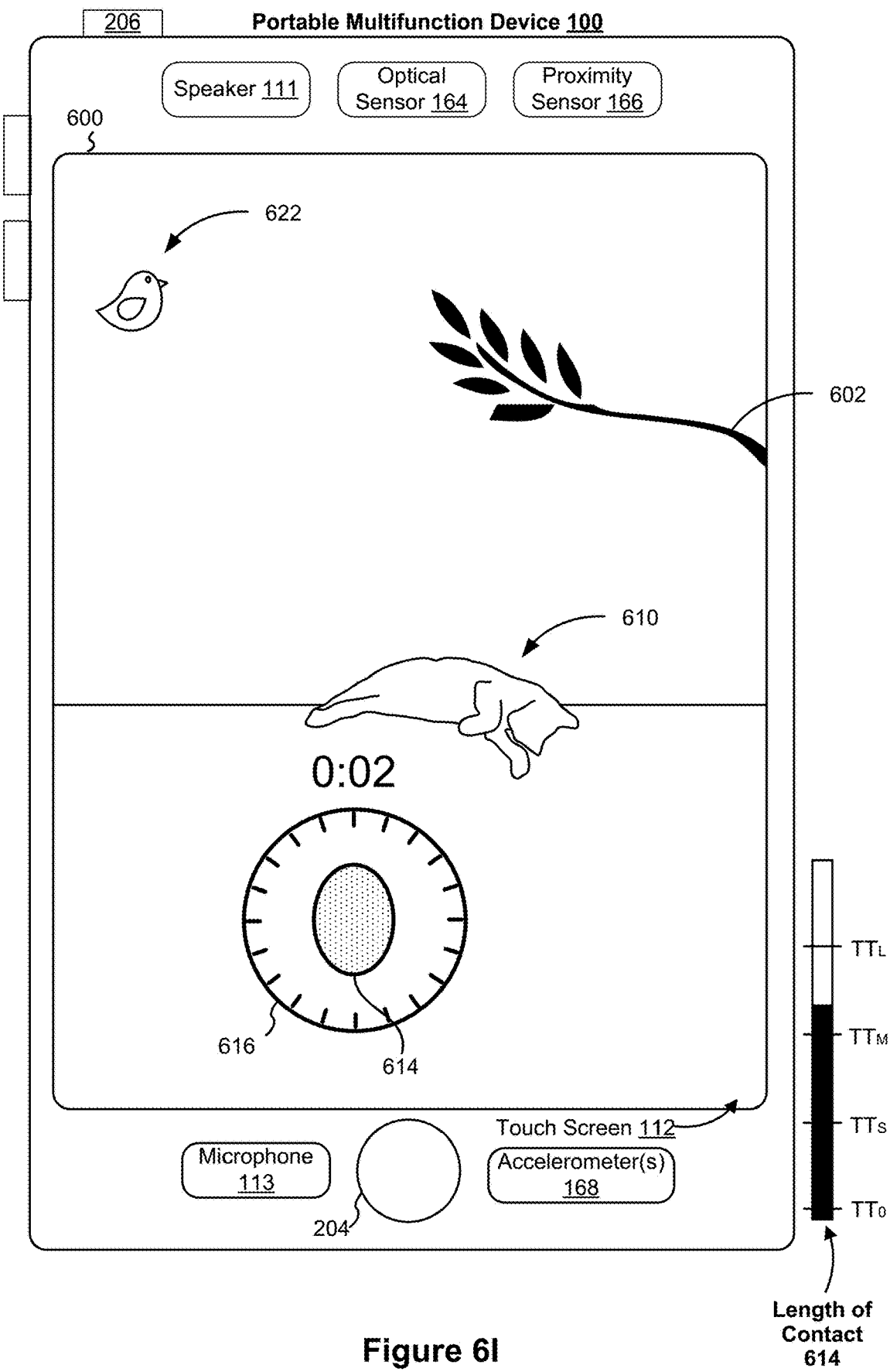
Figure 6J:
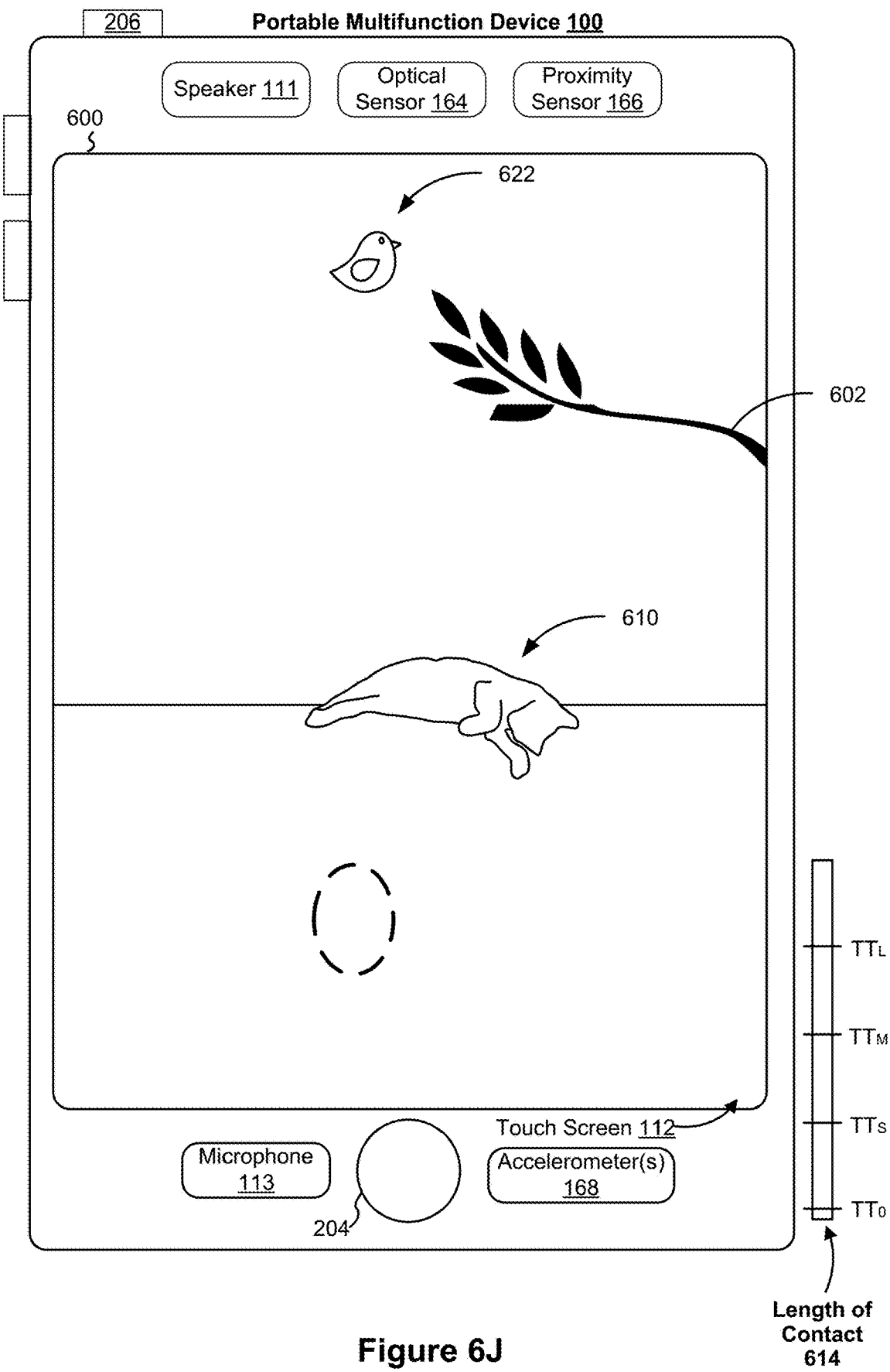
Figure 6K:
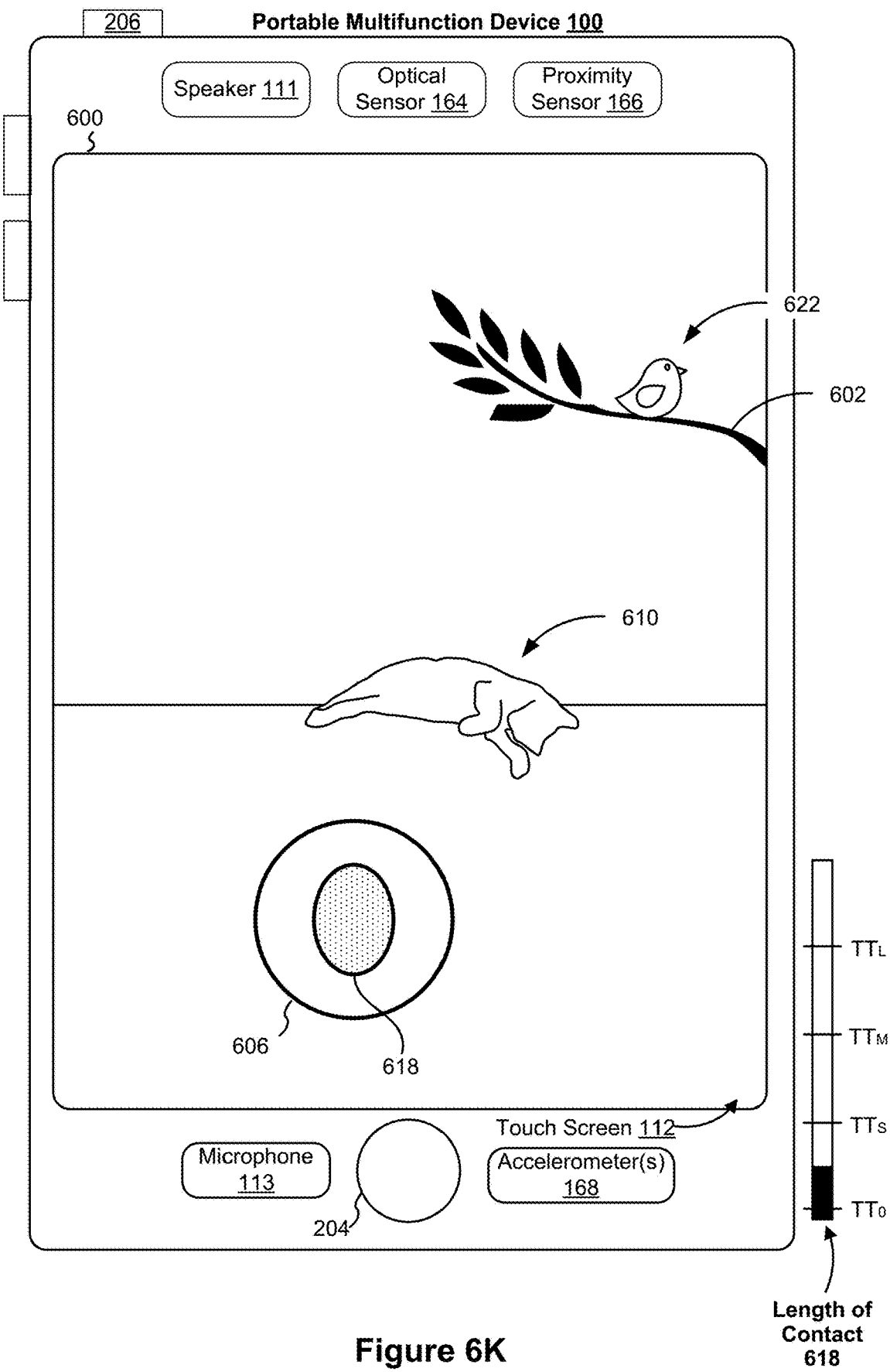
Figure 6L:
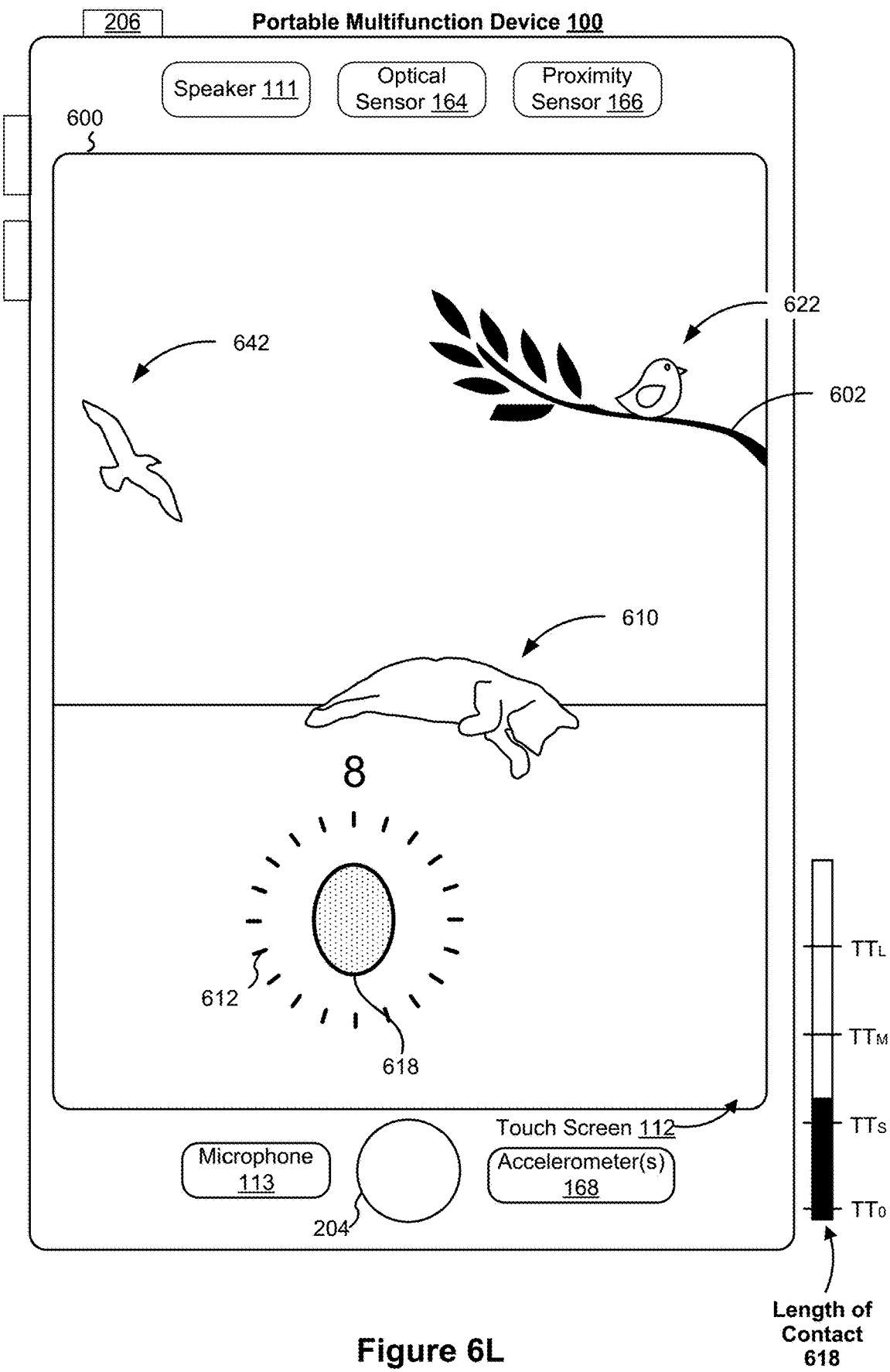
Figure 6M:
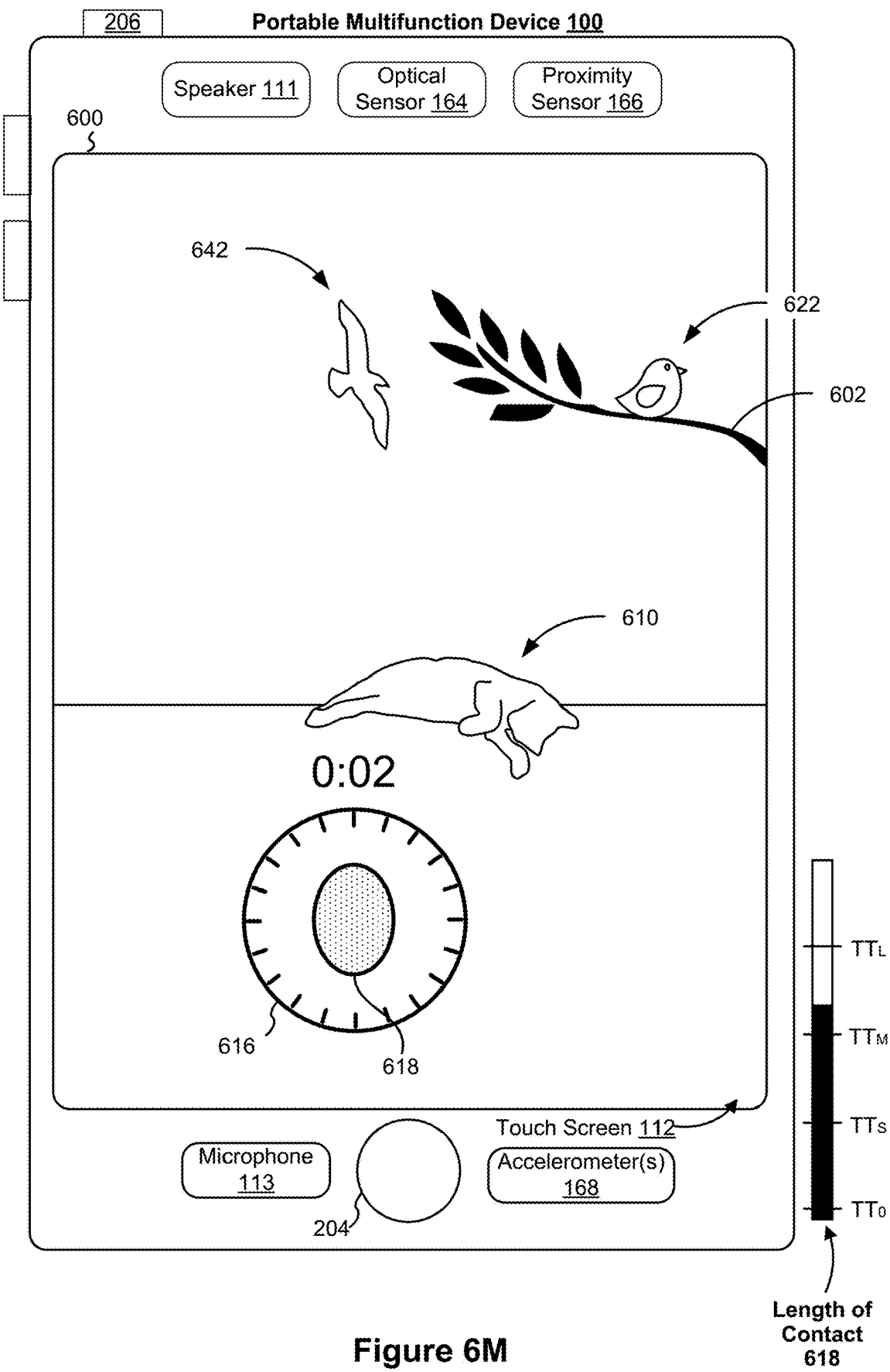
Figure 6N:
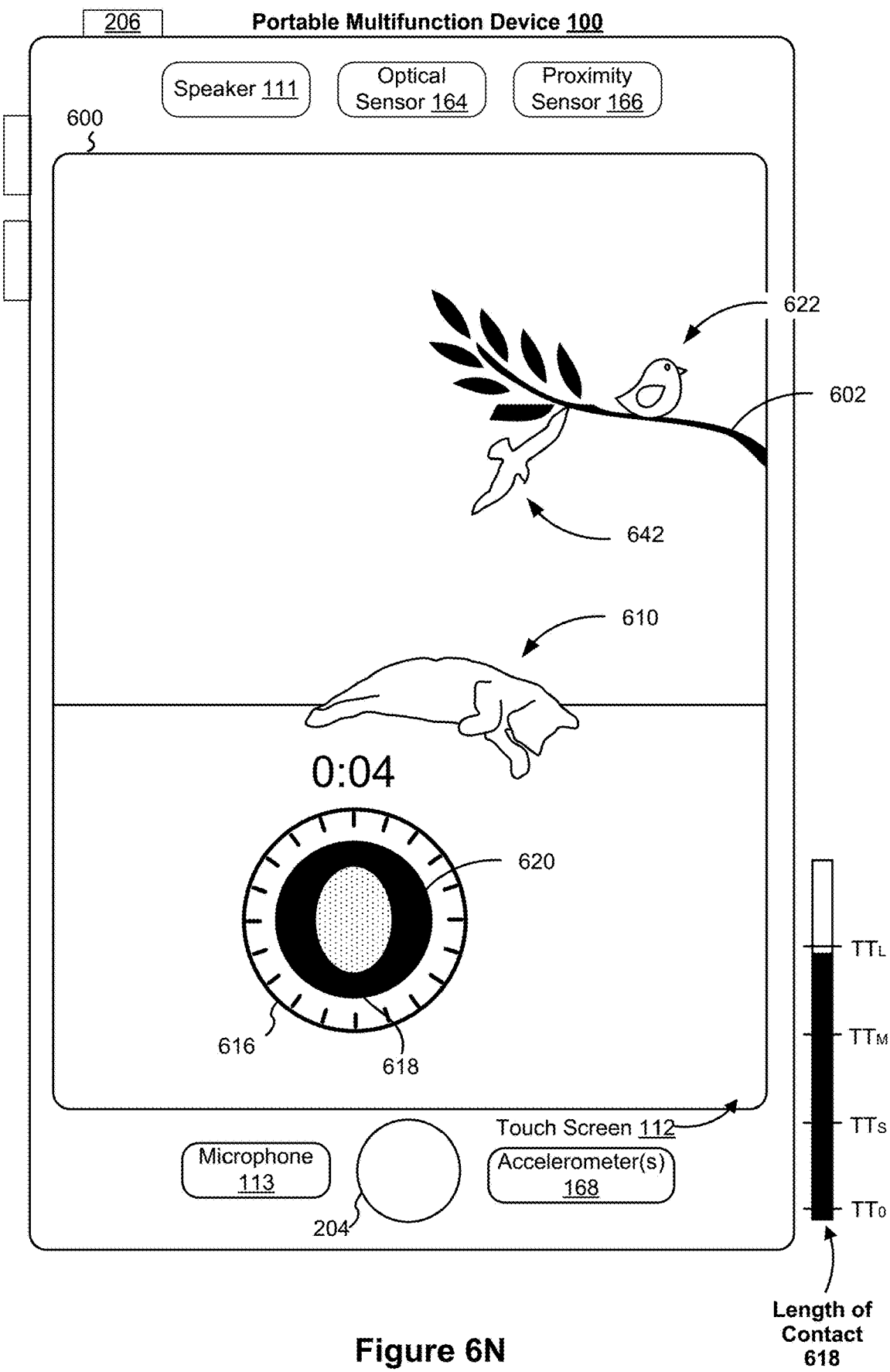
Figure 6O:
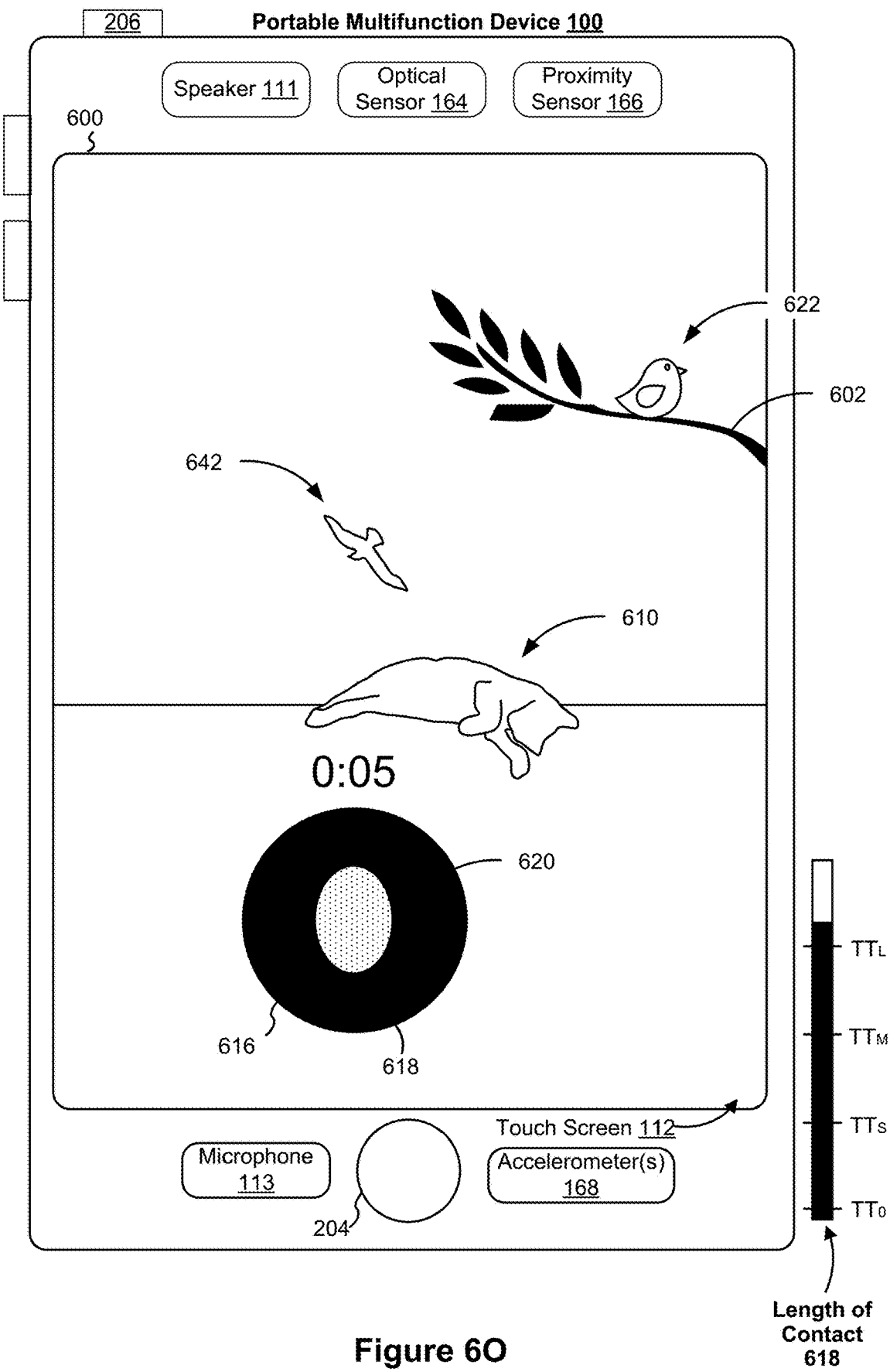
Figure 6P:
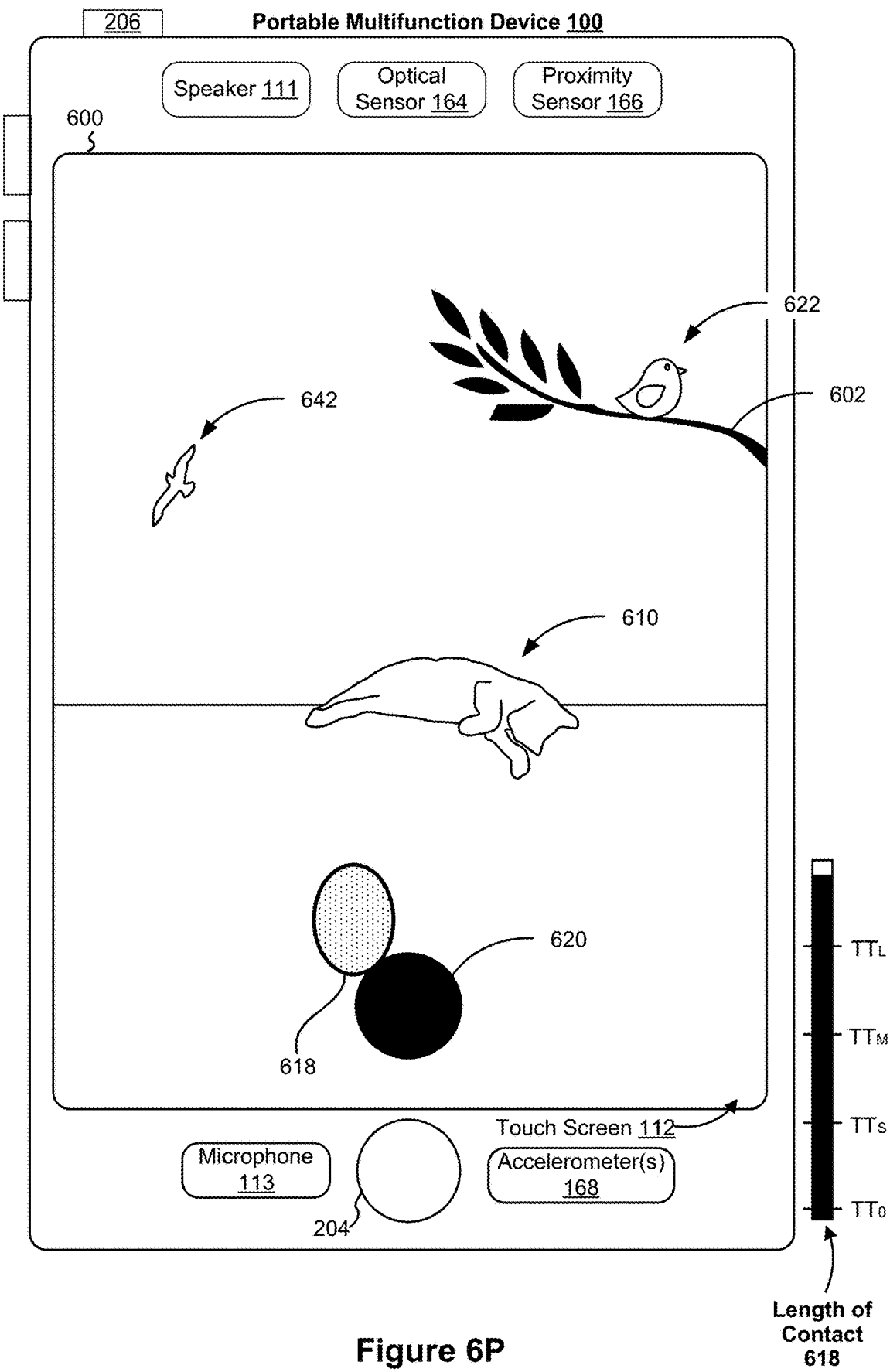
Figure 6Q:
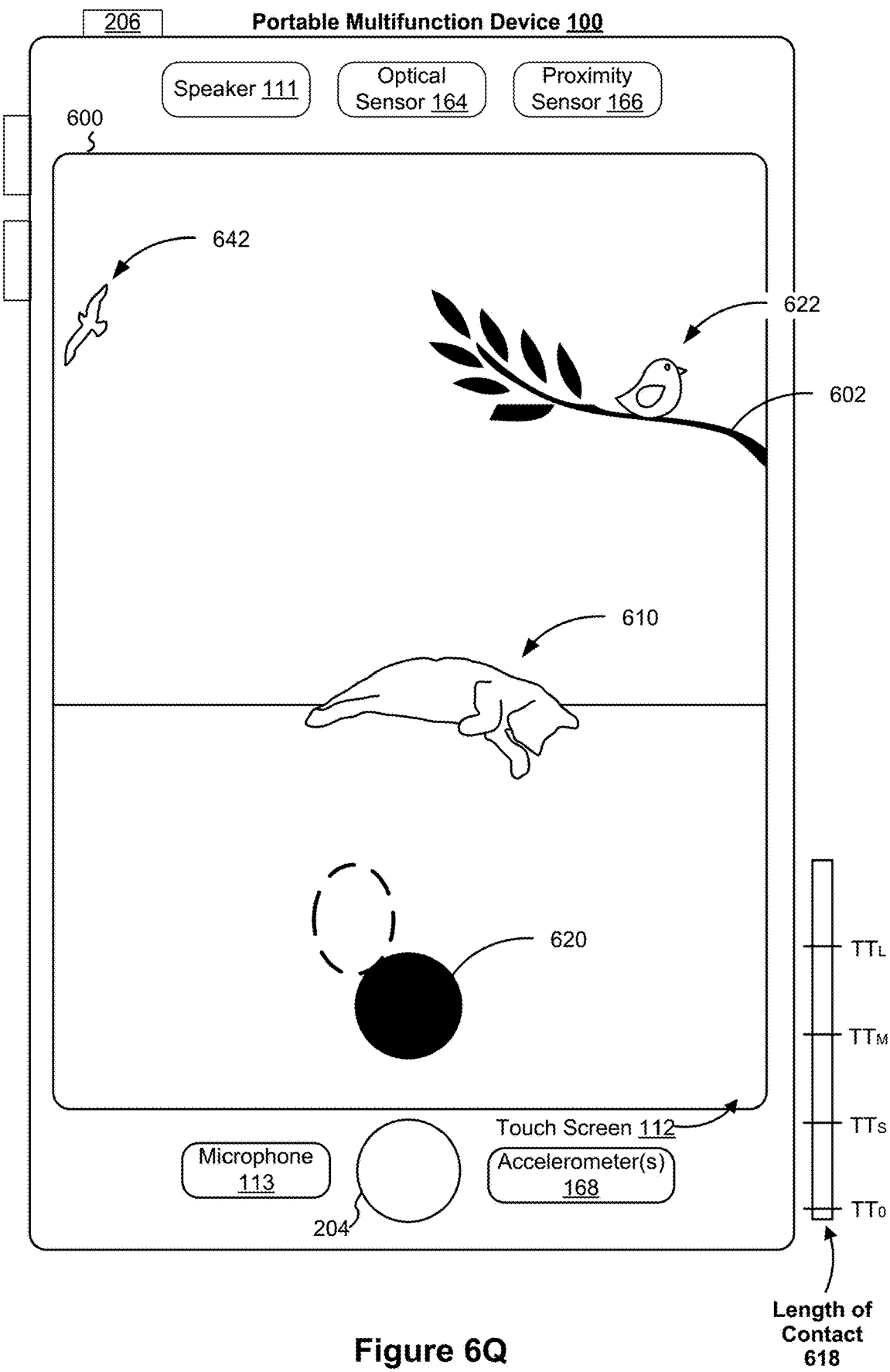
Figure 6R:
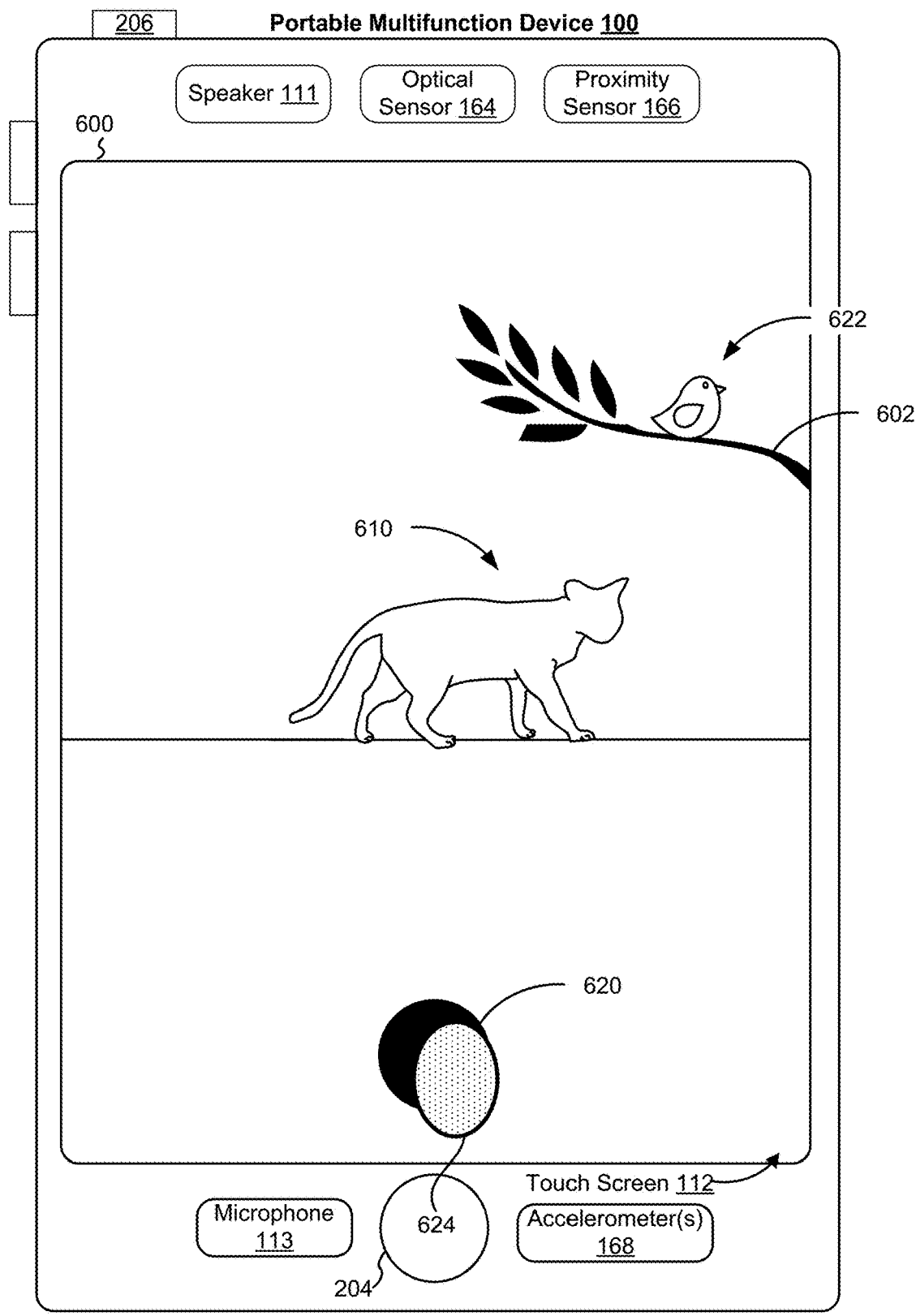
Figure 6S:
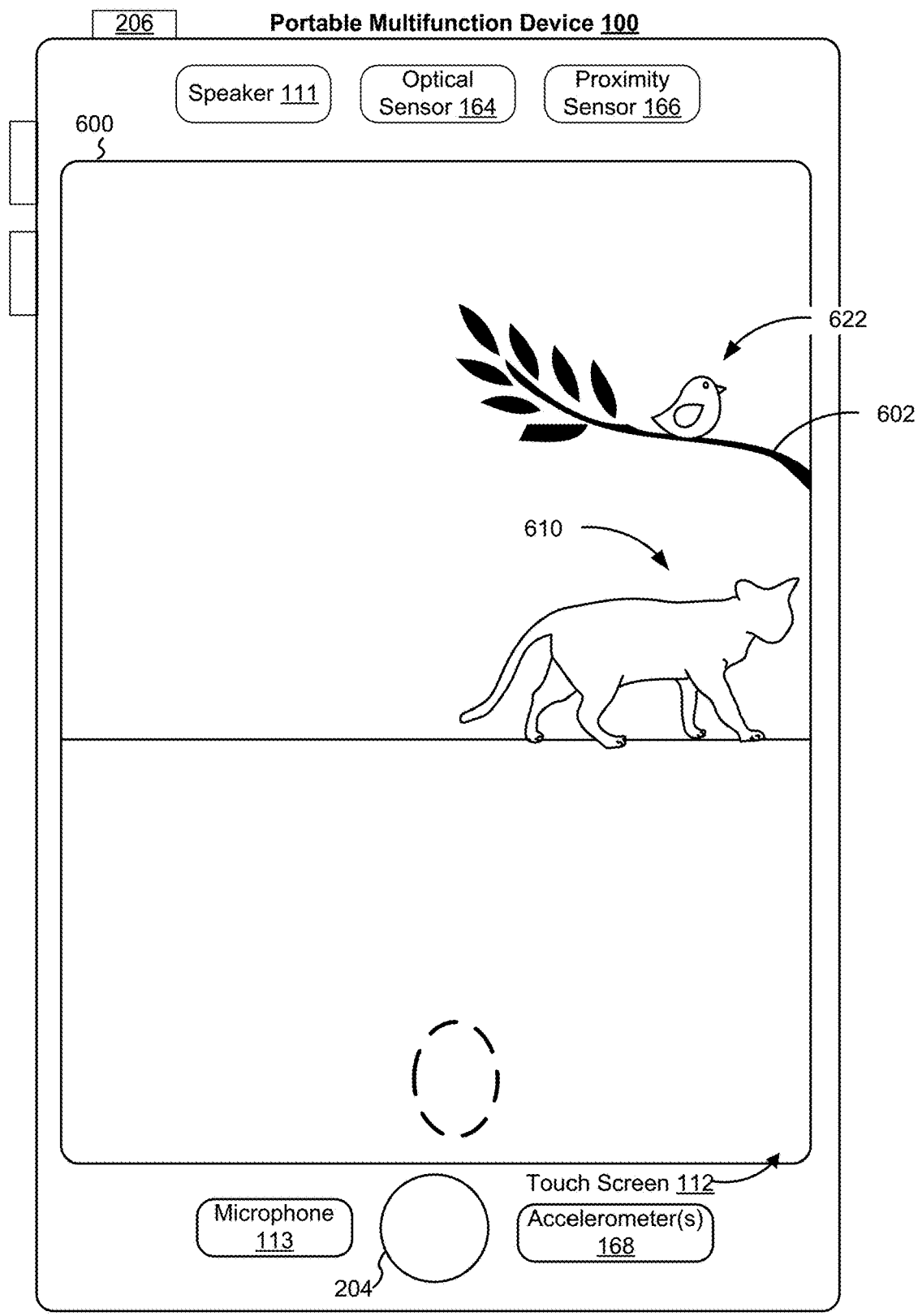

FIGS. 6A-6S illustrate exemplary user interfaces for capturing digital media in different imaging modes, in accordance with some embodiments. The user interfaces in these figures are used to illustrate the processes described below, including the processes in FIGS. 12A-12D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 6A-6S illustrate exemplary user interface 600 for a camera application. The user interface includes a live view from an associated digital camera (e.g., optical sensor 164) of device 100. The live view includes a live display of tree branch 602, cat 610, bird 622, and eagle 642. The figures illustrate an embodiment where tapping on the live view initiates capture of digital images in a first image recording mode, corresponding to a single image acquired upon detection of the contact. Maintaining the contact on the live view automatically changes the image acquisition modality from a single-image recording mode to a burst image recording mode, and then to a video recording mode. The exemplary user interfaces in FIGS. 6A-6S illustrate visual cues that alert the user to the automatic shift between image recording modes.

FIGS. 6A-6C illustrate an exemplary embodiment where the device records digital media in a single-image recording mode in response to a short tap gesture. In FIG. 6A, the live view from the camera includes a live image of branch 602. In response to detecting contact 604 in FIG. 6B, the device begins to record digital media in a first image recording mode, associated with the recording of a single image. The device indicates the first image recording mode by displaying ring 606 around the location at which contact 604 is detected. In response to detecting lift-off of contact 604, as illustrated in FIG. 6C, the device stops recording digital media. Because the length of contact 604 was shorter than a first threshold length of time (e.g., TTs), the device did not shift to a second image recording mode and marks a single image for long-term storage. In other words, a single still image is recorded in response to the tap gesture, and the single still image corresponds to an image that was captured at the time when the tap gesture was detected (e.g., an image that was captured at the time when contact 604 was initially detected or when lift-off of contact 604 was detected, or an image that was selected from multiple images that were captured while contact 604 was detected).

FIGS. 6D-6F illustrate an exemplary embodiment where the device transitions from a single-image recording mode and an image burst recording mode in response to detecting a short tap-and-hold gesture by a contact. In FIG. 6D, the device detects contact 608 and, in response, begins recording digital media in a first image recording mode, associated with the recording of a single image. The device indicates the first image recording mode by displaying ring 606 around the location at which contact 608 is detected.

As the device continues to detect contact 608 on the live view, beyond the first temporal threshold (e.g., temporal threshold TTs), the device changes from the single image recording mode into an image burst recording mode, in FIG. 6E. The device indicates this change in the image recording mode by replacing ring 606, in FIG. 6D, with tally marks 612 encircling the location at which contact 608 is detected, in FIG. 6E. The device also displays the number of burst images that have been collected (e.g., "8"). In response to detecting lift-off of contact 608, as illustrated in FIG. 6F, the device stops recording digital media. Because the length of the gesture by contact 608 was longer than the first threshold amount of time (e.g., TTs), but shorter than a second threshold amount of time (e.g., $TT_M$>TTs), the device did not shift to a third image recording mode and marks a burst of images for long-term storage. In other words, a sequence of still images are recorded in response to the short tap-and-hold gesture, and the sequence of still images correspond to images that were captured during the time when contact 608 was detected. In some embodiments, the burst of images includes a subset of images selected from all images that were captured during the short tap-and-hold gesture.

FIGS. 6G-6J illustrate an exemplary embodiment where the device transitions from a single image recording mode, to an image burst recording mode, and then to a video recording mode that terminates upon lift-off of a contact, in response to detecting an intermediate tap-and-hold gesture. In FIG. 6G, the device detects contact 614 and, in response, begins recording digital media in a first image recording mode, associated with the recording of a single image. The device indicates the first image recording mode by displaying ring 606 around the location at which contact 614 is detected.

As the device continues to detect contact 614 on the live view, beyond a first temporal threshold (e.g., temporal threshold TTs), the device changes from the single image recording mode to an image burst recording mode, in FIG. 6H. The device indicates this change in the image recording mode by replacing ring 606, in FIG. 6G, with tally marks 612 encircling the location at which contact 614 is detected, in FIG. 6H.

As the device further continues to detect contact 614 on the live view, beyond a second temporal threshold (e.g., temporal threshold $TT_M$>temporal threshold TTs), the device changes from the image burst recording mode, in FIG. 6I, to a video recording mode, in FIG. 6J. The device indicates this change in the image recording mode by replacing tally marks 612, in FIG. 6H, with marked-ring 616, in FIG. 6I. The device also displays a length of time for which the video has been recorded (e.g., "0:02").

In response to detecting lift-off of contact 614, as illustrated in FIG. 6J, the device stops recording digital media because the duration of contact 614 was shorter than a third temporal threshold (e.g., $TT_L$). Because the duration of contact 614 was longer than a second threshold length of time (e.g., $TT_M$), the device shifted into a third imaging mode and marks a video for subsequent processing and long-term storage. The marked video includes footage of cat 610 walking under branch 602 and lying down, both of which occurred prior to the device shifting into the video recording mode, because the device continuously collecting digital images from initial detection of contact 614. In other words, a video is recorded in response to the intermediate tap-and-hold gesture, and the video include images that were captured during the time when contact 614 was detected. In some embodiments, the video includes a subset of images selected from all images that were captured during the intermediate tap-and-hold gesture (e.g., the image capture is at a higher frame rate than the frame rate of the recorded video).

FIGS. 6K-6S illustrate an exemplary embodiment where the device transitions from a single image recording mode, to an image burst recording mode, and then to a video recording mode that does not terminate upon lift-off of the contact, in response to detecting a long tap-and-hold gesture. In FIG. 6K, the device detects contact 618 and, in response, begins recording of digital media in a first image recording mode, associated with the recording of a single image. The device indicates the first image recording mode by displaying ring 606 around the location at which contact 618 is detected.

As the device continues to detect contact 618 on the live view, beyond a first temporal threshold (e.g., temporal threshold TTs), the device changes from the single image recording mode into an image burst recording mode, in FIG. 6L. The device indicates this change in the image recording mode by replacing ring 606, in FIG. 6K, with tally marks 612 encircling the location at which contact 618 is detected, in FIG. 6L.

As the device further continues to detect contact 618 on the live view, beyond a second temporal threshold (e.g., temporal threshold $TT_M$), the device changes from the image burst recording mode, in FIG. 6L, to a video recording mode, in FIG. 6M. The device indicates this change in the image recording mode by replacing tally marks 612, in FIG. 6L, with marked-ring 616, in FIG. 6M. The device also displays a length of time for which the video has been recorded (e.g., "0:02").

The device continues to detect contact 618 on the live view and, in response, displays record button 620 that appears to grow out of contact 618 and gradually fill marked-ring 616, as the duration of contact 618 approaches a third temporal threshold (e.g., temporal threshold $TT_L$>$TT_M$), as illustrated in FIG. 6N. When the duration of contact 618 reaches the third temporal threshold (e.g., temporal threshold $TT_L$), record button 620 completely fills, and replaces marked-ring 616, as illustrated in FIG. 6O. The device is now in a second video recording mode, as indicated by migration of record button 620 from under contact 618, in FIG. 6O, to the bottom of the display, as illustrated in FIG. 6P.

Because the device has shifted into the second video recording mode, the device continues to record digital media after detecting lift-off of contact 618, as illustrated by maintained display of record button 620 in FIG. 6Q. The device then detects tap gesture by contact 624 on record button 620 and, in response, stops recording of digital media, as indicated by the disappearance of record button 620 in FIG. 6S. Because the duration of contact 618 was longer than the second (and the third) threshold length of time (e.g., $TT_M$ (and $TT_L$)), the device marks a video for subsequent processing and long-term storage.

Figure 7A:
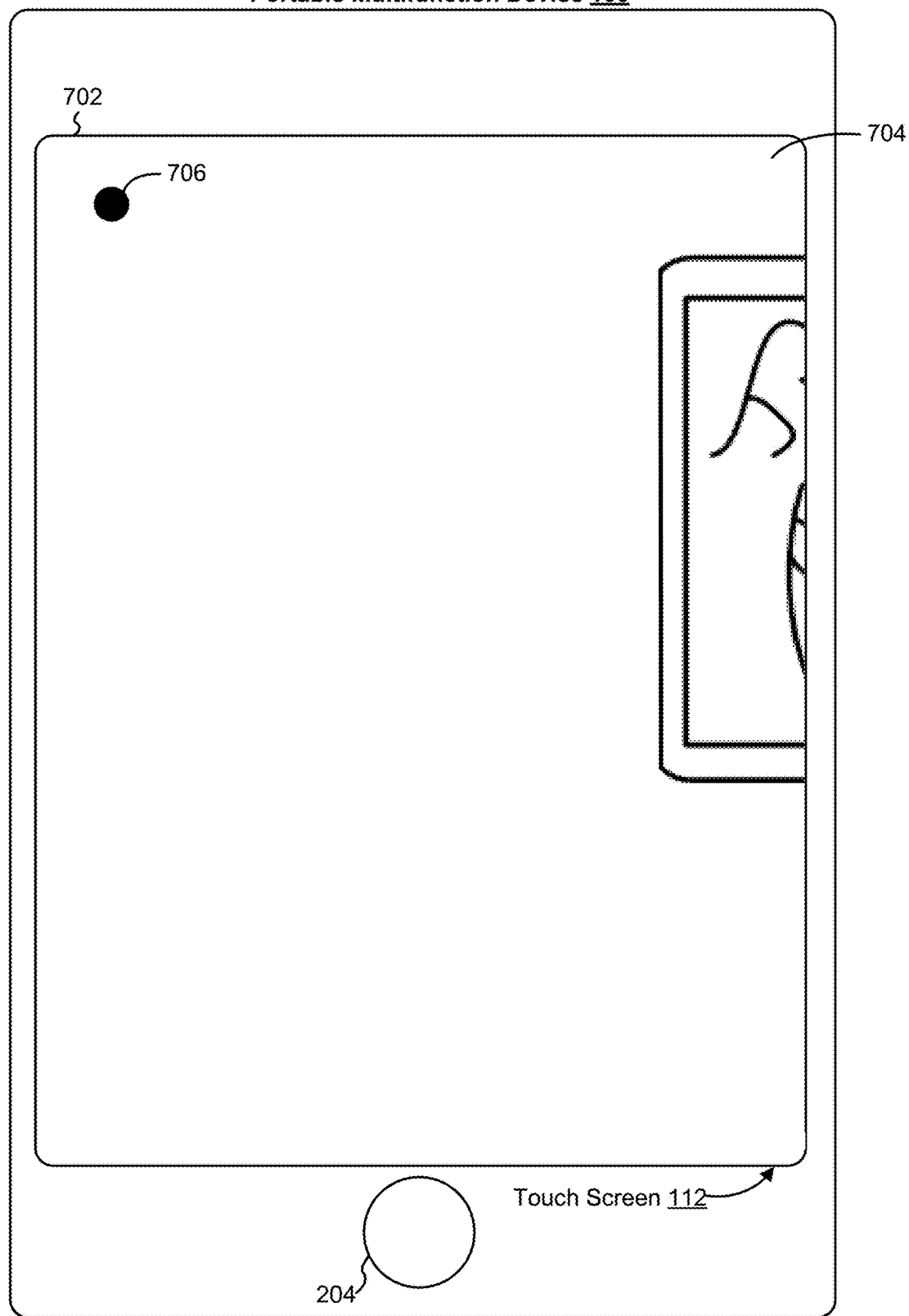
FIGS. 7A-7R illustrate example user interfaces for automatically detecting and prompting for user action(s) regarding an image recording mode in accordance with some embodiments.
Figure 7B:
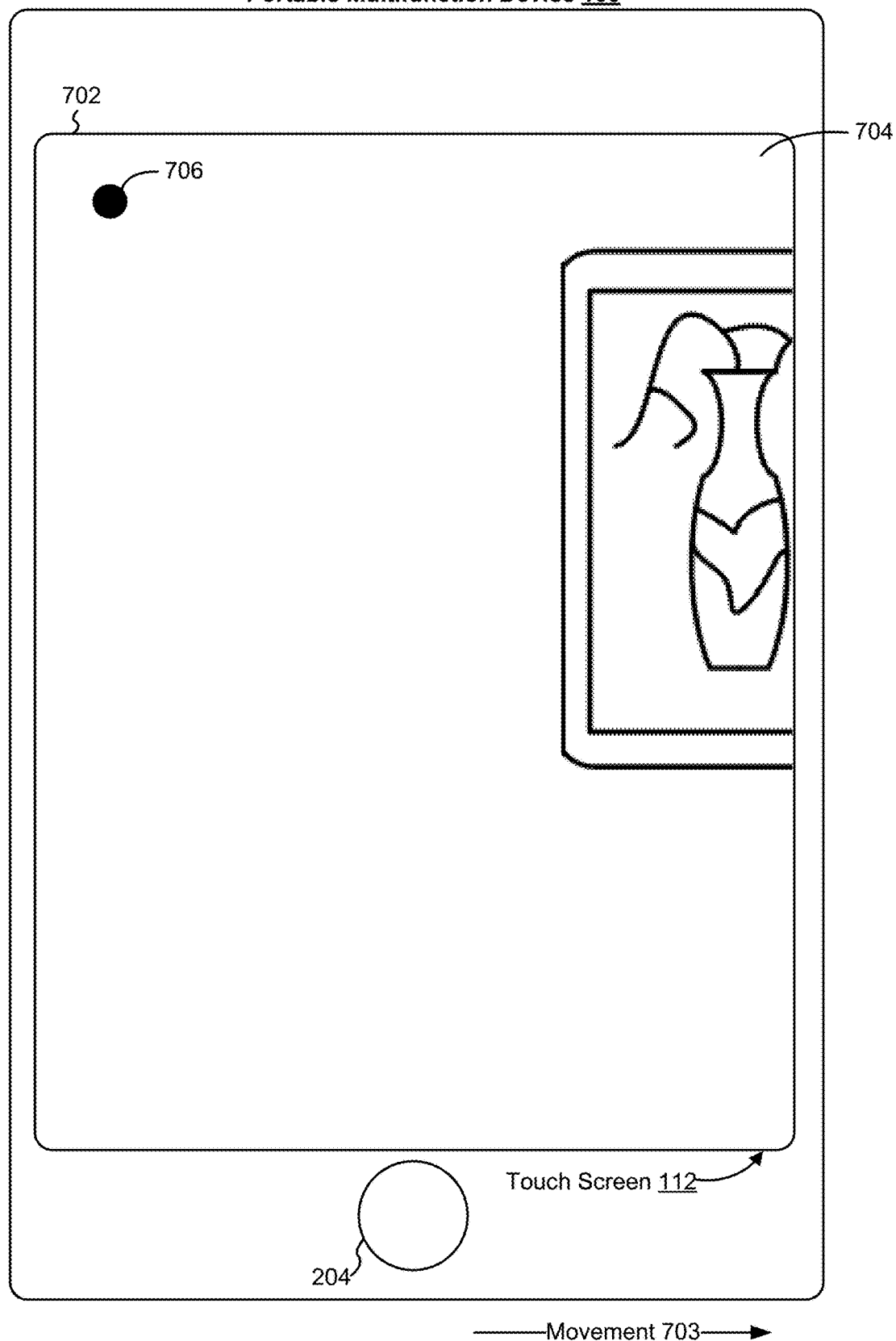
Figure 7C:
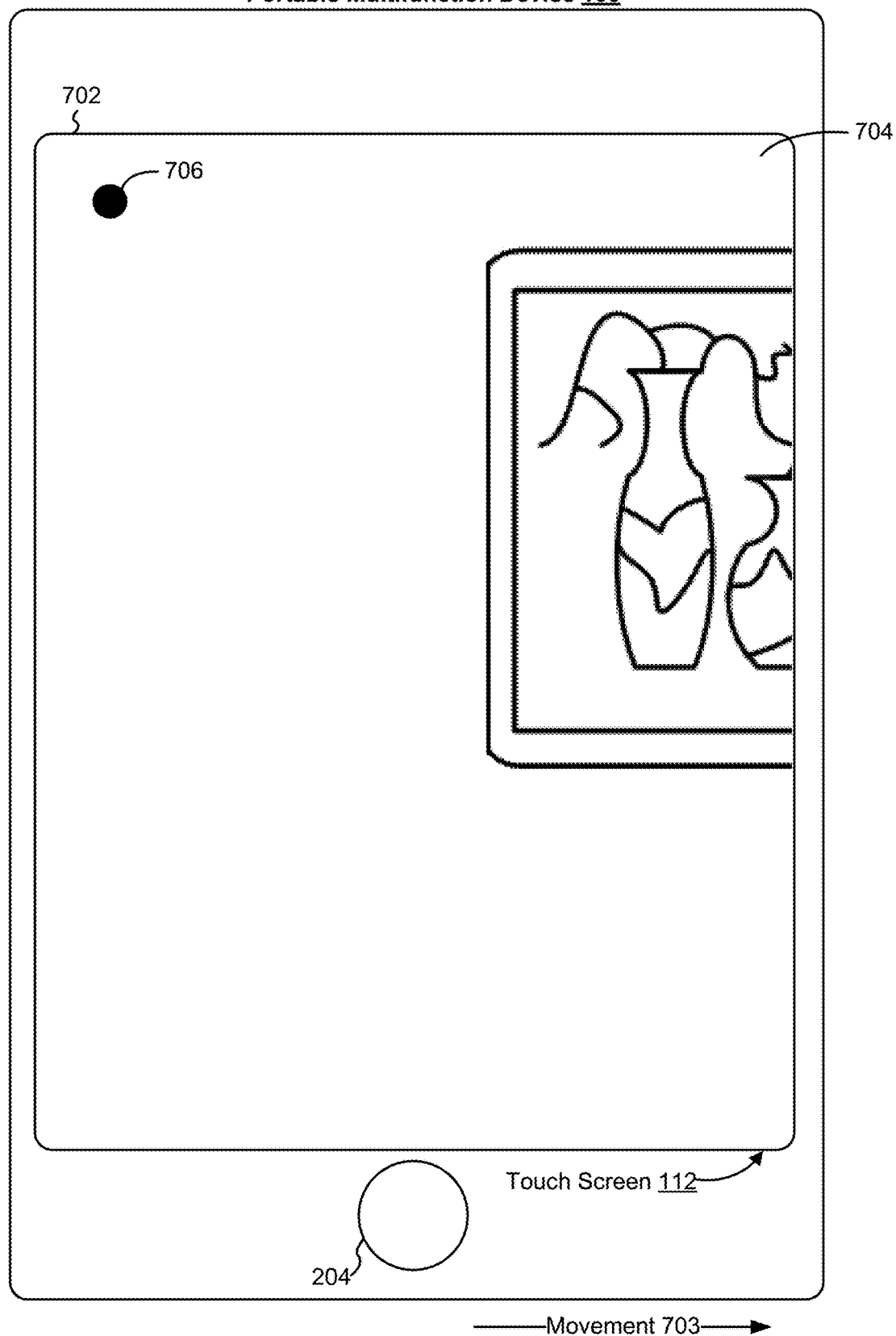
Figure 7D:
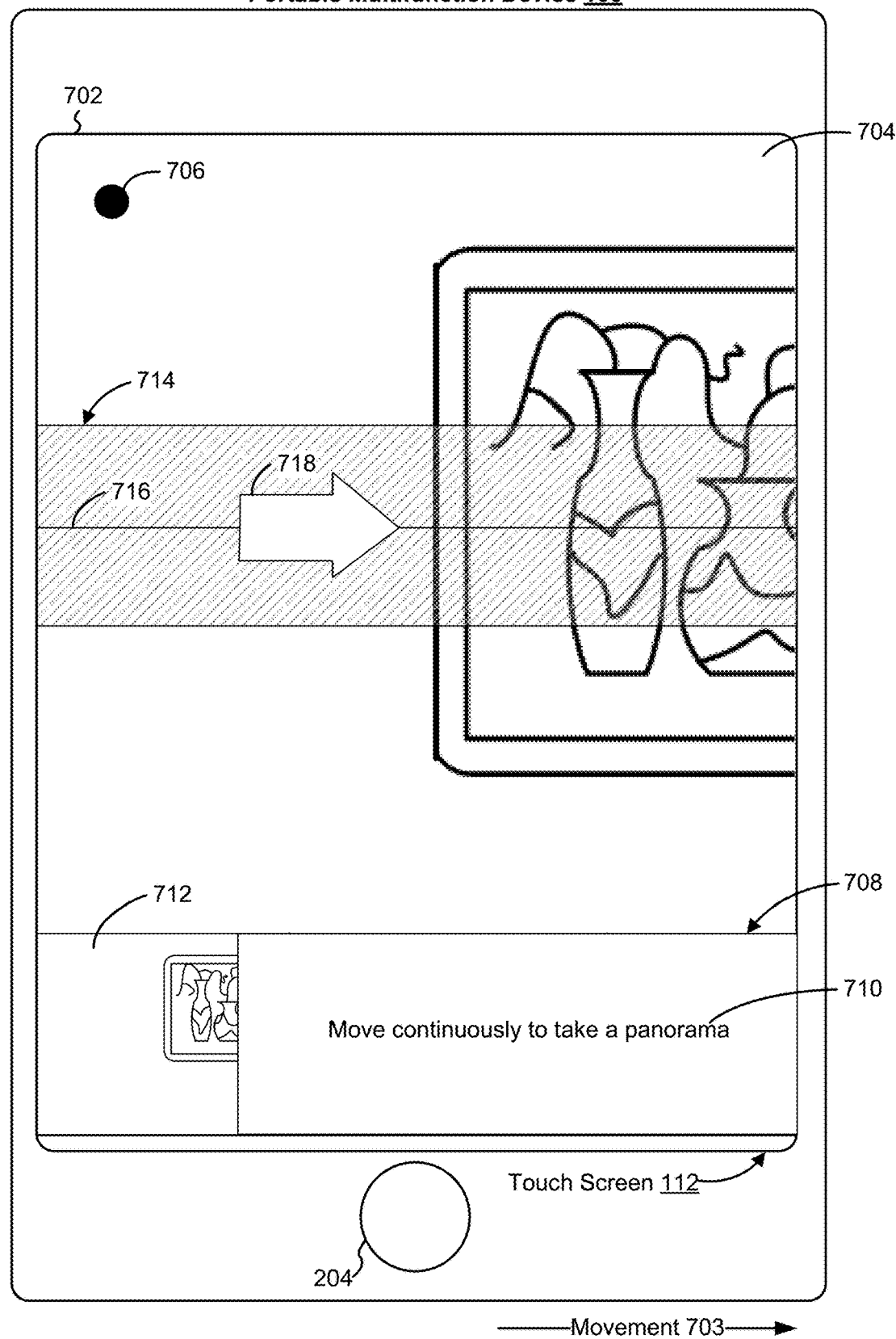
Figure 7E:
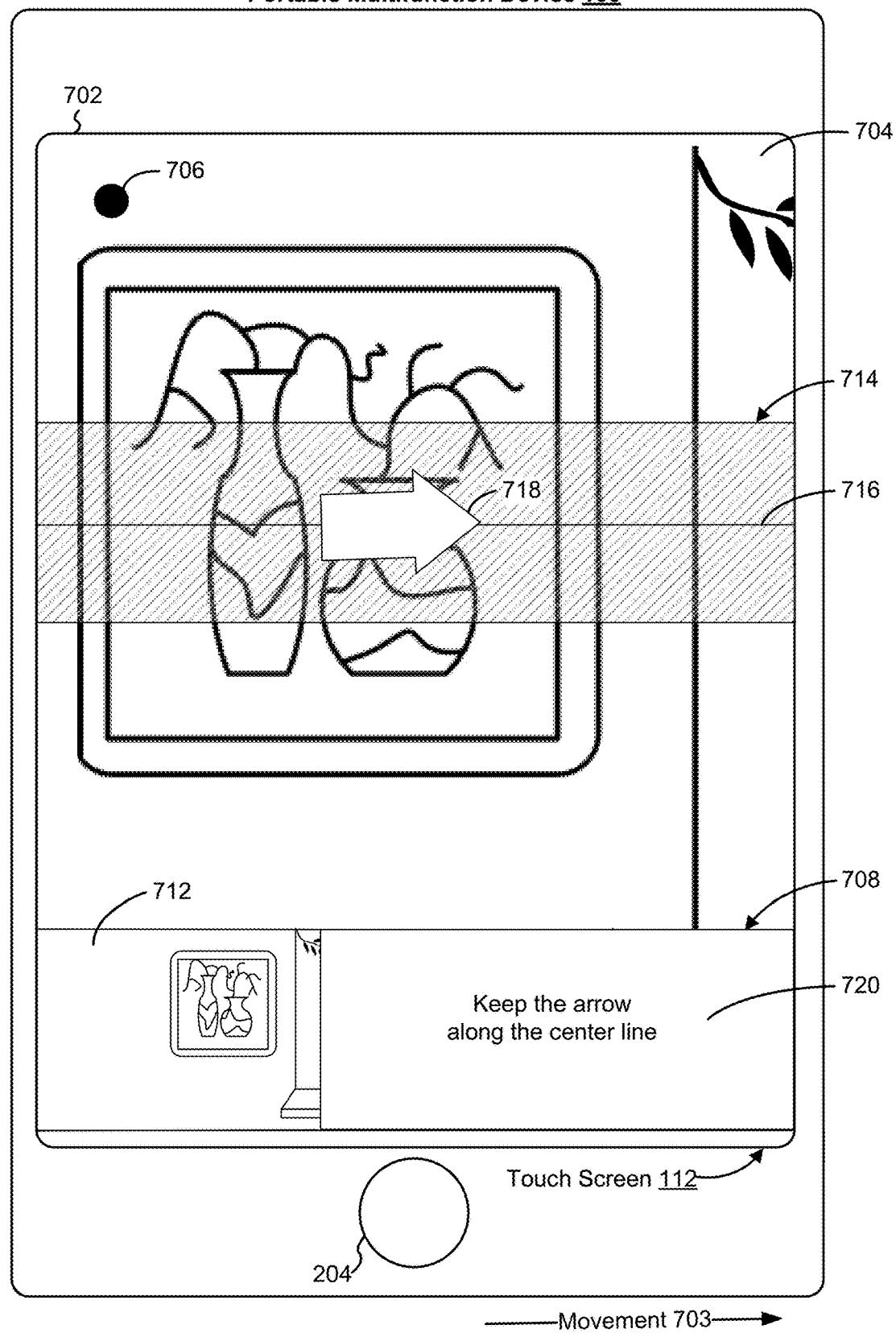
Figure 7F:
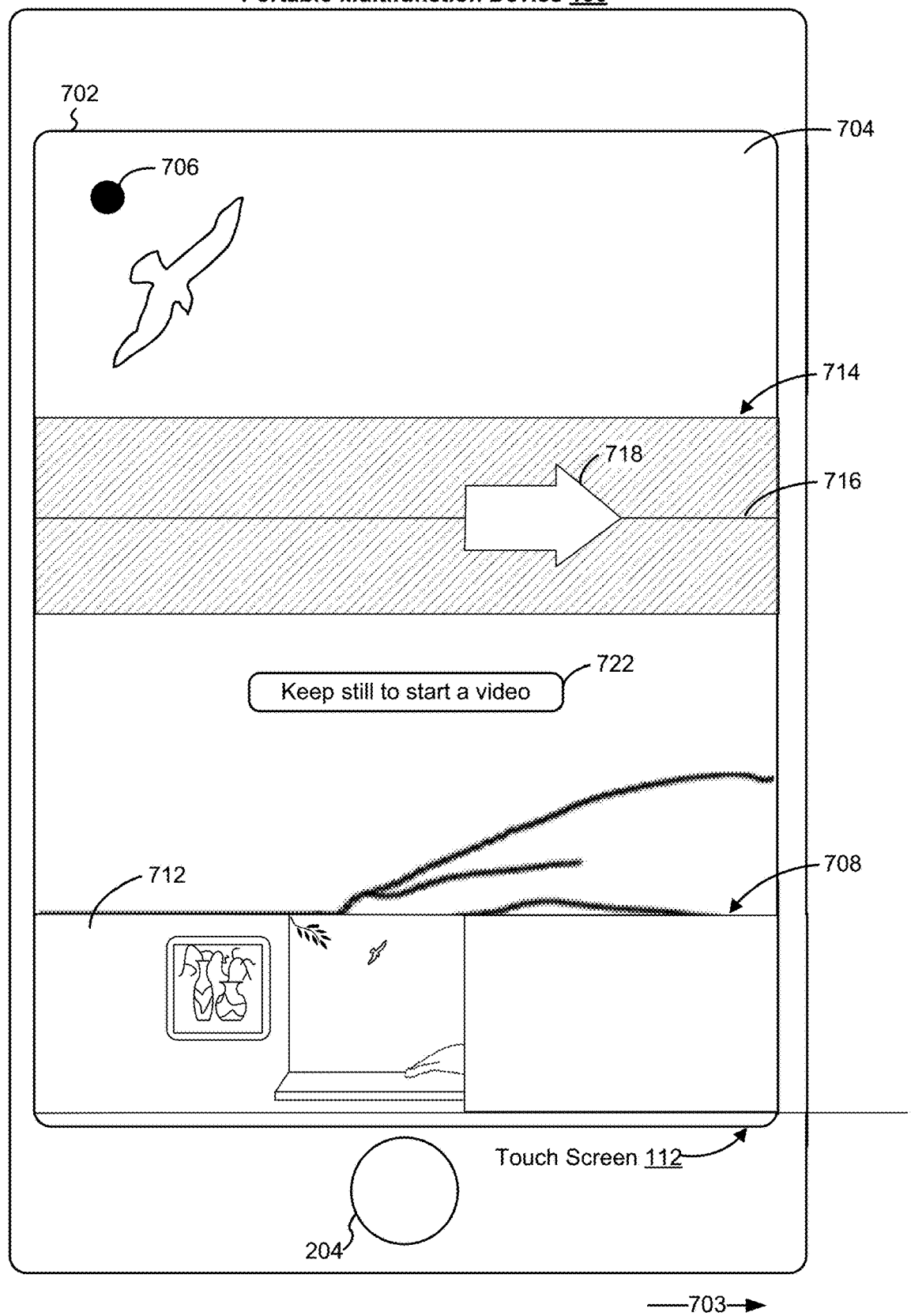
Figure 7G:
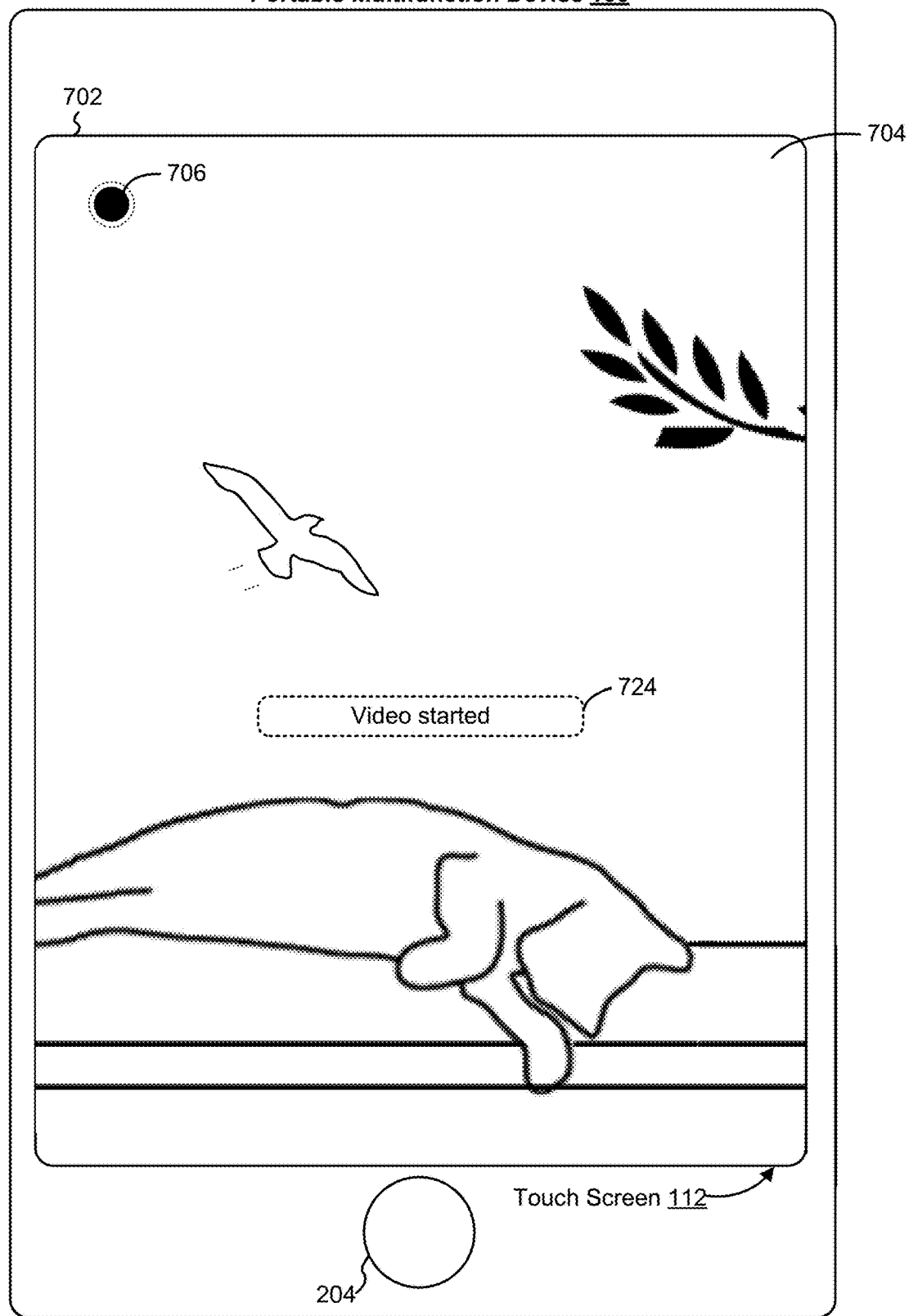
Figure 7H:
Figure 7I:
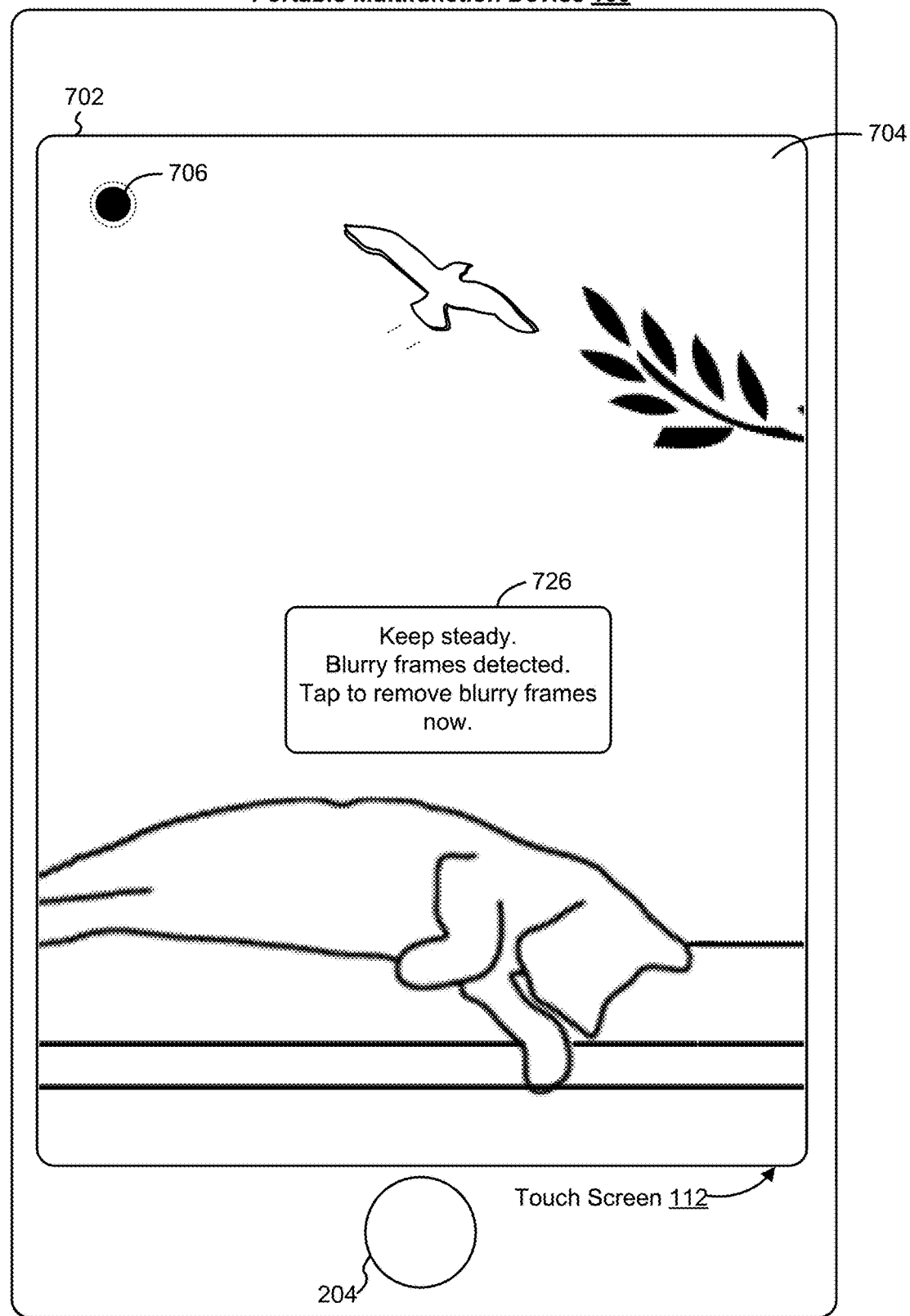
Figure 7J:
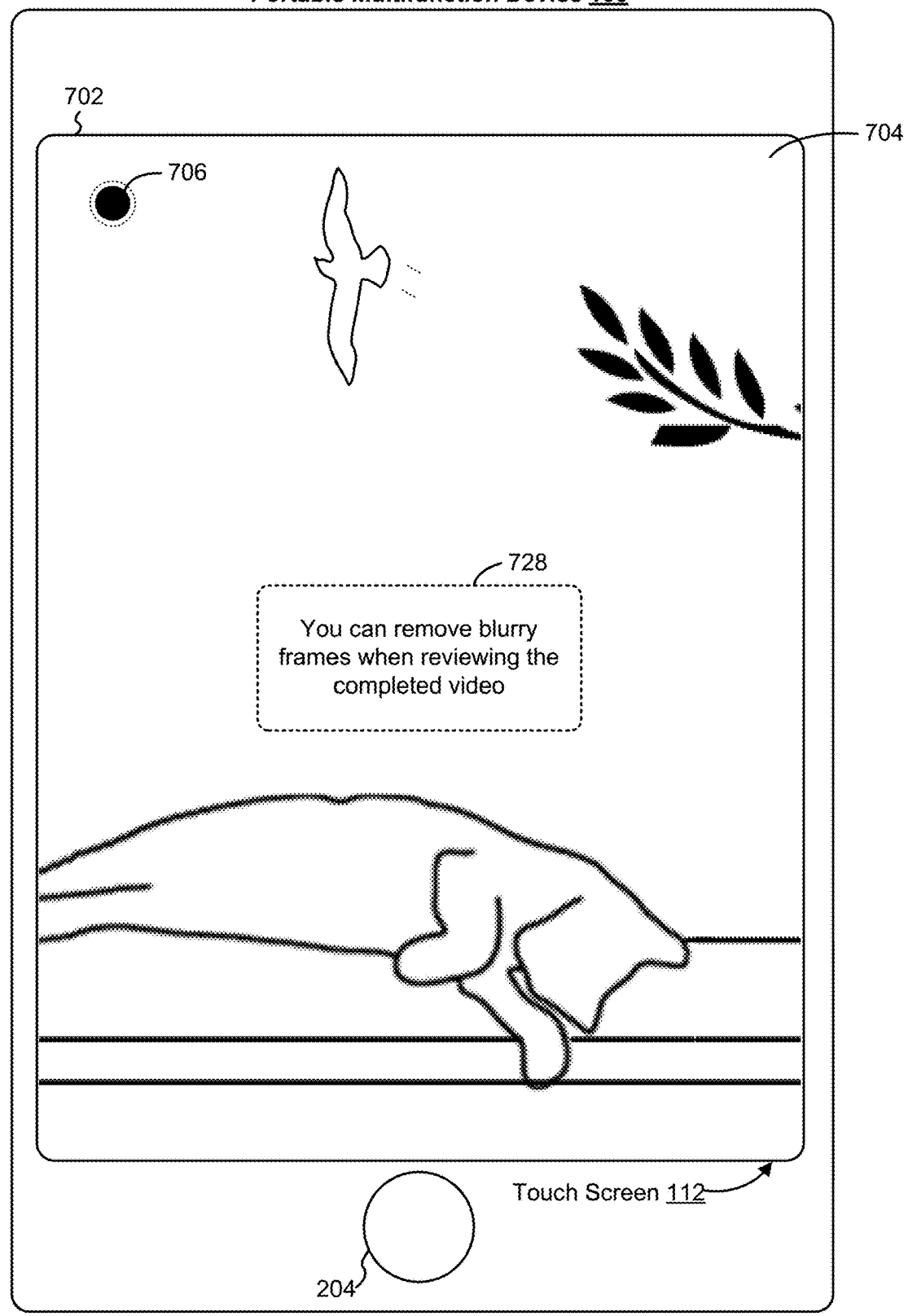
Figure 7K:
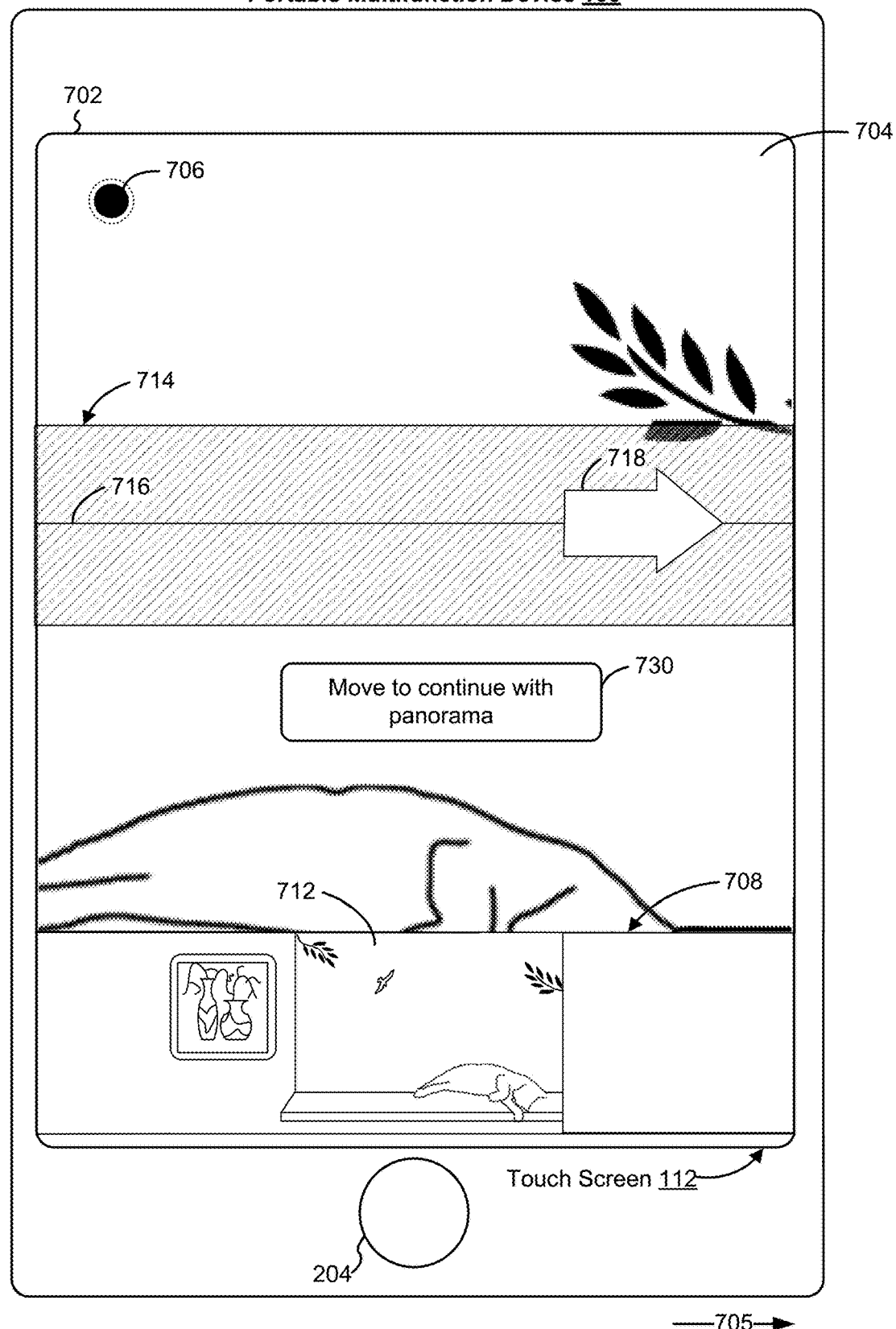
Figure 7L:
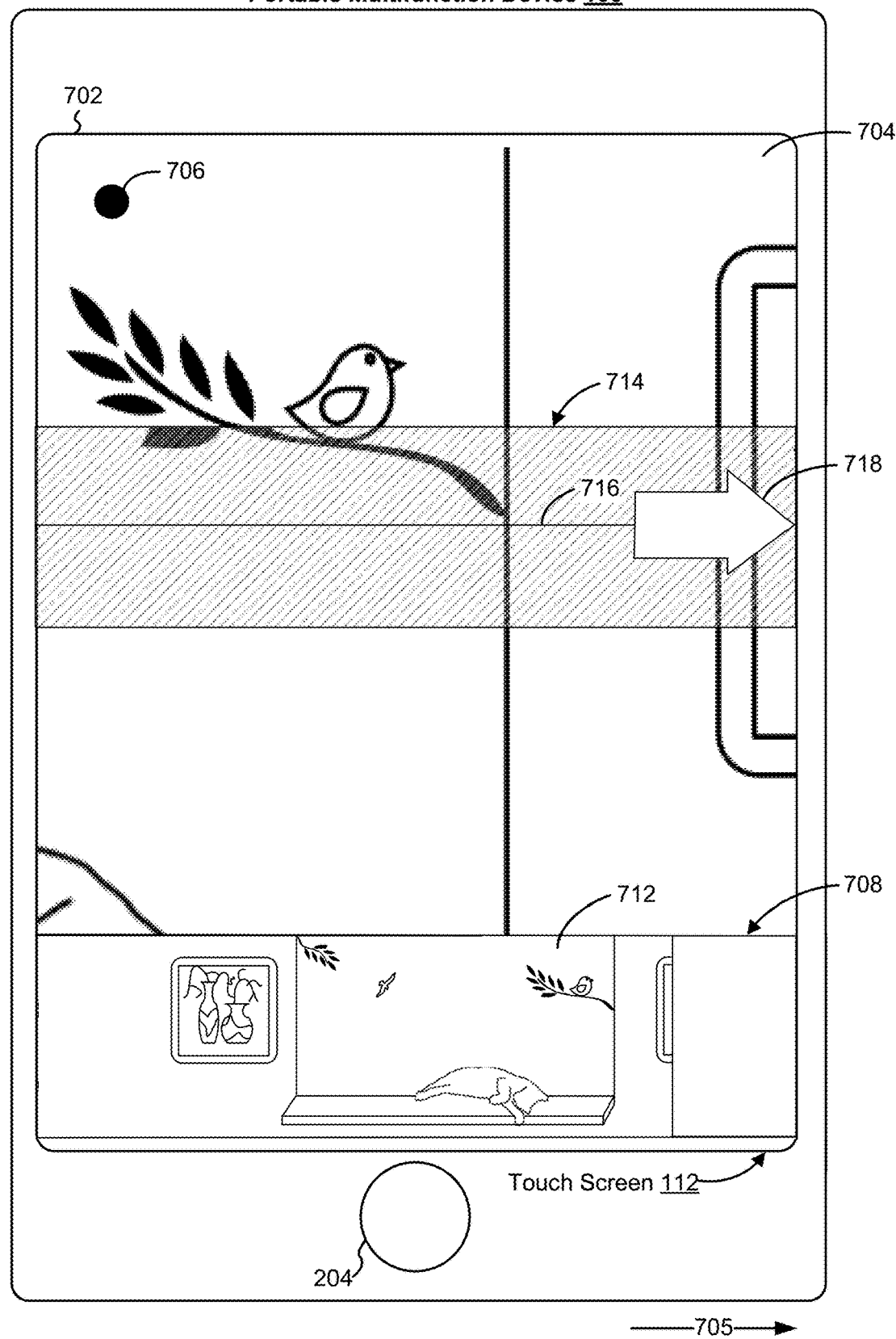
Figure 7M:
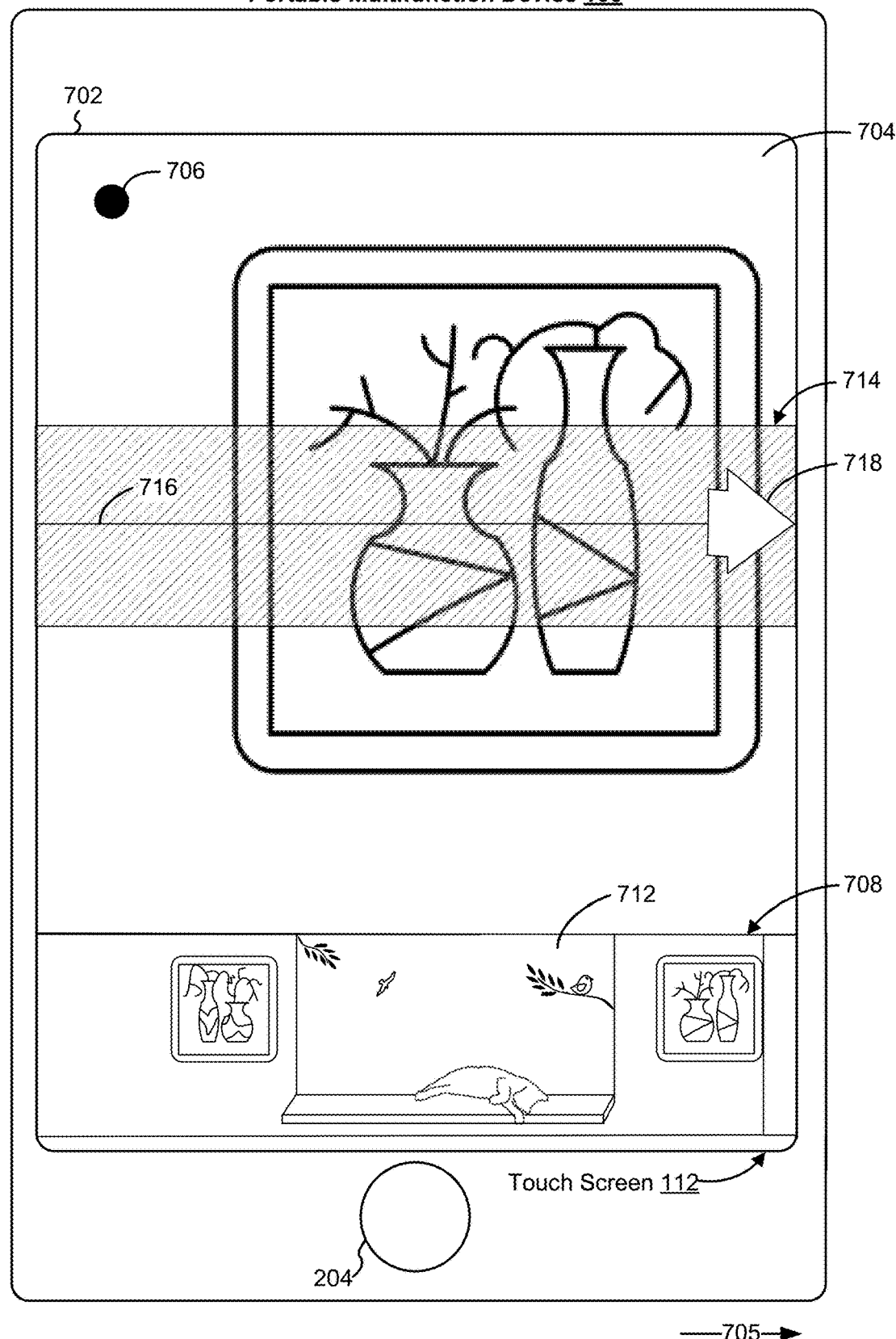
Figure 7N:
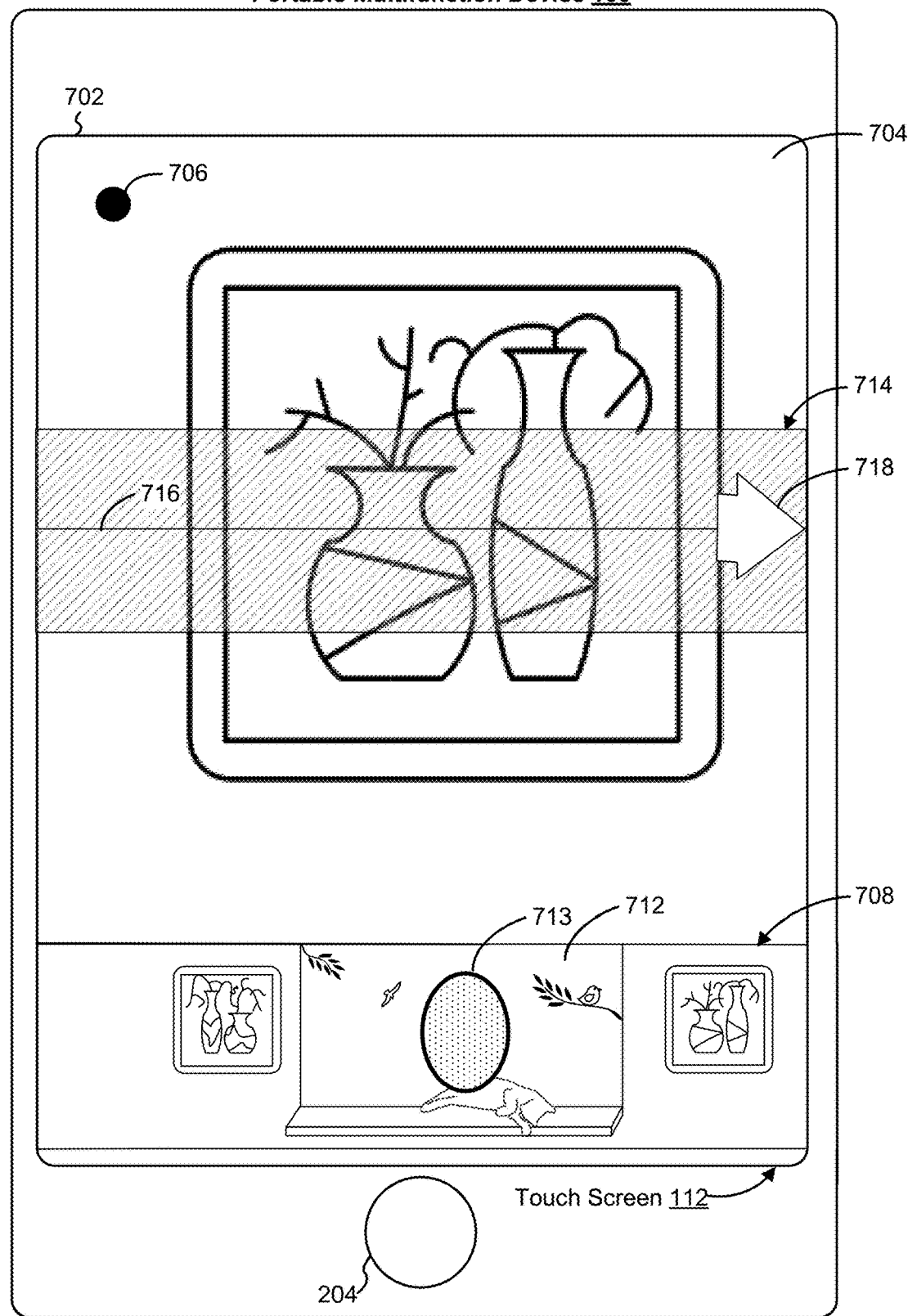
Figure 7O:
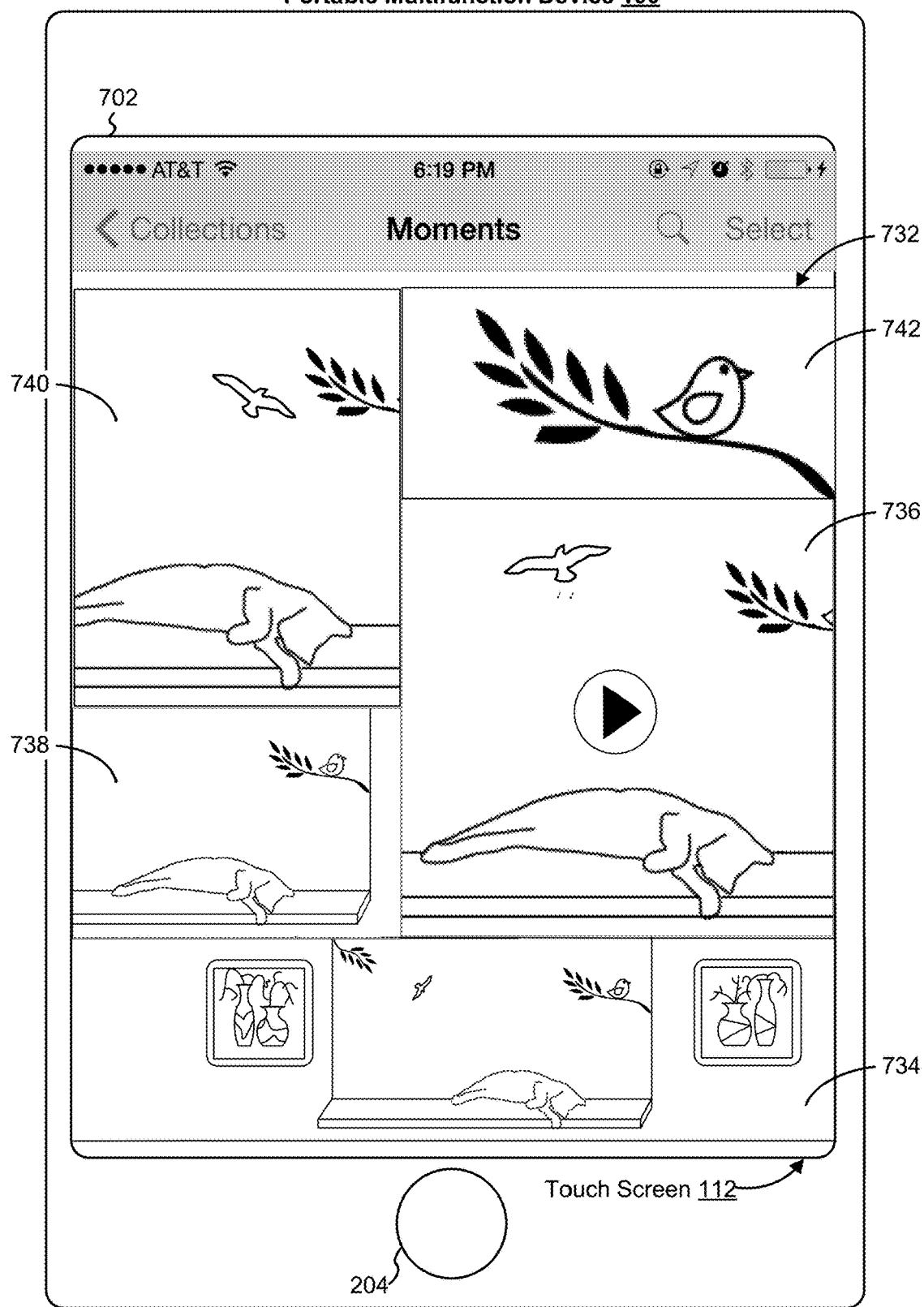
Figure 7P:
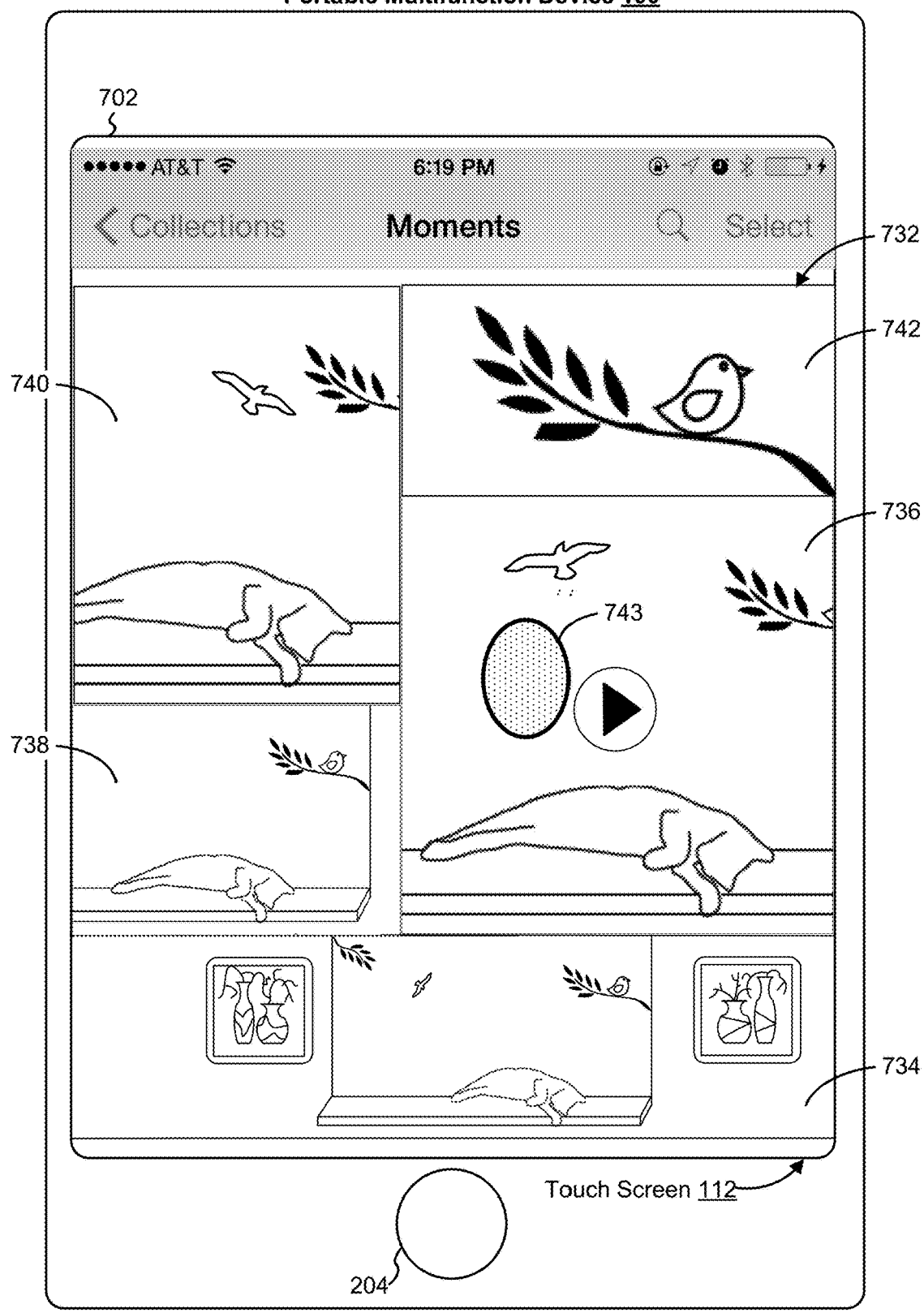
Figure 7Q:
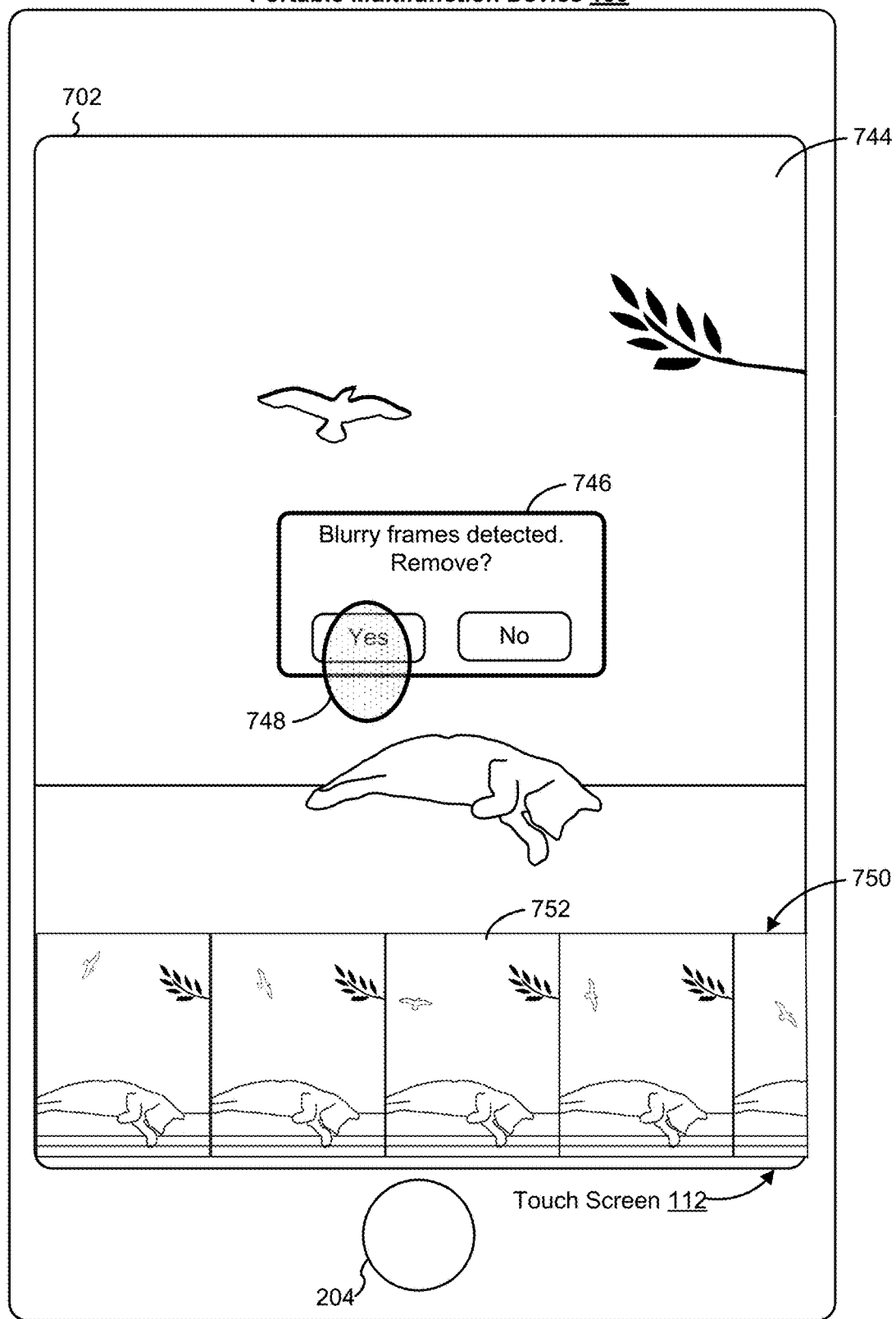
Figure 7R:
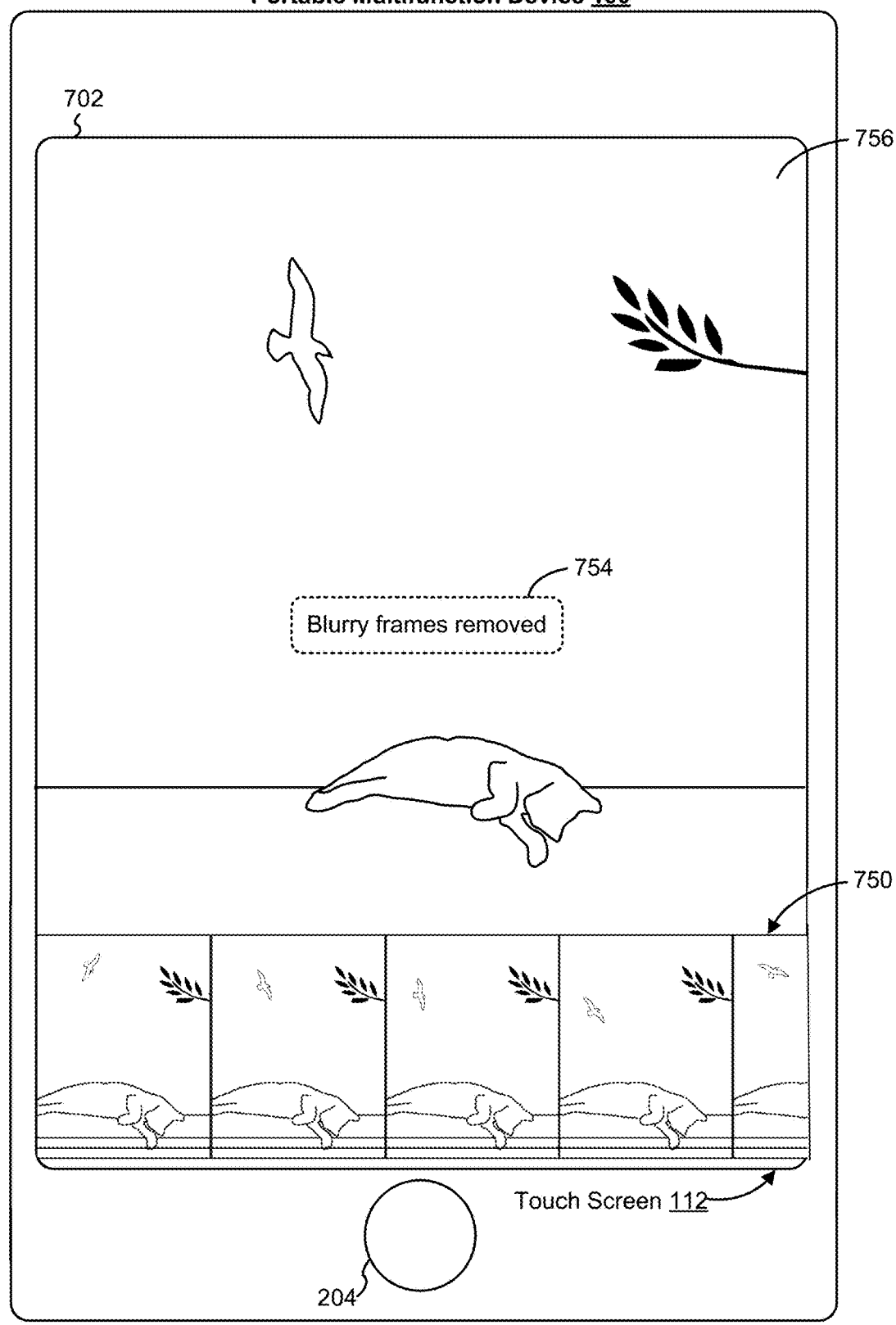

FIGS. 7A-7R illustrate exemplary user interfaces for automatically detecting and prompting for user action(s) regarding an image recording mode, in accordance with some embodiments. The device automatically detects image recording modes that are consistent with media content that is currently captured by a device and automatically prompts for user actions in association with the detected image recording modes. The user interfaces in these figures are used to illustrate the processes described below, including the processes in FIGS. 16A-16H. For convenience of explanation, some of the embodiments will be discussed with reference to operations performed on a device with touch-screen 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 7A-7R illustrate exemplary user interface 702 for a camera application. The camera user interface 702 includes live view 704 from a first camera (e.g., a back camera) of device 100. In the example shown in FIGS. 7A-7R, live view 704 is overlaid on user interface 702 within a display region (e.g., a live view display object, window, or viewport). The live view in this example is of the same shape and size as user interface 702. In some embodiments, the live view may be smaller than and of a different shape from user interface 702. Live view 704 presents images that are being captured by the first camera in real-time.

In FIG. 7A, device 100 has automatically started to capture images using the first camera in response to detecting that device 100 is substantially still and that the horizontal edges of device 100 are substantially level for at least a threshold amount of time. The images captured by device 100 are of a resolution, size, frame rate, and/or aspect ratio that are sufficiently large to permit images of multiple different image recording modes (e.g., a single image recording mode, an HD video recording mode, a square image recording mode, etc.) to be extracted from it at a later time. In FIG. 7A, indicator 706 is displayed when automatic capturing of images is initiated and in progress. In some embodiments, a frame stream (e.g., such as frame scroll 506 illustrated in FIGS. 5A-5AE) is overlaid on the live view or shown below the live view to show the images that have just been captured by the device. Images that are captured by the device are stored temporarily and is available for marking and subsequent processing by the device or the user; however, if images that are captured by the device are not marked for long-term storage by the user or in accordance with other preset conditions, the captured images are discarded or overwritten after a predetermined amount of time (e.g., 24 hours).

FIGS. 7A-7D illustrate that, while image capturing is in progress, device 100 detects that the device including the first camera is being moved horizontally (e.g., as indicated by movement 703) for at least a threshold amount of time or distance. Live view 704 shows that a picture frame is gradually coming into view from the left side of user interface 702, as the device and its first camera are being moved horizontally to the right. Based on the movement pattern of the device and its camera (e.g., steady horizontal movement) and/or the changes in the images that are being captured (e.g., new pixel patterns appear mostly at the right edge of each newly captured image), the device determines that the images that are being captured by the camera are consistent with an initial portion of a panorama. FIG. 7D shows that, upon making the determination that the images that are being captured are consistent with a panorama recording mode, device 100 displays a set of panorama recording guide objects to assist the user in taking the correct actions to complete the panorama.

As shown in FIG. 7D, the set of panorama recording guide objects include panorama review object 708 that displays a currently completed portion of a panorama that is being taken. In some embodiments, the completed portion of the panorama includes one or more images that had been captured before the device made the determination that a panorama was being taken). The set of panorama recording guide objects also includes guide window 714 with center line 716 and arrow 718. The display of panorama review object 708 and guide window 714 serve as a prompt to the user to continue to move the device horizontally to complete the panorama that has been started. In some embodiments, textual prompt 710 (e.g., "Move continuously to take a panorama") is displayed to explain to the user the action(s) required to complete the panorama. If the user does not follow the instruction specified in textual prompt 710 and moves the camera to the left or keep the camera still for more than a threshold amount of time, device 100 will determine that the user does not wish to take a panorama and will cease to display the panorama recording guide objects.

FIG. 7E illustrates that the user continues to move the device horizontally to the right (e.g., as indicated by movement 703) in accordance with the instruction in textual prompt 710. Live view 704 is continuously updated to show the currently captured images as device 100 is moved to the right. Panorama review object 708 is continuously updated with additional portions of the panorama that has been completed. FIG. 7E also illustrates that, during the recording of the panorama, device 100 detects that movement of the device and the camera is a little unsteady and deviates from the horizontal direction slightly, and in response, device 100 displays another prompt (e.g., textual prompt 720) requesting the user to keep arrow 718 along center line 716.

FIG. 7F illustrates that, the user has moved the device further to the right and additional portions of the panorama have been completed and presented in panorama review object 708. Live view 704 shows a bird flying into the field of view of the camera. The user slows down the movement of the device (e.g., as indicated by the smaller magnitude of movement 703) to take a better look at the bird. In response to detecting movement of the bird within newly captured images (e.g., moving pixels that are not consistent with panorama taking) and/or slower movement of the device, device determines that the currently captured images are consistent with a video recording mode. In accordance with the determination that the currently captured images are consistent with a video recording mode, device 100 displays a prompt (e.g., textual prompt 722 "Keep still to start a video") to request user confirmation that a video recording should be started. In some embodiments, the device suspends recording of the panorama while the bird moves within the field of view of the camera. In some embodiments, the device automatically removes the moving pixels representing the flying bird from the completed portions of the panorama. In some embodiments, the device consolidates the moving pixels representing the flying bird into one location of the completed portions of the panorama (e.g., the flying bird image from one frame is overlaid on the completed portions of the panorama).

FIG. 7G illustrates that, as the bird continues with fly within the field of view of the camera, the user follows the instruction in textual prompt 722 and stops movement of the camera. After the camera is kept still for more than a threshold amount of time, the device activates the video recording mode. In some embodiments, the video that is recorded includes at least some frames that had been captured (e.g., frame that had been captured since the device determined that the captured images are consistent with a video recording) before the device activated the video recording mode. In FIG. 7G, after device 100 activated the video recording mode, device 100 displays a notification 724 indicating that the video recording mode has been activated and that a video is currently being recorded. In some embodiments, recording indicator 706 changes its appearance to indicate that a video is being recorded. FIG. 7H illustrates that video recording continues as long as the device is kept substantially stationary, and/or captured images continue to change (e.g., due to movement of the flying bird).

FIG. 7I illustrates that, device 100 detects that one or more blurry frames have been recorded (e.g., due to the fast speed of the flying bird). In response to detecting the blurry frames, device 100 displays a prompt (e.g., textual prompt 726) asking the user whether he/she wishes to remove the blurry frames now. In some embodiments, device 100 removes the blurry frames in response to a single tap on textual prompt 726.

FIG. 7J illustrates that, if the user does not provide any input to remove the blurry frames (e.g., if no tap input is detected within a threshold amount of time after prompt 724 was displayed), then, the device determines that blurry frames should not be removed at this time, and video recording continues. In some embodiments, device 100 displays a notification (e.g., notification 728) informing the user that blurry frames can still be deleted in a video review mode after the video recording is completed. In some embodiments, when blurry frames are detected and/or when movement of the device is detected during video recording, the device restarts a new video clip (e.g., or inserts a marker in the video recording to indicate a change of scenes). In some embodiments, the device restarts the new video clip or inserts the marker to indicate a change of scenes, if the user declines to remove the blurry frames while video recording is still in progress.

FIG. 7K indicates that, when the bird flew out of the field of view of the camera, and the images captured by the camera no longer contain a large number of moving pixels (e.g., because the flying bird is out of the live view), device 100 determines that the panorama taking can be resumed from where it was left off. Device 100 redisplays guide object 714 with arrow 718 at its previous location, and panorama review object 708 which includes the portions of the panorama 712 that had been completed when the video recording was started (see FIG. 7K). Device 100 also displays prompt 730 requesting the user to resume the panorama by moving the device horizontally.

FIGS. 7L-7M illustrate that, when the user moves the device horizontally to the right (e.g., as represented by movement 705) in accordance with the instruction in prompt 730, panorama taking is resumed. In FIGS. 7L-7M, additional portions of the panorama are completed and displayed in panorama review object 708.

In FIG. 7N, the panorama is completed, and the user taps (e.g., as indicated by contact 713) on panorama review object 708 to enter an image review mode. In response to detecting the tap gesture on panorama review object 708, the device replaces the camera user interface 702 with media review user interface 732, as shown in FIG. 7O.

As shown in FIG. 7O, media review user interface 732 includes representations of a selected subset of the images that were captured and recorded. For example, the selected subset of the images include panorama 734 and video 736 that correspond to the panorama recording mode and the video recording mode that were activated during capturing of the images. In addition, media review user interface 732 includes representations of a few still images (e.g., images 738, 740, and 742). These still images were extracted from the captured images based on their content (e.g., image features) and temporal relationship with video 736 and panorama 734 that have been recorded. The single image recording mode was not activated during the capturing of the images; however, the device selects these images from the captured images to provide a representative subset of content (e.g., the highlight of the media capture) for user to review.

FIG. 7P shows that, a tap gesture (e.g., by contact 743) is detected on the representation of video 736. In response to detecting the tap gesture on the representation of video 736, device 100 displays image scroll 750 showing representative frames from video 736, including a blurry frame 752 that has been detected (e.g., the blurry frame is either detected during capture or after the completion of the video). The device displays prompt 746 requesting the user to confirm whether the detected blurry frame should be removed, as shown in FIG. 7Q.

FIG. 7Q further shows that, a tap gesture (e.g., by contact 748) is detected on the "yes" button in prompt 746. In response to detecting the tap gesture, device 100 removes the detected blurring frame 752 (and optionally other blurry frames that are detected in video 736). FIG. 7R shows the updated image scroll 750, with the blurry frame 752 removed.

Figure 8A:
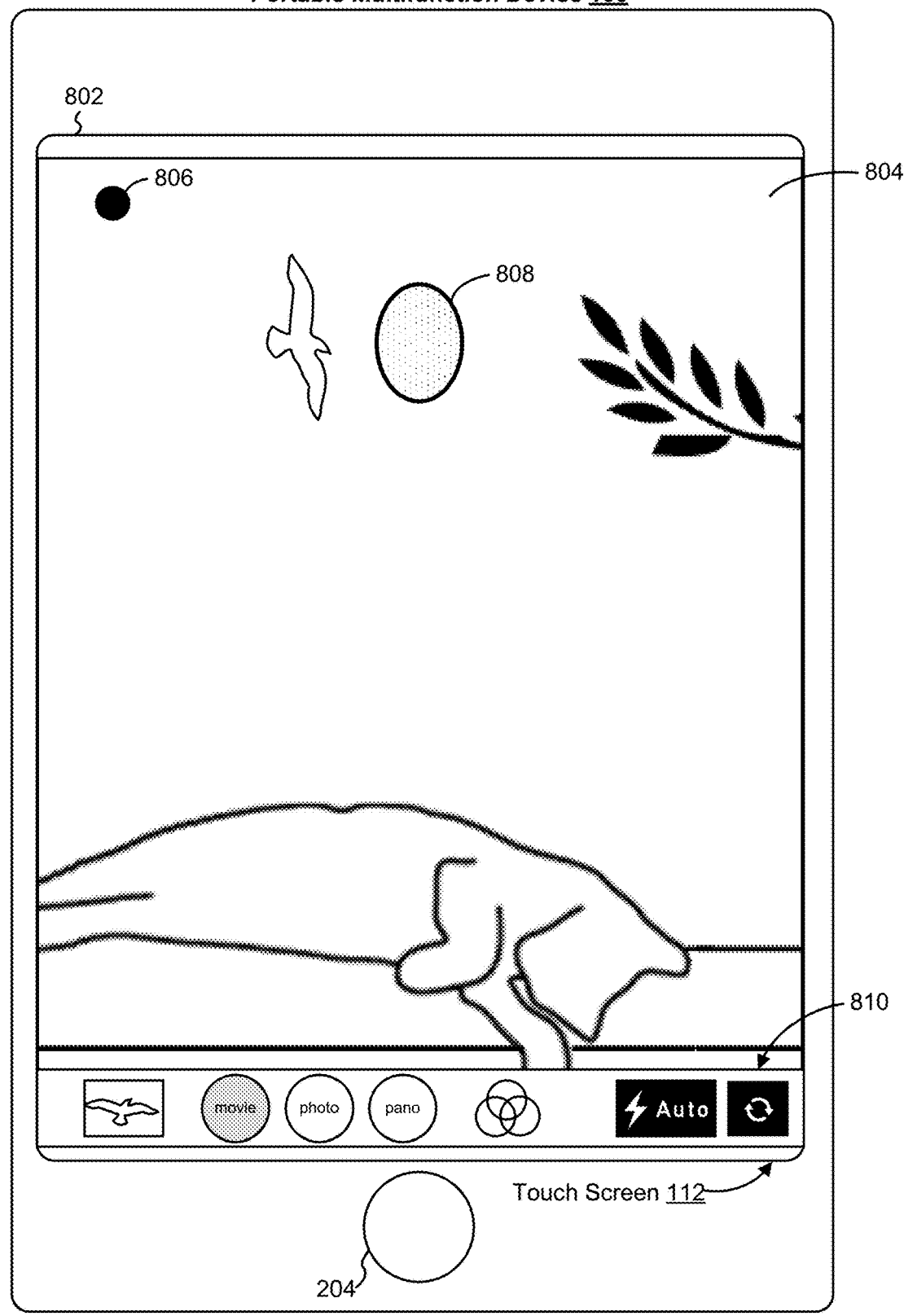
FIGS. 8A-8AC illustrate example user interfaces for switching between camera live views during image capture in accordance with some embodiments.

FIGS. 8A-8AC illustrate exemplary user interfaces for switching between camera live views during image capture, in accordance with some embodiments. The user interfaces in these figures are used to illustrate the processes described below, including the processes in FIGS. 14A-14F. For convenience of explanation, some of the embodiments will be discussed with reference to operations performed on a device with touch-screen 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 8A-8AC illustrate exemplary user interface 802 for a camera application. The camera user interface 802 includes a live view 804 from a first camera (e.g., a back camera) of device 100. In the example shown in FIGS. 8A-8AC, live view 804 is overlaid on user interface 802 within a display region (e.g., a live view presentation object, window, or viewport) that is smaller than and of a different shape from user interface 802. Live view 804 presents images that are being captured by the first camera in real-time.

In FIG. 8A, device 100 has automatically started to capture images using the first camera in response to detecting that device 100 is substantially still and the horizontal edges of device 100 are substantially level for at least a threshold amount of time. The images captured by device 100 are at a resolution, size, frame rate, and/or aspect ratio that are sufficiently large to permit images of multiple different image recording modes (e.g., a single image recording mode, an HD video recording mode, a square image recording mode, etc.) to be extracted at a later time. In FIG. 8A, indicator 806 is displayed when automatic capturing of images is initiated and in progress. In some embodiments, a frame stream (e.g., such as frame scroll 506 illustrated in FIGS. 5A-5AE) is overlaid on the live view or shown below the live view to show the images that have just been captured by the camera.

In FIG. 8A, user interface 802 includes a control area 810 that includes a number of camera control affordances, including a photo album affordance to launch an media review user interface (e.g., the media review user interface shown in FIG. 7O), a movie affordance to display a menu of movie recording modes (e.g., slow-motion recording mode, time-lapse recording mode, etc.), a photo affordance to display a menu of photo recording modes (e.g., square photo recording mode, 4:3 photo recording mode, etc.), a panorama affordance to activate a panorama recording mode, an editing affordance to display a media editing user interface, a flash control affordance to change a camera flash setting, and a camera switching affordance to switch between the front and back camera views. In some embodiments, if the frame stream is displayed, control area 810 is optionally not displayed.

Figure 8B:
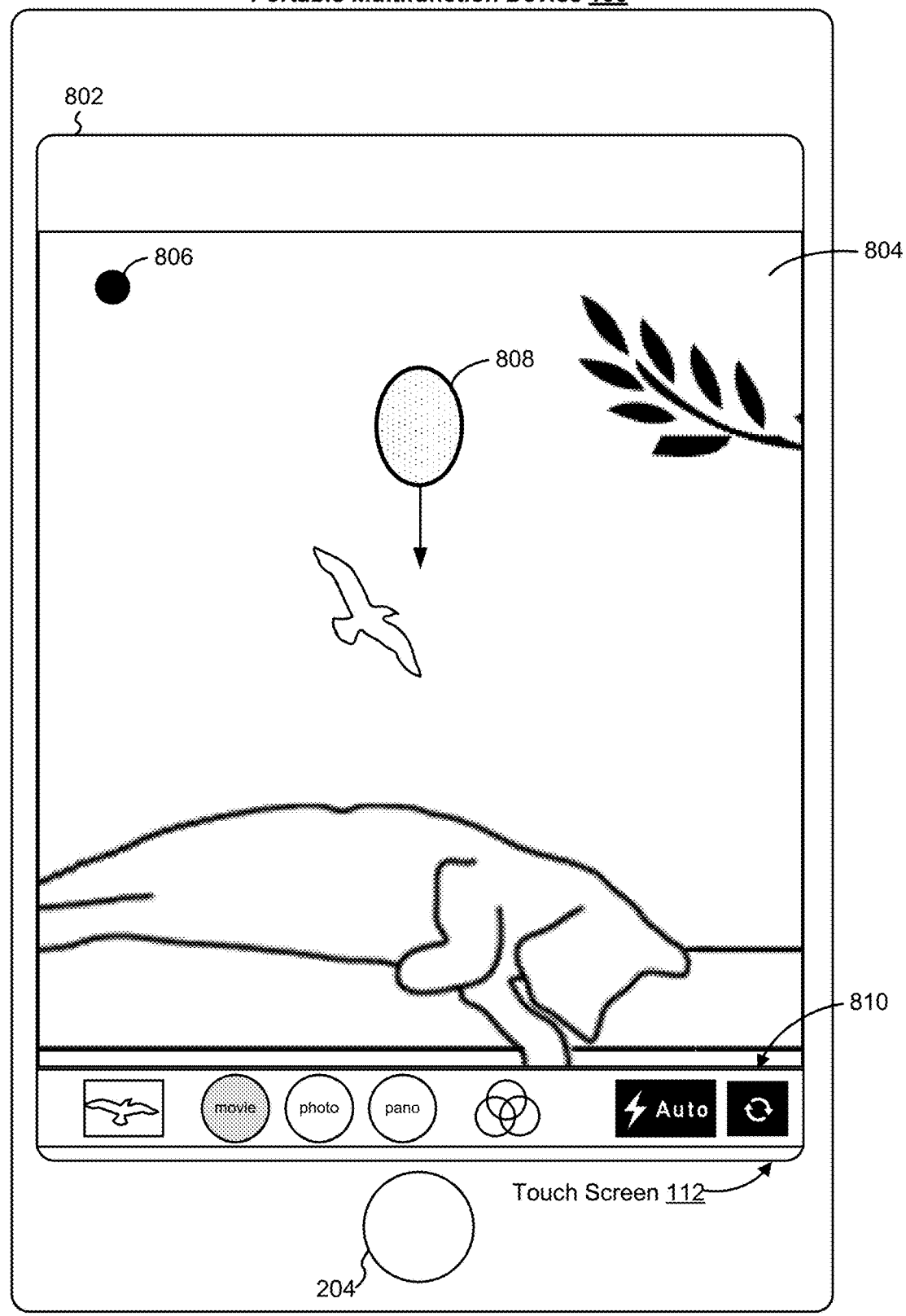
Figure 8C:
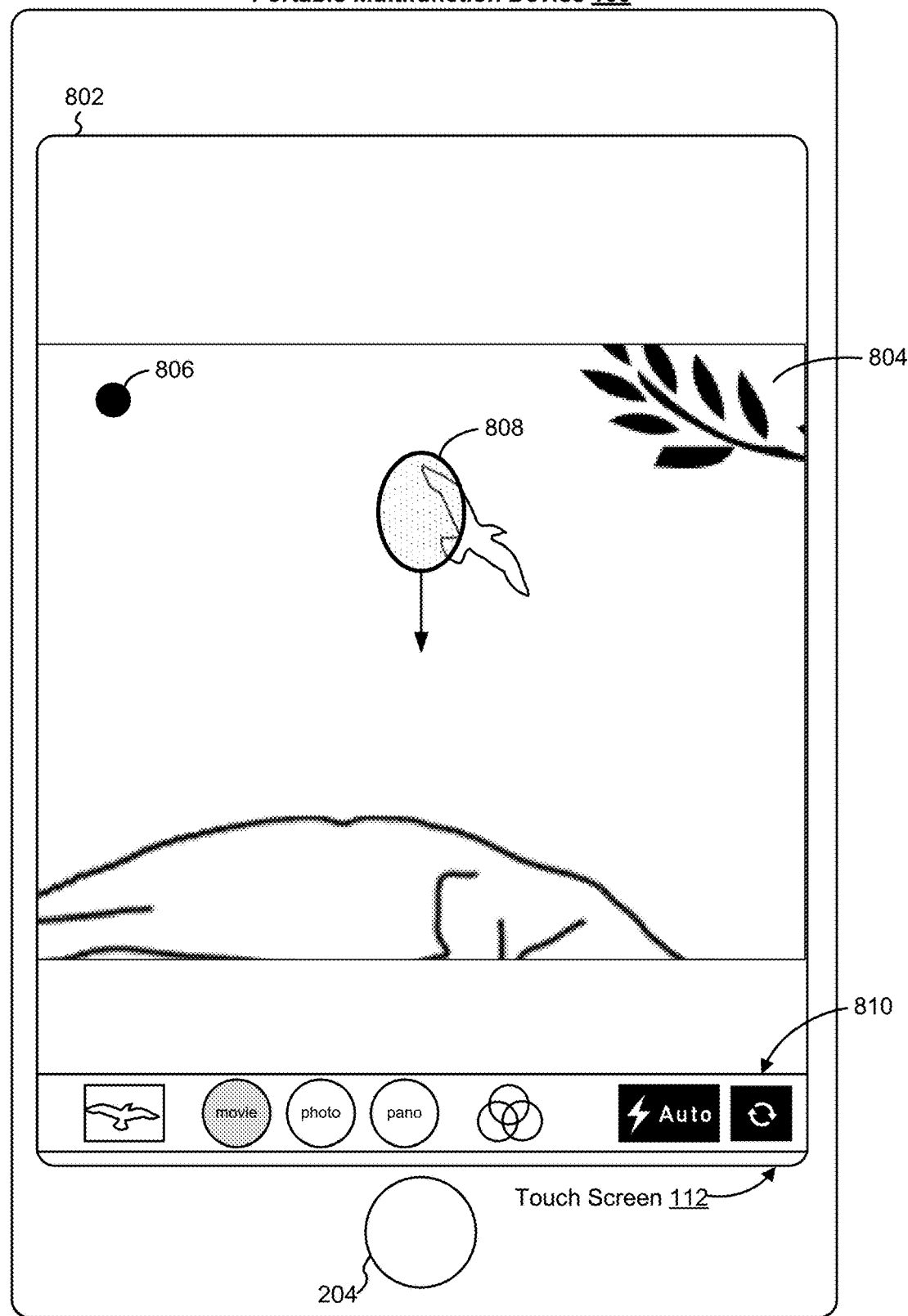

FIGS. 8A-8C illustrate that, while live view 804 is displayed and image capturing is in progress, a contact (e.g., contact 808) is detected on live view 804 (as shown in FIG. 8A). Contact 808 is detected on the upper portion of live view 804, and moves downward across touch-screen 112. In response to detecting the downward movement of contact 808, device 100 reduces the vertical dimension of live view 804 to adjust the aspect ratio of live view 804. In some embodiments, the aspect ratio of the live view is not changed, and a frame size indicator (e.g., a rectangular box) within the live view is adjusted in accordance with the movement of contact 808 to show the current aspect ratio of images that are being captured. In some embodiments, the aspect ratio of the images captured is adjusted according to the aspect ratio of live view 804. In some embodiments, metadata indicating the current aspect ratio is created, and device 100 continues to capture images with the original aspect ratio. The captured images are then processed to obtain images with the correct aspect ratio during post processing.

Figure 8D:
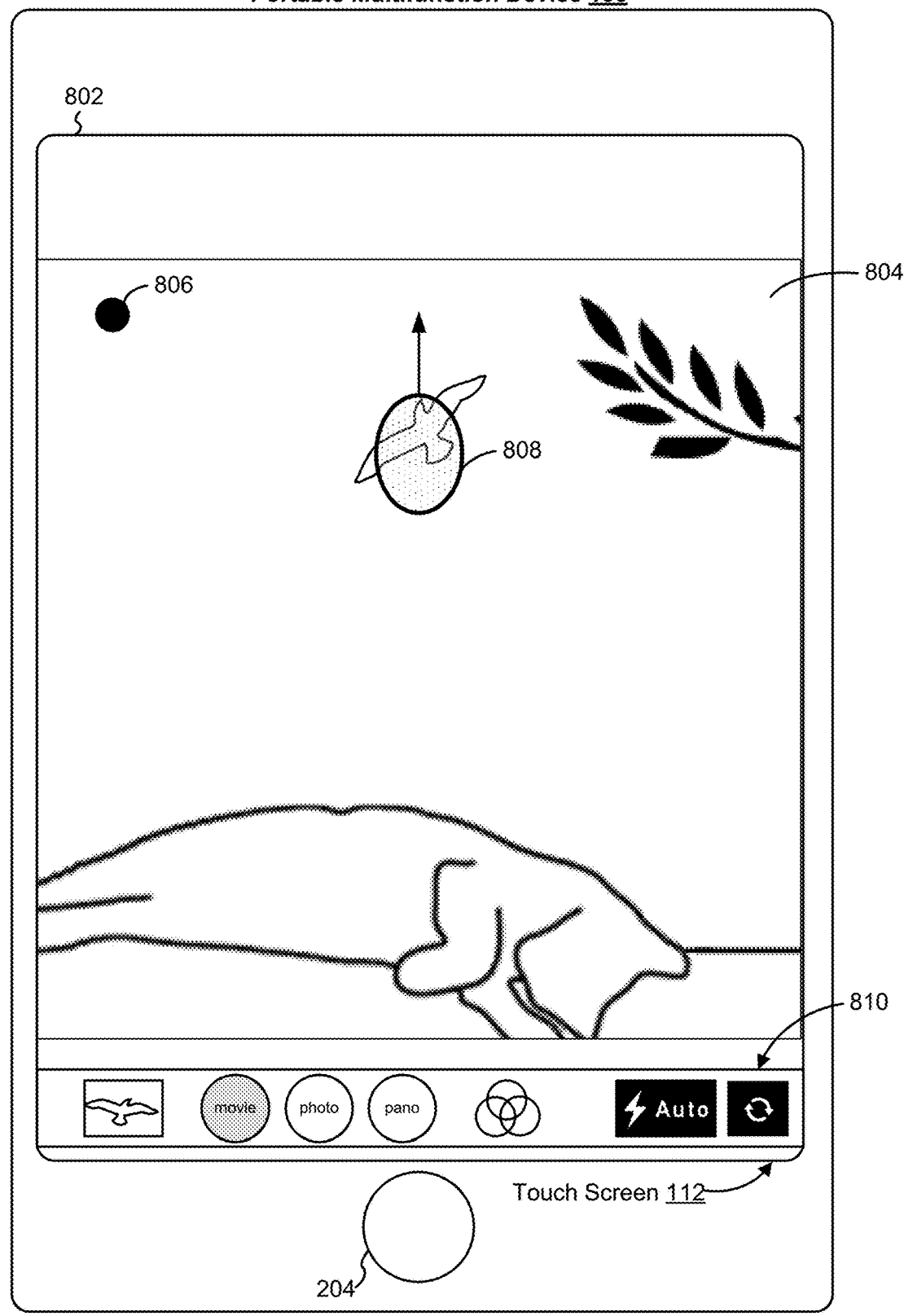

As shown in FIG. 8D, when movement of contact 808 reverses in direction (e.g., going upward), device 100 increases the vertical dimension of live view 804 to adjust the aspect ratio of live view 804 in accordance with the upward movement of contact 808.

Figure 8E:
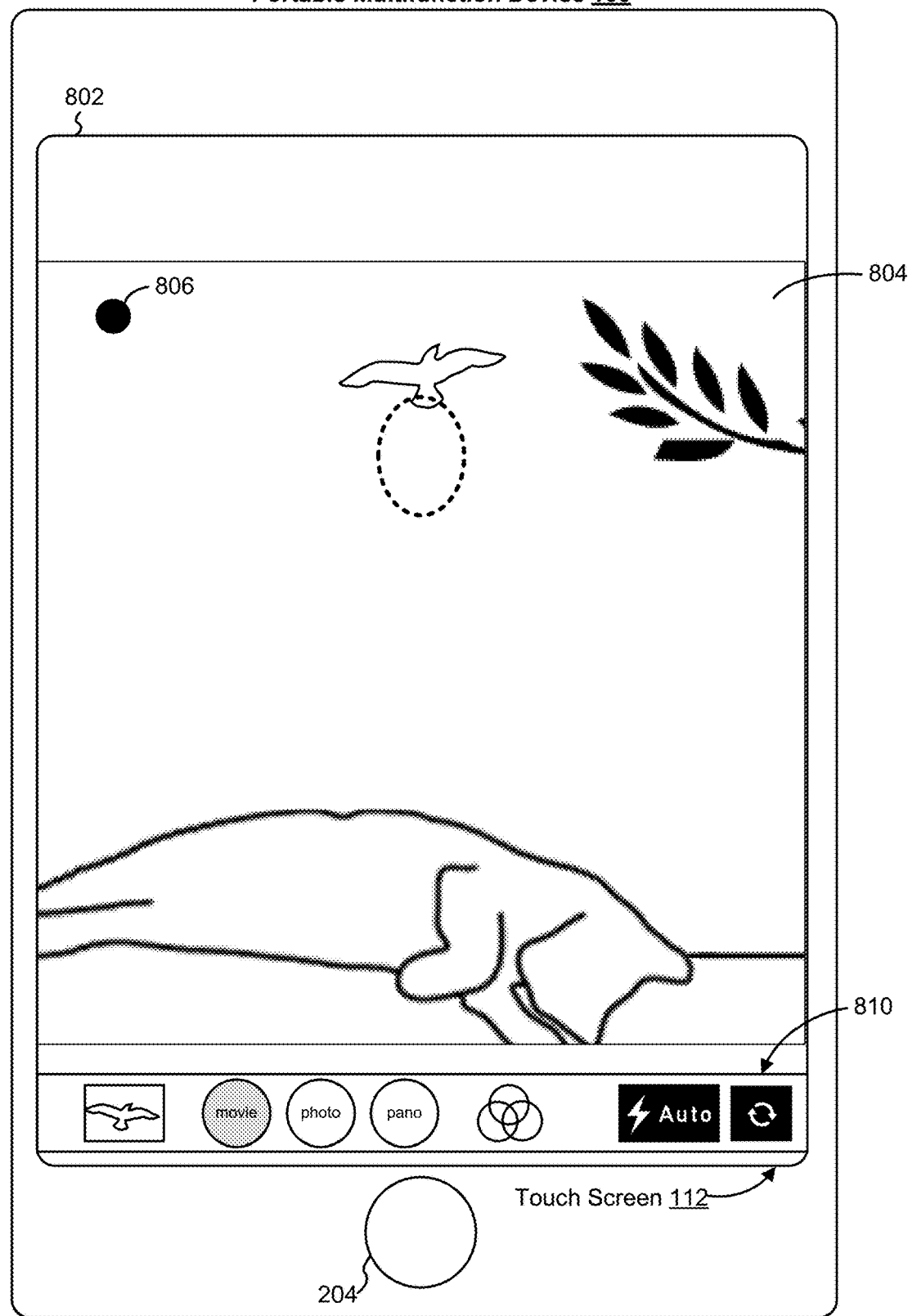

In FIG. 8E, lift-off of contact 808 is detected, and device 100 maintains the current aspect ratio of live view 804 at the time that lift-off of contact 808 is detect. Image capturing continues with the current aspect ratio.

In FIGS. 8A-8E, the movement of contact 808 is a slow and deliberate movement with a duration that is longer than a predetermined time threshold and/or a speed that is slower than a predetermined speed threshold. In response to such long and/or slow movement of a contact, device 100 continuously and smoothly adjusts the aspect ratio of the live view (and of the images that are being capturing) (e.g., by adjusting the vertical dimension of live view 804) in accordance with the movement of the contact, until lift-off of the contact is detected. In some embodiments, horizontal movement a contact can be used to adjust the horizontal dimension of the images that are being captured, if the horizontal movement is not used to trigger other functions (e.g., switching of camera views) in the camera user interface.

Figure 8F:
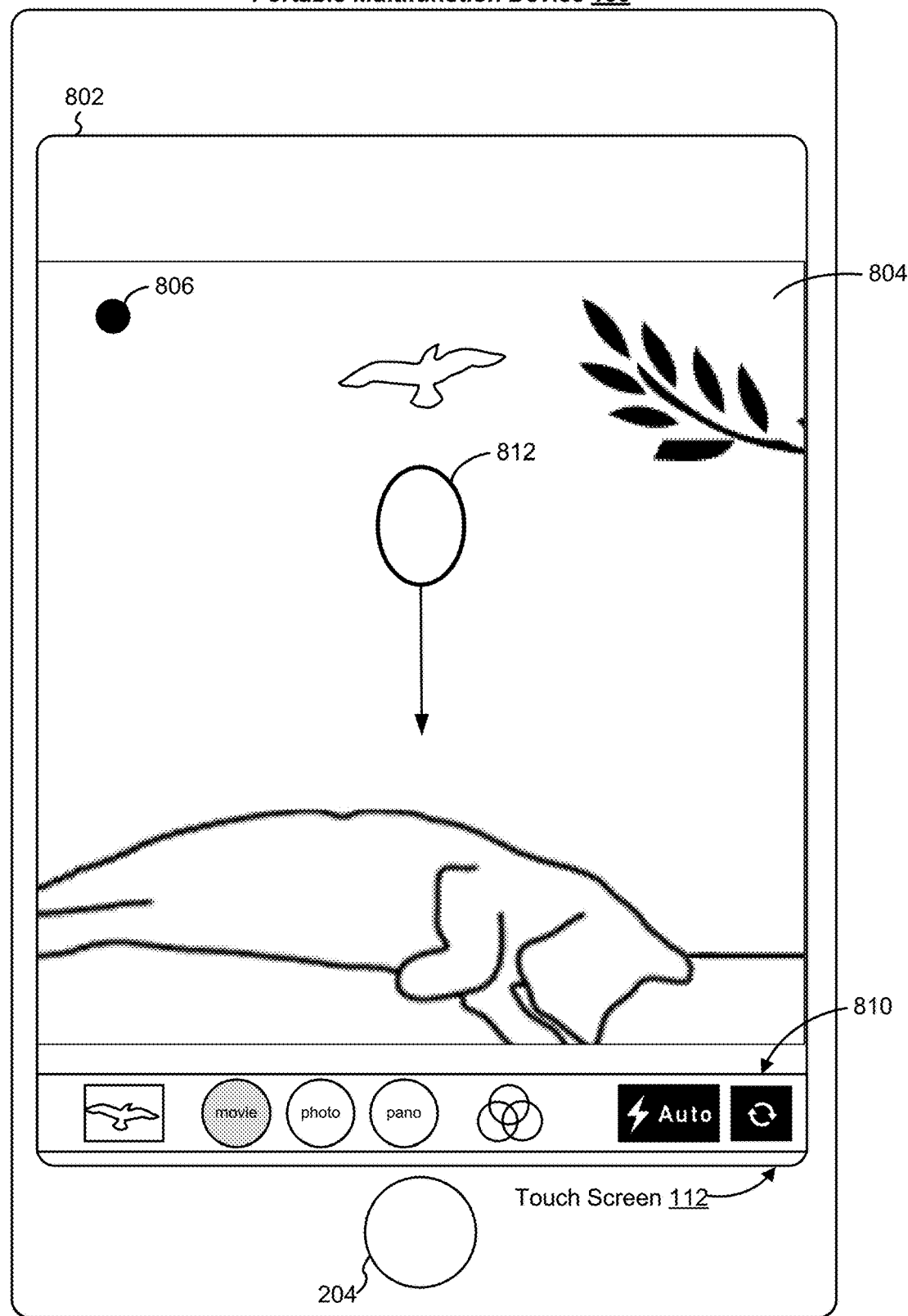
Figure 8G:
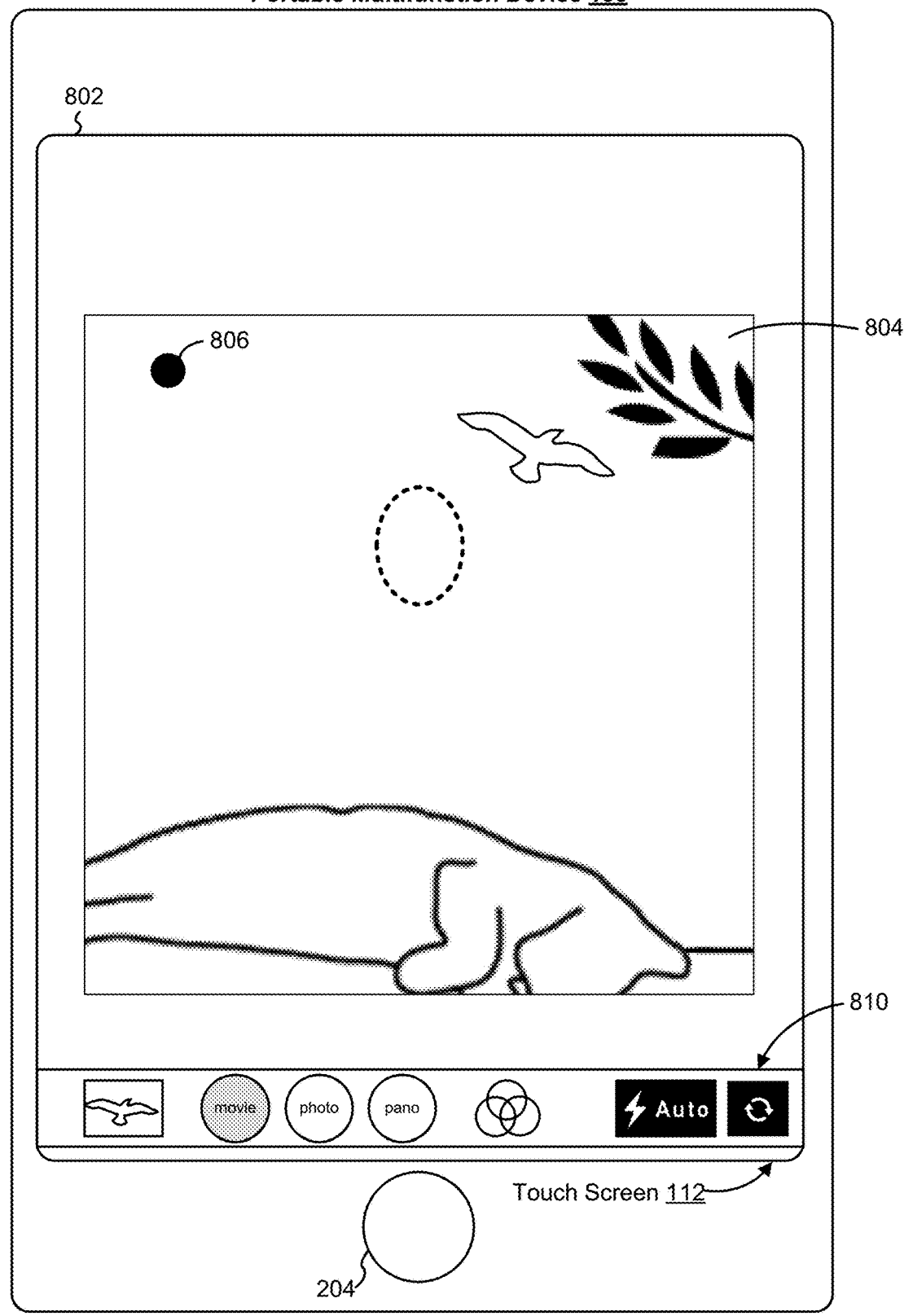

In contrast to FIGS. 8A-8E, FIGS. 8F-8I illustrate using fast flick gestures to quickly switch between two preset aspect ratios (e.g., a 4:3 aspect ratio and a square aspect ratio). As shown in FIGS. 8F-8G, a contact (e.g., contact 812) is detected on the upper portion of live view 804. Contact 812 moves quickly downward and lift-off of contact 812 is detected soon after touch-down of contact 812. In accordance with a determination that a flick gesture has been performed by contact 812 (e.g., a characteristic speed of contact 812 (e.g., the speed of contact 812 at the time of lift-off) is greater than a threshold speed, and/or the duration of contact 812 is less than a threshold amount of time), device 100 changes the current aspect ratio to the square aspect ratio in accordance with the downward movement of contact 812. In some embodiments, in order to achieve the preset square aspect ratio, the horizontal dimension of live view 814 is also adjusted, as shown in FIG. 8G.

Figure 8H:
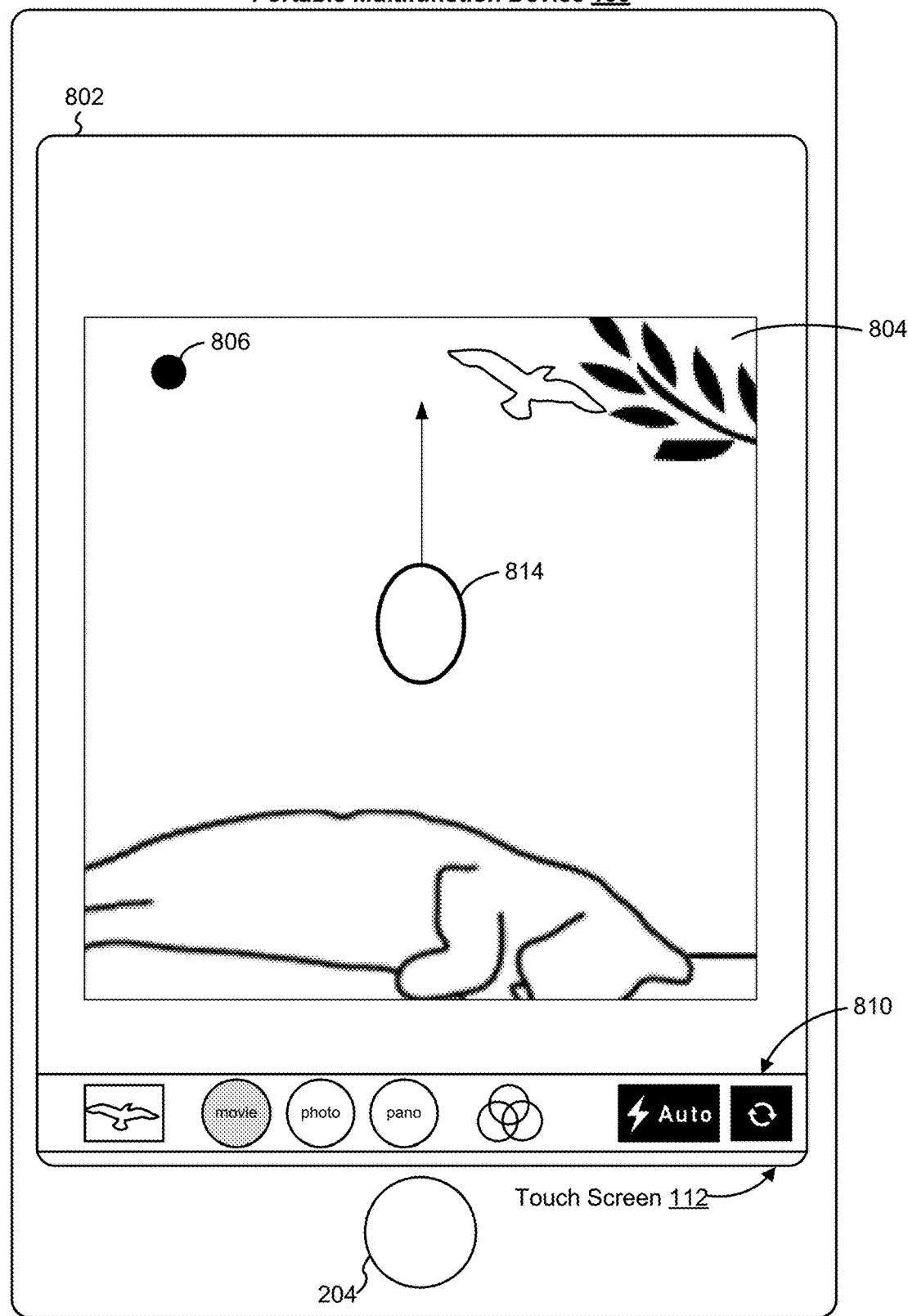
Figure 8I:
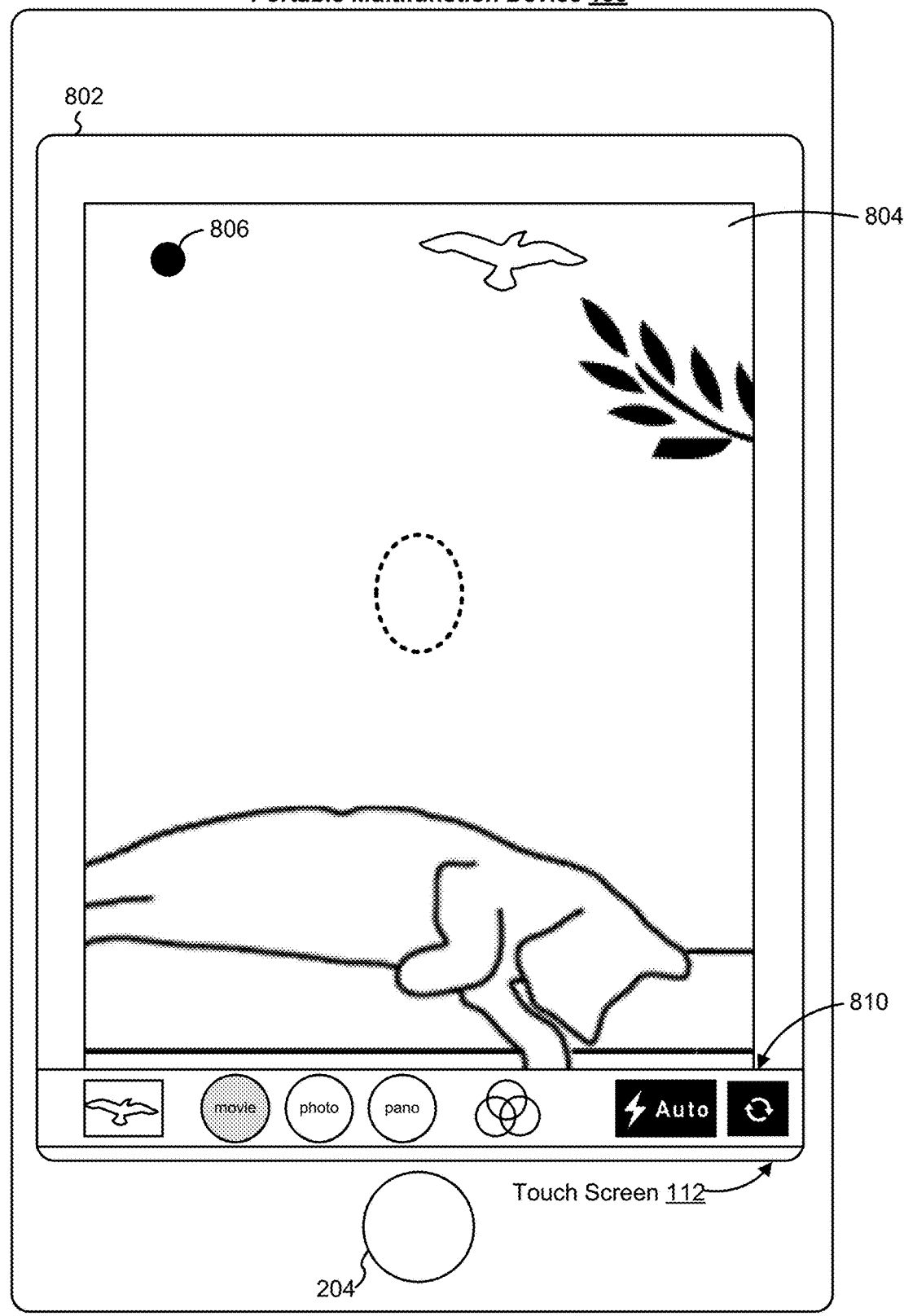

In FIGS. 8H-8I, another contact (e.g., contact 814) is detected on the upper portion of live view 804. Contact 814 moves quickly upward and lift-off of contact 814 is detected soon after touch-down of contact 814. In accordance with a determination that a flick gesture has been performed by contact 814 (e.g., a characteristic speed of contact 814 (e.g., the speed of contact 814 at the time of lift-off) is greater than a threshold speed, and/or the duration of contact 814 is less than a threshold amount of time), device 100 changes the current aspect ratio from the square aspect ratio to the 4:3 aspect ratio in accordance with the upward movement of contact 814. In some embodiments, in order to achieve the preset 4:3 aspect ratio, the horizontal dimension of live view 814 is also adjusted.

FIGS. 8J-8N illustrate a process in which horizontal movement of a contact (e.g., contact 816) rotates a live view display object on which live view 804 is displayed. On the reverse side of the live view display object, the live view from another camera is displayed. In some embodiments, while the two-sided live view display object is being rotated, image capturing continues. In some embodiments, the device captures the rotation of the live view display object, including how the live view(s) appear on the live view display object during the rotation of the live view display object. In some embodiments, the device continues to capture the images in the live view from one of the cameras, until the live view from another camera moves to the front and central position in the camera user interface.

Figure 8J:
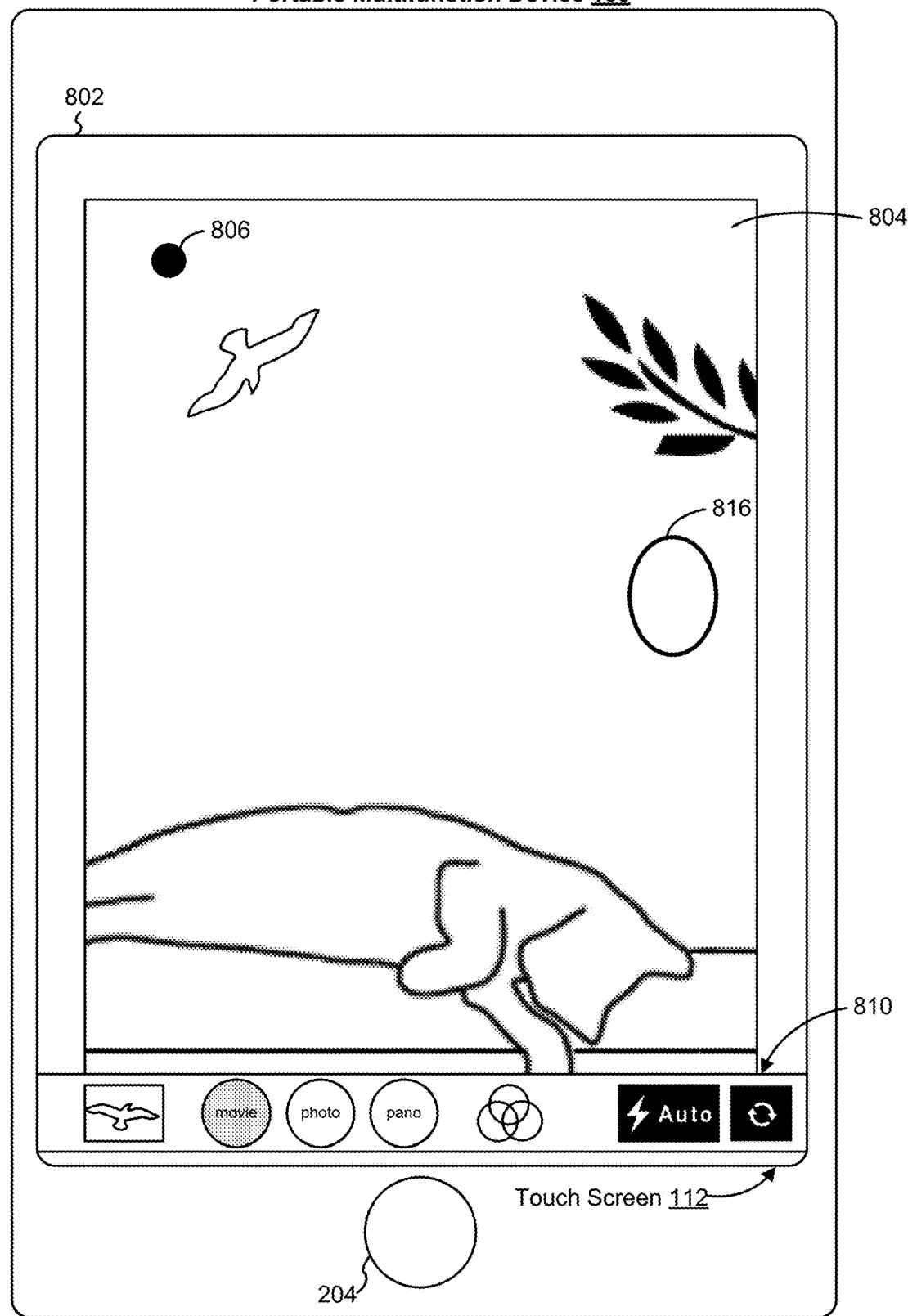
Figure 8K:
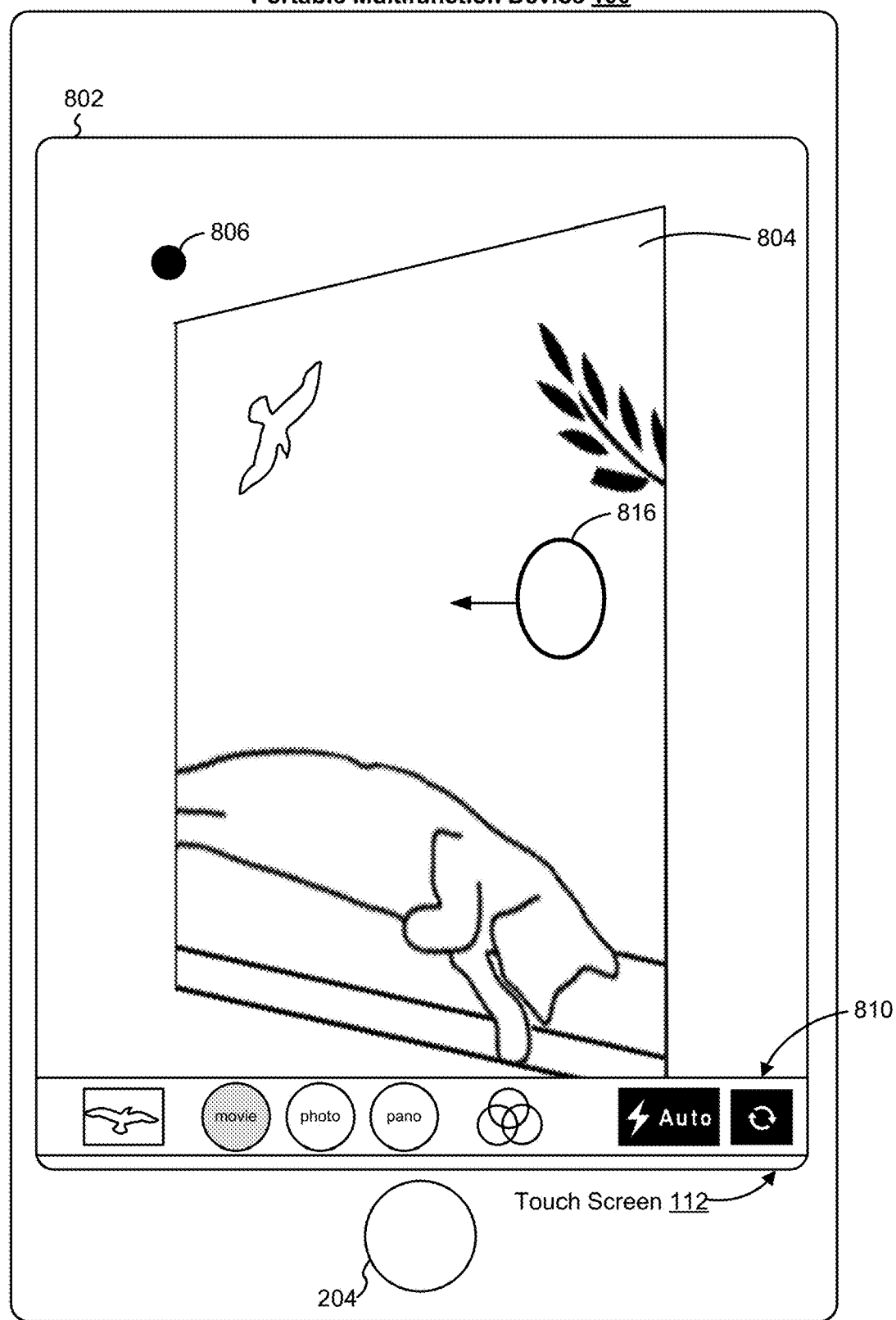
Figure 8L:
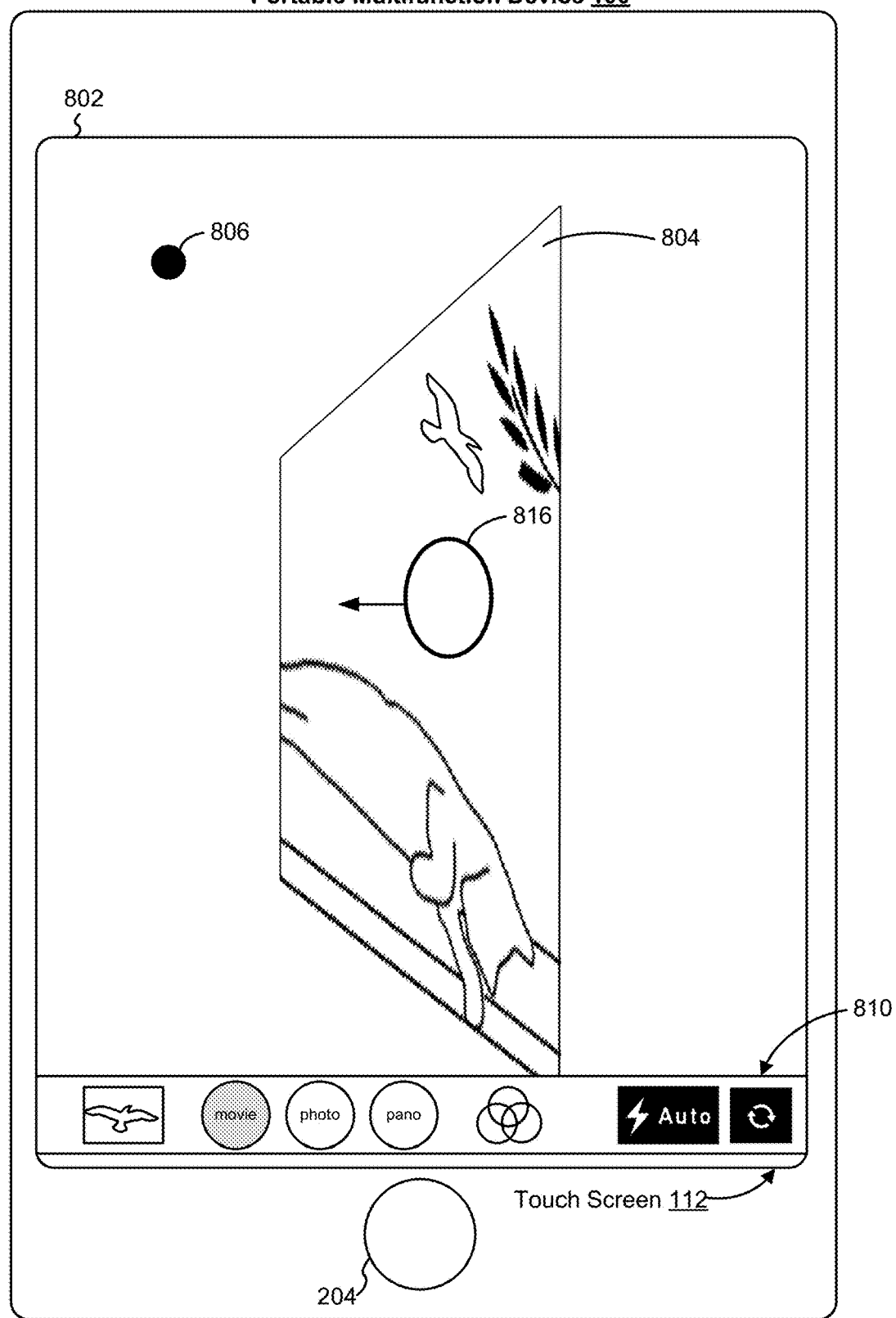

As shown in FIG. 8J, when live view 804 from the back camera is displayed on a first side of the live view display object, contact 816 is detected on live view 804 (e.g., on the right portion of live view 804). In FIGS. 8K-8L, device 100 detects leftward movement of contact 816, and in response to the leftward movement of contact 816, device 100 rotates the live view display object around a vertical central axis in the plane of the camera user interface, while live view 804 continues to be displayed and updated on the first side of the live view display object in accordance with the images that is being captured by the back camera.

Figure 8M:
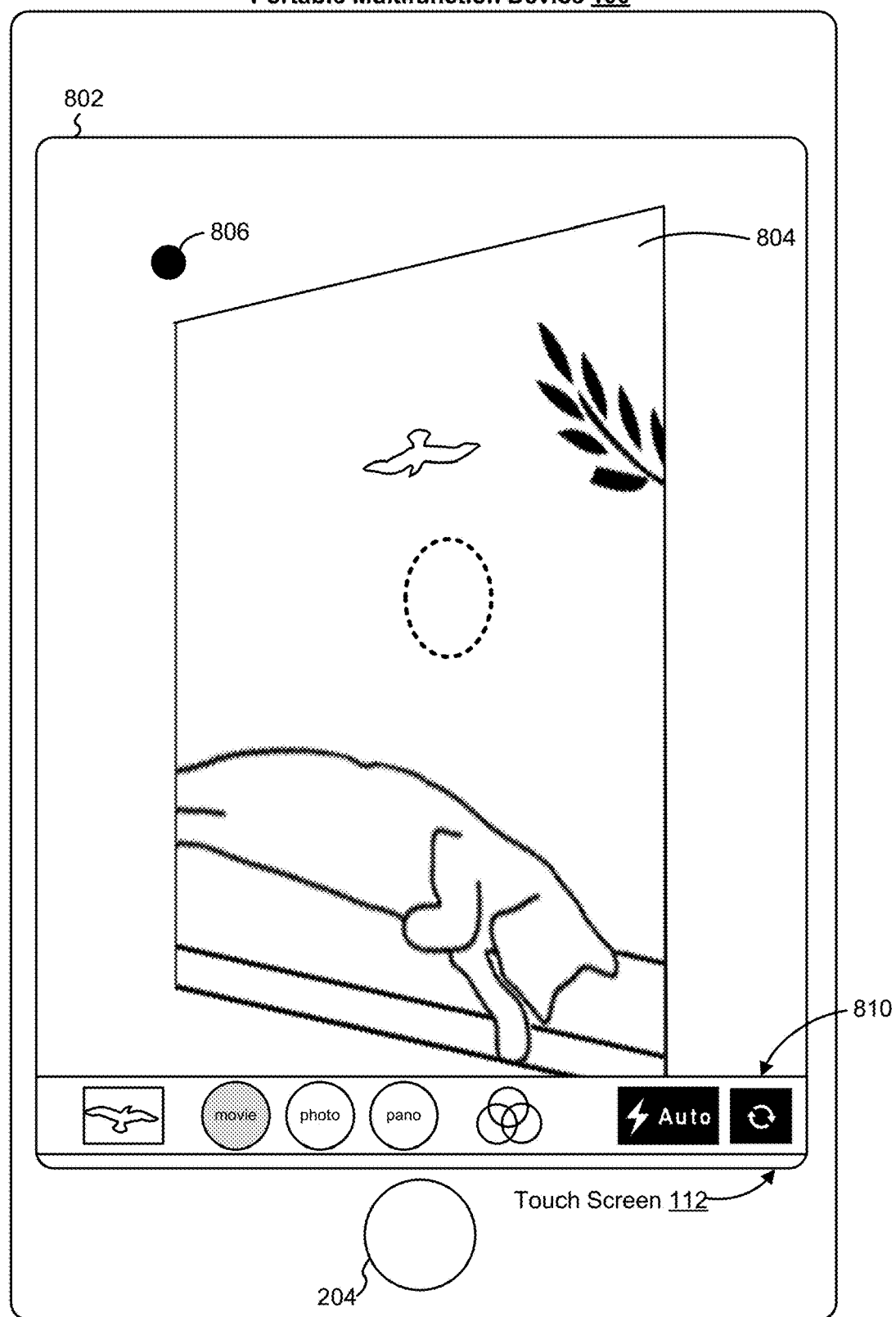
Figure 8N:
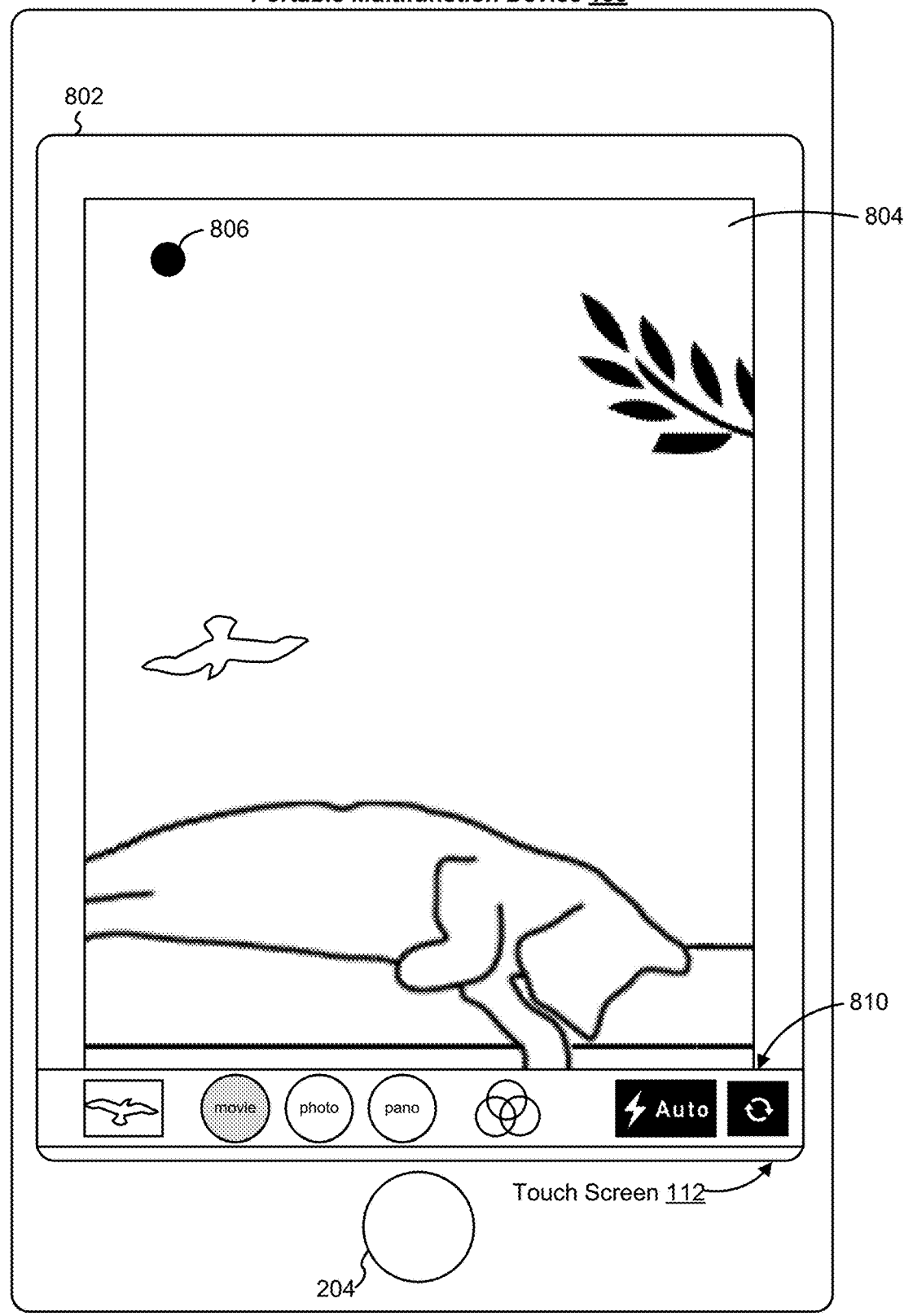

FIG. 8M illustrates that, when lift-off of contact 816 is detected, the live view display object has not been rotated to a point where the second side of the live view display object becomes visible in the camera user interface. In FIG. 8N, in response to detecting the lift-off of contact 816, the device reverses the rotation of the live view display object to redisplay live view 804 in the front and center position in the camera user interface. If the live view display object had been rotated to a point where the second side of the live view display object becomes visible in the camera user interface, then upon lift-off of the contact, the device will continue to rotate the live view display object until the live view associated with the second side of the live view display object is displayed in the front and center position in the camera user interface. In other words, when the live view display object is rotated by a slow moving contact, the live view display object snaps to a stable position that is closest to the position at the time of lift-off of contact.

FIGS. 8O-8T illustrate a process in which a horizontal flick gesture flips the two-sided live view display object that displays live view 804 and live view 820 on opposite sides of the live view display object.

Figure 8O:
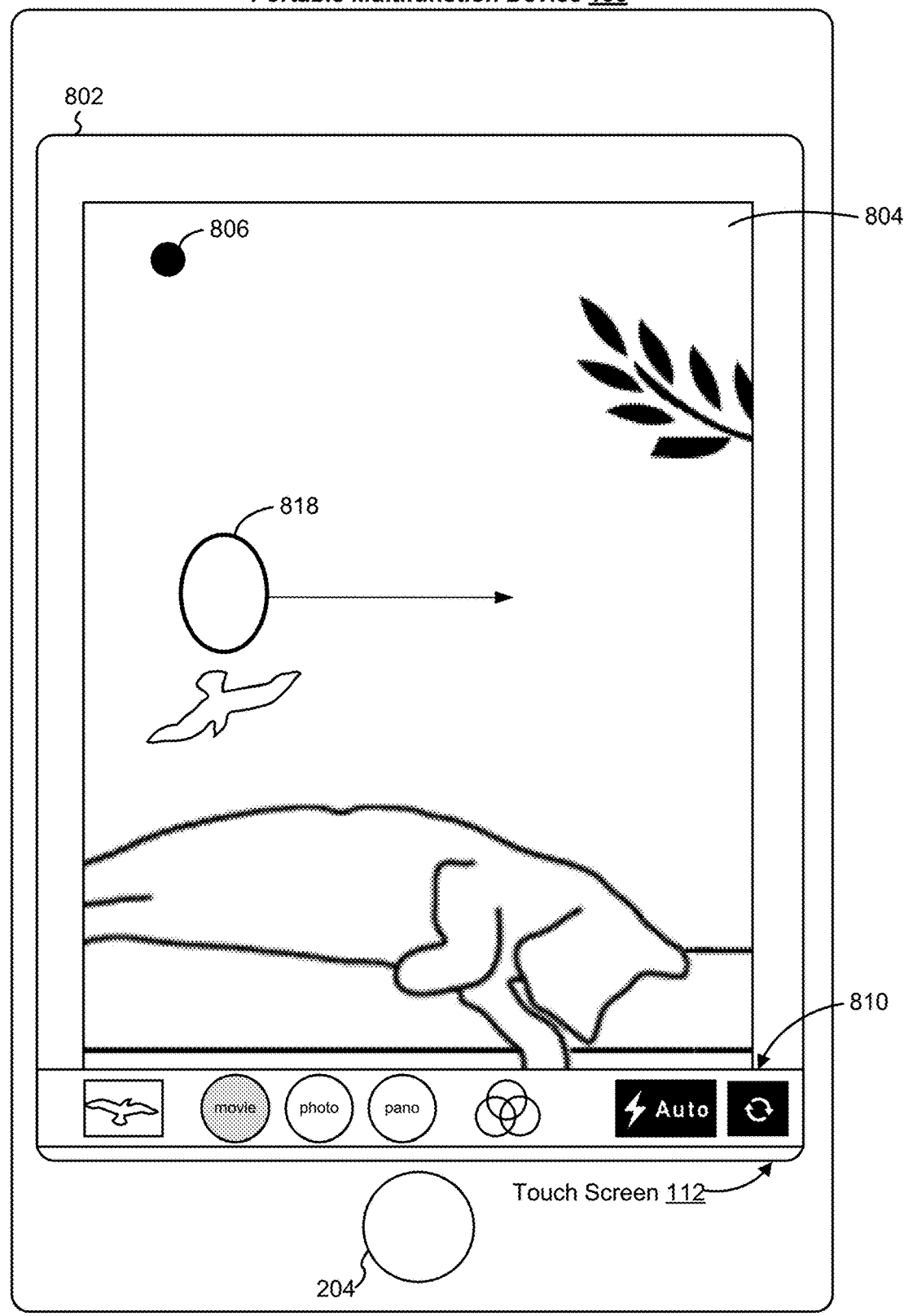
Figure 8P:
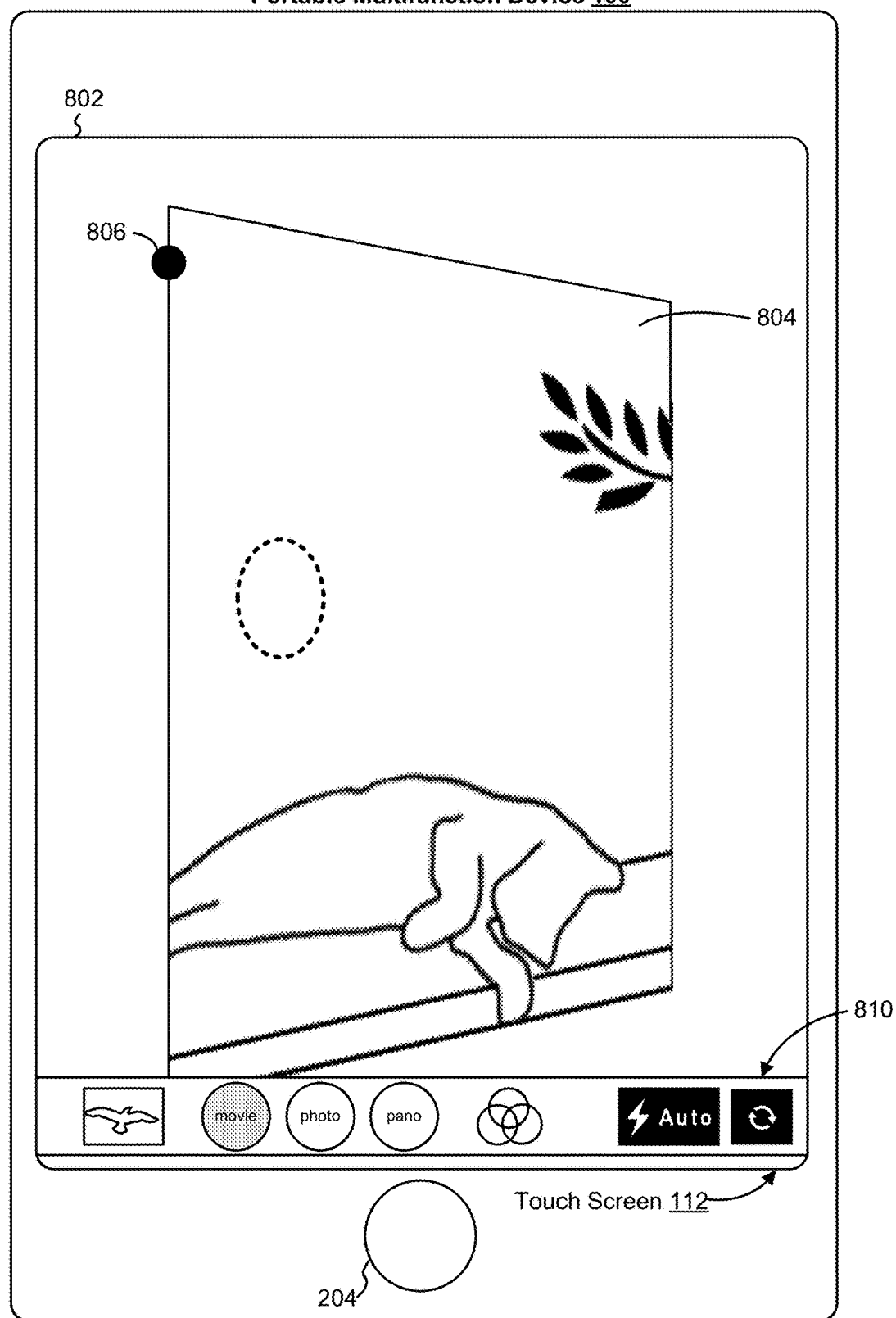

As shown in FIG. 8O, while image capturing is in progress, device 100 detects a flick gesture by contact 818. Movement of contact 818 starts on the left portion of live view 804 and goes toward the right side of the display with a high speed. Lift-off of contact 818 is detected after a short movement on the touch-sensitive surface, as shown in FIG. 8J. In response to detecting the flick gesture by contact 818 (e.g., based on the fast speed and/or short duration of the movement by contact 818), device 100 rotates the live view display object in accordance with the movement direction of contact 818, as shown in FIG. 8P.

Figure 8Q:
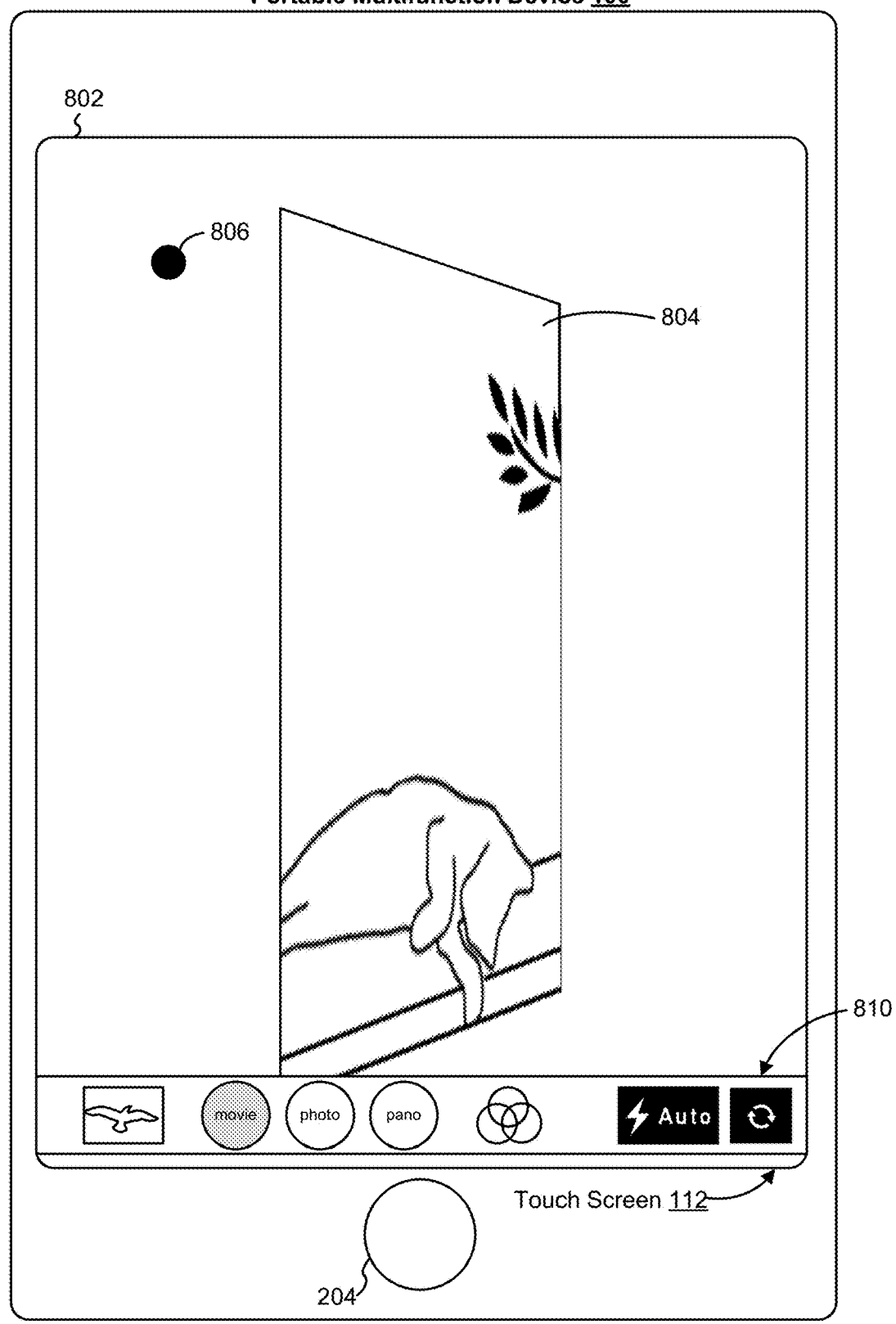
Figure 8R:
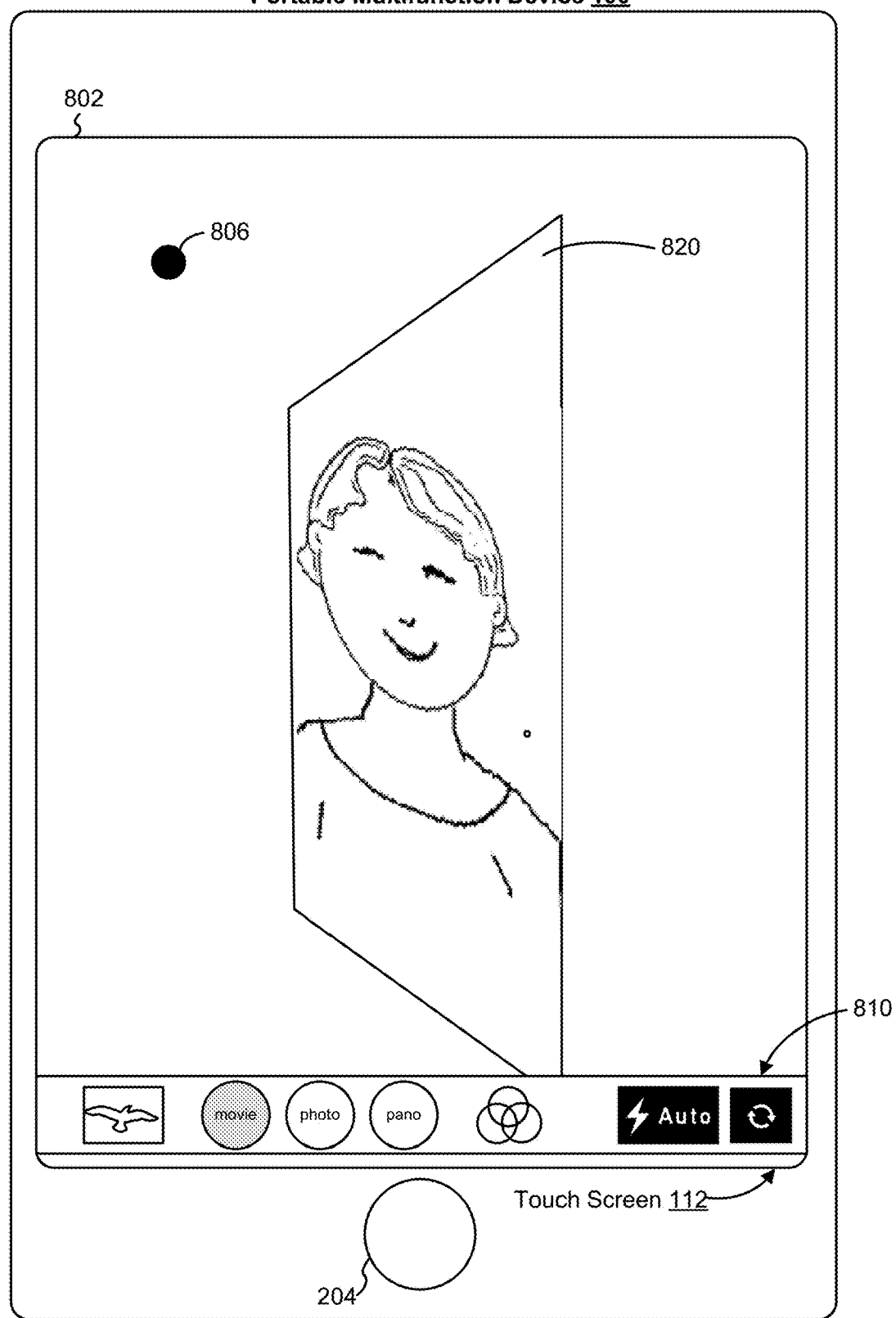

FIGS. 8Q-8R illustrate that, after termination of the flick gesture, the live view display object continues to rotate and a second side of the live view display object become visible in the camera user interface (e.g., as shown in FIG. 8R). Live view 820 from another camera (e.g., the front camera) of device 100 is displayed on the second side of the live view display object.

Figure 8S:
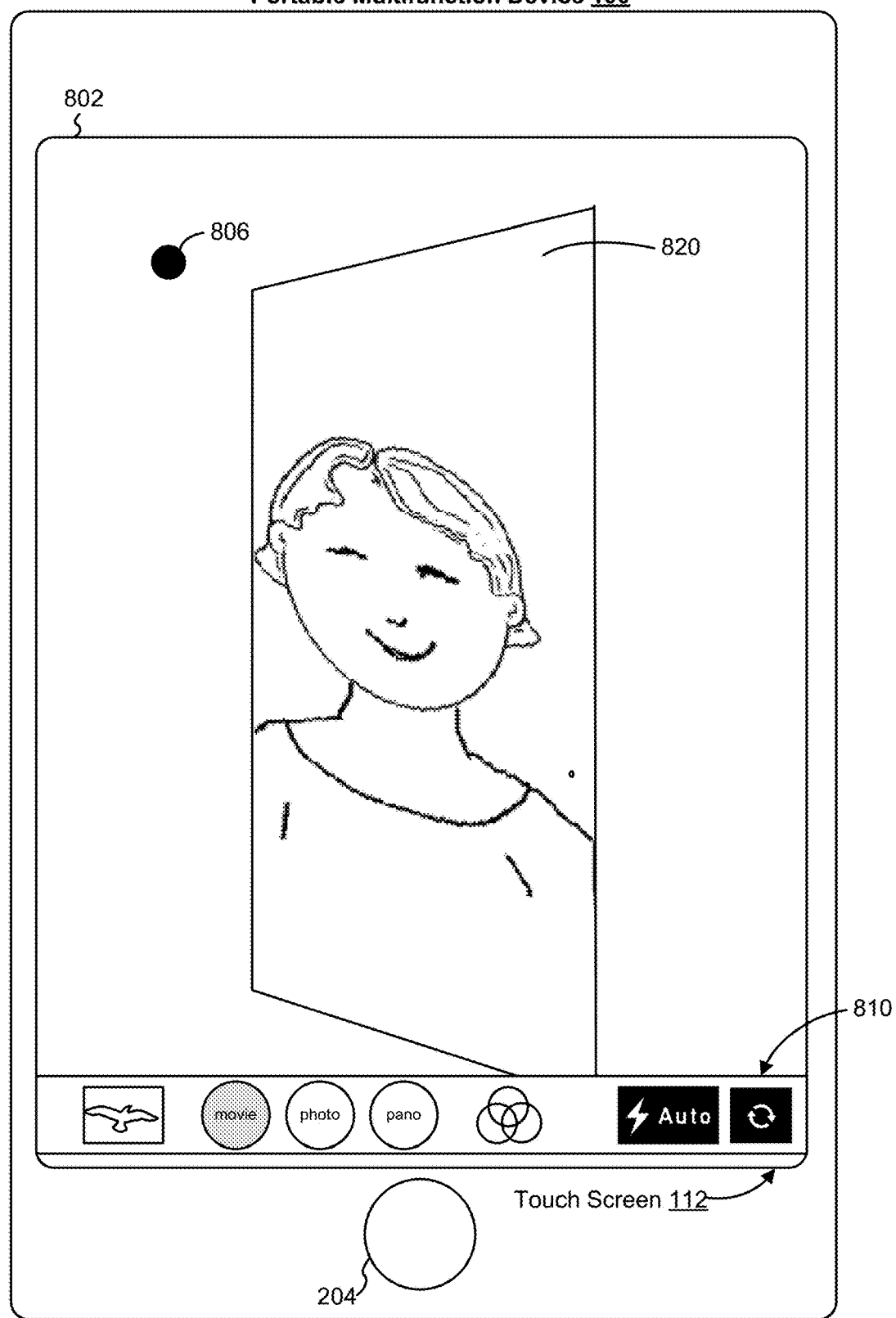
Figure 8T:
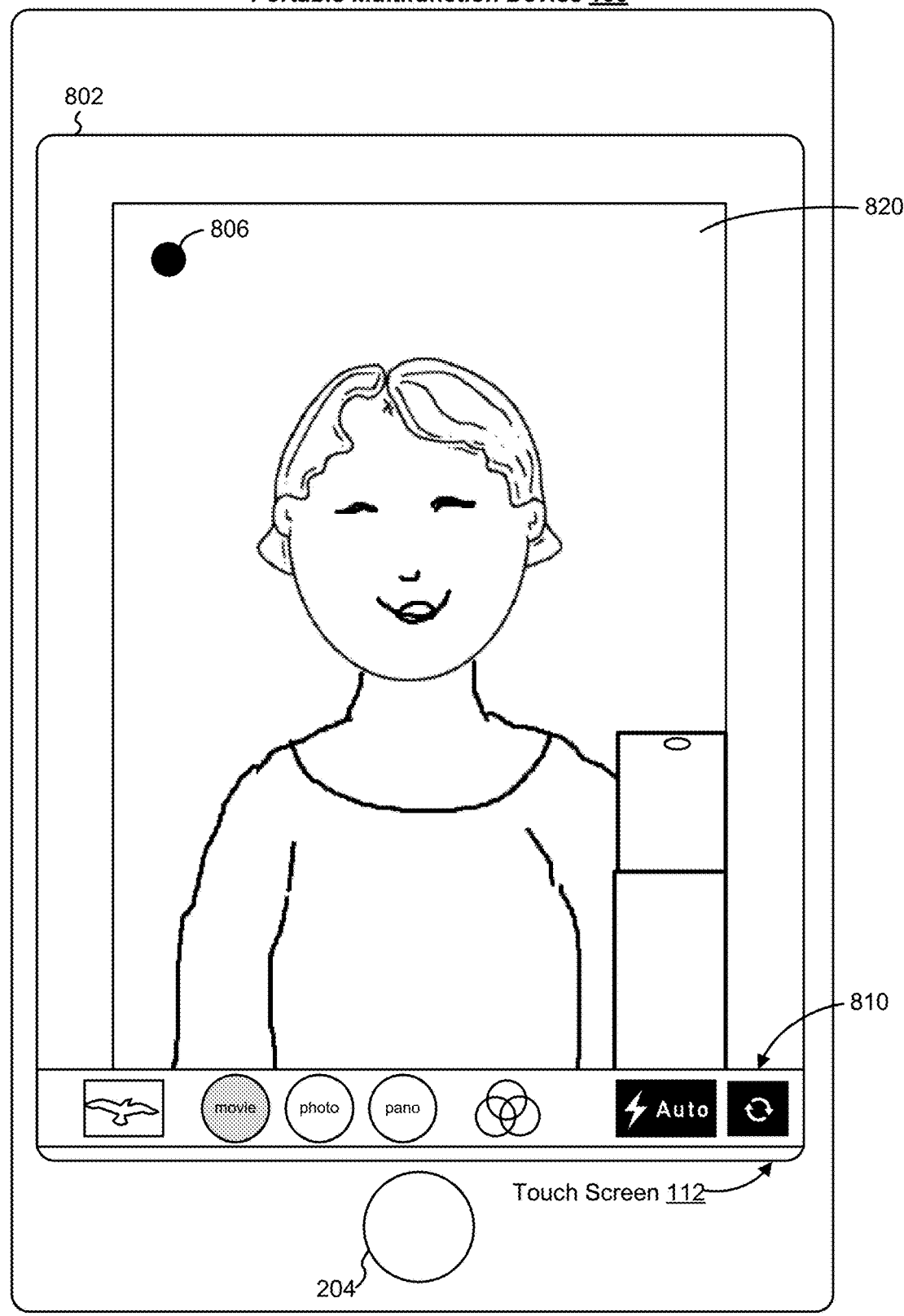

FIGS. 8S-8J illustrate that, the live view display object continues to rotate until the second side of the live view display object occupies the front and center location of the camera user interface. Live view 820 is displayed on the second side of the live view display object. Live view 820 shows an image of a user operating device 100.

In some embodiments, while the live view display object is being rotated, image capturing continues. In some embodiments, the device captures the rotation of the live view display object, including how the live view(s) appear on the live view display object during the rotation of the live view display object. In some embodiments, the device continues to capture the images in the live view from one of the cameras, until the live view from another camera occupies the front and center position in the camera user interface.

FIGS. 8U-8Y illustrate a process in which a swipe gesture slides a multi-pane live view display object to move a currently displayed live view (e.g., the live view 820) out of the visible region of the camera user interface and to bring in another live view that is not currently visible (e.g., live view 804) into the visible region of the camera user interface.

Figure 8U:
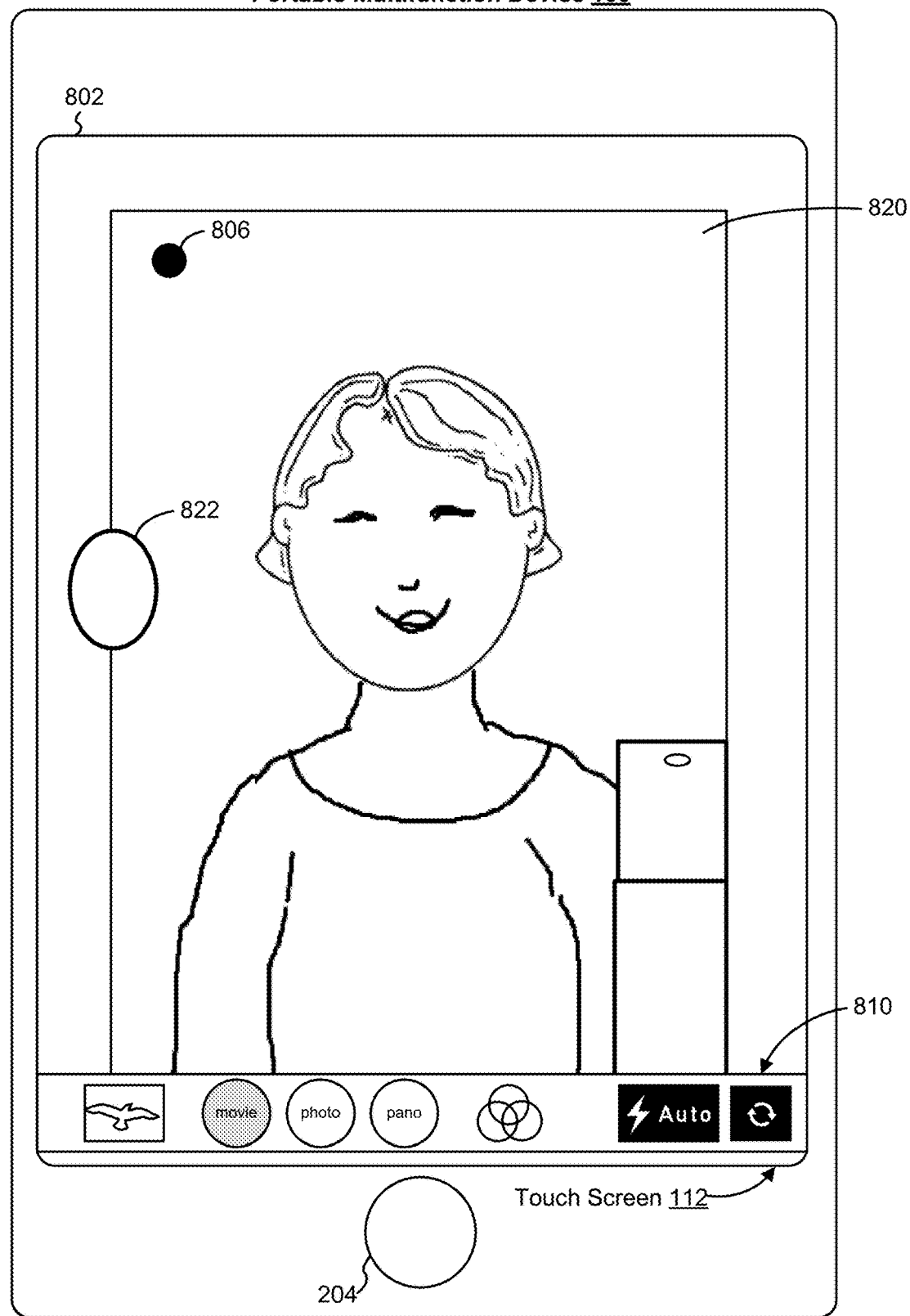
Figure 8V:
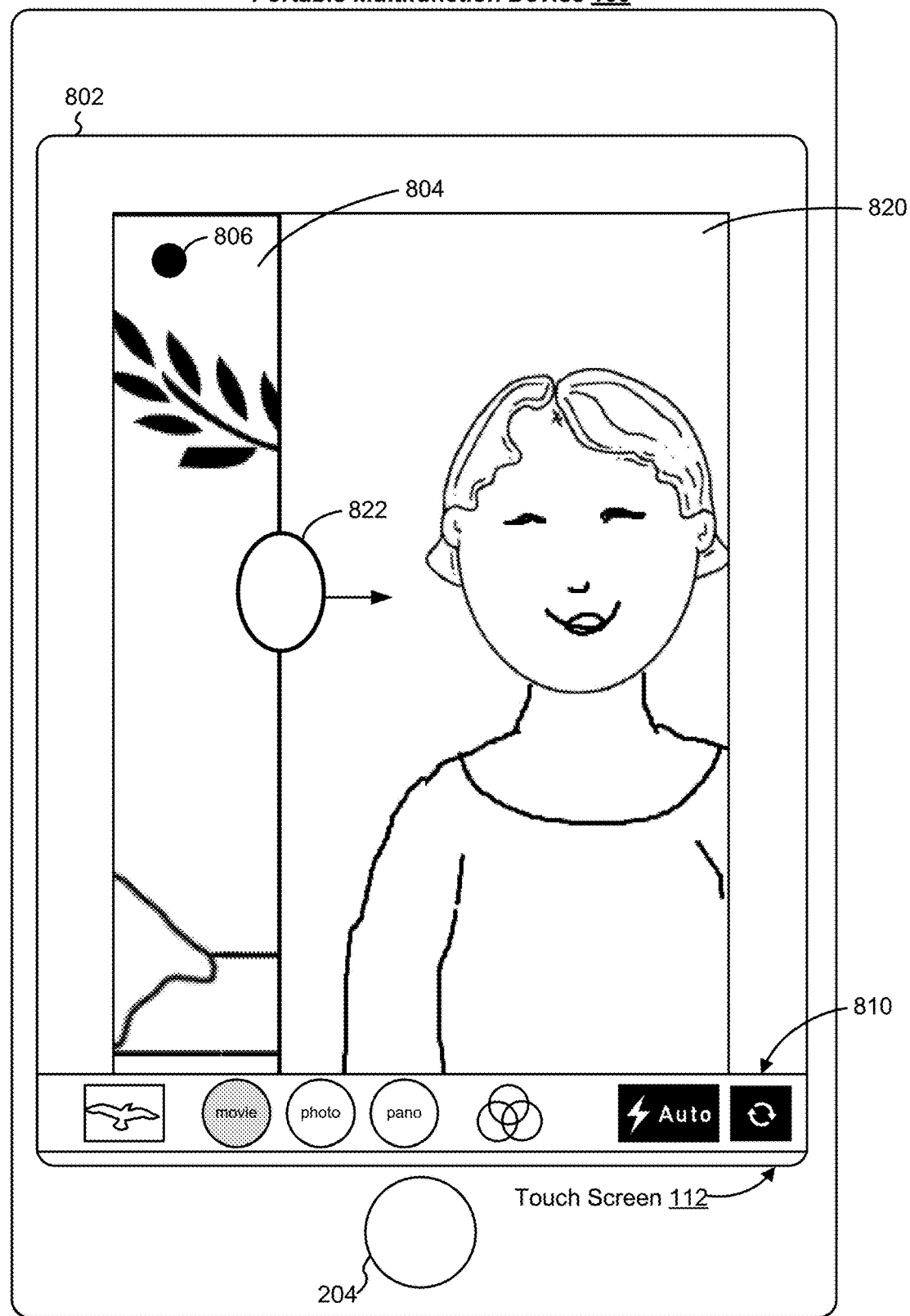
Figure 8W:
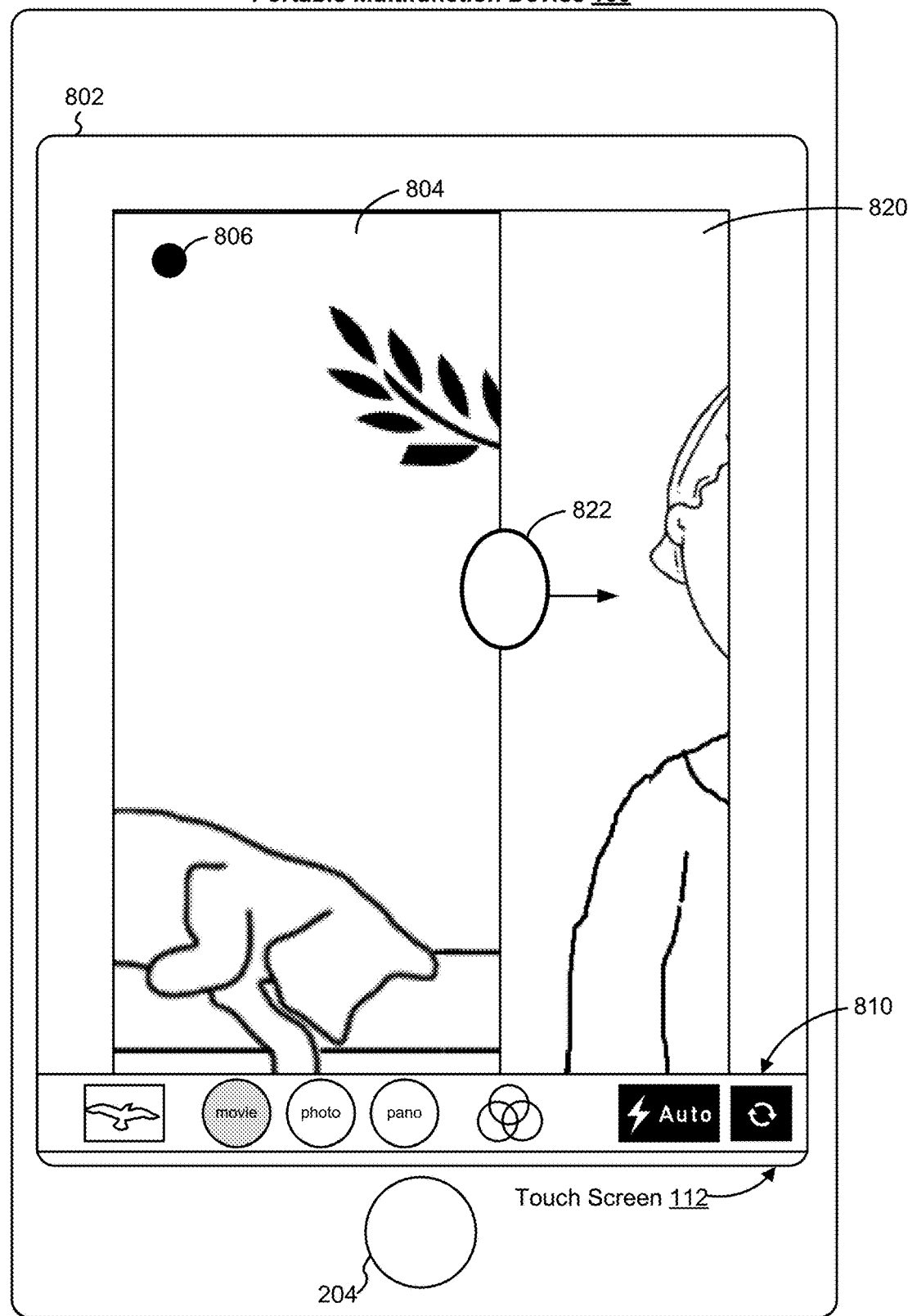

In FIG. 8U, a contact (e.g., contact 822) is detected near the left edge of live view 820 (e.g., within a threshold number of pixels from the edge of live view 820). In FIGS. 8V-8W, contact 822 moves toward the right side of the display. In accordance with the rightward movement of contact 822, device 100 slides the live view display object to the right, and live view 804 shifts to the right with the live view display object. The right portion of live view 820 gradually moves out of the visible region of the camera user interface, and the left portion of live view 804 gradually enters into the visible region of the camera user interface.

Figure 8X:
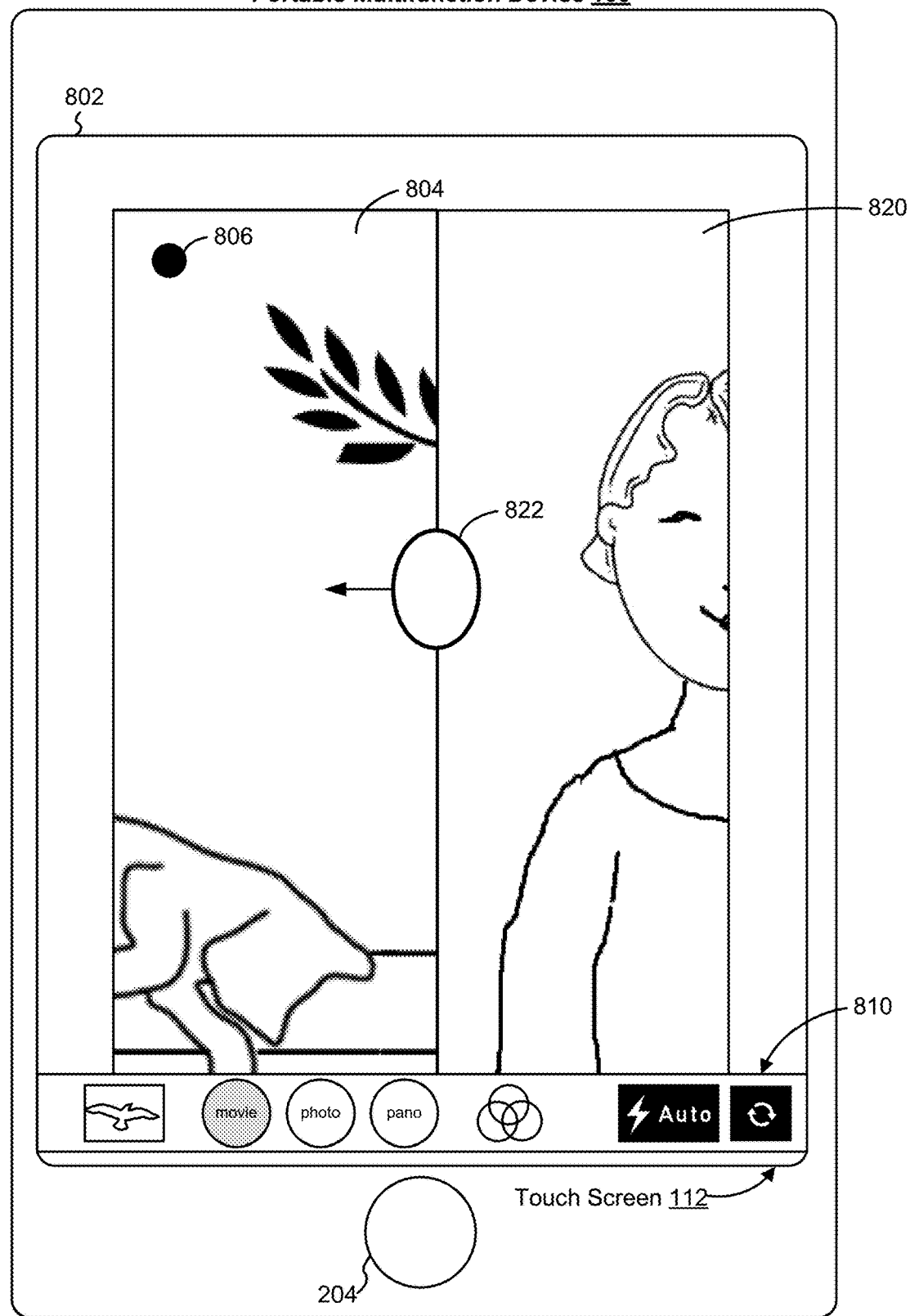

FIG. 8X illustrates that, contact 822 reverses its movement direction and moves toward the left side of the display. In accordance with the leftward movement of contact 822, device 200 slides the live view display object to the left, and live views 804 and 820 are shifted to the left. The left portion of live view 804 gradually moves out of the visible region of the camera user interface, and the right portion of live view 820 gradually reenters into the visible region of the camera user interface.

Figure 8Y:
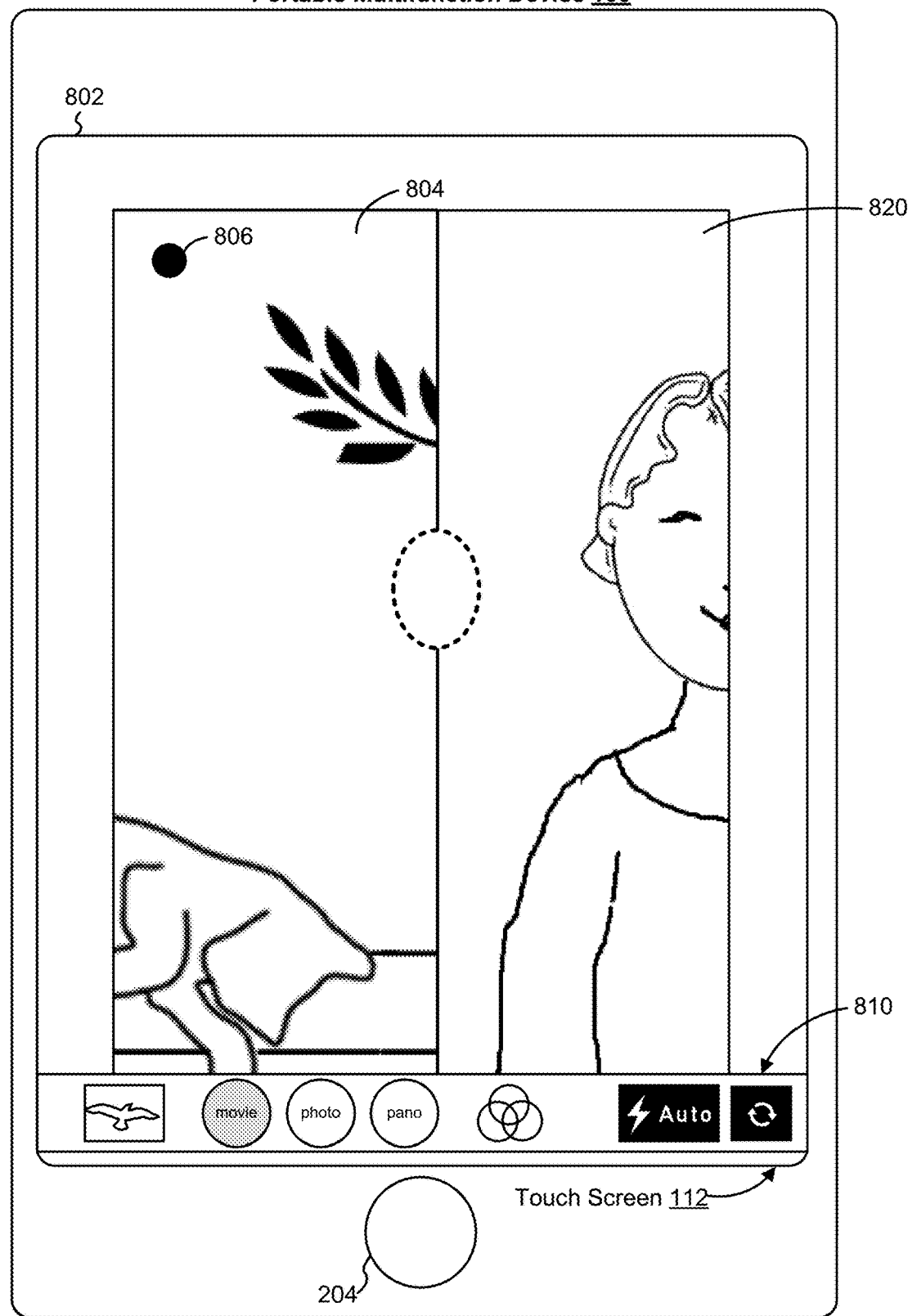

FIG. 8Y shows that, upon lift-off of contact 822, both live view 804 and live view 820 are partially visible on the camera user interface, and the visible portion of the live view display object is split between live view 804 and live view 820.

Figure 8Z:
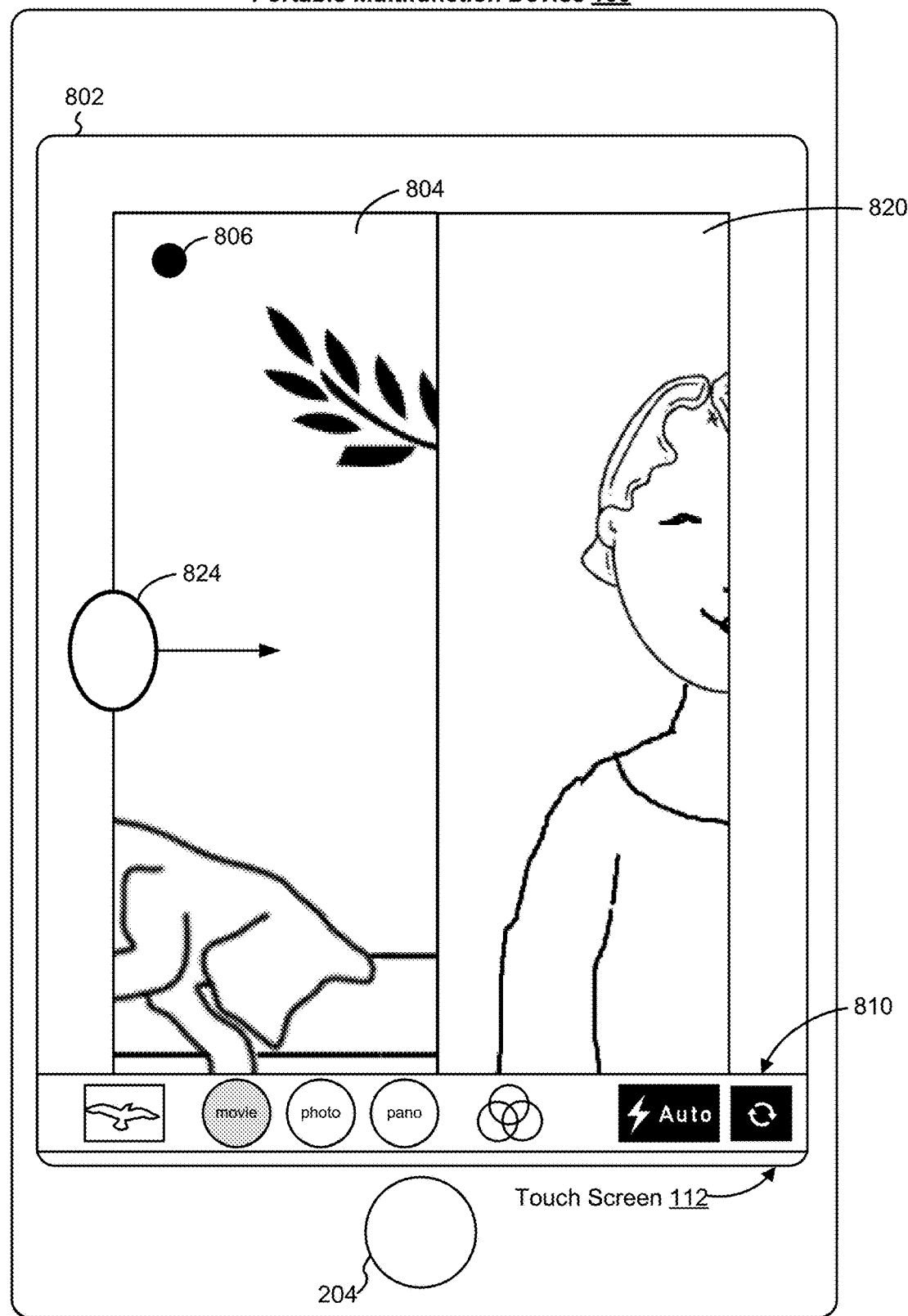
Figure 8A:
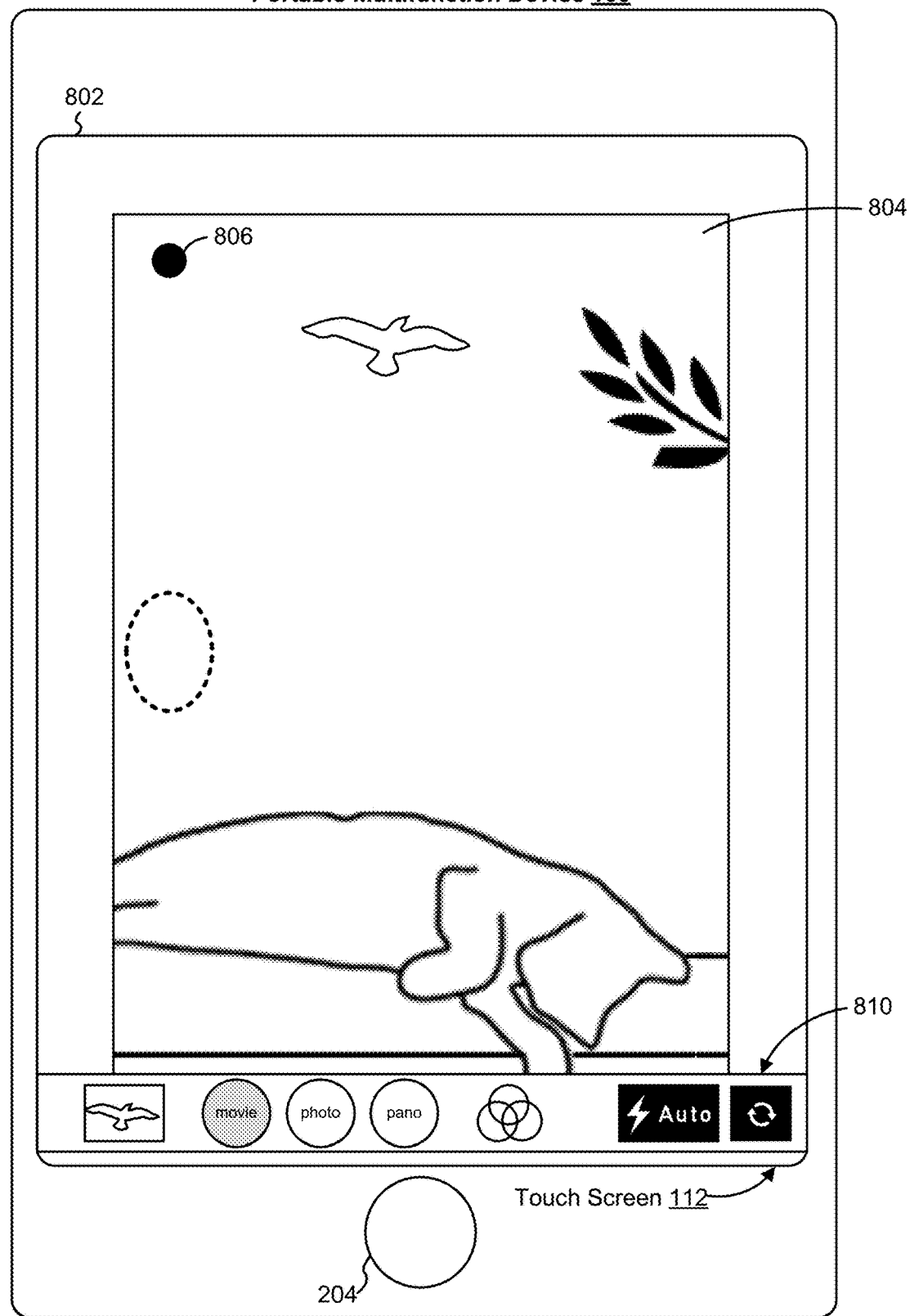
Figure 8A:
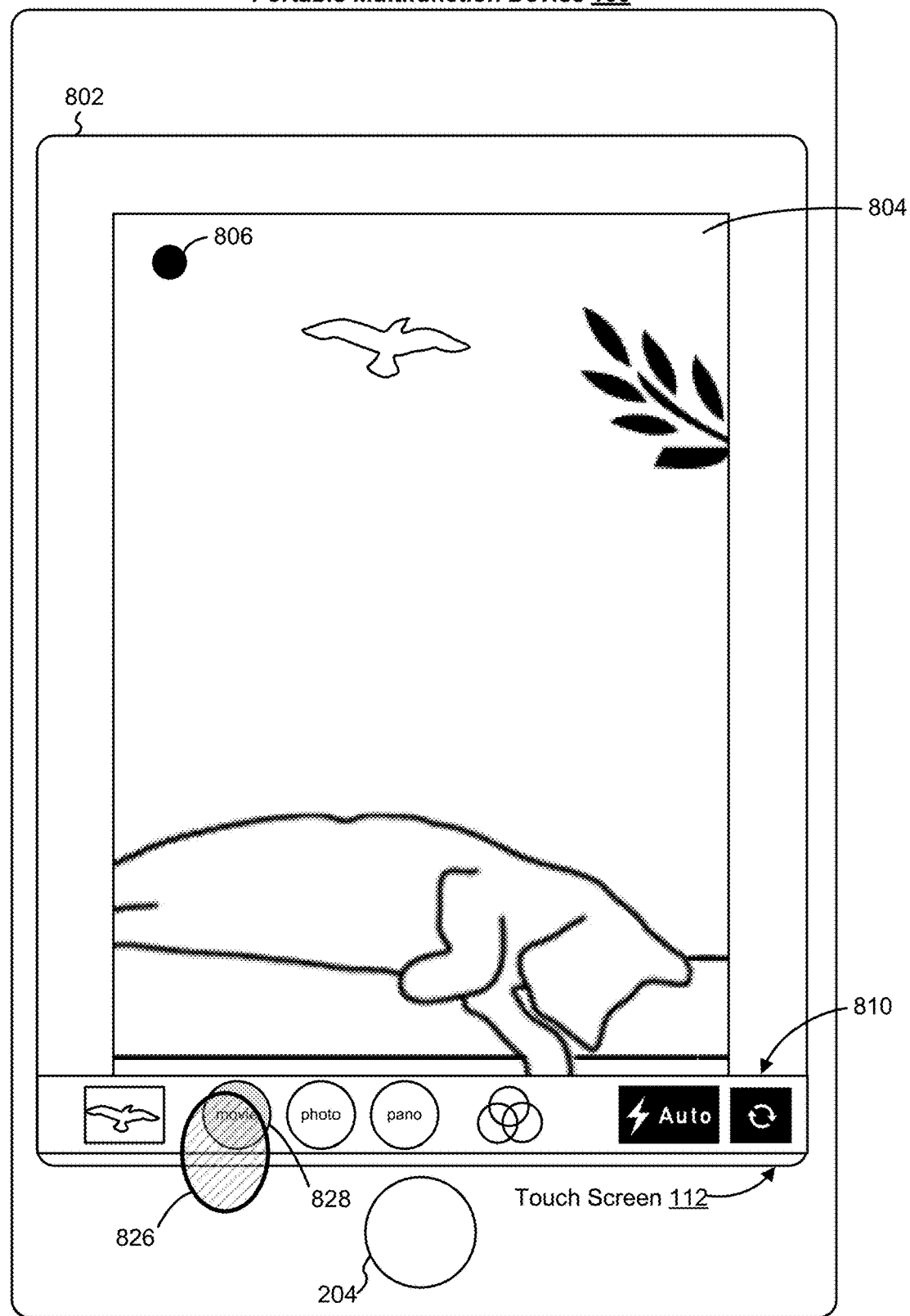
Figure 8A:
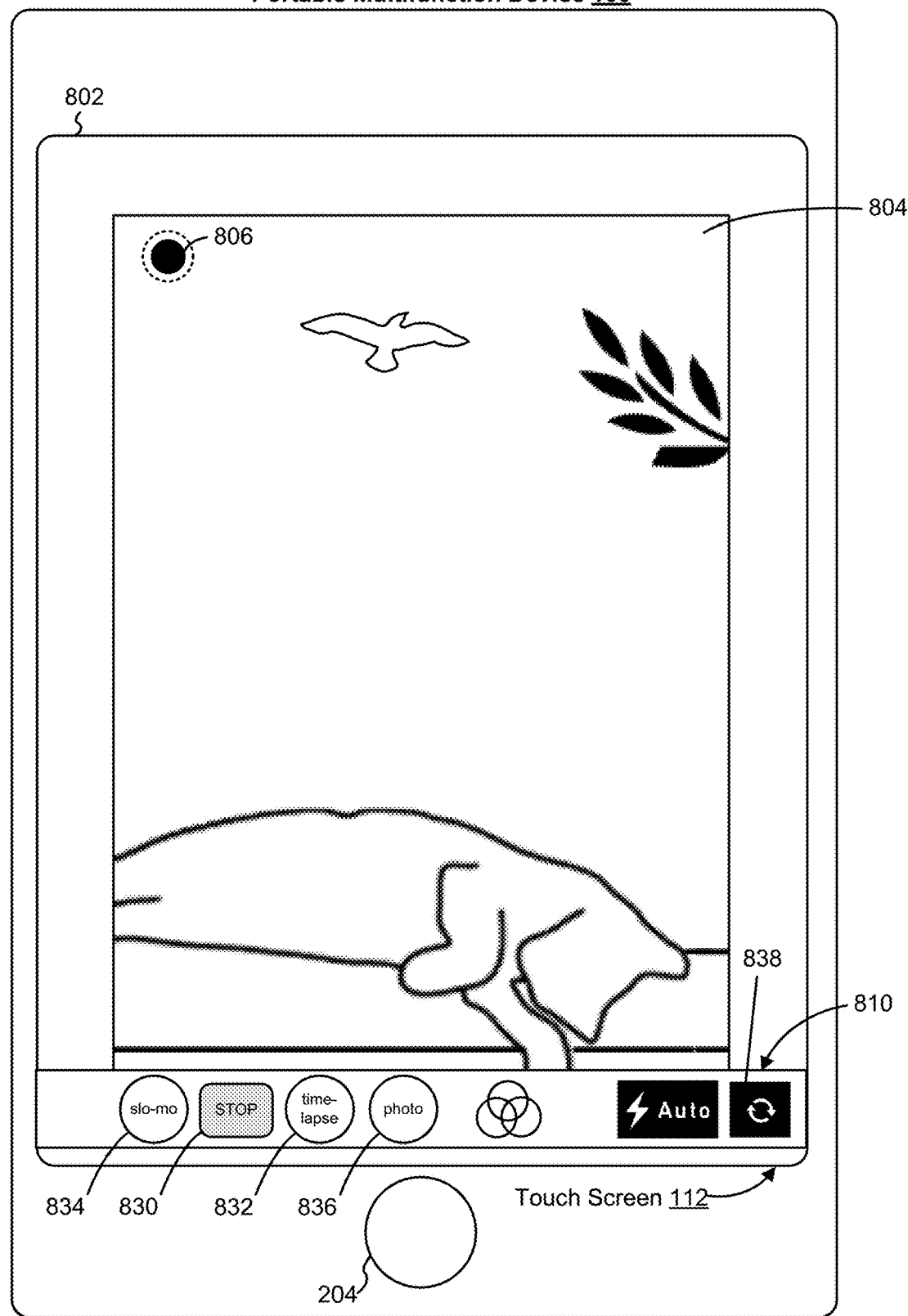

FIGS. 8Z-8AA illustrate that a flick gesture detected at the left edge of live view display object snaps the live view display object to the next live view that is coming up in the direction of the flick gesture. If there are only two live views available to the device, the flick gesture toggles between the two live views.

As shown in FIG. 8Z, the flick gesture by contact 824 is in the rightward direction, and the live view that is coming up in the direction of the flick gesture is live view 804. In response to the flick gesture by contact 824, live view 804 is shifted to the right with the live view display object, and occupies the front and center position of the camera user interface. If a flick gesture were in the leftward direction, live view 820 would be shifted to the left with the live view display object and occupied the front and center position of the camera user interface. If another flick gesture is detected on live view 804 shown in FIG. 8AA, the device will slide the live view display object and live view 804 to the left or right in accordance with the direction of the flick gesture, and display the live view 820 at the front and center position in the camera user interface.

FIG. 8AB illustrates that a tap gesture (e.g., by contact 826) is detected on movie affordance 828 in the control display region 810. In response to the tap gesture activating the movie affordance 828, device 100 activates video recording (e.g., as indicated by the changed appearance of recording indicator 806) (e.g., in a default video recording mode) of images captured by the back camera and shown in live view 804, as shown in FIG. 8AC. Device 100 also displays a new set of affordances (e.g., affordance 834 to activate a slow-motion recording mode, affordance 830 to stop current video recording, affordance 832 to activate a time-lapse recording mode, and affordance 836 to take a still photo during video recording) in the control region 810, as shown in FIG. 8AC. In some embodiments, a swipe input to the left or right on the control region 810 causes the device to switch the video recording mode, e.g., from the default video recording more to the slow-motion recording mode or to the time-lapse recording mode, respectively.

FIGS. 8J-8AA shows switching of live views from different cameras during ongoing image capture. In some embodiments, a dedicated affordance (e.g., affordance 838) in control region 810 can be used to switch the live views from different cameras. For example, a tap gesture detected on affordance 838 causes the live view shown in the camera user interface to switch to the live view of another camera that is not currently shown in the camera user interface. In some embodiments, image capture is not necessarily in progress when the above methods for switching live views are implemented.

Figure 9A:
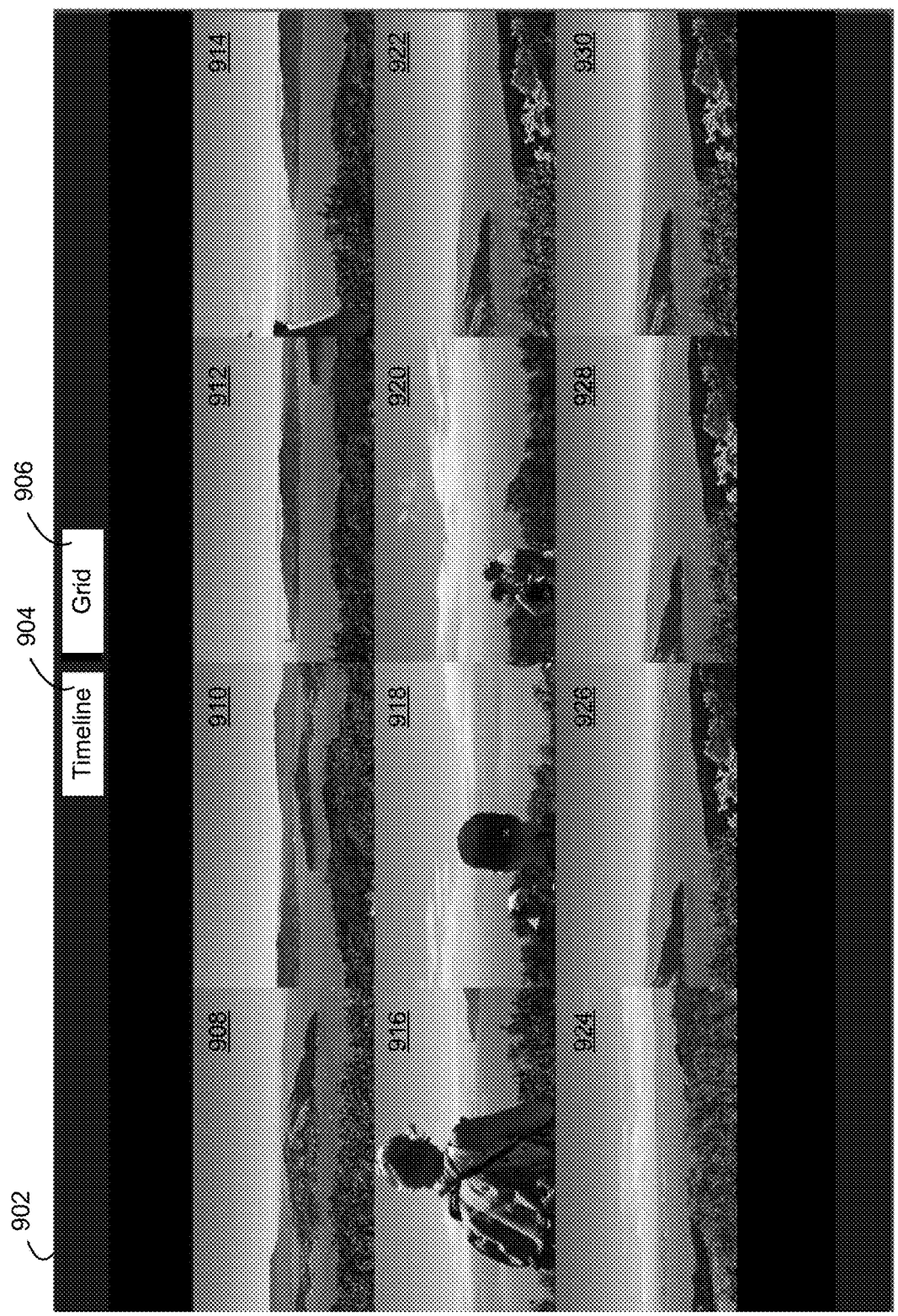
FIGS. 9A-9S illustrate example user interfaces for adjusting selected images and video clips from a video recording in accordance with some embodiments.
Figure 9B:
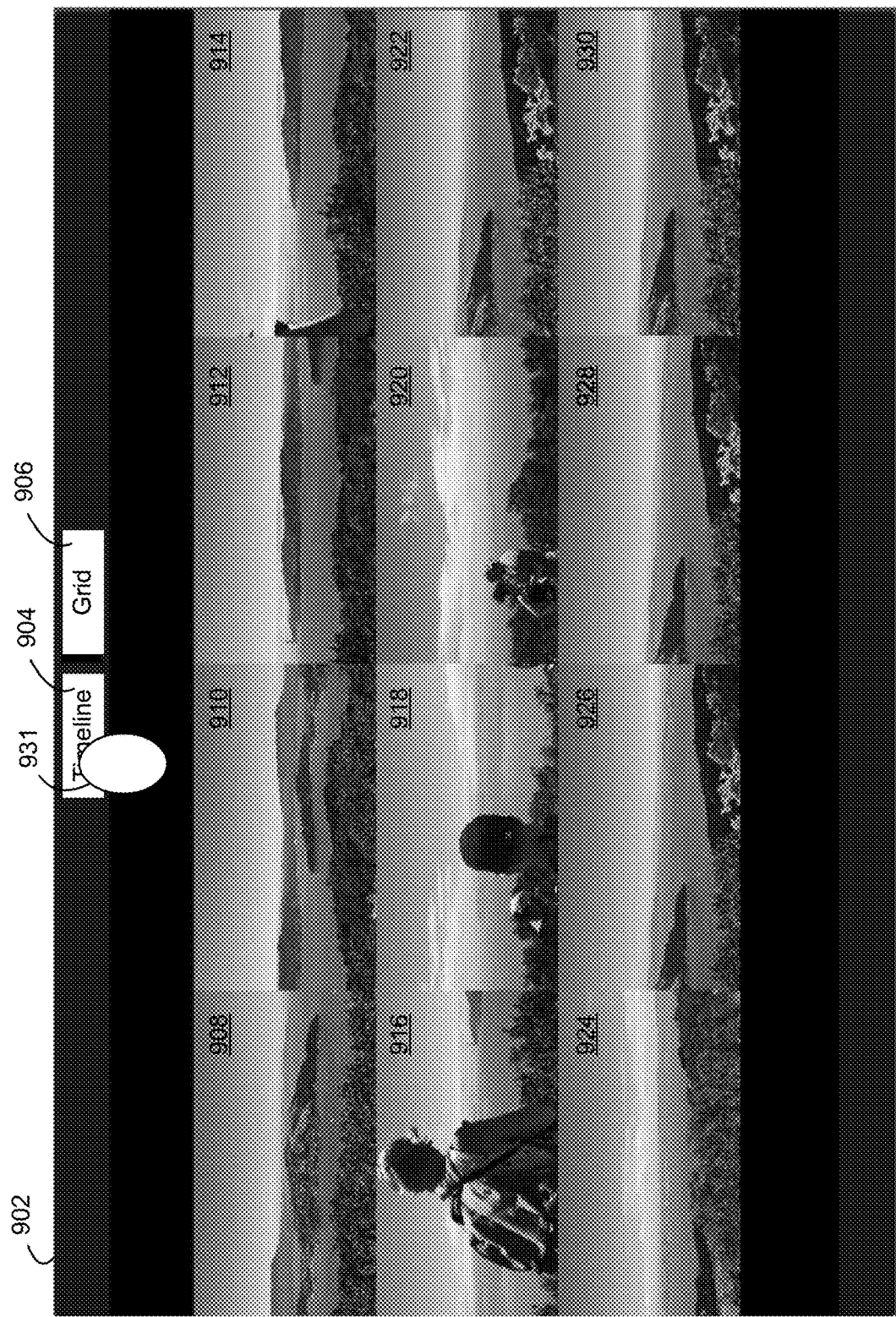
Figure 9C:
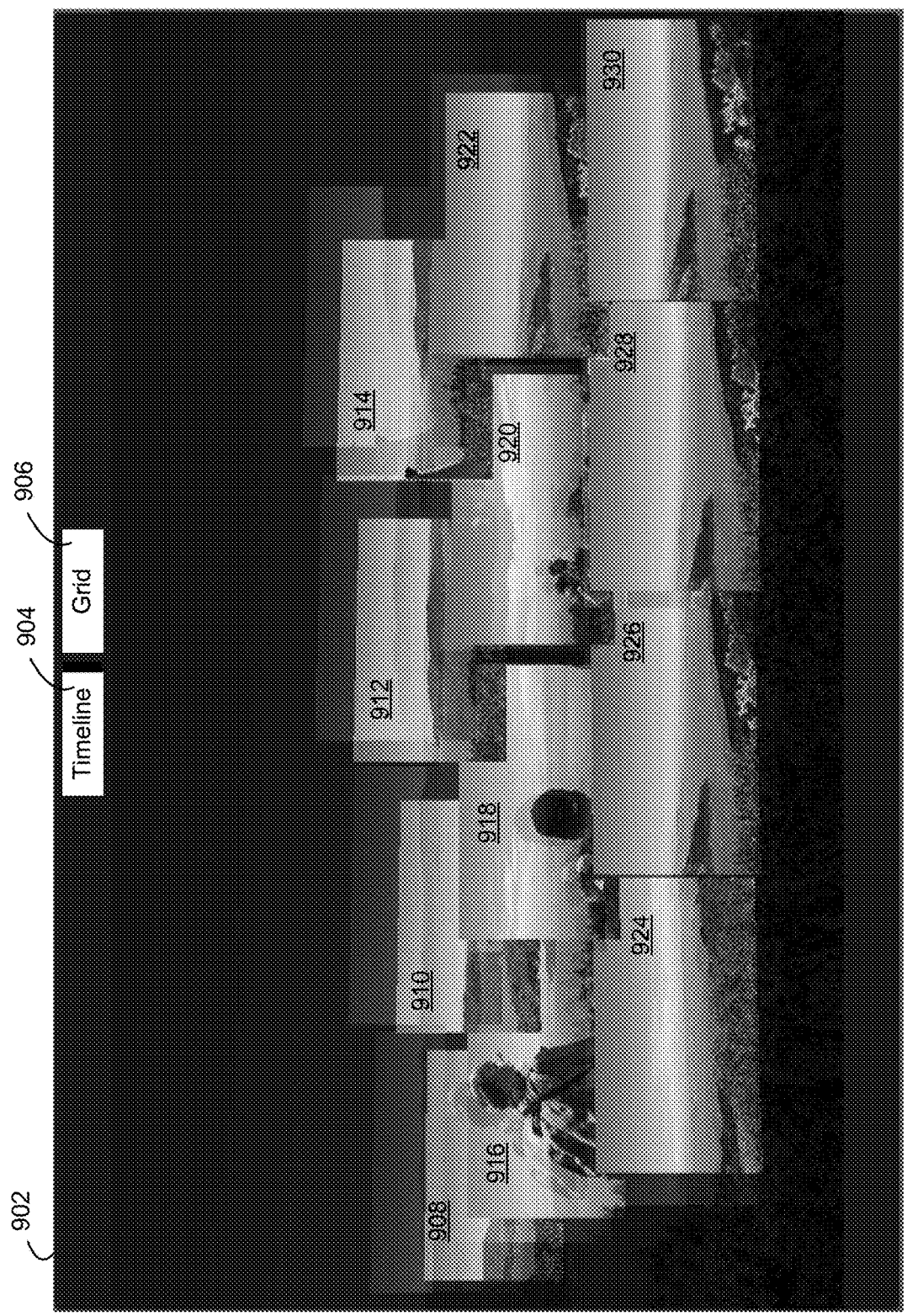
Figure 9D:
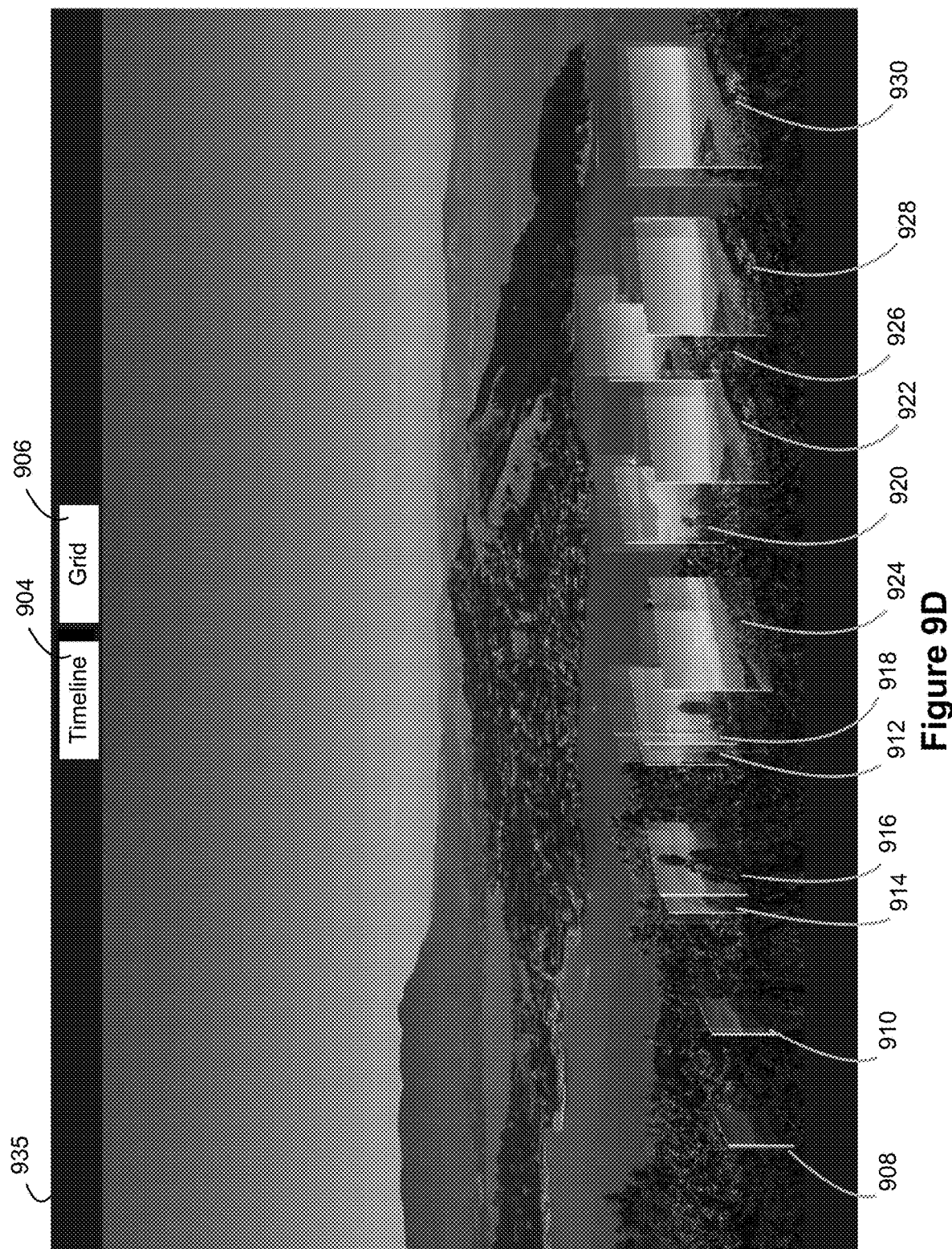
Figure 9E:
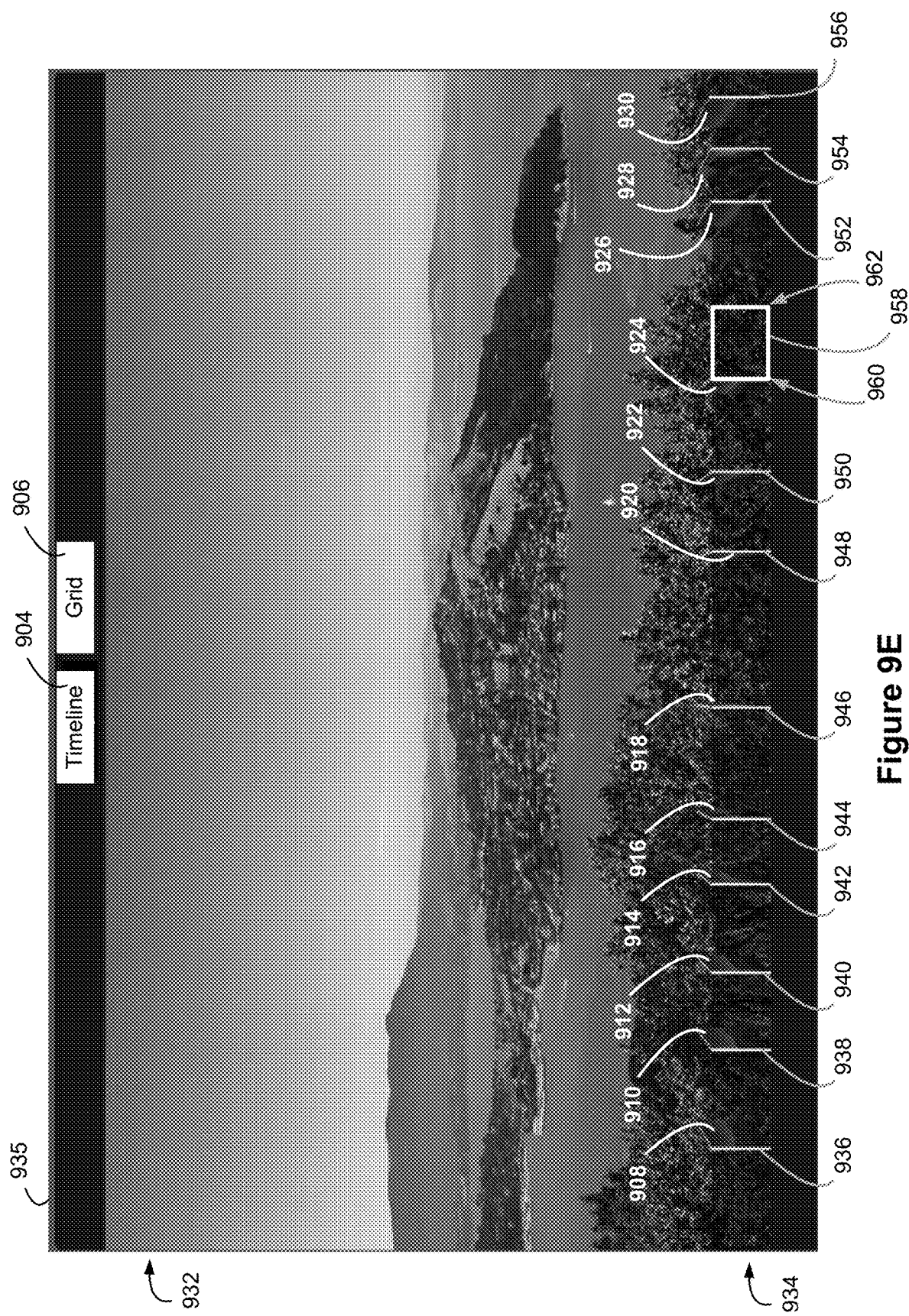
Figure 9F:
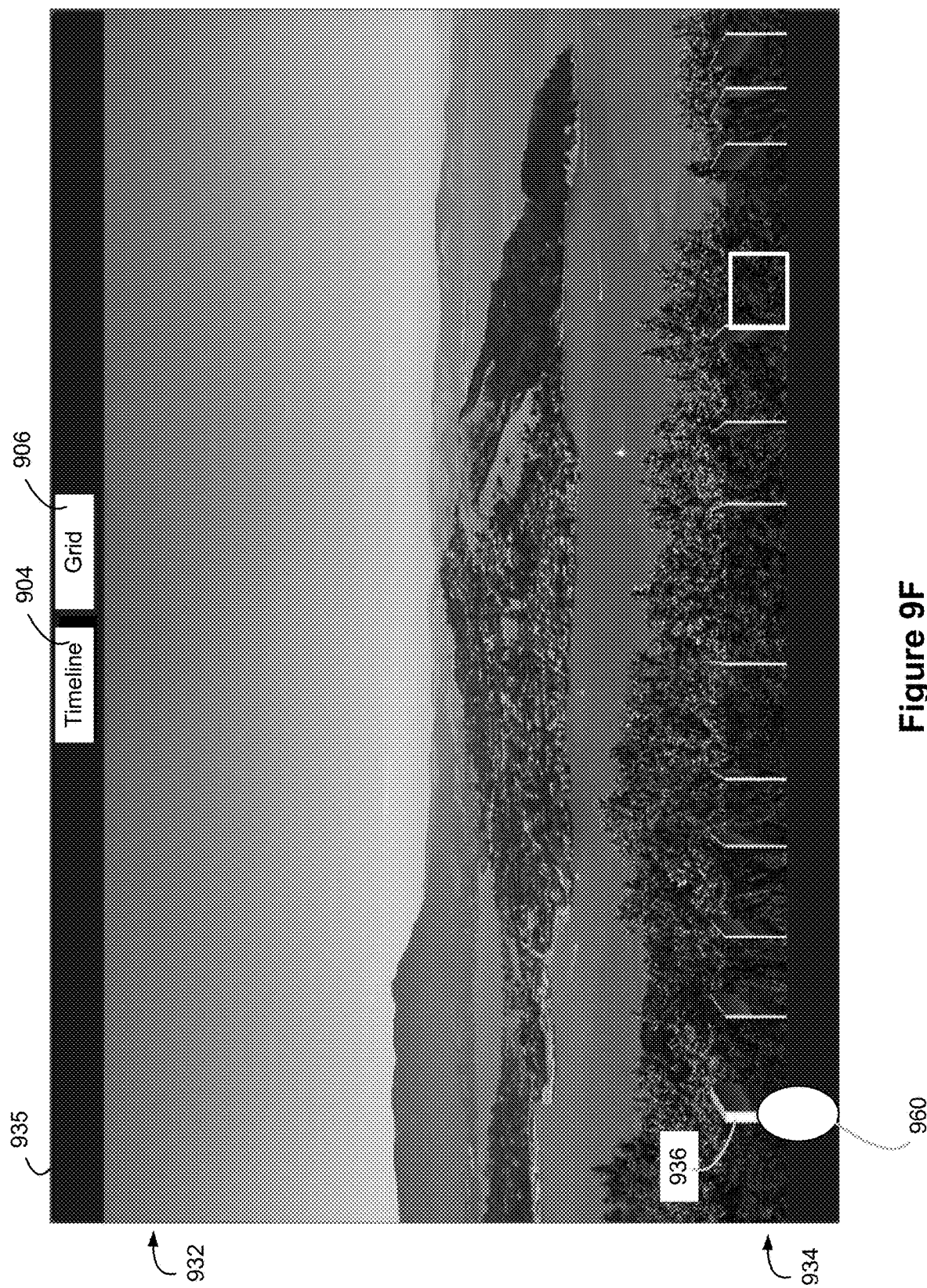
Figure 9G:
Figure 9H:
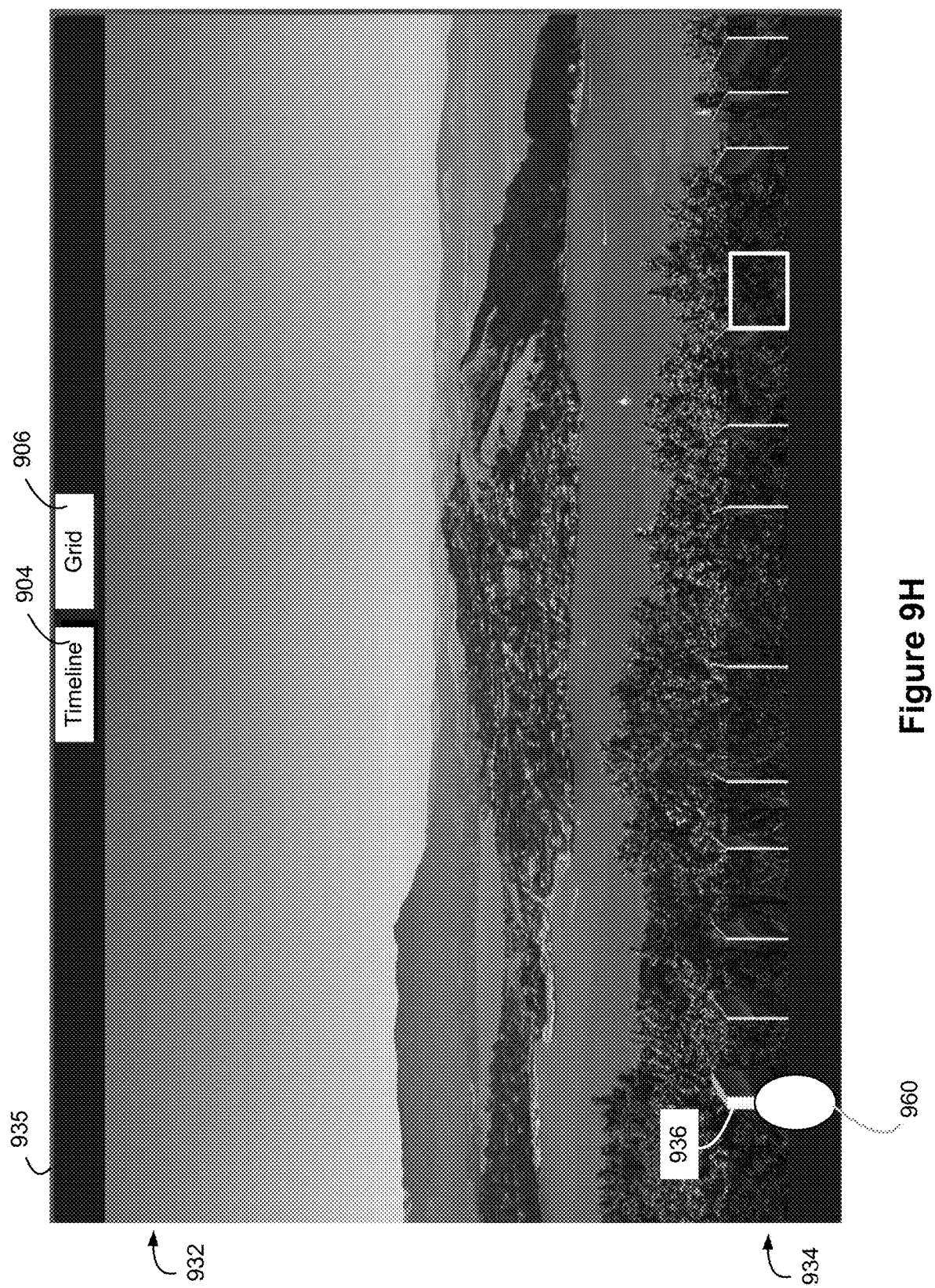
Figure 9I:
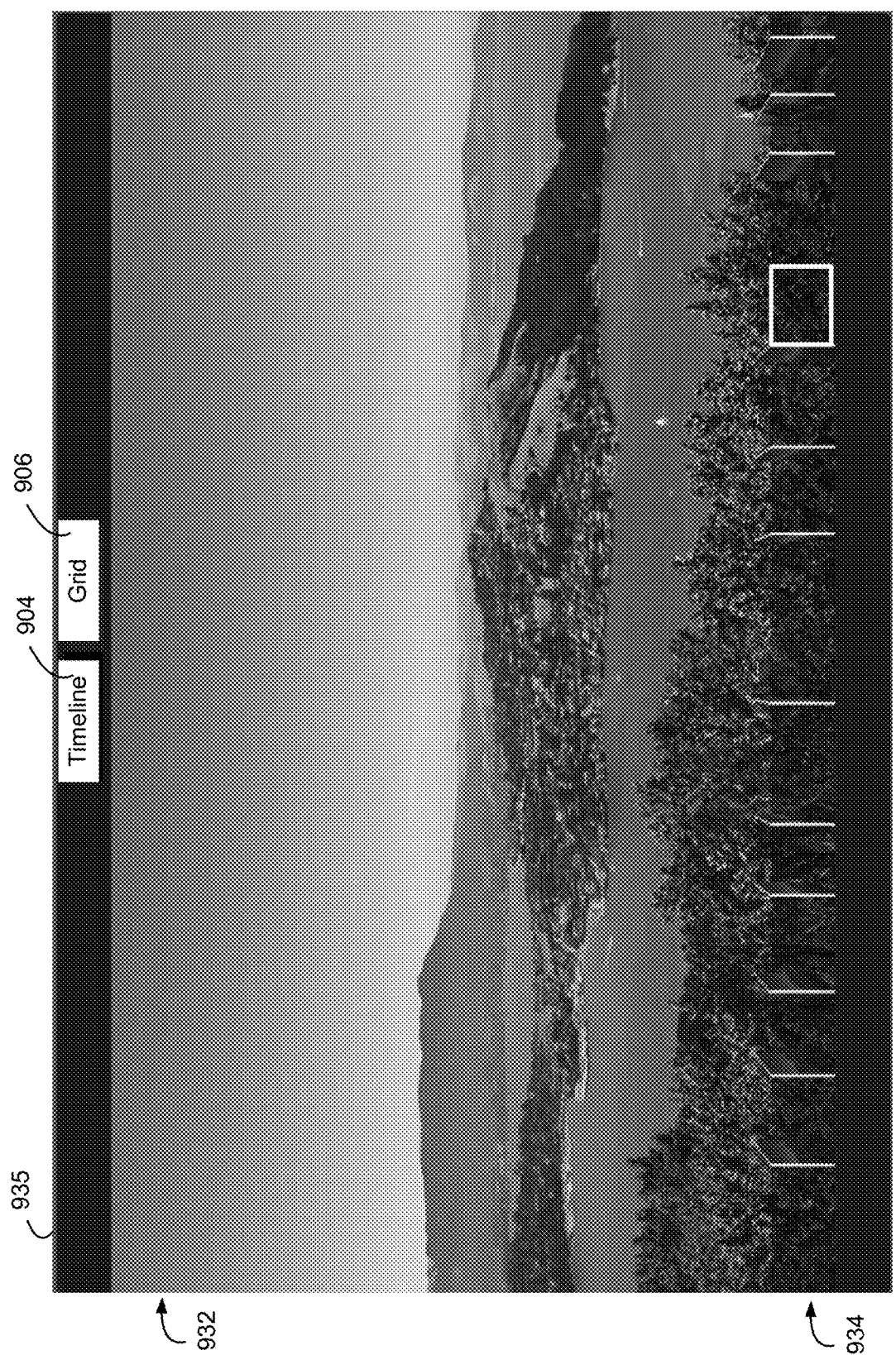
Figure 9J:
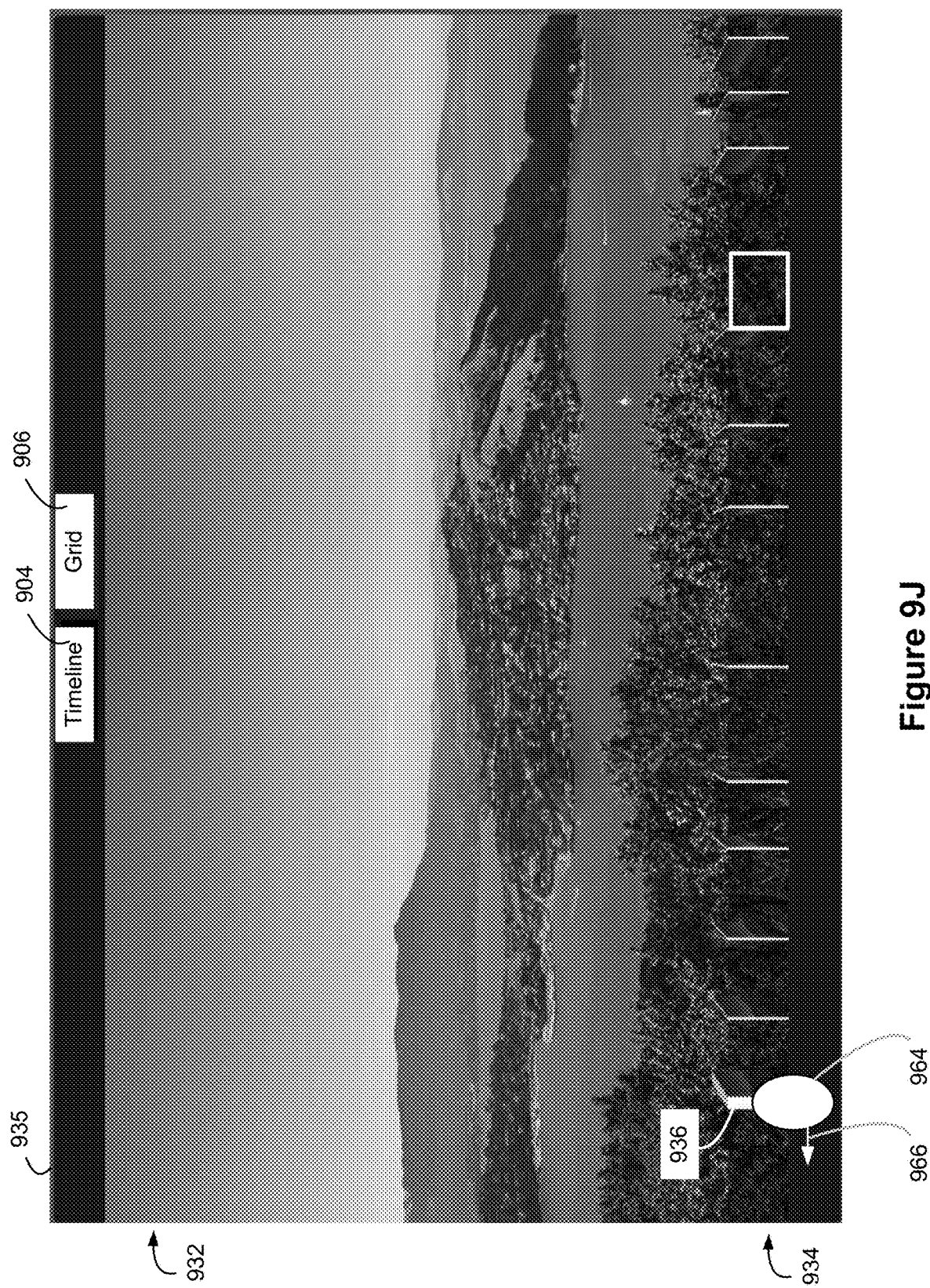
Figure 9K:
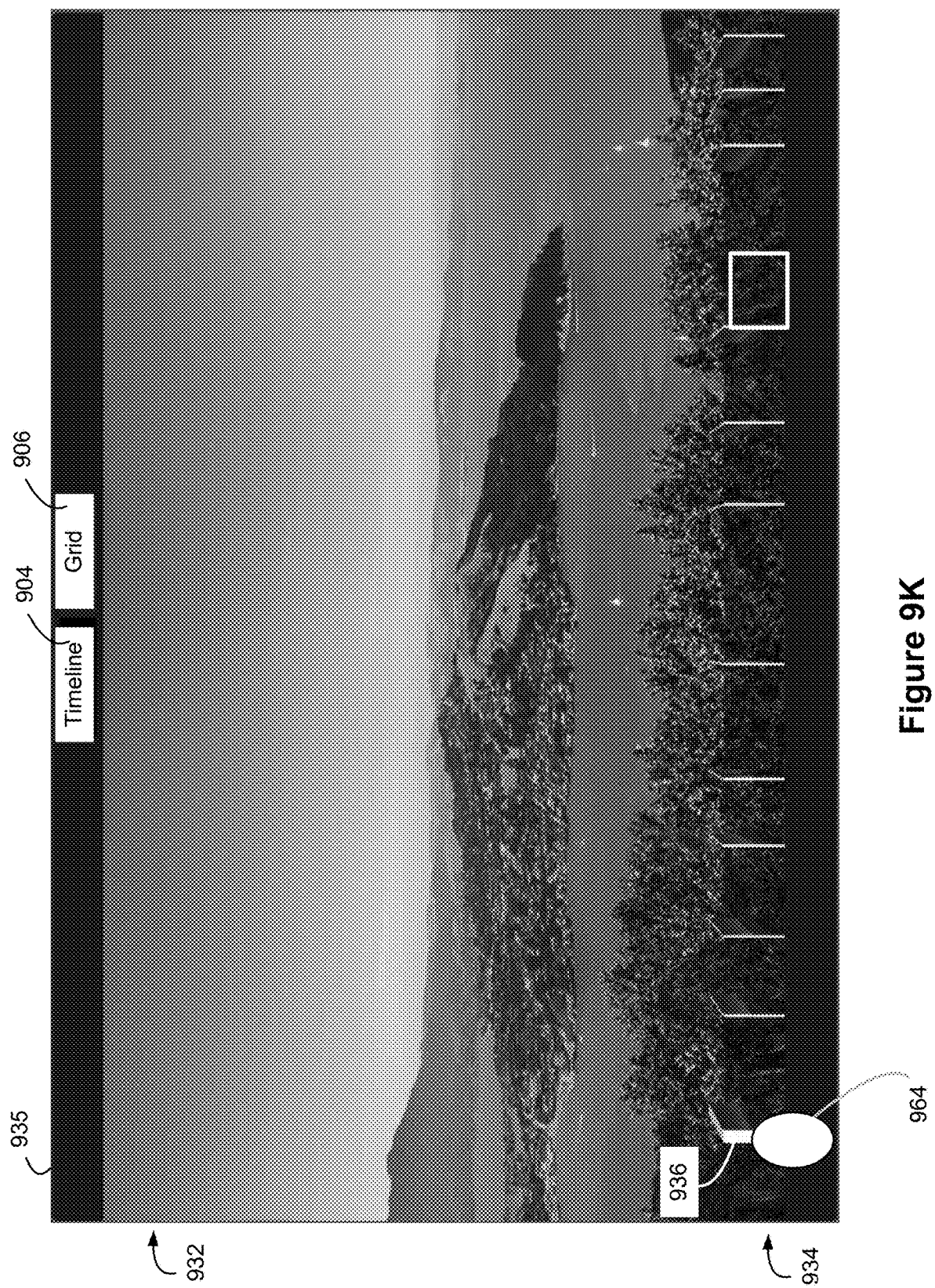
Figure 9L:
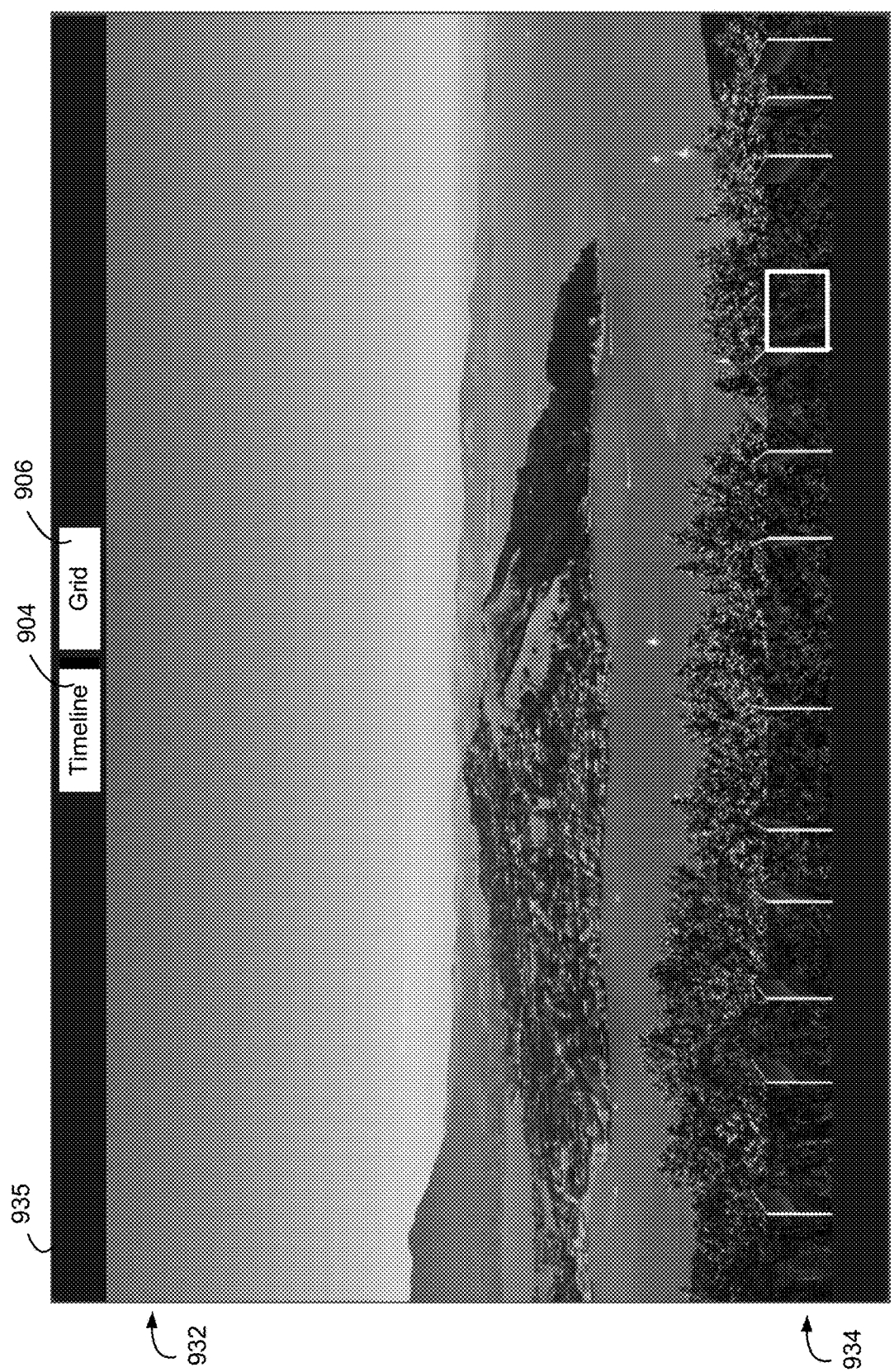
Figure 9M:
Figure 9N:
Figure 9O:
Figure 9P:
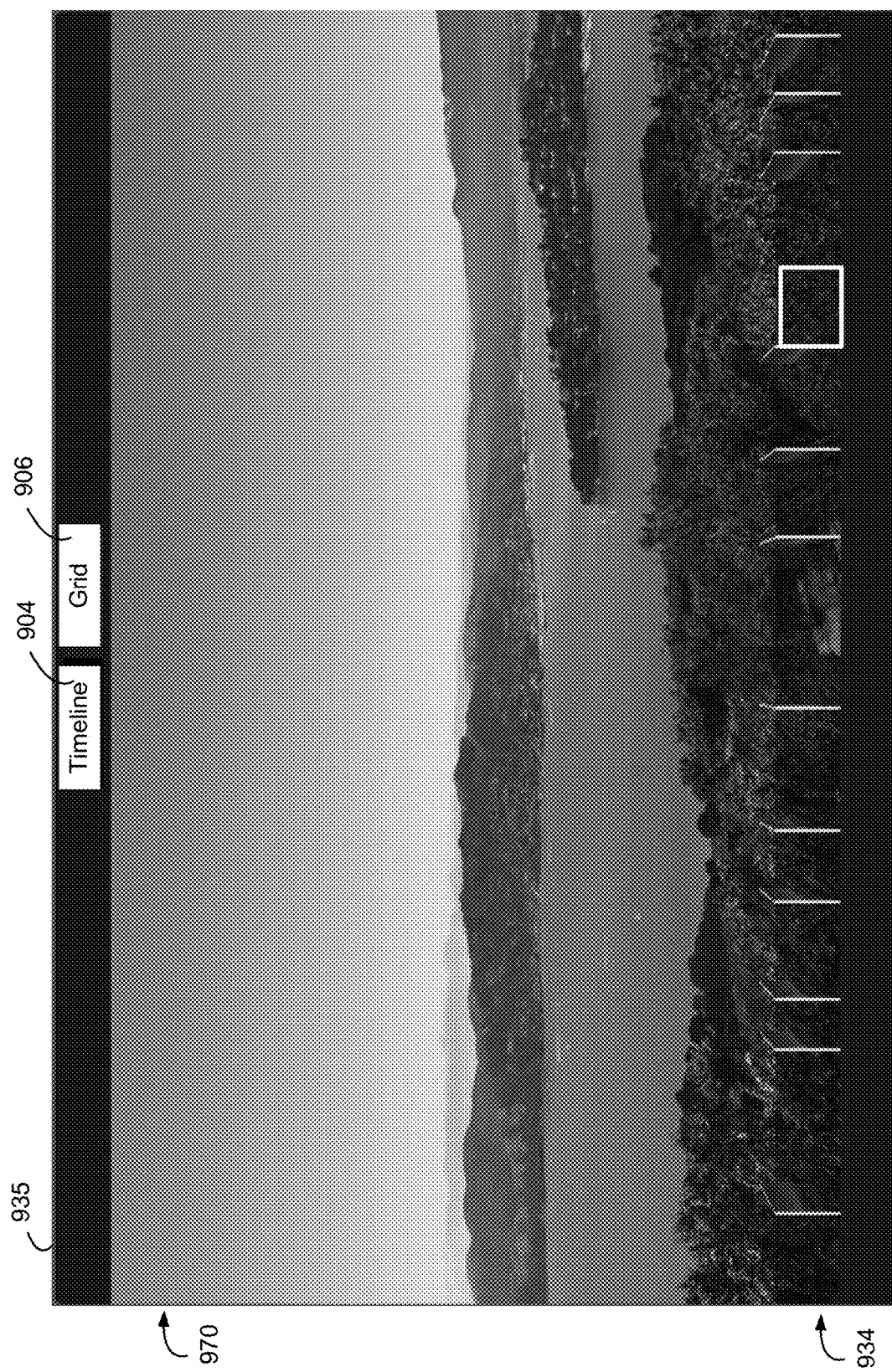
Figure 9Q:
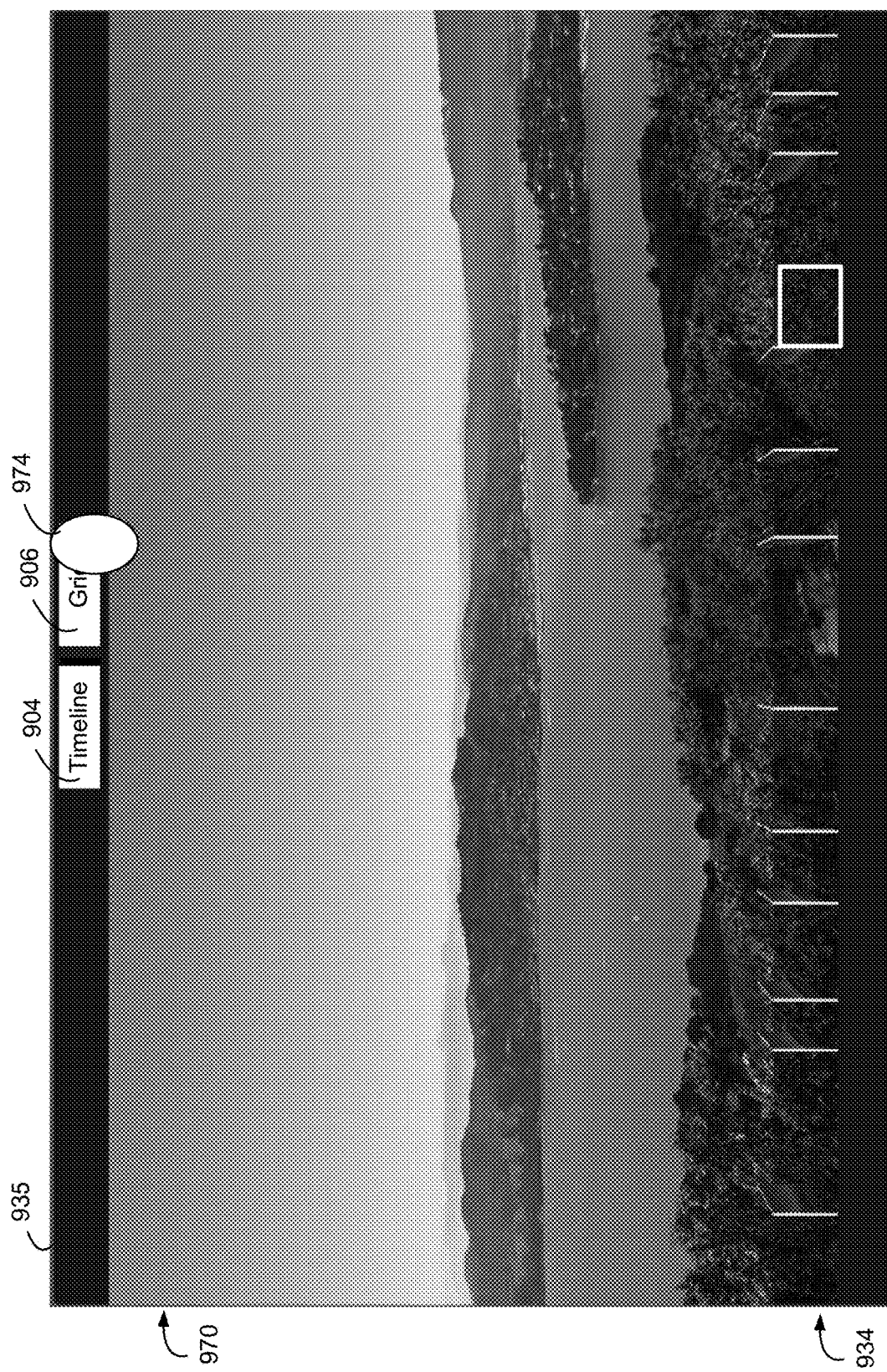
Figure 9R:
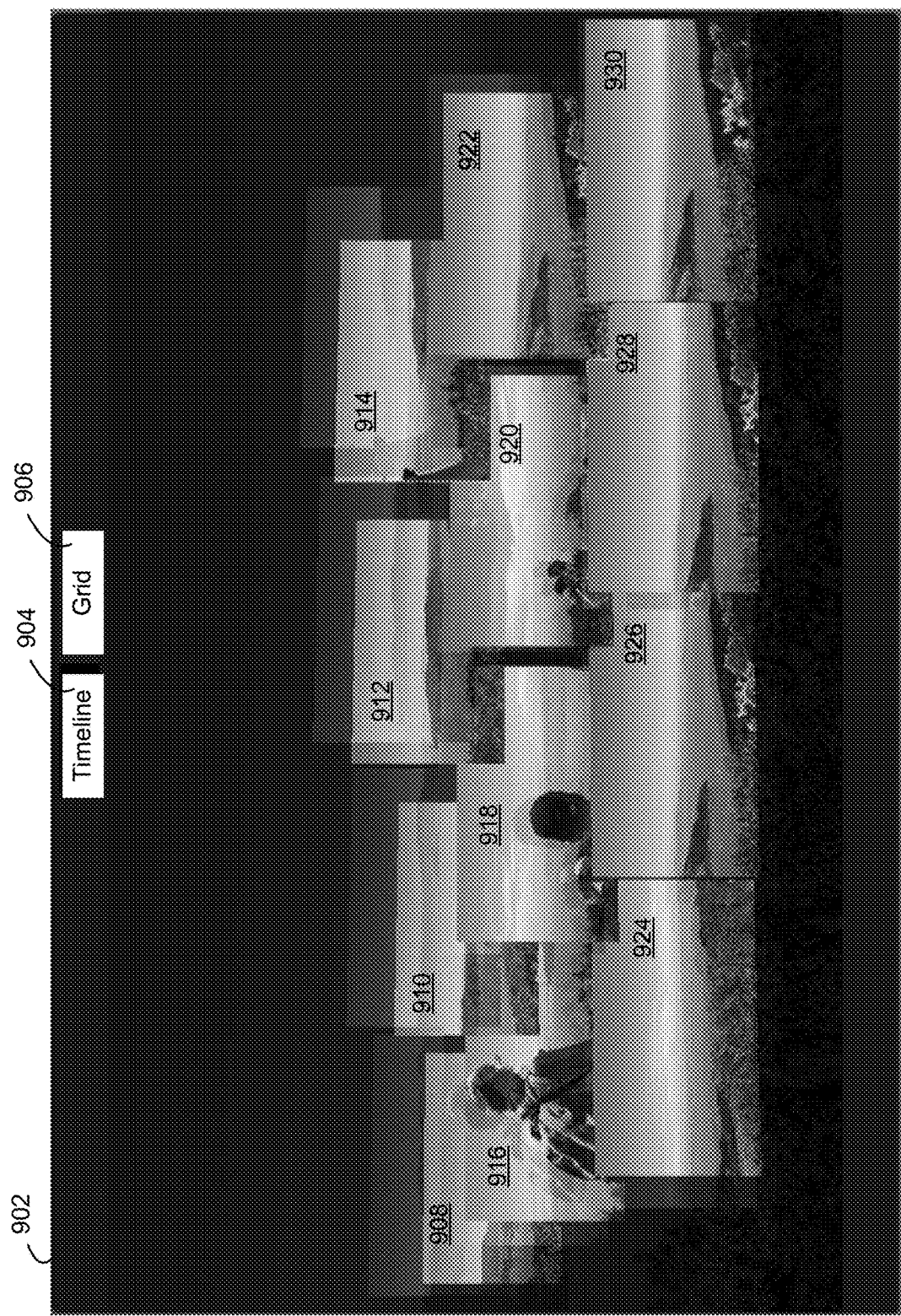
Figure 9S:
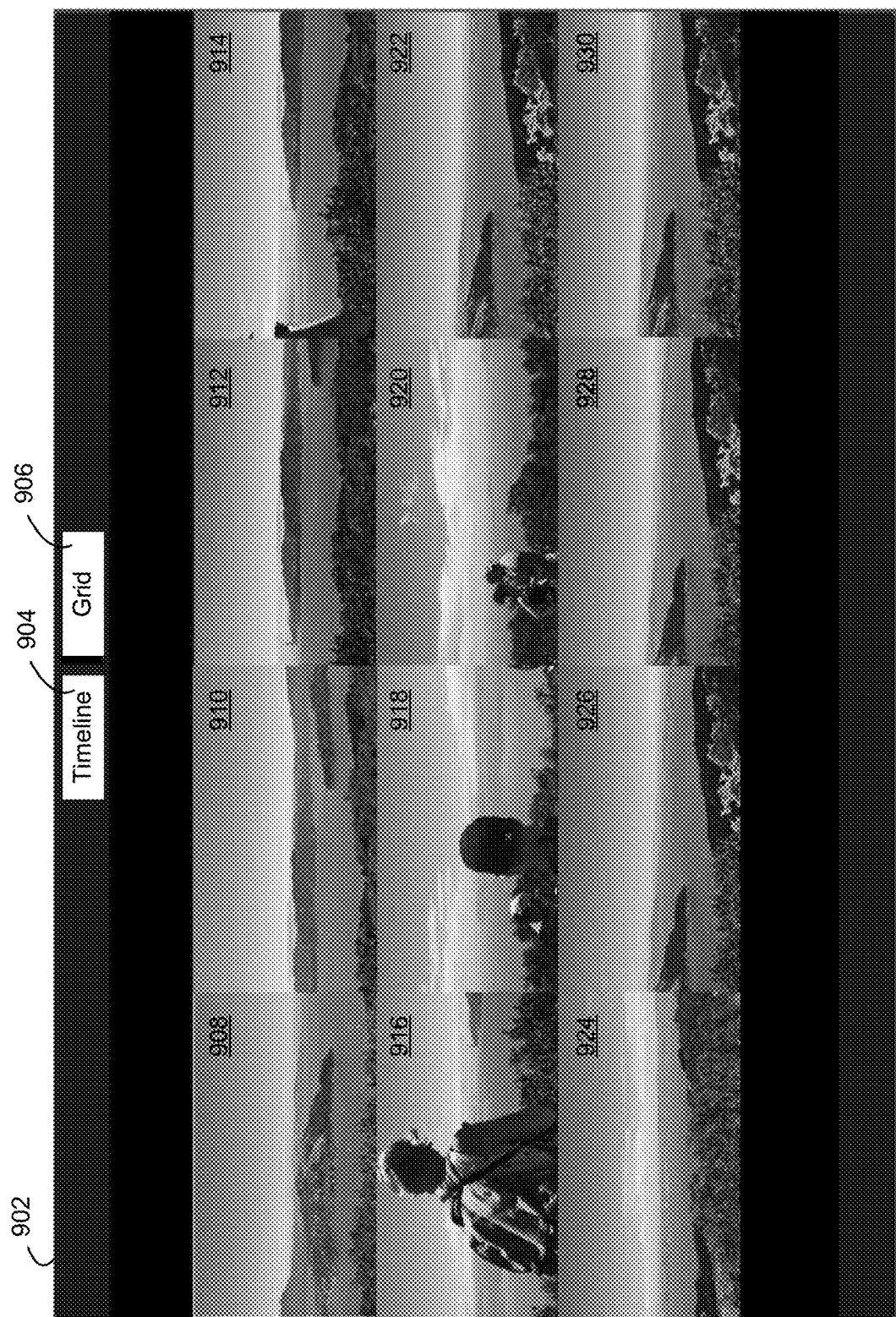

FIGS. 9A-9S illustrate exemplary user interfaces for adjusting selected images and video clips from a video recording, in accordance with some embodiments. The user interfaces in these figures are used to illustrate the processes described below, including the processes in FIGS. 18A-18D. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651).

In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 9A-9S and 18A-18D will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 9A-9S on the touch-sensitive surface 651 while displaying the user interfaces shown in FIGS. 9A-9S on the display 650, along with a focus selector.

FIG. 9A illustrates grid view user interface 902 of a media review user interface for selecting still images from a video recording, e.g., to provide an image summary of the video recording. The grid view user interface 902 includes "timeline" button 904 for accessing timeline view user interface 935 (e.g., from grid view user interface 902) and "grid" button 906 for accessing grid view user interface 902 (e.g., from the timeline view user interface 935). In some embodiments, the "grid" button is not displayed in the grid view user interface, and the "timeline" button is not displayed in the timeline view user interface.

Grid view user interface 902 includes still images 908, 910, 912, 914, 916, 918, 920, 922, 924, 926, 928, and 930 displayed in a grid layout. Still images 908-930 are selected images from the video recording. For example, still images 908-930 are images that were selected in response to user input as the video was captured or recorded, and/or images that were automatically selected (e.g., at periodic intervals) as the video was captured or recorded. In some embodiments, still images 908-930 are a sequence of images ordered (at least initially) by, e.g., timestamp in the video sequence or order in which the images were selected. As described further below with regard to FIG. 9E, still image 924 is a thumbnail image that corresponds to a selected video sub-clip of the video recording.

In FIG. 9B, an input (e.g., a tap gesture by contact 931) is detected at a location that corresponds to timeline button 904. In response to detecting the input, timeline view user interface 935 is displayed, as shown in FIG. 9E. In some embodiments, a transition from displaying grid view user interface 902, as illustrated in FIG. 9B, to displaying timeline view user interface 935, as illustrated in FIG. 9E, includes an animated transition as illustrated in FIGS. 9B-9E. For example, during the animation, still images 908-930 gradually descend from the grid as shown in FIGS. 9C-9D and, as the still images 908-930 descend, the still images are rearranged into a linear arrangement of image-adjustment objects and/or video-adjustment objects on the timeline 934, as shown in FIG. 9E. In some embodiments, during an animated transition from grid view user interface 902 to timeline view user interface 935, representation 932 of an image from still images 908-930 (e.g., a representation of still image 908), gradually fades into view.

As shown in FIG. 9E, timeline view user interface 935 includes timeline 934 that corresponds to a video recording (e.g., a video recording from which still images 908-930 were selected). Image-adjustment objects 936, 938, 940, 942, 944, 946, 948, 950, 952, 954, and 956 are displayed on timeline 934. Each of image-adjustment objects 936-958 corresponds to a still image (e.g., a still image that was displayed in the grid view interface 902). The locations of image-adjustment objects 936-958 correspond to positions of still images 908-930 within the video recording.

In some embodiments, a still image that corresponds to an image-adjustment object is displayed at a location that corresponds to an image-adjustment object. For example, a first still image 908 is displayed on a face of a first image-adjustment object 936, a second still image 910 is displayed on a face of a second image-adjustment object 938, and so on. In some embodiments, the image-adjustment objects are displayed at locations on timeline 934 that represent positions of still images 908-930 within the video recording.

As shown in FIG. 9E, video-adjustment object 958 is displayed on timeline 934. Video-adjustment object 958 represents a video sub-clip that is a portion (e.g., less than all) of the video recording represented by timeline 934. A left edge 960 of video-adjustment object 956 corresponds to start time of the video sub-clip, and a right edge 962 of the video-adjustment object 958 corresponds to an end time of the video sub-clip.

In some embodiments, a thumbnail image that corresponds to a video sub-clip is displayed at a location that corresponds to a video-adjustment object. For example, a thumbnail image 924 is displayed at the left edge 960 of video-adjustment object 958. In some embodiments, the thumbnail image is displayed at the right edge 962 of the video adjustment object 958 or within video-adjustment object 958. The thumbnail images do not necessarily correspond to the beginning or end frame of the video sub-clip, and is optionally a selected representative frame from the video sub-clip.

In some embodiments, an input received at location that corresponds to left edge 960 of video-adjustment object 958 (e.g., a drag input) adjusts the start time of the video sub-clip. As the drag input is received, a representation of an image displayed in the timeline view user interface 935 is updated to indicate an image that corresponds to the current position of the left edge 960 on timeline 934. When the drag input is complete, the start time of the video sub-clip is adjusted to a time within the video clip that corresponds to the location of left edge 960 of video-adjustment object 958 on timeline 934. In some embodiments, an input received at location that corresponds to right edge 962 of video-adjustment object 958 (e.g., a drag input) adjusts the end time of the video sub-clip. As the drag input is received, a representation of an image displayed in the timeline view user interface 935 is updated to indicate an image that corresponds to the current position of the right edge 962 on timeline 934. When the drag input is complete, the end time of the video sub-clip is adjusted to a time within the video clip that corresponds to the location of right edge 962 of video-adjustment object 958 on timeline 934.

FIGS. 9F-9H illustrate an input that selects and moves first image-adjustment object 936 rightward to update the still image 908 associated with first image-adjustment object 936.

In FIG. 9F, an input that selects first image-adjustment object 936 is detected, as indicated by focus selector 960. In response to the input, the appearance of first image-adjustment object 936 is changed (e.g., the width of image-adjustment object 936 is increased) to indicate its selected state.

In FIG. 9G, while first image-adjustment object 936 is selected by the focus selector 960, first image-adjustment object 936 begins movement along a path indicated by arrow 962 in accordance with movement of the focus selector.

In FIG. 9H, in response to the movement of focus selector 960 along the path indicated by arrow 962, first image-adjustment object 936 has moved to a new position on timeline 934 that is to the right of the previous position of first image-adjustment object 936 (as illustrated in FIG. 9G) and the representation 932 of still image 908 is updated. The updated representation 932 of still image 908 is an image that corresponds to the new position of first image-adjustment object 936 on timeline 934. In FIG. 9I, termination of the previous input has been detected and no image-adjustment object is currently selected (e.g., no image-adjustment appears widened or highlighted) in the timeline.

FIGS. 9J-9K illustrate an input that selects and moves first image-adjustment object 936 leftward to update the still image 908 associated with first image-adjustment object 936.

In FIG. 9J, an input that selects first image-adjustment object 936 is detected, as indicated by focus selector 964. While first image-adjustment object 936 is selected by the focus selector 964, the first image-adjustment object 936 begins movement along a path indicated by arrow 966 in accordance with the movement of focus selector 964.

In FIG. 9K, in response to the movement of focus selector 964 along the path indicated by arrow 966, first image-adjustment object 936 has moved to a new position on timeline 934 that is to the left of the previous position of first image-adjustment object 936 (as illustrated in FIG. 9J), and the representation 932 of still image 908 is updated. The updated representation 932 of still image 908 is an image that corresponds to the new position of image-adjustment object 936 on timeline 934. In FIG. 9L, termination of the previous input has been detected and no image-adjustment object is currently selected (e.g., no image-adjustment appears widened or highlighted) in the timeline.

FIGS. 9M-9O illustrate an input that selects and moves second image-adjustment object 938 rightward to update the still image 910 associated with the image-adjustment object 938.

In FIG. 9M, an input that selects second image-adjustment object 938 is detected, as indicated by focus selector 968. In response to the input, the appearance of second image-adjustment object 938 is changed (e.g., the width of second image-adjustment object 938 is increased) and representation 970 of still image 910 is displayed in the timeline view user interface 935.

In FIG. 9N, while the second image-adjustment object 938 is selected by the focus selector 968, the second image-adjustment object 938 begins movement along a path indicated by arrow 972 in accordance with the movement of focus selector 968.

In FIG. 9O, in response to the movement of focus selector 968 along the path indicated by arrow 972, second image-adjustment object 938 has moved to a new position on timeline 934 that is to the right of the previous position of second image-adjustment object 938 (as illustrated in FIG. 9N) and the representation 970 of still image 910 is updated. The updated representation 970 of still image 910 is an image that corresponds to the new position of second image-adjustment object 938 on timeline 934. In FIG. 9P, termination of the previous input has been detected and no image-adjustment object is currently selected (e.g., no image-adjustment appears widened or highlighted) in the timeline.

In FIG. 9Q, an input (e.g., a tap input) is detected at a location that corresponds to grid button 906, as indicated by focus selector 974. In response to the input, grid view user interface 902 is redisplayed, as indicated in FIG. 9S. In some embodiments, a transition from displaying timeline view user interface 935, as illustrated in FIG. 9Q, to displaying grid view user interface 902, as illustrated in FIG. 9S, includes an animated transition as illustrated in FIGS. 9Q-9S. For example, during the animation, still images 908-930 gradually rise from the timeline 934 and, as the still images 908-930 rise, the still images are rearranged into a grid arrangement of still images 908-930. The grid of still images 908-930 displayed in grid view interface 902 includes an updated version of still image 908, as indicated by representation 932 of still image 908 in FIG. 9K (e.g., after the adjustments illustrated in FIGS. 9F-9K were made to first image-adjustment object 936 to update the still image 908), and an updated version of still image 910, as indicated by representation 970 of still image 910 in FIG. 9O (e.g., after the adjustments illustrated in FIGS. 9M-9O were made to second image-adjustment object 938 to update the still image 910).

FIGS. 10A-10E are flow diagrams illustrating a method 1000 of concurrently capturing and editing digital media in accordance with some embodiments. As described below, method 1000 relates to displaying a frame stream (e.g., a plurality of freshly captured and recorded media images scrolling across the display as frames in a first direction) with a live view from a camera in a camera user interface. The frame stream scrolling across the camera user interface provides visual feedback to the user and serves as a visual reminder of media images that have been just been captured and/or recorded. The frame stream also allows the user some time to provide additional input to mark, review, or manipulate the images that are represented in the frame stream, without interrupting the media capture and recording. Providing the frame stream with the live view from the camera enhances the operability of the device and makes the user-device interface more efficient (e.g., by providing timely visual reminders of recently recorded images, providing opportunity to request additional operations to be performed with regard to these recently recorded images without interrupting the ongoing media capture and recording, and helping the user to provide proper inputs and reduce user mistakes when operating/interacting with the device) which, additionally, reduces power usage and improves battery life of the device by enabling the user to use the device more quickly and efficiently.

The method 1000 is performed at an electronic device with one or more processors, memory, a camera (e.g., mounted on the back of the electronic device, facing away from the user), and a display (e.g., a touch-sensitive display). In some embodiments, the electronic device includes a second camera (e.g., mounted on the front of the electronic device, facing towards the user). Some operations in method 1000 are, optionally, combined and/or the order of some operations is, optionally, changed.

The device displays (1002) a camera user interface on the display (e.g., user interface 500 on touch screen 112 in FIG. 5C), the camera user interface including a live view from the camera (e.g., showing branch 502 in FIG. 5C). In some embodiments, the camera user interface also includes an affordance for initiating recording of images, one or more affordances for setting a mode of operation (e.g., flash/lighting settings, dynamic-range settings, and/or image filter settings), and an affordance for switching between the (first) camera and a second camera.

While displaying the live view from the camera, the device records (1004) media images (e.g., images) that are captured by the camera (e.g., recording a video with an aspect ratio, resolution, and frame rate that supports post processing into any of a video, burst set of photos, and high-resolution photography), while continuing to display the live view from the camera (e.g., device 100 is recording images of tree branch 502 in FIG. 5C, or device 100 is recording images as a video in FIGS. 5V-5X). In some embodiments, audio is recorded as well. In addition, the device displays representations of a plurality of media images that were recorded while displaying the live view from the camera (e.g., representations of some of the plurality of captured media frames displayed in a scroll) as frames scrolling across the display in a first direction (e.g., as images in the recording are captured, every Xth image is scrolled across a bottom portion of the live image in a right to left direction on the touch-sensitive display). For example, as device 100 records images that include branch 502 and cat 510, in FIGS. 5D-5G, frames 508, 509, et al. are scrolled, from right to left, across the bottom portion of the live view, in scroll 506. In another example, device records images in FIGS. 5V-5W, and frames 556-562 are scrolled from right to left, across the bottom portion of the live view, in scroll 506. These frames show small versions of images captured by the device. Not every recorded image is displayed in scroll 506 (e.g., cat 510 is not visible in frame 509 and then, in the next frame 512, three fourths of the cat has entered into the camera's field of view). In some embodiments, when a media capture application is first launched, the device displays a live view from the camera, but the images being captured by the camera are not being recorded (e.g., designated for persistent storage in the memory, subject to automatic and/or manual processing or deletion) until a user input activates the recording (e.g., in some embodiments, in FIG. 5A, device 100 is capturing images of branch 502, but does not begin to record the images and scroll frames of the images across the screen until detecting a tap including contact 504 in FIG. 5B. After detecting the tap, the device begins recording the captured images and displaying scroll 506, in FIG. 5C (e.g., in some embodiments, if device 100 is only capturing images but does not begin to record the images after detecting a tap including contact 504 in FIG. 5B, the device begins recording the captured images when a long press input is detected, e.g., in FIGS. 5V-5W, and recorded frames are displayed in scroll 506, in FIGS. 55V-5X). In some embodiments, as soon as the media capture application is launched, the device begins recording media (e.g., without separate user activation of recording).

In some embodiments, prior to recording the media images that were captured by the camera, while displaying the live view from the camera, the device captures (1006), without recording, media images that correspond to the live view from the camera; and detects a first input that activates recording of media images with the camera (e.g., detecting a tap input on the live view from the camera or an affordance (e.g., a record button) for initiating capture of media (e.g., displayed over the live view)). In some embodiments, the recording of the media images is started in response to detection of the first input. For example, in some embodiments, device 100 is captures images of branch 502, in FIG. 5A, but does not begin to record the images and scroll frames of the images across the screen until detecting a tap including contact 504 in FIG. 5B. After detecting the tap, the device begins recording the captured images and displaying scroll 506, in FIG. 5C.

In some embodiments, "capturing" media refers to automatic, temporary, and real-time storage of media by the electronic device without active intervention from the user. In some embodiments, media that are captured by the camera are automatically stored (e.g., in a memory of the electronic device) for a predetermined duration (e.g., while the camera user interface is active, or for 24 hours after capture), and are automatically deleted or overwritten unless instructions are received from the user to mark the captured media for subsequent processing (e.g., marking, editing, compression, conversion, etc.) and/or persistent storage. In some embodiments, media that are marked for subsequent processing or persistent storage (e.g., in accordance with user input or a preconfigured device setting) are considered "recorded." Starting the recording in response to user input helps to reduce unnecessary usage of storage space and gives the user more control over the operation of the device. The conservation of storage space and improved user control enhance the operability of the device and make the user-device interface more efficient (e.g., by freeing up storage space for other uses, helping the user to provide proper inputs and reducing user mistakes when operating/interacting with the device) which, additionally, reduces power usage and improves battery life of the device by enabling the user to use the device more quickly and efficiently.

In some embodiments, the display of the representations of the plurality of media images as frames scrolling across the display is (1008) started in response to the detection of the first input (e.g., a tap gesture by contact 504 in FIG. 5B, in some embodiments) (e.g., a long press input by contact 558 in FIG. 5V, in some embodiments where only capturing and not recording is started by an earlier tap input). Displaying the frame stream in response to user input helps to reduce unnecessary visual clutter and gives the user more control over the operation of the device. The conservation of display space and improved user control enhance the operability of the device and make the user-device interface more efficient (e.g., by freeing up display space for other uses, helping the user to provide proper inputs and reducing user mistakes when operating/interacting with the device) which, additionally, reduces power usage and improves battery life of the device by enabling the user to use the device more quickly and efficiently.

In some embodiments, the display of the representations of the plurality of media images as frames scrolling across the display is (1010) started prior to the detection of the first input (e.g., the display of the representations of the plurality of media images as frames scrolling across the display is started as soon as the capturing of the media images is started; e.g., in some embodiments, the application is launched into the state shown in FIG. 5C and recording is started automatically). Starting the frame stream automatically helps to reduce the number of inputs required to review the captured/recorded images. Automatically starting the frame stream enhances the operability of the device and makes the user-device interface more efficient (e.g., by reducing the number of inputs needed to perform a desired operation) which, additionally, reduces power usage and improves battery life of the device by enabling the user to use the device more quickly and efficiently.

In some embodiments, the representations of the plurality of images scrolling across the display as frames (e.g., frames 508, 509, et al. in FIGS. 5B-5J) are (1012) overlaid on a portion of the live view from the camera (e.g., across the bottom of the live view, as illustrated in scroll 506 in FIGS. 5B-5J). Displaying the frame stream over the live view helps to reduce unnecessary visual clutter and conserves display space. The conservation of display space enhances the operability of the device and makes the user-device interface more efficient (e.g., by freeing up display space for other uses) which, additionally, reduces power usage and improves battery life of the device by enabling the user to use the device more quickly and efficiently.

In some embodiments, displaying the representations of the plurality of media images as frames scrolling across the display includes (1014) scrolling a respective frame (e.g., the last or rightmost frame in the current sequence of frames, such as frame 512 in FIG. 5E) onto the display from a first side of the display (e.g., each frame gradually slides in from the right side of the display, such as frame 512 in FIGS. 5E-5G); while scrolling the respective frame onto the display and prior to displaying an entirety of the respective frame, displaying a reduced-size copy of the live view from the camera within the respective frame (e.g., only the left portion of frame is visible on the display; e.g., frame 512 shows a copy of the live image displayed in user interface 500, in FIGS. 5E-5F); and, upon a determination that the entirety of the respective frame has scrolled onto the display, replacing the reduced-size copy of the live view in the respective frame with a respective media image that corresponds to a current image in the live view (e.g., the reduced-size copy of the live view appears to freeze as soon as the respective frame scrolls all the way onto the display; e.g., as soon as the entirety of frame 512 is visible on touch screen 112, the image is frozen, as illustrated in FIG. 5G). In some embodiments, the media image that replaces the live image in the frame is the last media image that is captured or recorded before the frame scrolls entirely onto the screen (e.g., the image recorded in FIG. 5F, immediately before frame 512 becomes entirely visible on touch screen 112, is the image displayed in frame 512 in FIG. 5G). In some embodiments, the media image that replaces the live image in the frame is the first media image recorded after the frame scrolls entirely onto the screen. Displaying a live image at the end of the frame stream helps to provide visual feedback regarding the progress of relative positions of the frames in the timeline. The enhanced visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representations of the plurality of media images scrolling across the display as frames include (1016) less than all media images that are recorded by the camera (e.g., in one embodiment, where thirty images are recorded per second, only two images are displayed in the scroll, e.g., every fifteenth recorded image is displayed in the scroll). For example, as illustrated in FIG. 5I, cat 510 is shown walking under branch 502 in the image shown in frame 514 and then laying down in the image shown in frame 516. Although the camera also recorded images of the cat during the process of laying down, these images are not displayed in scroll 506. Displaying only a subset of recorded images in the frame stream helps to reduce unnecessary visual clutter and makes inspection of the frames more easily. The reduction of visual clutter enhances the operability of the device and makes the user-device interface more efficient (e.g., by freeing up display space for other uses, helping the user to provide proper inputs and reducing user mistakes when operating/interacting with the device) which, additionally, reduces power usage and improves battery life of the device by enabling the user to use the device more quickly and efficiently.

In some embodiments, while displaying the live view from the camera and the representations of the plurality of images as frames scrolling across the display, the device detects (1018) a second input (e.g., a tap gesture on a touch-sensitive display, or a press input on a virtual or physical button on the electronic device) while a focus selector is at a location that corresponds to a respective representation of a first media image that is currently scrolling across the display (e.g., the image that is captured by the camera upon, closest in time to, immediately before, the detection of the second input); and in response to detecting the second input, changes an appearance of the respective representation of the first media image among the frames that are scrolling across the display (e.g., highlighting, coloring, and/or enlarging the frame/image in the scroll) to indicate that the first media image has been marked for later reference (e.g., stored separately from a recorded video that also includes the first media image). For example, device 100 detects a tap gesture including contact 580 on frame 576 in FIG. 5AF and, in response, increases the size of frame 576, in FIG. 5AG, to indicate that the image was marked for later reference. In some embodiments, the device creates metadata that marks the first media image (e.g., creates a timestamp or flag on the first image and record the first media image for persistent storage as a standalone image). Allowing the user to mark an image in the scrolling frame stream gives the user proper visual context when marking images. The change in the appearance of the marked frame provides visual feedback regarding the operation that has been carried out. The visual context and improved visual feedback enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a copy of a respective marked media image is (1020) stored separately (e.g., as a single image) from a recorded video that includes the respective marked media image in the memory of the device (e.g., a first copy of the marked image is stored as a frame in the recorded video (e.g., as an unprocessed or processed video) and a second copy of the marked image is stored separately as a photo). In some embodiments, after terminating continuous capture of the media images, all marked media frames and/or videos are collected into a dedicated user interface within an associated media management application (e.g., the device picks out all of the marked photos and videos from the collected media stream). In some embodiments, the collected media items are displayed in an auto-summary that includes media items of various types, e.g., as illustrated in FIG. 7O. In some embodiments, the collected media are displayed in a timeline or grid as illustrated in FIGS. 9A and 9E. Storing the marked image separately from a video that also includes the marked image allows the user to access the marked image independent of the stored video, thus allowing the user more control over stored content. The improved control enhances the operability of the device and makes the user-device interface more efficient (e.g., by reducing the number of inputs needed to access and manipulate the marked image) which, additionally, reduces power usage and improves battery life of the device by enabling the user to use the device more quickly and efficiently.

In some embodiments, the copy of the respective marked media image is (1022) configured to be displayed at a different aspect ratio (and/or resolution) from the recorded video that includes the respective marked media image (e.g., the copy of the marked image is processed differently that the recorded video, such that the marked image is configured to be displayed at a photographic aspect ratio and the captured media is configured to be displayed at a video aspect ratio).

The marked image has an independent display aspect ratio from the display aspect ratio of a video that also includes the marked image. This allows the user more control over how stored content is displayed. The improved control enhances the operability of the device and makes the user-device interface more efficient (e.g., by reducing the number of inputs needed to view the marked image with a proper aspect ratio) which, additionally, reduces power usage and improves battery life of the device by enabling the user to use the device more quickly and efficiently.

In some embodiments, while displaying the live view from the camera and the representations of the plurality of images as frames scrolling across the display, the device detects (1024) a third input (e.g., a tap gesture on the live view displayed on a touch-sensitive display, or a press input on a virtual or physical shutter button on the electronic device) that marks a concurrently captured image (e.g., the image that is being captured by the camera upon, closest in time to, immediately before, the detection of the third input) (e.g., the concurrently captured image is the image shown in the live view or in the live image in the representation/frame that is just scrolled onto the display or that is about to be fully scrolled onto the display); and in response to detecting the third input, displays a respective representation of the concurrently marked and captured image, wherein an appearance of the respective representation of the concurrently marked and captured image is changed (e.g., highlighted, colored, and/or enlarged relative to other representations of images in the scroll) to indicate that the concurrently marked and captured image has been marked for later reference (e.g., stored separately from a recorded video that also includes the concurrently captured and marked image). For instance, device 100 detects a tap gesture, including contact 518 on the live image, corresponding to frame 516 in scroll 506, as illustrated in FIG. 5H. In response, the device marks the captured image and enlarges the display of frame 516 in FIG. 5I. Allowing the user to mark a concurrently captured image gives the user more precise and timely control over the marking of images. The change in the appearance of the marked frame provides visual feedback regarding the operation that has been carried out. The improved control and visual feedback enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the respective representation of the concurrently marked and captured image (e.g., enlarged frame 516 in FIG. 5J) is (1026) displayed among the plurality of digital media images scrolling across the display, regardless of whether the respective representation of the concurrently marked and captured image would have been displayed if the concurrently marked and captured digital media image had not been marked. For example, in one embodiment, thirty images are captured per second and only two images are displayed in the scroll (e.g., every fifteenth captured image is displayed in the scroll). In such an embodiment, the representation of the image will be added to the scroll, even if the concurrently marked and captured image happens not to be the two images that would have been displayed in the scroll. In some embodiments, where the representation of the marked media image would not otherwise be displayed within the scroll, the device changes the appearance of a representation of a media image that is recorded closest in time to the marked image, that is displayed within the scroll. Displaying the marked frame in the frame stream provides visual feedback regarding the operation that has been carried out. The improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representations of the plurality of images as frames scrolling across the display in the first direction (and while displaying the live view from the camera), the device detects (1028) a third input that causes movement of a focus selector in a second direction opposite of the first direction (e.g., a swipe input that starts while a focus selector is at a first location in the camera user interface that corresponds to the representations of the plurality of images as frames scrolling across the display, where the swipe input includes movement of the focus selector in a second direction opposite of the first direction (e.g., a swipe or drag gesture that scrubs the scroll); e.g., a swipe gesture including movement 546 of contact 544, on scroll 506, from position 544-*a* in FIG. 5P to position 544-*b* in FIG. 5Q); and, in response to detecting the third input, scrolls the representations of the plurality of images as frames across the display in the second direction (e.g., rewinds the scroll), in accordance with the movement of the focus selector (e.g., movement 546 of contact 546 navigates frames in scroll 506, independent of the live image displayed in user interface 500, such that previously displayed frames 514 and 515 are brought back onto touch screen 112, as illustrated in FIGS. 5P-5Q). In some embodiments, when the representations of the plurality of images are scrolled across the display in the second direction, the live view from the camera is replaced with one or more of the previously captured images (e.g., the live image behind scroll 506 is also rewound). Allowing the user to swipe on the frame stream to bring back frames that are no longer in view allows the user more control over stored content. The improved control enhances the operability of the device and makes the user-device interface more efficient (e.g., by reducing the number of inputs needed to view the stored content) which, additionally, reduces power usage and improves battery life of the device by enabling the user to use the device more quickly and efficiently.

In some embodiments, while displaying the representations of the plurality of images as frames scrolling across the display (and while displaying the live view from the camera) the device detects (1030) a fourth input (e.g., a tap input that is detected while a focus selector is at a location corresponding to a first representation of an image scrolling across the display as a frame; e.g., a tap gesture including contact 524 on frame 516, in FIG. 5J) that activates (e.g., opens) an image review mode (e.g., a tap gesture on the frame); and, in response to detecting the fourth input that activates the image review mode, replacing display of the live view from the camera with display of a first recorded media image (e.g., the recorded image that corresponds to the first representation) among the plurality of media images (e.g., in response to detecting contact 524 in FIG. 5J, device 100 replaces display of live image user interface 500 with image review user interface 526 in FIG. 5K). By allowing the user to enter the image review mode from the user interface with the live view and the frame stream, the device gives the user the ability to review a recorded image in more detail. The ability to access the image review mode from the user interface with the live view enhances the operability of the device and makes the user-device interface more efficient (e.g., by reducing the number of inputs needed to inspect the stored content) which, additionally, reduces power usage and improves battery life of the device by enabling the user to use the device more quickly and efficiently.

In some embodiments, in response to detecting the fourth input that activates the image review mode, the device creates (1032) metadata that marks the first recorded media image among the plurality of media images. In some embodiments, when a representation of the first recorded media image is subsequently displayed in the scroll of frames, the representation is visually marked as well. Automatically marking an image when entering the image review mode enhances the operability of the device and makes the user-device interface more efficient (e.g., by reducing the number of inputs needed to inspect and mark a stored image) which, additionally, reduces power usage and improves battery life of the device by enabling the user to use the device more quickly and efficiently.

In some embodiments, while displaying the first recorded media image (e.g., the recorded image that corresponds to the first representation) in the image review mode, the device detects (1034) a fifth input that causes movement of a focus selector in a third direction (e.g., in some embodiments, the third direction is perpendicular to the first direction; in some embodiments, the third direction is parallel to the first direction) (e.g., the fifth input is a swipe input that starts while a focus selector is at a first location in the camera user interface that corresponds to display of the first recorded media image, where the swipe input includes movement of the focus selector in a third direction (e.g., in a direction that has a component movement that is perpendicular to the major axis of the recorded media image); e.g., a swipe gesture including movement 528 of contact 526 to the right, in FIG. 5L); and in response to detecting the fifth input, replaces display of the first recorded media image with a second recorded media image (e.g., a recorded image that immediately preceded or followed the first recorded media image; e.g., device 100 replaces an image showing cat 510 laying under branch 502, in FIG. 5L with an image of the cat just prior to laying down, in FIG. 5M). Allowing the user to switch images within the image review mode enhances the operability of the device and makes the user-device interface more efficient (e.g., by reducing the number of inputs needed to inspect additional stored image) which, additionally, reduces power usage and improves battery life of the device by enabling the user to use the device more quickly and efficiently.

In some embodiments, while displaying the first recorded media in the image review mode, in response to detecting the fifth input that causes movement of the focus selector in the third direction, the device creates (1036) metadata that marks the second recorded media image (and optionally, deletes the metadata that marks the first recorded media image; e.g., where frame 516, corresponding to the image where cat 510 is laying down under branch 502, is marked in FIG. 5J, navigation within image review user interface 526, in FIGS. 5K-5L, marks the image of the cat just before laying down, as illustrated in FIG. 5L, and unmarks the image of the cat laying down, as illustrated in FIG. 5J. Additionally, when image review user interface 526 is closed, by a swipe gesture including movement 532 of contact 530 down from the top of the screen, in Figured 5N, previously marked frame 516 is replaced with newly marked frame 515, corresponding to the image of cat 510 just prior to laying down, in FIG. 5O) (e.g., scrubbing through the recorded images adjusts the timestamp denoting which image should be stored as an image separate from the entirety of the recorded image data). In some embodiments, a selection affordance is displayed for each image that is displayed within the image review mode, and the user is allowed to select multiple images to mark while in the image review mode. Automatically marking an image when switching images within the image review mode enhances the operability of the device and makes the user-device interface more efficient (e.g., by reducing the number of inputs needed to inspect and mark a stored image) which, additionally, reduces power usage and improves battery life of the device by enabling the user to use the device more quickly and efficiently.

In some embodiments, the device continues (1038) to record media images with the camera (e.g., in a background process), while displaying the first recorded media image in the image review mode (e.g., as illustrated by the advancement of scroll 506 in FIG. 5O, after image review user interface 526 is replaced by live image user interface 500). Continuing media recording while in the image review mode enhances the operability of the device and makes the user-device interface more efficient (e.g., by reducing the number of inputs and time needed to record media and inspect stored content) which, additionally, reduces power usage and improves battery life of the device by enabling the user to use the device more quickly and efficiently.

In some embodiments, while displaying a respective recorded media image (e.g., the first, second, or a subsequent photo, as opposed to a live image from the camera) in the image review mode, the device detects (1040) a sixth input that deactivates (e.g., closes) the image review mode (e.g., a swipe gesture including movement 532 of contact 530 down from the top of the screen, in Figured 5N); and, in response to detecting the sixth input that deactivates the image review mode, replaces display of the respective recorded media image with the live view from the camera (e.g., returns the media capture application to the state it was in prior to activating the image review mode; e.g., device 100 replaces image review user interface 526, in FIG. 5N, with live image user interface 500, in FIG. 5O). Allowing the user to return to the live view when exiting the image review mode enhances the operability of the device and makes the user-device interface more efficient (e.g., by reducing the number of inputs needed to record media and inspect stored media content) which, additionally, reduces power usage and improves battery life of the device by enabling the user to use the device more quickly and efficiently.

In some embodiments, while displaying the representations of the plurality of images as frames scrolling across the display in the first direction (and while displaying the live view from the camera), the device detects (1042) a seventh input that specifies a start and an end of a sequence of recorded media images (e.g., detects initial touch-down of contact corresponding to a long press input or deep press input on the live view to mark a currently recorded media image as the start of the sequence of recorded media images (e.g., creates metadata that identifies the beginning of a video clip), continues to detect the contact to mark the body of the sequence of recorded media images (e.g., creates metadata to identify the body of the video clip), and detects lift-off of the contact to mark a currently recorded media image as the end of the sequence of recorded media images (e.g., creates metadata that identifies the end of the video clip); e.g., device 100 detects a long-press gesture including contact 558, in FIGS. 5V-5X. In response to detecting the seventh input that specifies the start and the end of the sequence of recorded media images, the device creates metadata that marks the sequence of recorded media images as a unit of media of a first type (e.g., a video clip); and displays an indication, in the plurality of images scrolling across the display as frames, that the sequence of recorded media images was marked as a unit of media of the first type (e.g., highlighting, coloring, and/or enlarging the sequence of frames/images in the scroll as a unit; e.g., frames 556, 560, and 562 are enlarged in FIGS. 5V-5X). Allowing the user to mark a video while displaying a frame stream enhances the operability of the device and makes the user-device interface more efficient (e.g., by reducing the number of inputs needed to record a video) which, additionally, reduces power usage and improves battery life of the device by enabling the user to use the device more quickly and efficiently.

In some embodiments, a copy of the sequence of recorded media images (e.g., the marked video clip) is (1044) stored separately (e.g., as a video clip) from the recorded media images (e.g., the full-length recorded video) in the memory of the device (e.g., a first copy of the sequence of recorded media images is stored as frames in the recorded video (e.g., as an unprocessed or processed video), and a second copy of the marked image is stored separately as a video clip). In some embodiments, after terminating continuous capture of the media images, all marked media frames and/or videos are collected into a dedicated user interface within an associated media management application (e.g., the device picks out all of the marked photos and videos from the collected media stream). Storing the marked video separately from the rest of recorded image data that also includes the marked video allows the user to access the marked video independent of the rest of the stored image data, thus allowing the user more control over stored content. The improved control enhances the operability of the device and makes the user-device interface more efficient (e.g., by reducing the number of inputs needed to access and manipulate the marked video) which, additionally, reduces power usage and improves battery life of the device by enabling the user to use the device more quickly and efficiently.

In some embodiments, the copy of the sequence of recorded media images is (1046) configured to be displayed at a different aspect ratio (and/or resolution) from the recorded media images (e.g., the copy of the video clip is processed differently that the recorded video, such that the marked video clip is configured to be displayed at a different aspect than the full-length recorded video). The marked video has independent display aspect ratio from the display aspect ratio of the recorded media images that also includes the marked video. This allows the user more control over how stored content is displayed. The improved control enhances the operability of the device and makes the user-device interface more efficient (e.g., by reducing the number of inputs needed to view the marked video with a proper aspect ratio) which, additionally, reduces power usage and improves battery life of the device by enabling the user to use the device more quickly and efficiently.

In some embodiments, while displaying the representations of the plurality of images as frames scrolling across the display (and while displaying the live view from the camera), the device detects (1048) an eighth input (e.g., a tap gesture that is detected while a focus selector is at a location corresponding to at least a portion of the marked sequence of media images, in the plurality of images scrolling across the display as frames; e.g., a tap gesture including contact 568 on marked frame 560, in FIG. 5AA) that activates (e.g., opens) a video review mode (e.g., a tap gesture on a frame in a sequence of marked frames); and, in response to detecting the eighth input that activates the video review mode, replaces display of the live view from the camera with playback of a first recorded video clip (e.g., the first recorded video clip corresponds to the marked sequence of recorded media images; e.g., device replaces live image user interface 500, in FIG. 5AA, with video review user interface 568, in FIG. 5AB, and plays the marked video in FIGS. 5AB-5AD). In some embodiments, while in the video review mode, the device displays controls (e.g., adjustable boundary lines) for selecting a different start and/or end for the marked video clip from the representations of the plurality of images. By allowing the user to enter the video review mode from the user interface with the live view and the frame stream, the device gives the user the ability to review a recorded video in more detail. The ability to access the video review mode from the user interface with the live view enhances the operability of the device and makes the user-device interface more efficient (e.g., by reducing the number of inputs needed to inspect the stored content) which, additionally, reduces power usage and improves battery life of the device by enabling the user to use the device more quickly and efficiently.

In some embodiments, the device continues (1050) to record media images with the camera, while playing back the first video clip (e.g., as illustrated by the advancement of scroll 506 in FIG. 5AE, after video review user interface 568 is replaced by live image user interface 500). Continuing media recording while in the video review mode enhances the operability of the device and makes the user-device interface more efficient (e.g., by reducing the number of inputs and time needed to record media and inspect stored content) which, additionally, reduces power usage and improves battery life of the device by enabling the user to use the device more quickly and efficiently.

In some embodiments, while playing back the first video clip, the device detects (1052) a ninth input (e.g., a swipe gesture including movement 572 of contact 570 down from the top of touch screen 112, in FIG. 5AD) that deactivates (e.g., closes) the video review mode; and, in response to detecting the ninth input that deactivates the image review mode, replaces playback of the first video clip with the live view from the camera (e.g., returns the media capture application to the state it was in prior to activating the video review mode; e.g., device 100 replaces display of video review user interface 568, in FIG. 5AD, with live image user interface 500, in FIG. 5AE). Allowing the user to return to the live view when exiting the video review mode enhances the operability of the device and makes the user-device interface more efficient (e.g., by reducing the number of inputs needed to record media and inspect stored media content) which, additionally, reduces power usage and improves battery life of the device by enabling the user to use the device more quickly and efficiently.

It should be understood that the particular order in which the operations in FIGS. 10A-10E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1200, 1400, 1600 and 1800) are also applicable in an analogous manner to method 1000 described above with respect to FIGS. 10A-10E. For example, the contacts, gestures, user interface objects, various types of thresholds, focus selectors, live views, frame stream, captured media content, media items, and live view display object, affordances, and animations described above with reference to method 1000 optionally have one or more of the characteristics of the contacts, gestures, user interface objects, various types of thresholds, focus selectors, live views, frame stream, captured media content, media items, and live view display object, affordances, and animations described herein with reference to other methods described herein (e.g., methods 1200, 1400, 1600 and 1800). For brevity, these details are not repeated here.

Figure 11:
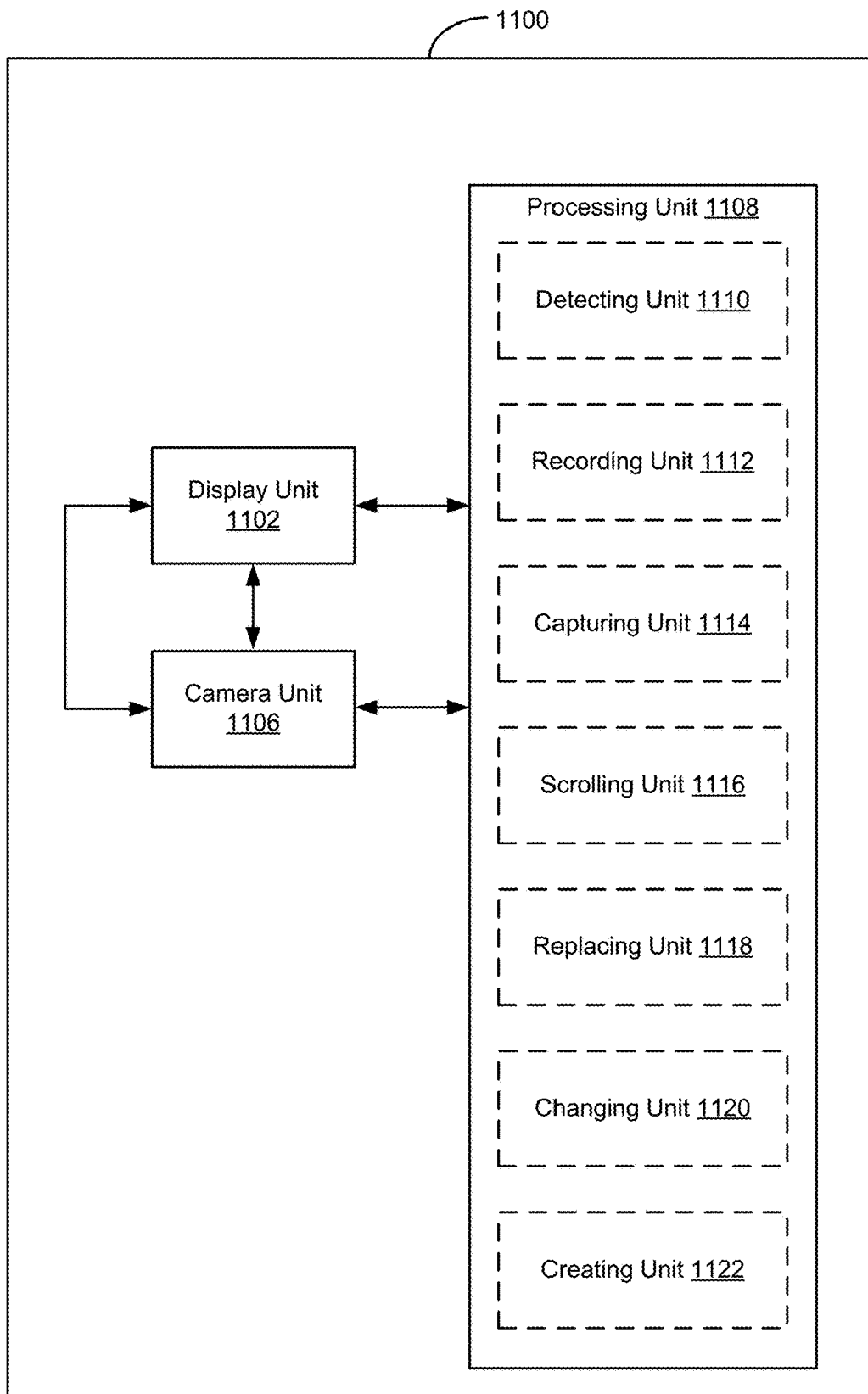
FIG. 11 is a functional block diagram of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display user interfaces, a camera unit 1106 configured to capture media, and a processing unit 1108 coupled to the display unit 1102 and the camera units 1106. In some embodiments, the processing unit includes detecting unit 1110, recording unit 1112, capturing unit 1114, scrolling unit 1116, replacing unit 1118, changing unit 1120, and creating unit 1122.

The processing unit 1108 is configured to: enable display of (e.g., with the display unit 1102) a camera user interface on the display unit 1102, the camera user interface including a live view from the camera unit 1106; while displaying the live view from the camera unit 1106: record (e.g., with the recording unit 1112) media images that are captured by the camera unit 1106, while continuing to display the live view from the camera unit 1106; and enable display of (e.g., with the display unit 1102) representations of a plurality of media images that were recorded while displaying the live view from the camera unit 1106 as frames scrolling (e.g., with the scrolling unit 1116) across the display unit 1102 in a first direction.

In some embodiments, the processing unit 1108 is further configured to: prior to recording the media images that were captured by the camera unit 1106: while displaying the live view from the camera unit 1106: capture (e.g., with the capturing unit 1114), without recording, media images that correspond to the live view from the camera unit 1106; and detect (e.g., with the detecting unit 1110) a first input that activates recording of media images with the camera unit 1106, wherein the recording of the media images is started in response to detection of the first input.

In some embodiments, the display unit 1102 of the representations of the plurality of media images as frames scrolling (e.g., with the scrolling unit 1116) across the display unit 1102 is started in response to the detection of the first input.

In some embodiments, the display unit 1102 of the representations of the plurality of media images as frames scrolling (e.g., with the scrolling unit 1116) across the display unit 1102 is started prior to the detection of the first input.

In some embodiments, the representations of the plurality of images scrolling (e.g., with the scrolling unit 1116) across the display unit 1102 as frames are overlaid on a portion of the live view from the camera unit 1106.

In some embodiments, displaying the representations of the plurality of media images as frames scrolling (e.g., with the scrolling unit 1116) across the display unit 1102 includes: scrolling (e.g., with the scrolling unit 1116) a respective frame onto the display unit 1102 from a first side of the display unit 1102; while scrolling (e.g., with the scrolling unit 1116) the respective frame onto the display unit 1102 and prior to displaying an entirety of the respective frame, displaying (e.g., with the display unit 1102) a reduced-size copy of the live view from the camera unit 1106 within the respective frame; and upon a determination that the entirety of the respective frame has scrolled onto the display unit 1102, replacing (e.g., with the replacing unit 1118) the reduced-size copy of the live view in the respective frame with a respective media image that corresponds to a current image in the live view.

In some embodiments, the representations of the plurality of media images scrolling (e.g., with the scrolling unit 1116) across the display unit 1102 as frames include less than all media images that are recorded by the camera unit 1106.

In some embodiments, the processing unit 1108 is further configured to: while displaying the live view from the camera unit 1106 and the representations of the plurality of images as frames scrolling (e.g., with the scrolling unit 1116) across the display unit 1102: detect (e.g., with the detecting unit 1110) a second input while a focus selector is at a location that corresponds to a respective representation of a first media image that is currently scrolling (e.g., with the scrolling unit 1116) across the display unit 1102; and in response to detecting the second input, change (e.g., with the changing unit 1120) an appearance of the respective representation of the first media image among the frames that are scrolling (e.g., with the scrolling unit 1116) across the display unit 1102 to indicate that the first media image has been marked for later reference.

In some embodiments, the processing unit 1108 is further configured to: while displaying the live view from the camera unit 1106 and the representations of the plurality of images as frames scrolling (e.g., with the scrolling unit 1116) across the display unit 1102: detect (e.g., with the detecting unit 1110) a third input that marks a concurrently captured image; and in response to detecting the third input, enable display of (e.g., with the display unit 1102) a respective representation of the concurrently marked and captured image, wherein an appearance of the respective representation of the concurrently marked and captured image is changed to indicate that the concurrently marked and captured image has been marked for later reference.

In some embodiments, the respective representation of the concurrently marked and captured image is displayed among the plurality of digital media images scrolling (e.g., with the scrolling unit 1116) across the display unit 1102, regardless of whether the respective representation of the concurrently marked and captured image would have been displayed if the concurrently marked and captured digital media image had not been marked.

In some embodiments, a copy of a respective marked media image is stored separately from a recorded video that includes the respective marked media image in the memory of the device.

In some embodiments, the copy of the respective marked media image is configured to be displayed at a different aspect ratio from the recorded video that includes the respective marked media image.

In some embodiments, the processing unit 1108 is further configured to: while displaying the representations of the plurality of images as frames scrolling (e.g., with the scrolling unit 1116) across the display unit 1102 in the first direction: detect (e.g., with the detecting unit 1110) a third input that causes movement of a focus selector in a second direction opposite of the first direction; and in response to detecting the third input, scroll (e.g., with the scrolling unit 1116) the representations of the plurality of images as frames across the display unit 1102 in the second direction in accordance with the movement of the focus selector.

In some embodiments, the processing unit 1108 is further configured to: while displaying the representations of the plurality of images as frames scrolling (e.g., with the scrolling unit 1116) across the display unit 1102: detect (e.g., with the detecting unit 1110) a fourth input that activates an image review mode; and in response to detecting the fourth input that activates the image review mode, replace (e.g., with the replacing unit 1118) display of the live view from the camera unit 1106 with display of a first recorded media image among the plurality of media images.

In some embodiments, the processing unit 1108 is further configured to: in response to detecting the fourth input that activates the image review mode, create (e.g., with the creating unit 1122) metadata that marks the first recorded media image among the plurality of media images. The processing unit 1108 is further configured to: while displaying the first recorded media image in the image review mode: detect (e.g., with the detecting unit 1110) a fifth input that causes movement of a focus selector in a third direction; and in response to detecting the fifth input, replace (e.g., with the replacing unit 1118) display of the first recorded media image with a second recorded media image.

In some embodiments, the processing unit 1108 is further configured to: while displaying the first recorded media in the image review mode: in response to detecting the fifth input that causes movement of the focus selector in the third direction, create (e.g., with the creating unit 1122) metadata that marks the second recorded media image.

In some embodiments, the device continues to record (e.g., with the recording unit 1112) media images with the camera unit 1106, while displaying the first recorded media image in the image review mode.

In some embodiments, the processing unit 1108 is further configured to: while displaying a respective recorded media image in the image review mode: detect (e.g., with the detecting unit 1110) a sixth input that deactivates the image review mode; and in response to detecting the sixth input that deactivates the image review mode, replace (e.g., with the replacing unit 1118) display of the respective recorded media image with the live view from the camera unit 1106.

In some embodiments, the processing unit 1108 is further configured to: while displaying the representations of the plurality of images as frames scrolling (e.g., with the scrolling unit 1116) across the display unit 1102 in the first direction: detect (e.g., with the detecting unit 1110) a seventh input that specifies a start and an end of a sequence of recorded media images; in response to detecting the seventh input that specifies the start and the end of the sequence of recorded media images: create (e.g., with the creating unit 1122) metadata that marks the sequence of recorded media images as a unit of media of a first type; and enable display of (e.g., with the display unit 1102) an indication, in the plurality of images scrolling (e.g., with the scrolling unit 1116) across the display unit 1102 as frames, that the sequence of recorded media images was marked as a unit of media of the first type.

In some embodiments, a copy of the sequence of recorded media images is stored separately from the recorded media images.

In some embodiments, the copy of the sequence of recorded media images is configured to be displayed at a different aspect ratio from the recorded media images.

In some embodiments, the processing unit 1108 is further configured to: while displaying the representations of the plurality of images as frames scrolling (e.g., with the scrolling unit 1116) across the display unit 1102: detect (e.g., with the detecting unit 1110) an eighth input that activates a video review mode; and in response to detecting the eighth input that activates the video review mode, replace (e.g., with the replacing unit 1118) display of the live view from the camera unit 1106 with playback of a first recorded video clip.

In some embodiments, the device continues to record (e.g., with the recording unit 1112) media images with the camera unit 1106, while playing back the first video clip. The processing unit 1108 is further configured to: while playing back the first video clip, detect (e.g., with the detecting unit 1110) a ninth input that deactivates the video review mode; and in response to detecting the ninth input that deactivates the image review mode, replace (e.g., with the replacing unit 1118) playback of the first video clip with the live view from the camera unit 1106.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10E are, optionally, implemented by components depicted in FIGS. 1A-1B or FIG. 11. For example, recording operation in operation 1004, detecting operation in operation 1006 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12D are flow diagrams illustrating a method 1200 of capturing digital media in different imaging modes in accordance with some embodiments. As described below, the method 1200 relates to, in response to continuing to detect an input that has activated a single image recording mode at a device, automatically switching to one or more additional image recording modes at later time points when the input is continuously detected for more than respective threshold amounts of time for trigging the one or more additional image recording modes. In addition, visual indication of the currently active media recording mode is also displayed. The automatic switching of media recording modes based on a continuous input meeting different temporal thresholds at different points in time and corresponding visual feedback enhance the operability of the device and make the user-device interface more efficient (e.g., by performing the mode switching operation based on satisfaction of a preset condition without requiring separate user inputs, and without interrupting the ongoing media recording) which, additionally, reduces power usage and improves battery life of the device by enabling the user to use the device more quickly and efficiently.

The method 1200 is performed at an electronic device (e.g., device 300, FIG. 3, or portable multifunction device 100, FIG. 1A) with one or more processors, memory, a camera (e.g., mounted on the back of the electronic device, facing away from the user), and a display (e.g., a touch-sensitive display). In some embodiments, the electronic device includes a second camera (e.g., mounted on the front of the electronic device facing towards the user). Some operations in method 1200 are, optionally, combined and/or the order of some operations is, optionally, changed.

The device displays (1202) displays a camera user interface (e.g., user interface 600 in FIG. 6A) on the display, the camera user interface including a live view from the camera (e.g., live view including tree branch 602 in FIG. 6A). In some embodiments, the camera user interface also includes an affordance for initiating recording of images, one or more affordances for setting a mode of operation (e.g., flash/lighting settings, dynamic-range settings, and/or image filter settings), and an affordance for switching between the (first) camera and a second camera.

While displaying the live view from the camera, the device detects (1204) start of an input by a first contact (e.g., contact 604 in FIG. 6B, contact 608 in FIG. 6D, contact 614 in FIG. 6G, or contact 618 in FIG. 6K), that activates recording of media with the camera (e.g., the device detects a tap on the live view or an affordance for initiating capture of images (e.g., an affordance that is displayed over the live view from the camera)).

In response to detecting the start of the input by the first contact that activates recording of media with the camera, the device displays (1206) a first indication that the camera is in a first media recording mode that corresponds to recording of a single image (e.g., ring 606 in FIGS. 6B, 6D, 6G, and 6K). In some embodiments, in response to detecting the start of the input by the first contact, the camera records a single image (e.g., device 100 takes a single image of tree branch 602 in FIG. 6B). In some embodiments, in response to detecting the start of the input by the first contact, the camera begins capturing media in a raw format that can be processed into media of various different types (e.g., SD video, HD video, images of different aspect ratios, resolutions, etc.) and marks a single image that will be retained in the memory of the electronic device (or external memory) if the device does not continue to detect the first contact past a predefined temporal threshold (e.g., where the input is a tap, a single image is retained and all other media data are automatically deleted from the memory after a predefined period of time (e.g., after termination of the input)) (e.g., device 100 begins recording cat 610 walking in FIG. 6G).

In some embodiments, "capturing" media refers to automatic, temporary, and real-time storage of media by the electronic device without active intervention from the user. media that are captured by the camera are automatically stored (e.g., in a memory of the electronic device) for a predetermined duration (e.g., while the camera user interface is active, or for 24 hours after capture), and are automatically deleted or overwritten unless instructions are received from the user to mark the captured media for subsequent processing (e.g., marking, editing, compression, conversion, etc.) and/or persistent storage. In some embodiments, media that are marked for subsequent processing and/or persistent storage (e.g., in accordance with user input or a preconfigured device setting) are considered "recorded."

While displaying the first indication that the camera is in the first media recording mode (e.g., a single image recording mode), the device detects (1208) continuation of the input by the first contact (e.g., continues to detect the first contact) (e.g., continued detection of contact 608 in FIG. 6E, contact 614 in FIG. 6H, or contact 618 in FIG. 6L).

In response to detecting the continuation of the input by the first contact and before detecting termination of the input (e.g., continuing to detect the first contact) (1210), in accordance with at least a determination that the continuation of the input meets a first predefined temporal threshold (e.g., the electronic device has continuously detected the first contact for a period of time that meets a first predefined temporal threshold; e.g., temporal threshold TTs in FIGS. 6E, 6H, and 6L) (1212), the device displays (1214) a second indication (e.g., tally marks 612 encircling the location of the detected contact in FIGS. 6E, 6H, and 6L) that the camera is in a second media recording mode that corresponds to recording of a sequence of images contemporaneous with the continuation of the input by the first contact (e.g., continued detection of the first contact (e.g., where the camera ceases to capture images upon lift-off of the first contact)). In some embodiments, while in the second image recording mode, the camera records a burst of images, each temporally separated by a predefined period of time that is longer than a minimal period of time defining a frame rate of a video the camera is configured to capture (e.g., device 100 records a burst of photos of cat 610 walking into the field of view in FIG. 6E). In some embodiments, while in the second image recording mode, the camera records a plurality of images (e.g., a video) in a configuration that is compatible with multiple different recording modes, but marks some (less than all) of the plurality of images that will be retained in the memory of the electronic device (or external memory) if the device does not continue to detect the first contact past a second temporal threshold (e.g., where the input is longer than a tap, but shorter than a long-press, a burst of images are retained and all other images are automatically deleted from the memory after the termination of the input; e.g., when detecting lift-off of contact 608 in FIG. 6F).

While displaying the second indication that the camera is in the second media recording mode (e.g., the image burst recording mode), the device detects (1216) further continuation of the input by the first contact (e.g., continues to detect the first contact).

In response to detecting the further continuation of the input by the first contact and before detecting termination of the input (e.g., continuing to detect the first contact) (1218) (e.g., continued detection of contact 614 in FIG. 6I or contact 618 in FIG. 6M), in accordance with at least a determination that the further continuation of the input meets a second predefined temporal threshold (e.g., the electronic device has continuously detected the first contact for a period of time that meets a second predefined temporal threshold that is longer than the first predefined temporal threshold; e.g., temporal threshold $TT_M$ in FIGS. 6I and 6M), the device displays (1220) a third indication (e.g., marked ring 616 in FIGS. 6I and 6M) that the camera is in a third media recording mode that corresponds to recording of a video. In some embodiments, the camera continues to record video upon termination of the input (e.g., lift-off of the first contact) and continues to record video until an input terminating the video recording is detected (e.g., device 100 continues to record video upon detecting lift-off of contact 618 in FIG. 6P. Upon detecting contact 624 in FIG. 6R, device stops recording in FIG. 6S). In some embodiments, when the third image record mode is activated, the camera retains a video that starts at the time when the input meets the second temporal threshold (e.g., prior to reaching the second temporal threshold, the camera records individual images or only retains some individual images from all images captured prior to reaching the second temporal threshold; e.g., the video recorded after continued detection of contact 614 in FIG. 6I includes footage of cat 610 walking and lying down under branch 602, as illustrated in FIGS. 6G-6H, captured prior to device 100 entering into third media recording mode). In some embodiments, when the third image recording mode is activated, the camera retains a video that starts when the first contact in the input was initially detected.

In some embodiments, in response to detecting the continuation of the input by the first contact and before detecting termination of the input (e.g., continuing to detect the first contact) (1210) (e.g., continued detection of contact 608 in FIG. 6E, contact 614 in FIG. 6H, or contact 618 in FIG. 6L), in accordance with at least a determination that the continuation of the input meets a first predefined temporal threshold (e.g., the electronic device has continuously detected the first contact for a period of time that meets a first predefined temporal threshold; e.g., temporal threshold TTs in FIGS. 6E, 6H, and 6L) (1212), in response to detecting the further continuation of the input by the first contact and before detecting termination of the input (e.g., continuing to detect the first contact) (1218), and in accordance with a determination that the further continuation of the input does not meets the second predefined temporal threshold (e.g., temporal threshold $TT_M$ in FIGS. 6E, 6H, and 6L), the device maintains (1222) display of the second indication (e.g., tally marks 612 encircling the location at which the device detects the contact in FIGS. 6E, 6H, and 6L) that the camera is in the second media recording mode.

In some embodiments, in response to detecting the continuation of the input by the first contact and before detecting termination of the input (e.g., continuing to detect the first contact) (1210) (e.g., continued detection of contact 604 in FIG. 6B, contact 608 in FIG. 6D, contact 614 in FIG. 6G, or contact 618 in FIG. 6K), in accordance with a determination that the continuation of the input does not meets the first predefined temporal threshold (e.g., temporal threshold TTS in FIGS. 6B, 6D, 6G, and 6K), the device maintains (1224) display of the first indication (e.g., ring 606 in FIGS. 6B, 6D, 6G, and 6K) that the camera is in the first media recording mode.

In some embodiments, in response to detecting the start of the input by the first contact that activates recording of media with the camera, the device starts (1226) continuous capture of media images with a configuration that is compatible with multiple media recording modes including the first, second, and third media recording modes (e.g., captures and temporarily stores video that is captured with a maximum resolution, frame rate, and size, and aspect ratio).

In some embodiments, while displaying a respective one of the first, second, and third indications that corresponds to a respective one of the first, second, and third media recording modes, the device detects (1228) termination of the input by the first contact (e.g., detecting lift-off of the first contact; e.g., lift-off of contact 604 in FIG. 6C, contact 608 in FIG. 6F, or contact 614 in FIG. 6J); and, in response to detecting the termination of the input by the first contact: obtains, from the continuously captured media images, media of a first type that corresponds to said respective one of the first, second, and third media recording modes (e.g., a single image, a burst of images, or a video); and persistently stores the obtained media of the first type (e.g., the single image, the burst of images, or the video is persistently stored, and the rest of the media image data is discarded). In some embodiments, the device also ceases to display said respective one of the first, second, and third indications. In some embodiments, the termination of the input terminates the recording and triggers output of the media of the first type only if the input is terminated before a third threshold amount of time for activating continuous video recording mode has expired (e.g., lift-off of contact 618 after third threshold $TT_L$, in FIG. 6Q, does not terminate image recording). Automatically storing the proper type of media upon termination of the input based on the activated media recording mode enhances the operability of the device and makes the user-device interface more efficient (e.g., by reducing the number of inputs needed to record media of the desired type) which, additionally, reduces power usage and improves battery life of the device by enabling the user to use the device more quickly and efficiently.

In some embodiments, in response to detecting the termination of the input by the first contact (e.g., lift-off of contact 604 in FIG. 6C, contact 608 in FIG. 6F, or contact 614 in FIG. 6J), the device ceases (1230) the continuous capture of media images with the configuration that is compatible with multiple media recording modes. In some embodiments, the termination of the input terminates the continuous capturing of media images only if the input is terminated before a third threshold amount of time for activating continuous video recording mode has expired (e.g., lift-off of contact 618 after third threshold $TT_L$, in FIG. 6Q, does not terminate image recording). Automatically stopping recording media upon termination of the input enhances the operability of the device and makes the user-device interface more efficient (e.g., by reducing the number of inputs needed to stop recording at a desired time) which, additionally, reduces power usage and improves battery life of the device by enabling the user to use the device more quickly and efficiently.

In some embodiments, the termination of the input by the first contact is (1232) detected while the camera is in the first media recording mode (e.g., single image recording mode; e.g., lift-off of contact 604 in FIG. 6C); and the media of a first type includes a single image with a first set of media properties (e.g., first size, aspect ratio, and resolution for a photo that is different from the set of media properties of the multi-modal media that has been captured). For example, a frame from the multi-modal media is cropped, downsampled, and/or shrunken to generate the single image with the first set of media properties. Automatically storing the proper type of media (e.g., a single image) upon termination of the input based on the activated media recording mode enhances the operability of the device and makes the user-device interface more efficient (e.g., by performing an operation based on satisfaction of a preset condition) which, additionally, reduces power usage and improves battery life of the device by enabling the user to use the device more quickly and efficiently.

In some embodiments, the termination of the input by the first contact is (1234) detected while the camera is in the second media recording mode (e.g., image burst recording mode; e.g., lift-off of contact 608 in FIG. 6F); and the media of a first type includes a sequence of two or more images with a second set of media properties (e.g., first size, aspect ratio, resolution, and frame rate for a sequence of photos that is different from the set of media properties of the multi-modal media that has been captured). For example, two or more frames from the multi-modal media are cropped, down-sampled, and/or shrunken to generate the sequence of images with the second set of media properties (e.g., the frame rate of the sequence of images is lower than the frame rate of the multi-modal media that has been captured and lower than a video that can be extracted from the multi-modal media). In some embodiments, the sequence of two or more images starts from a time at or near when the start of the first input was detected (e.g., slightly before or after the start of the first input was detected). Automatically storing the proper type of media (e.g., a sequence of images in an image burst) upon termination of the input based on the activated media recording mode enhances the operability of the device and makes the user-device interface more efficient (e.g., by performing an operation based on satisfaction of a preset condition) which, additionally, reduces power usage and improves battery life of the device by enabling the user to use the device more quickly and efficiently.

In some embodiments, the sequence of two or more images includes (1236) at least one image that had been captured before the camera entered the second media recording mode (e.g., the sequence of images stored in response to detecting lift-off of contact 608, in FIG. 6F, includes an image without cat 610 as captured in FIG. 6D, prior to the device entering second media recording mode, as illustrated in FIG. 6E). Including images that had been captured before the second media recording mode is entered in the sequence of images that are stored under the second media recording mode enhances the operability of the device and makes the user-device interface more efficient (e.g., by reducing the number of steps needed to include media content that had been captured earlier in a media item that is created under a subsequently activated media recording mode) which, additionally, reduces power usage and improves battery life of the device by enabling the user to use the device more quickly and efficiently.

In some embodiments, the termination of the input by the first contact is (1238) detected while the camera is in the third media recording mode (e.g., video recording mode; e.g., lift-off of contact 614 in FIG. 6J); and the media of a first type includes a video with a third set of media properties (e.g., first size, aspect ratio, resolution, and frame rate for a video that is different from the set of media properties of the multi-modal media that has been captured). For example, a sequence of frames from the multi-modal media are cropped, down-sampled, and/or shrunken to generate the video with the third set of media properties (e.g., the frame rate of the video is lower than or equal to the frame rate of the multi-modal media that has been captured and higher than an image burst that can be extracted from the multi-modal media). Automatically storing the proper type of media (e.g., a video) upon termination of the input based on the activated media recording mode enhances the operability of the device and makes the user-device interface more efficient (e.g., by performing an operation based on satis-faction of a preset condition) which, additionally, reduces power usage and improves battery life of the device by enabling the user to use the device more quickly and efficiently.

In some embodiments, the video includes (1240) at least one frame that had been captured before the camera entered the third media recording mode. In some embodiments, the video starts from a time at or near when the start of the first input was detected (e.g., slightly before or after the start of the first input was detected) (e.g., the video stored in response to detecting lift-off of contact 614, in FIG. 6J, includes images of cat 610 walking under branch 602, as captured in FIG. 6G prior to the device entering third media recording mode, as illustrated in FIG. 6I). Including images that had been captured before the third media recording mode is entered in the video that is stored under the third media recording mode enhances the operability of the device and makes the user-device interface more efficient (e.g., by reducing the number of steps needed to include media content that had been captured earlier in a media item that is created under a subsequently activated media recording mode) which, additionally, reduces power usage and improves battery life of the device by enabling the user to use the device more quickly and efficiently.

In some embodiments, displaying the first indication that the camera is in the first media recording mode includes (1242) displaying a recording affordance with a first appearance (e.g., ring 606 in FIGS. 6B, 6D, 6G, and 6K; displaying the second indication that the camera is in the second media recording mode includes displaying the recording affordance with a second appearance that is different from the first appearance (e.g., the first appearance is a round button, and the second appearance includes a series of tick marks around a round button and/or a burst count indicator above the round button, e.g., tally marks 612 encircling the location of the detected contact in FIGS. 6E, 6H, and 6L); and displaying the third indication that the camera is in the third media recording mode includes displaying the recording affordance with a third appearance that is different from the first appearance and the second appearance (e.g., the first appearance is a round shutter button, the second appearance includes a series of tick marks around a round shutter button and/or a burst count indicator above the round shutter button, and the third appearance includes a round recording button with a series of more closely spaced tick marks around the round recording button and/or a recording duration indicator above the round recording button; e.g., marked ring 616 in FIGS. 6I and 6M). Displaying different indications for different media recording modes enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first indication that the camera is in the first media recording mode includes displaying the live view from the camera with a first visual characteristic (e.g., a first aspect ratio, size, and/or resolution); and displaying the third indication that the camera is in the third media recording mode includes displaying the live view from the camera with a second visual characteristic (e.g., a second aspect ratio, size, and/or resolution) that is different from the first visual characteristic. Displaying indications with different visual characteristics for different media recording modes enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first indication that the camera is in the first media recording mode includes (1246) displaying a mode indicator in a first state (e.g., a toggle switch that is in the camera state) (e.g., a video indicator in an inactive state); displaying the third indication that the camera is in the third media recording mode includes displaying the mode indicator in a second state (e.g., the toggle switch in the video state) (e.g., the video indicator in the inactive state); and, while detecting the continuation the input by the first contact, the device displays an animated transition from the mode indicator in the first state to the mode indicator in the second state (e.g., the toggle button of the mode selector gradually expands to cover the video icon) (e.g., the video indicator gradually changes from the inactive state to the active state). Displaying animated transitions when device transitions between different media recording modes enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the third indication that corresponds to the third media recording mode, the device detects (1248) termination of the input by the first contact (e.g., detecting lift-off of the first contact; e.g., lift-off of contact 618 in FIG. 6Q). In addition, in response to detecting the termination of the input by the first contact, in accordance with a determination that a duration of the input meets a third predefined temporal threshold (e.g., the device has continuously detected the first contact for more than a third threshold amount of time that is longer than the threshold amount of time required to enter the video recording mode; e.g., temporal threshold $TT_L$, in FIG. 6O), the device continues to capture media images with the configuration that is compatible with multiple media recording modes until a termination input distinct from the first input is detected; obtains a first video from the continuously captured media upon detection of the termination input (e.g., the first video includes frames that are captured for the entire duration from the initial detection of the input by the first contact to the detection of the termination input); persistently stores the obtained first video (e.g., the video is persistently stored, and the rest of the media image data is discarded; e.g., a tap gesture including contact 624, in FIG. 6R, terminates video recording, as illustrated in FIG. 6S). In accordance with a determination that the duration of the input does not meet the third predefined temporal threshold (e.g., the device has continuously detected the first contact for more than the second threshold amount of time to enter the video recording mode, but not more than the third threshold amount of time to activate the continuous video recording mode; e.g., lift-off of contact 614, in FIG. 6J), the device ceases the continuous capture of media images with the configuration that is compatible with multiple media recording modes; obtains a second video from the continuously captured media (e.g., the second video includes frames that are captured for the entire duration of the input by the first contact); and persistently stores the obtained second video (e.g., the video is persistently stored, and the rest of the media image data is discarded).

Entering into a continuous recording mode when the input is maintained for a sufficient amount of time, and requiring separate input to terminate the recording of the video after the continuous recording mode is entered enhance the operability of the device and make the user-device interface more efficient (e.g., by reducing the number of user inputs needed to start the continuous recording mode and to providing the user with more precise control over when to stop the continuous recording) which, additionally, reduces power usage and improves battery life of the device by enabling the user to use the device more quickly and efficiently.

It should be understood that the particular order in which the operations in FIGS. 12A-12D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1400, 1600 and 1800) are also applicable in an analogous manner to method 1200 described above with respect to FIGS. 12A-12D. For example, the contacts, gestures, user interface objects, various types of thresholds, focus selectors, live views, frame stream, captured media content, media items, and live view display object, affordances, and animations described above with reference to method 1200 optionally have one or more of the characteristics of the contacts, gestures, user interface objects, various types of thresholds, focus selectors, live views, frame stream, captured media content, media items, and live view display object, affordances, and animations described herein with reference to other methods described herein (e.g., methods 1000, 1400, 1600 and 1800). For brevity, these details are not repeated here.

Figure 13:
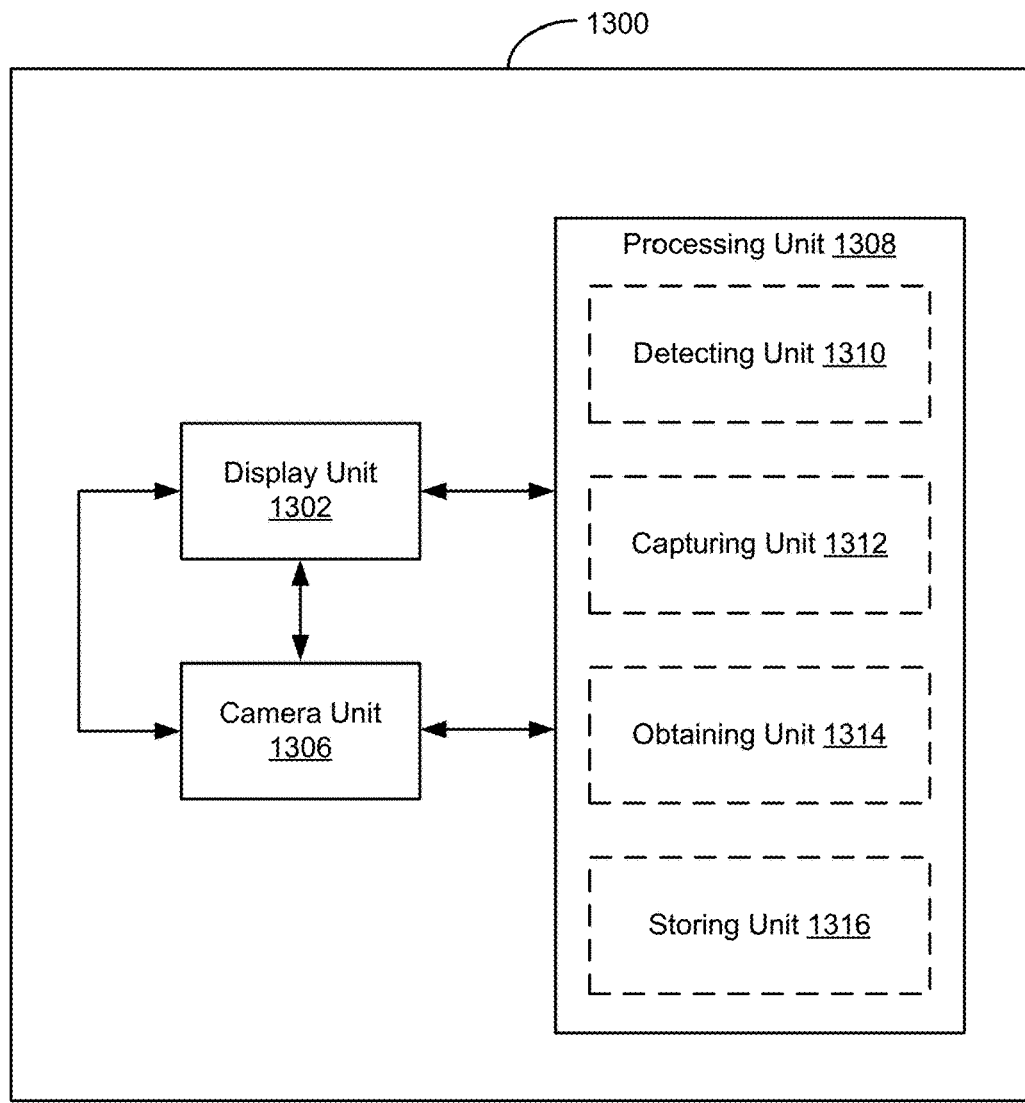
FIG. 13 is a functional block diagram of an electronic device in accordance with some embodiments.
Figure 14E:
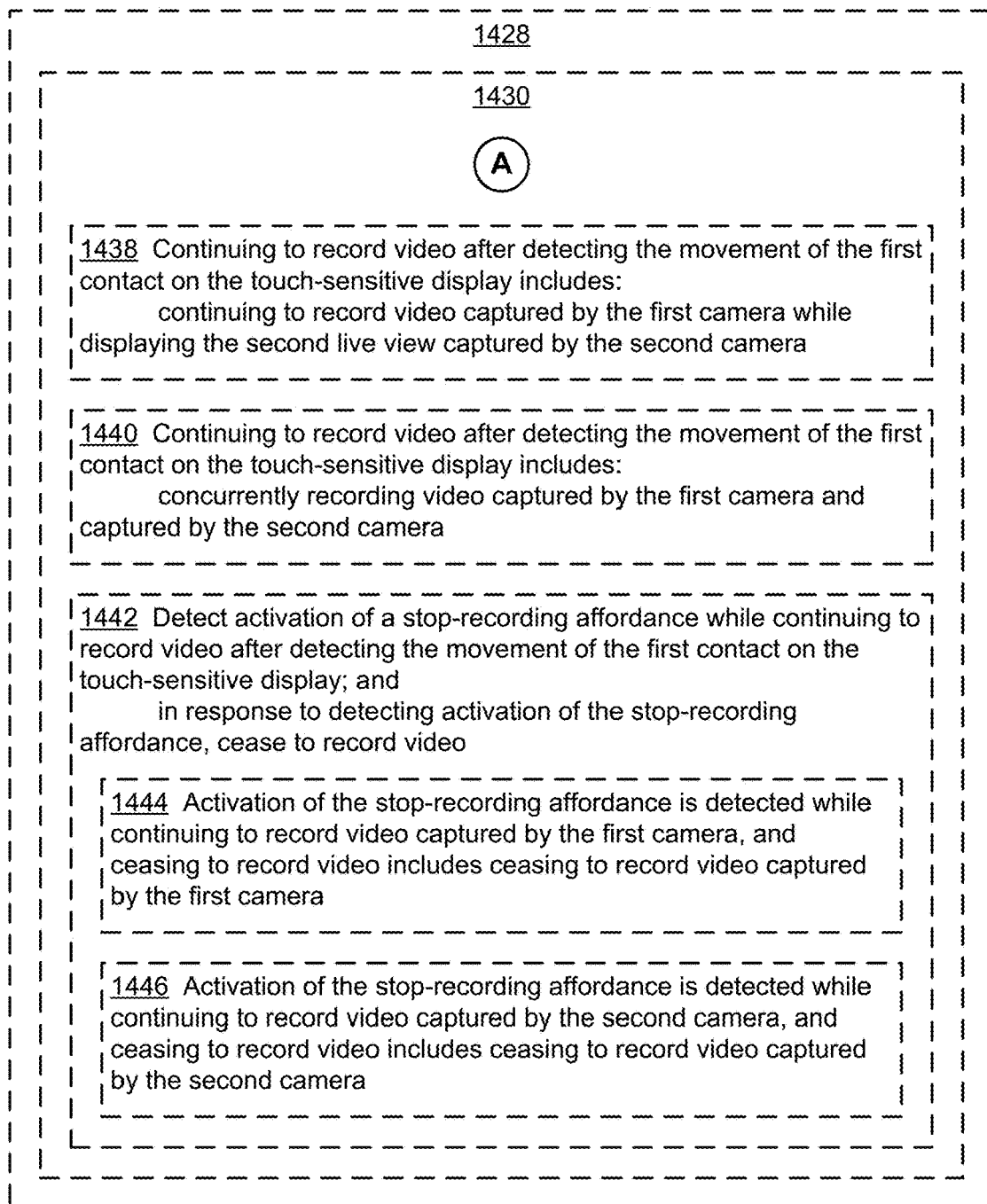

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display user interfaces, a camera unit 1306 configured to capture media, and a processing unit 1308 coupled to the display unit 1302 and the camera units 1306. In some embodiments, the processing unit includes detecting unit 1310, capturing unit 1312, obtaining unit 1314, and storing unit 1316.

The processing unit 1308 is configured to: enable display of (e.g., with the display unit 1302) a camera user interface on the display, the camera user interface including a live view from the camera unit 1306; while displaying the live view from the camera unit 1306, detect (e.g., with the detecting unit 1310) start of an input by a first contact that activates recording of media with the camera unit 1306; in response to detecting the start of the input by the first contact that activates record of media with the camera unit 1306, enable display of (e.g., with the display unit 1302) a first indication that the camera unit 1306 is in a first media recording mode that corresponds to recording of a single image; while displaying the first indication that the camera unit 1306 is in the first media recording mode, detect (e.g., with the detecting unit 1310) continuation of the input by the first contact; in response to detecting the continuation of the input by the first contact and before detecting termination of the input: in accordance with at least a determination that the continuation of the input meets a first predefined temporal threshold: enable display of (e.g., with the display unit 1302) a second indication that the camera unit 1306 is in a second media recording mode that corresponds to record of a sequence of images contemporaneous with the continuation of the input by the first contact; while displaying the second indication that the camera unit 1306 is in the second media recording mode, detect (e.g., with the detecting unit 1310) further continuation of the input by the first contact; in response to detecting the further continuation of the input by the first contact and before detecting termination of the input: in accordance with at least a determination that the further continuation of the input meets a second predefined temporal threshold, enable display of (e.g., with the display unit 1302) a third indication that the camera unit 1306 is in a third media recording mode that corresponds to record of a video.

In some embodiments, the processing unit 1308 is further configured to: in response to detecting the continuation of the input by the first contact and before detecting termination of the input: in accordance with at least a determination that the continuation of the input meets a first predefined temporal threshold: in response to detecting the further continuation of the input by the first contact and before detecting termination of the input: in accordance with a determination that the further continuation of the input does not meets the second predefined temporal threshold, maintain displaying (e.g., with the display unit 1302) of the second indication that the camera unit 1306 is in the second media recording mode.

In some embodiments, the processing unit 1308 is further configured to: in response to detecting the continuation of the input by the first contact and before detecting termination of the input: in accordance with a determination that the continuation of the input does not meets the first predefined temporal threshold, maintain displaying (e.g., with the display unit 1302) of the first indication that the camera unit 1306 is in the first media recording mode.

In some embodiments, the processing unit 1308 is further configured to: in response to detecting the start of the input by the first contact that activates recording of media with the camera unit 1306, start continuous capture (e.g., with the capturing unit 1312) of media images with a configuration that is compatible with multiple media recording modes including the first, second, and third media recording modes.

In some embodiments, the processing unit 1308 is further configured to: while displaying a respective one of the first, second, and third indications that corresponds to a respective one of the first, second, and third media recording modes, detect (e.g., with the detecting unit 1310) termination of the input by the first contact; and in response to detecting the termination of the input by the first contact: obtain (e.g., with the obtaining unit 1314), from the continuously captured media images, media of a first type that corresponds to said respective one of the first, second, and third media recording modes; and persistently store (e.g., with the storing unit 1316) the obtained media of the first type.

In some embodiments, the processing unit 1308 is further configured to: in response to detecting the termination of the input by the first contact, cease the continuous capture (e.g., with the capturing unit 1312) of media images with the configuration that is compatible with multiple media recording modes.

In some embodiments, the termination of the input by the first contact is detected while the camera unit 1306 is in the first media recording mode; and the media of a first type includes a single image with a first set of media properties.

In some embodiments, the termination of the input by the first contact is detected while the camera unit 1306 is in the second media recording mode; and the media of a first type includes a sequence of two or more images with a second set of media properties.

In some embodiments, the sequence of two or more images includes at least one image that had been captured before the camera unit 1306 entered the second media recording mode.

In some embodiments, the termination of the input by the first contact is detected while the camera unit 1306 is in the third media recording mode; and the media of a first type includes a video with a third set of media properties.

In some embodiments, the video includes at least one frame that had been captured before the camera unit 1306 entered the third media recording mode.

In some embodiments, displaying the first indication that the camera unit 1306 is in the first media recording mode includes displaying (e.g., with the display unit 1302) a recording affordance with a first appearance; displaying the second indication that the camera unit 1306 is in the second media recording mode includes displaying (e.g., with the display unit 1302) the recording affordance with a second appearance that is different from the first appearance; and displaying the third indication that the camera unit 1306 is in the third media recording mode includes displaying (e.g., with the display unit 1302) the recording affordance with a third appearance that is different from the first appearance and the second appearance.

In some embodiments, displaying the first indication that the camera unit 1306 is in the first media recording mode includes displaying (e.g., with the display unit 1302) the live view from the camera unit 1306 with a first visual characteristic; and displaying the third indication that the camera unit 1306 is in the third media recording mode includes displaying (e.g., with the display unit 1302) the live view from the camera unit 1306 with a second visual characteristic that is different from the first visual characteristic.

In some embodiments, displaying the first indication that the camera unit 1306 is in the first media recording mode includes displaying (e.g., with the display unit 1302) a mode indicator in a first state; displaying the third indication that the camera unit 1306 is in the third media recording mode includes displaying (e.g., with the display unit 1302) the mode indicator in a second state; and the processing unit 1308 is further configured to: while detecting the continuation the input by the first contact, enable display of (e.g., with the display unit 1302) an animated transition from the mode indicator in the first state to the mode indicator in the second state.

In some embodiments, the processing unit 1308 is further configured to: while displaying the third indication that corresponds to the third media recording mode, detect (e.g., with the detecting unit 1310) termination of the input by the first contact; and in response to detecting the termination of the input by the first contact: in accordance with a determination that a duration of the input meets a third predefined temporal threshold: continue to capture (e.g., with the capturing unit 1312) media images with the configuration that is compatible with multiple media recording modes until a termination input distinct from the first input is detected; obtain (e.g., with the obtaining unit 1314) a first video from the continuously captured media upon detection of the termination input; and persistently store (e.g., with the storing unit 1316) the obtained first video; and in accordance with a determination that the duration of the input does not meet the third predefined temporal threshold: cease the continuous capture (e.g., with the capturing unit 1312) of media images with the configuration that is compatible with multiple media recording modes; obtain (e.g., with the obtaining unit 1314) a second video from the continuously captured media; and persistently store (e.g., with the storing unit 1316) the obtained second video.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12D are, optionally, implemented by components depicted in FIGS. 1A-1B or FIG. 13. For example, detection operation 1204, determining operations 1212, 1220, 1222, and 1224 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 14A-14F are flow diagrams illustrating a method 1400 of switching between camera live views during image capture in accordance with some embodiments. As described below, the method 1400 relates to manipulating a user interface object that currently displays a live view from a first camera through movement of a contact, such that a live view from a second camera is displayed in the user interface object. In addition, the live views from the first camera and the second camera both move in accordance with the movement of the contact. Switching to the live view from a second camera in response to movement of a contact that is detected while displaying the live view from a first camera, and moving the live views from the two cameras in accordance with the movement of the contact allow the user more control over the speed and extent by which the live views from different cameras will move in the user interface. The additional control over the speed and extent by which the live views from different camera are moved and/or switched in the user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The method 1400 is performed at an electronic device (e.g., device 300, FIG. 3, or portable multifunction device 100, FIG. 1A) a display, a touch-sensitive surface, and one or more cameras. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1400 are, optionally, combined and/or the order of some operations is, optionally, changed.

The device displays (1402), in a first display region of a camera user interface, a first live view (e.g., live view 804 in FIG. 8A) from a first camera of the electronic device. For example, in some embodiments, the first display region is a live viewfinder that includes the first live view. In some embodiments, the first display region does not concurrently include a second live view that is captured by a second camera of the electronic device (e.g., the first camera is a front camera and the second camera is a back camera, or vice versa). In some embodiments, the camera user interface includes affordances for activating or stopping one or more media recording modes.

While displaying the first live view from the first camera in the first display region of the camera user interface, the device detects (1404) movement of a first contact on the touch-sensitive surface (e.g., detecting a first swipe gesture on the touch-sensitive display across the first live view in the first display region) (e.g., the first contact is not detected at any location that corresponds to a toggle affordance for switching between a front camera and a back camera). For example, the first contact that is detected is contact 808 in FIGS. 8A-8D, contact 812 in FIGS. 8F-8G, contact 814 in FIGS. 8H-8I, contact 816 in FIGS. 8J-8M, contact 818 in FIGS. 8O-8P, contact 822 in FIGS. 8U-8Y, or contact 824 in FIGS. 8Z-8AA.

In response to detecting the movement of the first contact on the touch-sensitive surface, in accordance with a determination that the movement of the first contact meets first movement criteria (e.g., the first movement criteria require that the movement of the first contact is in a first direction (e.g., the horizontal direction)), the device moves (1406) the first live view in the first display region in accordance with the movement of the first contact on the touch-sensitive surface (e.g., the first live view is displayed on a front side of a double-sided user interface object, and the double-sided user interface object is rotated about an axis in the plane of the display in accordance with movement of the first contact) (e.g., the first live view is shifted horizontally in accordance with the movement of the first contact, such that part of the first live view is moved outside of the first display region and is no longer visible to the user). This is illustrated in FIGS. 8J-8N (e.g., live view 804 is rotated with movement of contact 816), FIGS. 8O-8P (e.g., live view 804 is rotated with movement of contact 818), FIGS. 8T-8X (e.g., live view 820 is shifted to the right with movement of contact 822), and FIGS. 8Z-8AA (e.g., live view 820 is shifted to the right with movement of contact 824), for example. In addition, the device displays a second live view from a second camera of the electronic device in the first display region (e.g., the second live view is displayed on a back side of a double-sided user interface object; and when the double-sided user interface object is flipped completely (e.g., rotated more than 90 degrees about an axis in the plane of the display) in accordance with movement of the first contact, the first live view is no longer displayed in the first display region and the second live view is displayed in the first display region) (e.g., as the first live view is shifted horizontally in accordance with the movement of the first contact, the second live view is moved into the space that is vacated by the first live view). Furthermore, the device moves the second live view in the first display region in accordance with the movement of the first contact on the touch-sensitive surface (e.g., after the back side of the double-sided user interface object (with the second live view) becomes visible in the first display region, the double-sided user interface object is rotated about the axis in the plane of the display in accordance with movement of the first contact, until the back side of the double-sided user interface object (with the second live view) has reached the frontal position in the first display region) (e.g., as the first and second live views are continually shifted horizontally in accordance with the movement of the first contact, the second live view eventually occupies the entire first display region and the first live view is no longer visible to the user). This is illustrated in FIGS. 8O-8T (e.g., live view 820 is rotated with simulated inertia caused by movement of contact 818), FIGS. 8T-8X (e.g., live view 804 is shifted to the right with movement of contact 822), and FIGS. 8Z-8AA (e.g., live view 804 is shifted to the right with simulated inertia caused by movement of contact 824), for example.

In some embodiments, the first live view is (1408) displayed on a first side of a multi-sided user interface object (e.g., a double-sided user interface object); the second live view is displayed on a second side of the multi-sided user interface object; and moving the first live view and the second live view in accordance with the movement of the first contact on the touch-sensitive display includes rotating the multi-sided user interface object in accordance with the movement of the first contact on the touch-sensitive display. This is illustrated in FIGS. 8J-8T and accompanying descriptions, for example. Switching live views from different cameras by rotating a multi-sided user interface object enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the movement of the first contact includes (1410) a first portion of the movement in a first direction (e.g., from left to right), and a second portion of the movement in a second direction opposite the first direction (e.g., from right to left); and rotating the multi-sided user interface object in accordance with the movement of the first contact on the touch-sensitive display includes rotating the multi-sided user interface object in the first direction in response to the first portion of the movement; and rotating the multi-sided user interface object in the second direction in response to the second portion of the movement. For example, the user may start to flip the double-sided user interface object to see the second live view by swiping from left to right, and then reverse the swipe direction to return to the first live view before lifting off the contact. Allowing the user to reverse the rotation of a multi-sided user interface object enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after rotating the multi-sided user interface object in accordance with the first contact on the touch-sensitive display, the device detects (1412) lift-off of the first contact; and, in response to detecting the lift-off of the first contact, in accordance with a determination that the movement of the first contact meets second movement criteria (e.g., movement is beyond a threshold distance, a threshold speed, and/or a threshold duration), the device continues to rotate the multi-sided user interface object after the lift-off of the first contact, until the second side of the multi-sided user interface object occupies an entirety of the first display region. This is illustrated in FIGS. 8O-8T and accompanying descriptions, for example. Automatically snapping to a second live view in response to rotation/movement that meet predetermined movement criteria enhances the operability of the device and makes the user-device interface more efficient (e.g., by reducing the number of user inputs and lowering the precision requirement of the user inputs to perform an operation) which, additionally, reduces power usage and improves battery life of the device by enabling the user to use the device more quickly and efficiently.

In some embodiments, in response to detecting the lift-off of the first contact, in accordance with a determination that the movement of the first contact meets third movement criteria (e.g., movement is not beyond a threshold distance, a threshold speed, and/or a threshold duration), the device reverses (1414) rotation of the multi-sided user interface object after the lift-off of the first contact, until the first side of the multi-sided user interface object reoccupies the entirety of the first display region. This is illustrated in FIGS. 8J-8N and accompanying descriptions, for example. Automatically reverting to the first live view after termination of rotation/movement that meet predetermined movement criteria enhances the operability of the device and makes the user-device interface more efficient (e.g., by reducing the number of user inputs and lowering the precision requirement of the user inputs to perform an operation) which, additionally, reduces power usage and improves battery life of the device by enabling the user to use the device more quickly and efficiently.

In some embodiments, the first live view is (1416) displayed in a first panel of a multi-panel user interface object (e.g., a two-panel user interface object); the second live view is displayed in the second-panel of the multi-panel user interface object; and moving the first live view and the second live view in accordance with the movement of the first contact on the touch-sensitive display includes sliding the multi-panel user interface object in the first display region in accordance with the movement of the first contact on the touch-sensitive display. For example, as the user slides the two-panel user interface object horizontally, the first live view is gradually moved off of the first display region, and the second live view is gradually moved onto the first display region, and eventually, occupies the entirety of the first display region. This is illustrated in FIGS. 8U-8Y and accompanying descriptions, for example. Automatically splitting the user interface object to show live views from both cameras enhances the operability of the device and makes the user-device interface more efficient (e.g., by reducing the number of user inputs required to show live views from both camera and providing more precise control over the relative sizes of the two live views) which, additionally, reduces power usage and improves battery life of the device by enabling the user to use the device more quickly and efficiently.

In some embodiments, the movement of the first contact includes (1418) a first portion of the movement in a first direction, and a second portion of the movement in a second direction opposite the first direction, and sliding the multi-panel user interface object in accordance with the movement of the first contact on the touch-sensitive display includes sliding the multi-panel user interface object in the first direction in response to the first portion of the movement; and sliding the multi-panel user interface object in the second direction in response to the second portion of the movement. This is illustrated in FIGS. 8W and 8X and accompanying descriptions, for example. Allowing the user to reverse the sliding of a multi-panel user interface object enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after sliding the multi-panel user interface object in accordance with the movement of the first contact on the touch-sensitive display, the device detects (1420) lift-off of the first contact; and, in response to detecting the lift-off of the first contact, in accordance with a determination that the movement of the first contact meets fourth movement criteria (e.g., movement is beyond a threshold distance, a threshold speed, and/or a threshold duration), the device continues to slide the multi-panel user interface object after the lift-off of the first contact, until the second panel of the multi-panel user interface object occupies an entirety of the first display region. This is illustrated in FIGS. 8Z and 8AA and accompanying descriptions, for example. Automatically snapping to a second live view in response to movement that meet predetermined movement criteria enhances the operability of the device and makes the user-device interface more efficient (e.g., by reducing the number of user inputs and lowering the precision requirement of the user inputs to perform an operation) which, additionally, reduces power usage and improves battery life of the device by enabling the user to use the device more quickly and efficiently.

In some embodiments, in response to detecting the lift-off of the first contact, in accordance with a determination that the movement of the first contact meets fifth movement criteria (e.g., movement is not beyond a threshold distance, a threshold speed, and/or a threshold duration), the device reverses (1422) sliding of the multi-sided user interface object after the lift-off of the first contact, until the first panel of the multi-panel user interface object reoccupies the entirety of the first display region. Automatically reverting to the first live view after termination of movement that meet predetermined movement criteria enhances the operability of the device and makes the user-device interface more efficient (e.g., by reducing the number of user inputs and lowering the precision requirement of the user inputs to perform an operation) which, additionally, reduces power usage and improves battery life of the device by enabling the user to use the device more quickly and efficiently.

In some embodiments, after sliding the multi-panel user interface object in accordance with the movement of the first contact on the touch-sensitive display, the device detects (1424) lift-off of the first contact; and, in response to detecting the lift-off of the first contact, ceases to slide the multi-panel user interface object after the lift-off of the first contact. In some embodiments, the first display region concurrently displays a part of the first panel of the multi-panel user interface object and a part of the second panel of the multi-panel user interface object. This is illustrated in FIG. 8Y and accompanying descriptions, for example. Splitting the user interface object to show live views from both cameras at a location based on a lift-off of the contact in a swipe input enhances the operability of the device and makes the user-device interface more efficient (e.g., by reducing the number of user inputs required to show live views from both camera and providing more precise control over the relative sizes of the two live views) which, additionally, reduces power usage and improves battery life of the device by enabling the user to use the device more quickly and efficiently.

In some embodiments, the device detects (1426) lift-off of the first contact. In some embodiments, after lift-off of the first contact, in accordance with a determination that the movement of the first contact meets sixth movement criteria (e.g., the first swipe gesture is a quick swipe with a fast speed (e.g., a speed greater than a threshold speed), a short distance (e.g., distance less than a threshold distance), and/or a short duration (e.g., duration less than a threshold duration)), the first live view ceases to be displayed in the first display region, and the second live view occupies an entirety of the first display region; and, in accordance with a determination that the movement of the first contact meets seventh movement criteria (e.g., the first swipe gesture is a slow swipe with a slow speed (e.g., a speed that is no greater than a threshold speed), a longer distance (e.g., a distance that is no less than a threshold distance), and/or a longer duration (e.g., a duration that is no less than a threshold duration)), the first display region is split between the displaying a part of the first live view and a part of the second live view. This is illustrated in FIGS. 8U-8AA and accompanying descriptions, for example. In FIGS. 8U-8Y, the live view display object is split between live view 804 and live view 820 in response to a slow swipe gesture by contact 822, and in FIGS. 8Z-8AA, in response to a fast flick gesture, the live view display object snaps to a position where only one live view is displayed. Determining whether to snap to another live view or split the user interface object between two live views based on which movement criteria are met by the input upon lift-off of the input enhances the operability of the device and makes the user-device interface more efficient (e.g., by reducing the number of user inputs required to show desired live view(s) and providing more precise control over the relative sizes of the live view(s)) which, additionally, reduces power usage and improves battery life of the device by enabling the user to use the device more quickly and efficiently.

In some embodiments, the movement of the first contact is (1428) detected while video recording (or media capturing) through the first camera is in progress (e.g., such that the recorded video shows the first live view before the movement of the first contact is detected and shows the movement of the first live view and the movement of the second live view that is displayed in response to the movement of the first contact). Continuing to record media when input for switching live views is detected enhances the operability of the device and makes the user-device interface more efficient (e.g., by reducing the number of user inputs required to switch live views and continuing to record media) which, additionally, reduces power usage and improves battery life of the device by enabling the user to use the device more quickly and efficiently.

In some embodiments, the device continues (1430) to record video (or continuing to capture media) after detecting the movement of the first contact on the touch-sensitive display (e.g., such that the recorded video shows the first live view before the movement of the first contact is detected and shows the movement of the first live view and the movement of the second live view that is displayed in response to the movement of the first contact). Continuing to record media while input for switching live views is detected enhances the operability of the device and makes the user-device interface more efficient (e.g., by reducing the number of user inputs required to switch live views and continuing to record media) which, additionally, reduces power usage and improves battery life of the device by enabling the user to use the device more quickly and efficiently.

In some embodiments, continuing to record video after detecting the movement of the first contact on the touch-sensitive display includes (1432) continuing to record video captured by the first camera while moving the first live view and the second live view in accordance with the movement of the first contact (e.g., such that the recorded video shows the first live view before the movement of the first contact is detected and shows the movement of the first live view and the movement of the second live view that is displayed in response to the movement of the first contact). Continuing to record media captured by the first camera when switching live views enhances the operability of the device and makes the user-device interface more efficient (e.g., by reducing the number of user inputs required to switch live views and continuing to record media from the camera that provides the initial live view) which, additionally, reduces power usage and improves battery life of the device by enabling the user to use the device more quickly and efficiently.

In some embodiments, continuing to record video after detecting the movement of the first contact on the touch-sensitive display includes (1434) ceasing to record video captured by the first camera when the first live view captured by the first camera is no longer displayed in the first display region; and starting to record video captured by the second camera when the second live view captured by the second camera is displayed in the first display region. Switching the recording camera based on the live switching of camera views enhances the operability of the device and makes the user-device interface more efficient (e.g., by reducing the number of user inputs to change the recording camera) which, additionally, reduces power usage and improves battery life of the device by enabling the user to use the device more quickly and efficiently.

In some embodiments, continuing to record video after detecting the movement of the first contact on the touch-sensitive display includes (1436) continuing to recording video as shown in the first display region, including recording the movement of the first live view and the second live view (e.g., the rotation of the double-sided user interface object, or the sliding of the two-panel user interface object). Recording media that includes the live switching of camera views enhances the operability of the device and makes the user-device interface more efficient (e.g., by reducing the number of user inputs to capture the live switching of camera views) which, additionally, reduces power usage and improves battery life of the device by enabling the user to use the device more quickly and efficiently.

In some embodiments, continuing to record video after detecting the movement of the first contact on the touch-sensitive display includes (1438) continuing to record video captured by the first camera while displaying the second live view captured by the second camera (e.g., while the second live view occupies the entirety of the first display region and before an explicit stop recording input is detected). Continuing to record media captured by the first camera regardless of the live views that is currently shown enhances the operability of the device and makes the user-device interface more efficient (e.g., by reducing the number of user inputs to record media from one camera while checking the live views from another camera) which, additionally, reduces power usage and improves battery life of the device by enabling the user to use the device more quickly and efficiently.

In some embodiments, continuing to record video after detecting the movement of the first contact on the touch-sensitive display includes (1440) concurrently recording video captured by the first camera and captured by the second camera (e.g., two videos are created, one from each camera; or alternatively, a single video is created with image data from each of the two cameras occupying part of each image frame (e.g., either in a picture-in-picture format, a split-screen format, or some other format)). Recording media captured by both cameras during the live switching of camera views enhances the operability of the device and makes the user-device interface more efficient (e.g., by reducing the number of user inputs to record media from both cameras while checking the live views from both cameras) which, additionally, reduces power usage and improves battery life of the device by enabling the user to use the device more quickly and efficiently.

In some embodiments, the device detects (1442) activation of a stop-recording affordance while continuing to record video after detecting the movement of the first contact on the touch-sensitive display, and, in response to detecting activation of the stop-recording affordance, ceases to record video. Requiring an explicit stop input to stop recording from the user to stop recording of captured media enhances the operability of the device and makes the user-device interface more efficient (e.g., by giving the user more precise control of when the media recording should be stopped, and reducing the number of user inputs to continue recording media) which, additionally, reduces power usage and improves battery life of the device by enabling the user to use the device more quickly and efficiently.

In some embodiments, activation of the stop-recording affordance is (1444) detected while continuing to record video captured by the first camera, and ceasing to record video includes ceasing to record video captured by the first camera.

In some embodiments, activation of the stop-recording affordance is (1446) detected while continuing to record video captured by the second camera, and ceasing to record video includes ceasing to record video captured by the second camera.

In some embodiments, in response to detecting the movement of the first contact, in accordance with a determination that the movement of the first contact meets eighth movement criteria (e.g., the eight movement criteria require that the movement of the first contact is in a second direction perpendicular to the first direction (e.g., the first swipe gesture is in the vertical direction)), the device changes (1448) an aspect ratio of the first live view or an aspect ratio of the first display region in accordance with the movement of the first contact. This is illustrated in FIGS. 8A-8I and accompanying descriptions (e.g., aspect ratio of live view 804 is changed in response to vertical movement of contacts 808, 812, and 814, respectively), for example. Changing an aspect ratio of a live view in accordance with movement of a contact meeting predetermined criteria enhances the operability of the device and makes the user-device interface more efficient (e.g., by reducing the number of user inputs to record media of a desired aspect ratio) which, additionally, reduces power usage and improves battery life of the device by enabling the user to use the device more quickly and efficiently.

In some embodiments, changing an aspect ratio of the first live view or an aspect ratio of the first display region in accordance with the movement of the first contact includes (1450), in accordance with a determination that the movement of the first contact meets ninth movement criteria (e.g., the first swipe gesture is a quick swipe with a fast speed (speed greater than a threshold speed), a short distance (e.g., distance less than a threshold distance), and/or a short duration (e.g., duration less than a threshold duration)), switching from a first aspect ratio (e.g., a preset aspect ratio such as a 4:3 aspect ratio) to a second aspect ratio (e.g., a present aspect ratio such as a square aspect ratio). This is illustrated in FIGS. 8F-8I and accompanying descriptions (e.g., aspect ratio of live view 804 toggles between a square aspect ratio and a 4:3 aspect ratio in response to two flick gestures by contact 812 and 814, respectively), for example. Changing an aspect ratio of a live view in accordance with movement of a contact meeting predetermined criteria enhances the operability of the device and makes the user-device interface more efficient (e.g., by reducing the number of user inputs to record media of a desired aspect ratio) which, additionally, reduces power usage and improves battery life of the device by enabling the user to use the device more quickly and efficiently.

In some embodiments, changing an aspect ratio of the first live view or an aspect ratio of the first display region in accordance with the movement of the first contact includes (1452), in accordance with a determination that the movement of the first contact meets tenth movement criteria (e.g., the first swipe gesture is a slow swipe with a slow speed (speed no greater than a threshold speed), dynamically adjusting the aspect ratio of the first live view or the first display region in accordance with the movement of the first contact (e.g., in accordance with a magnitude of the movement of the contact such as a speed or distance moved by the contact). This is illustrated in FIGS. 8A-8E and accompanying descriptions (e.g., aspect ratio of live view 804 is dynamically changed in accordance with movement of contact 808), for example. Changing an aspect ratio of a live view in accordance with movement of a contact meeting predetermined criteria enhances the operability of the device and makes the user-device interface more efficient (e.g., by reducing the number of user inputs to record media of a desired aspect ratio) which, additionally, reduces power usage and improves battery life of the device by enabling the user to use the device more quickly and efficiently.

In some embodiments, the movement of the first contact is (1454) in a first region on the touch-sensitive display that corresponds to locations within the first display region, and, while displaying the first display region including the first live view captured by the first camera (e.g., while the first live view occupies the entirety of the first display region), the device detects movement of a second contact (e.g., detecting a second swipe gesture distinct from the first swipe gesture) in a second region on the touch-sensitive display that corresponds to locations outside of the first display region (e.g., in a camera control region that includes a plurality of affordances for different image capturing modes, e.g., respective affordances for video, still camera, slow-motion, bursts, panorama, night-vision, etc.). In response to detecting the movement of the second contact in the second direction, the device switches from a first media capture mode to a second media capture mode of the first camera in accordance with the movement of the second contact (e.g., in accordance with a direction and/or magnitude of the movement of the second contact, such that movement in a first direction causes the device to switch to a first other media capture mode, and movement in a second direction opposite to the first direction causes the device to switch to a second other media capture mode that is different from the first other media capture mode). This is illustrated in FIG. 8AC wherein control region 810 includes affordances 834 and 832. A swipe input on the control region 810 causes the camera to switch from regular video recording to slow-motion recording mode, or to time-lapse recording mode depending on whether the swipe is a rightward swipe or a leftward swipe, for example. Changing a media capture mode in accordance with movement of a contact meeting predetermined criteria enhances the operability of the device and makes the user-device interface more efficient (e.g., by reducing the number of user inputs to record media using a desired media capture mode) which, additionally, reduces power usage and improves battery life of the device by enabling the user to use the device more quickly and efficiently.

It should be understood that the particular order in which the operations in FIGS. 14A-14F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1200, 1600 and 1800) are also applicable in an analogous manner to method 1400 described above with respect to FIGS. 14A-14F. For example, the contacts, gestures, user interface objects, various types of thresholds, focus selectors, live views, frame stream, captured media content, media items, and live view display object, affordances, and animations described above with reference to method 1400 optionally have one or more of the characteristics of the contacts, gestures, user interface objects, various types of thresholds, focus selectors, live views, frame stream, captured media content, media items, and live view display object, affordances, and animations described herein with reference to other methods described herein (e.g., methods 1000, 1200, 1600 and 1800). For brevity, these details are not repeated here.

Figure 15:
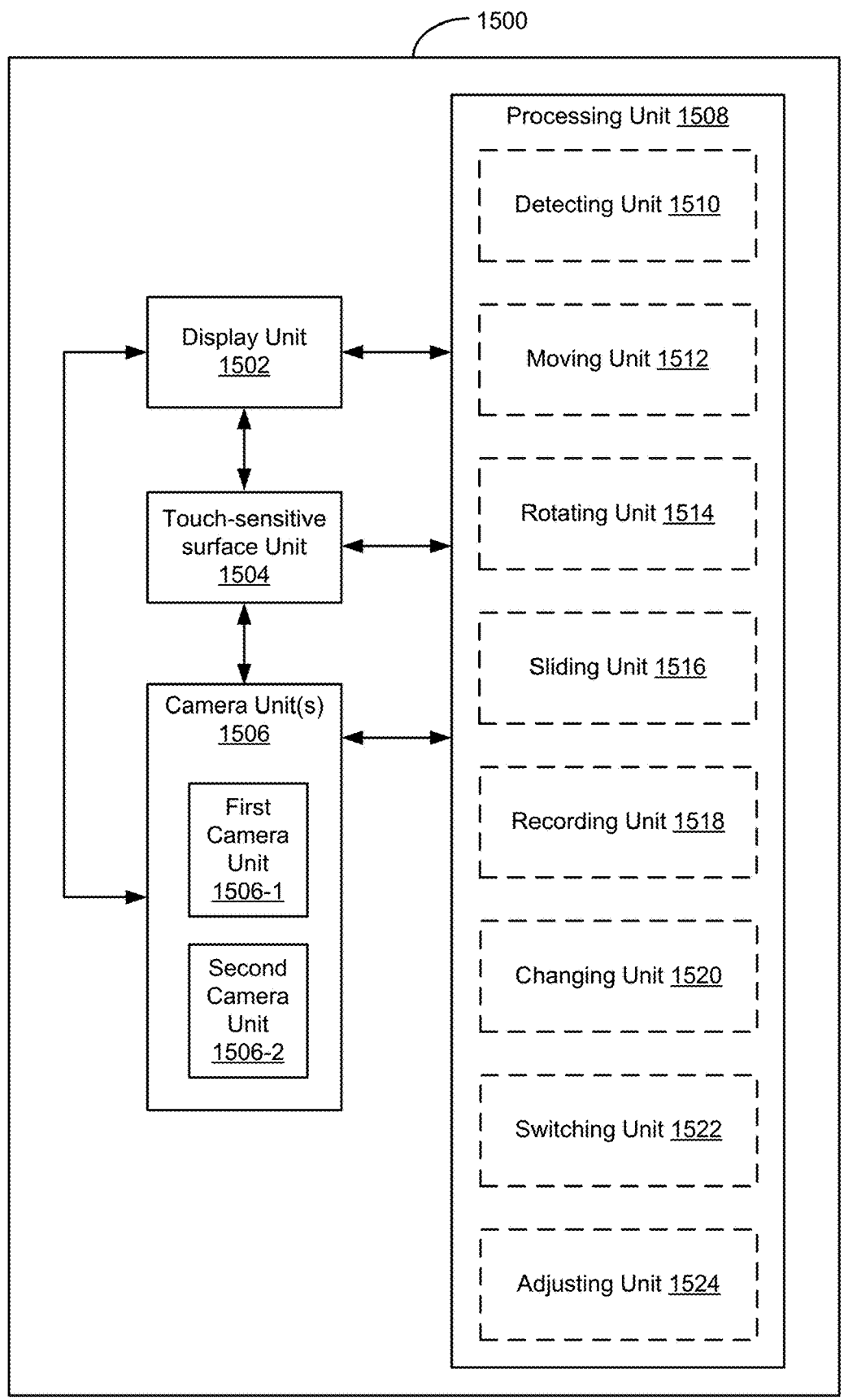
FIG. 15 is a functional block diagram of an electronic device in accordance with some embodiments.
Figure 16D:
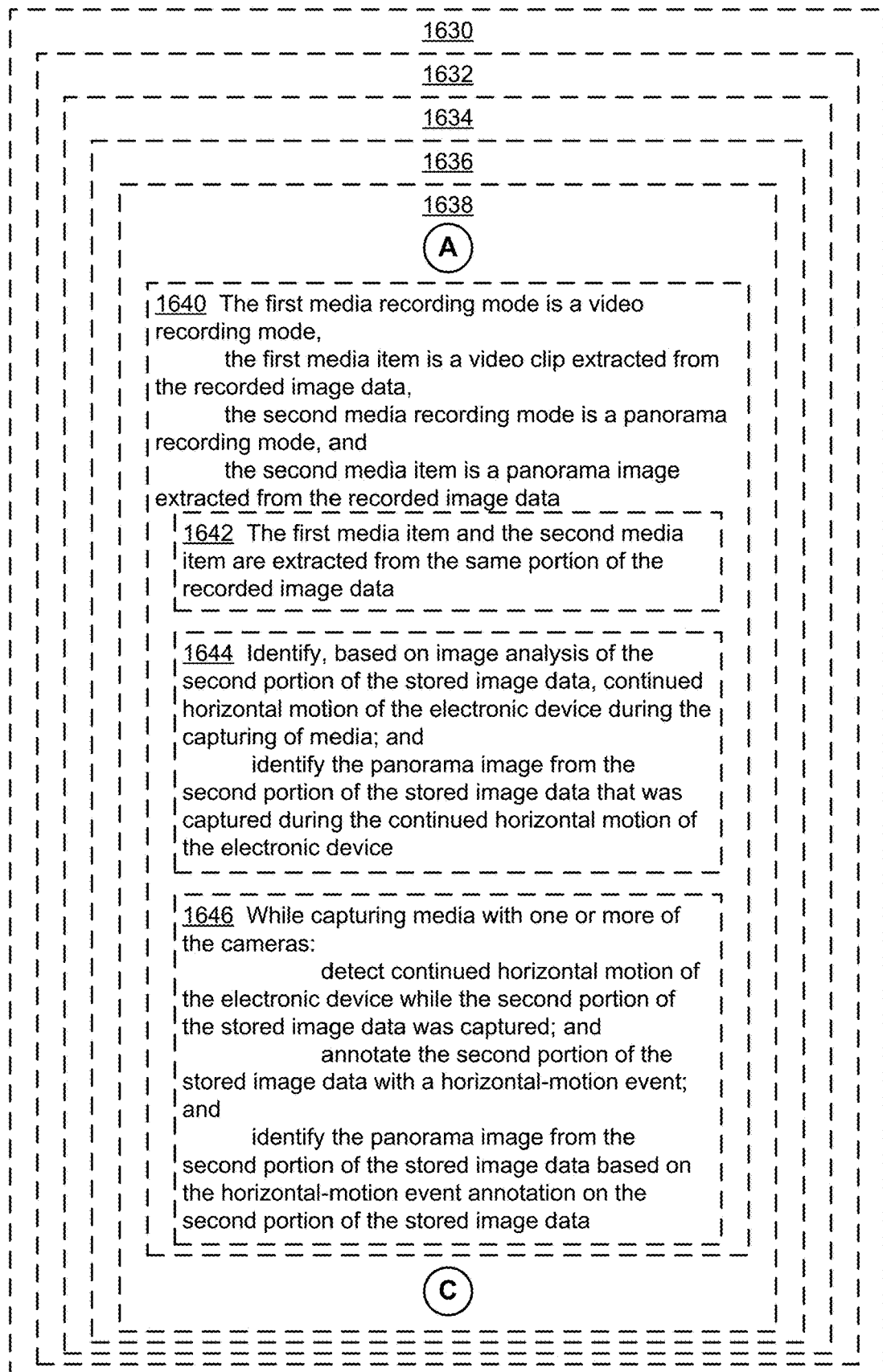
Figure 16E:
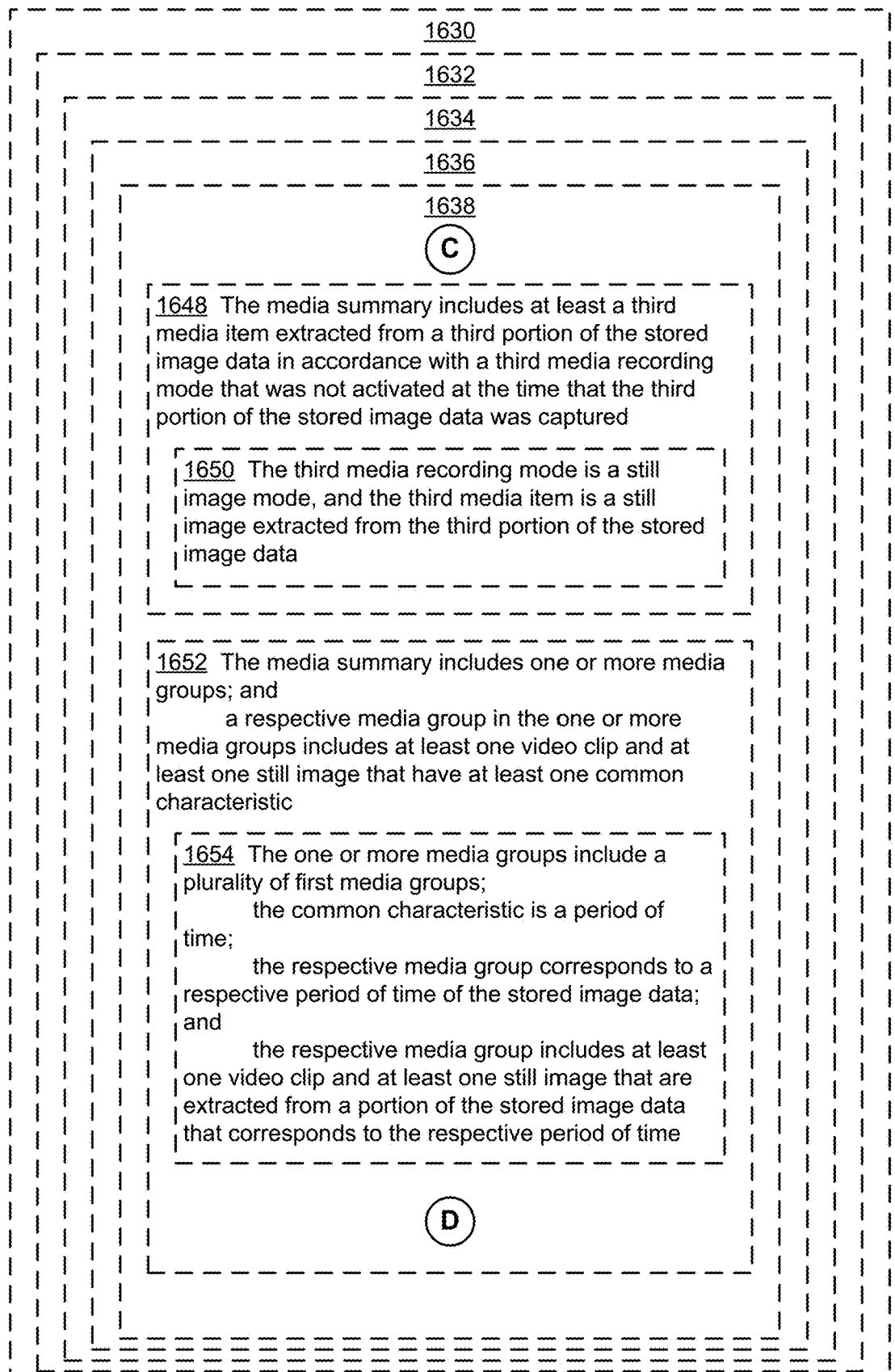
Figure 16F:
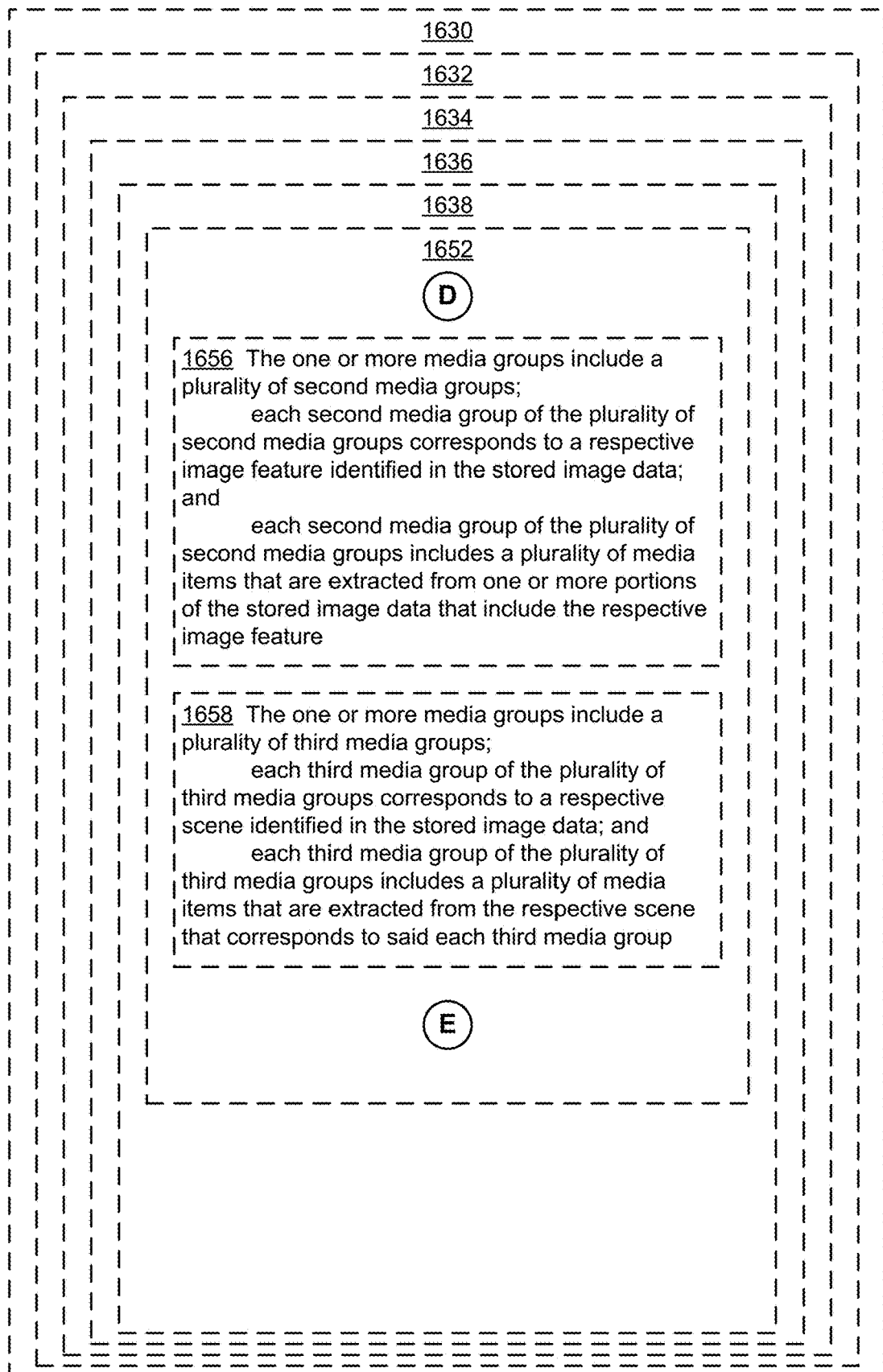
Figure 16G:
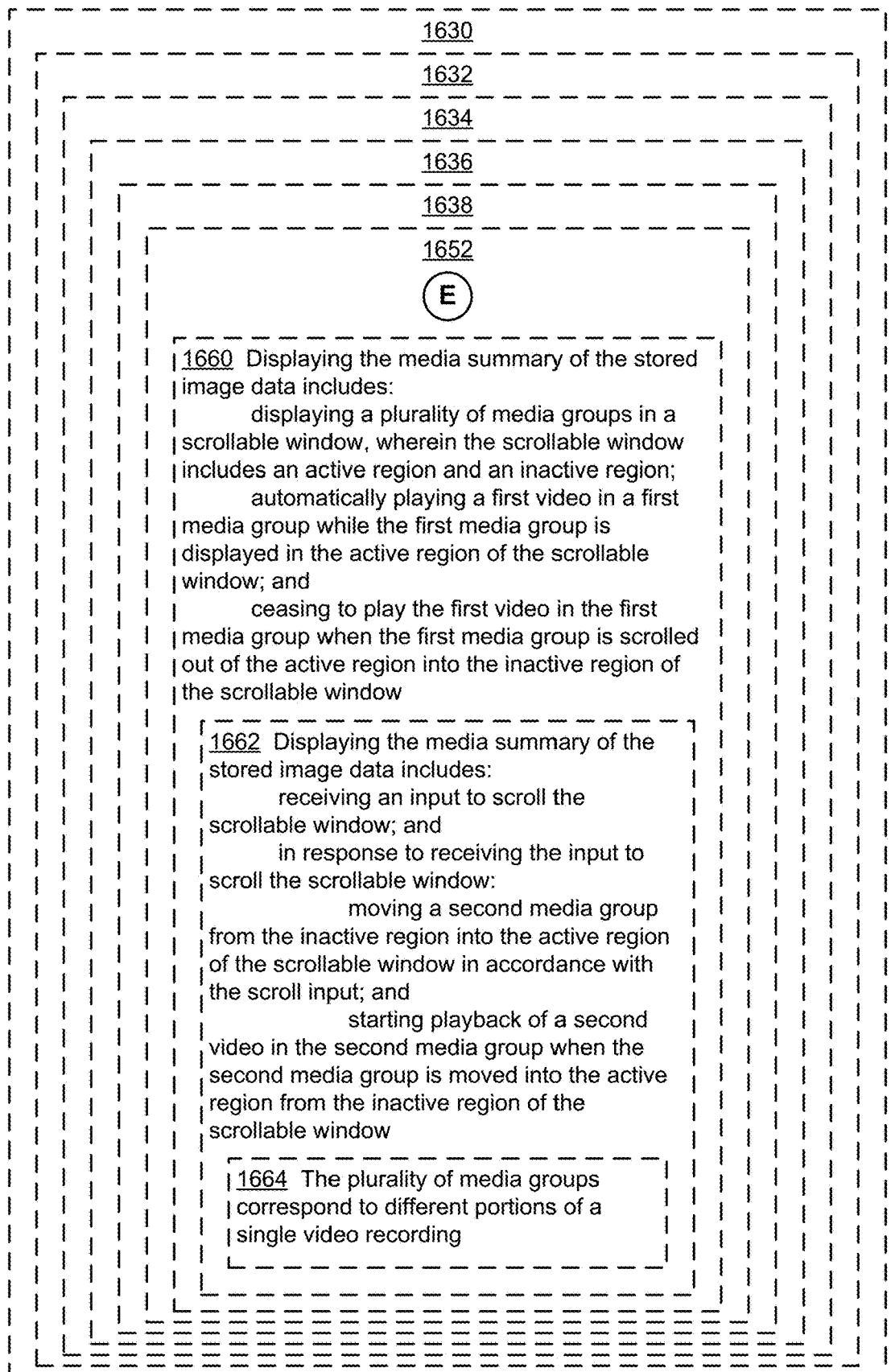
Figure 16H:
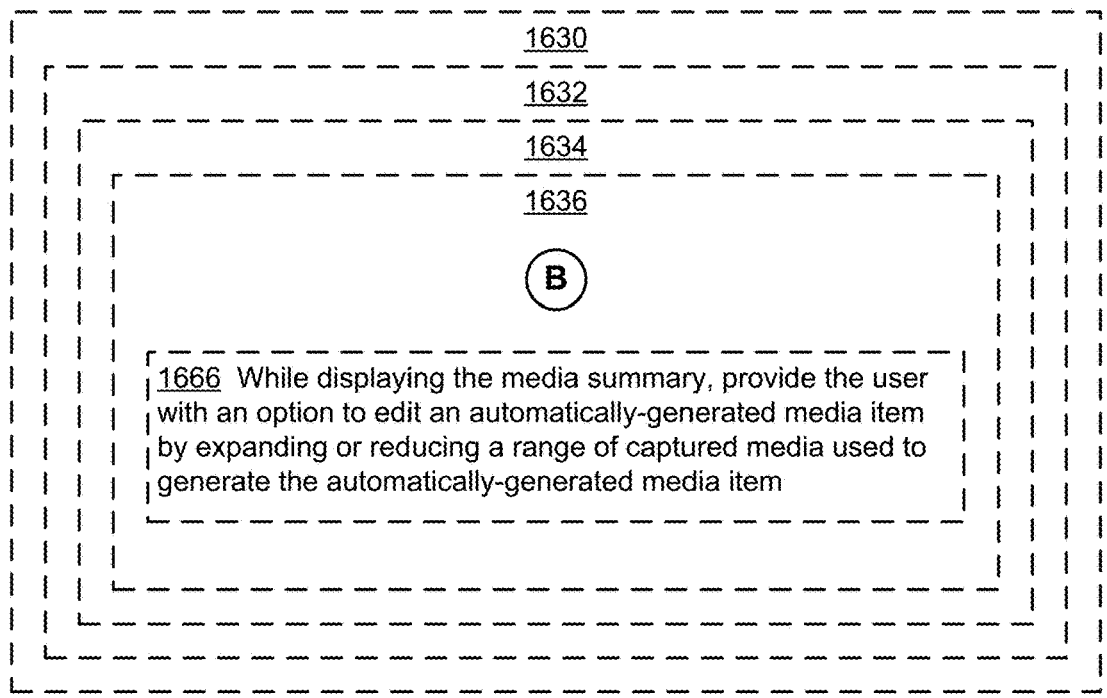

In accordance with some embodiments, FIG. 15 shows a functional block diagram of an electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes a display unit 1502 configured to display user interfaces, a touch-sensitive surface unit 1504 configured to detect contacts, one or more camera units 1506 (including a first camera unit 1506-1 and a second camera unit 1506-2) configured to capture media, and a processing unit 1508 coupled to the display unit 1502, the touch-sensitive surface unit 1504, and the camera units 1506. In some embodiments, the processing unit includes detecting unit 1510, moving unit 1512, rotating unit 1514, sliding unit 1516, recording unit 1518, changing unit 1520, switching unit 1522, and adjusting unit 1524.

The processing unit 1508 is configured to: enable display of (e.g., with the display unit 1502), in a first display region of a camera user interface, a first live view from a first camera unit 1506-1 of the electronic device; while displaying the first live view from the first camera unit 1506-1 in the first display region of the camera user interface, detect (e.g., with the detecting unit 1510) movement of a first contact on the touch-sensitive surface unit 1504; and, in response to detecting the movement of the first contact on the touch-sensitive surface unit 1504: in accordance with a determination that the movement of the first contact meets first movement criteria: move (e.g., with the moving unit 1512) the first live view in the first display region in accordance with the movement of the first contact on the touch-sensitive surface unit 1504; enable display of (e.g., with the display unit 1502) a second live view from a second camera unit 1506-2 of the electronic device in the first display region; and move (e.g., with the moving unit 1512) the second live view in the first display region in accordance with the movement of the first contact on the touch-sensitive surface unit 1504.

In some embodiments, the first live view is displayed (e.g., with the display unit 1502) on a first side of a multi-sided user interface object, the second live view is displayed (e.g., with the display unit 1502) on a second side of the multi-sided user interface object; and moving the first live view and the second live view in accordance with the movement of the first contact on the touch-sensitive surface unit 1504 includes rotating (e.g., with the rotating unit 1514) the multi-sided user interface object in accordance with the movement of the first contact on the touch-sensitive surface unit 1504.

In some embodiments, the movement of the first contact includes a first portion of the movement in a first direction, and a second portion of the movement in a second direction opposite the first direction, and rotating the multi-sided user interface object in accordance with the movement of the first contact on the touch-sensitive surface unit 1504 includes: rotating (e.g., with the rotating unit 1514) the multi-sided user interface object in the first direction in response to the first portion of the movement; and rotating (e.g., with the rotating unit 1514) the multi-sided user interface object in the second direction in response to the second portion of the movement.

In some embodiments, the processing unit 2508 is further configured to: after rotating the multi-sided user interface object in accordance with the first contact on the touch-sensitive surface unit 1504, detect (e.g., with the detecting unit 1510) lift-off of the first contact; and in response to detecting the lift-off of the first contact: in accordance with a determination that the movement of the first contact meets second movement criteria, continue to rotate (e.g., with the rotating unit 1514) the multi-sided user interface object after the lift-off of the first contact, until the second side of the multi-sided user interface object occupies an entirety of the first display region.

In some embodiments, the processing unit 2508 is further configured to: in response to detecting the lift-off of the first contact: in accordance with a determination that the movement of the first contact meets third movement criteria, reverse rotation of (e.g., with the rotating unit 1514) the multi-sided user interface object after the lift-off of the first contact, until the first side of the multi-sided user interface object reoccupies the entirety of the first display region.

In some embodiments, the first live view is displayed (e.g., with the display unit 1502) in a first panel of a multi-panel user interface object, and the second live view is displayed (e.g., with the display unit 1502) in the second-panel of the multi-panel user interface object; and moving the first live view and the second live view in accordance with the movement of the first contact on the touch-sensitive surface unit 1504 includes sliding (e.g., with the sliding unit 1516) the multi-panel user interface object in the first display region in accordance with the movement of the first contact on the touch-sensitive surface unit 1504.

In some embodiments, the movement of the first contact includes a first portion of the movement in a first direction, and a second portion of the movement in a second direction opposite the first direction, and sliding the multi-panel user interface object in accordance with the movement of the first contact on the touch-sensitive surface unit 1504 includes: sliding (e.g., with the sliding unit 1516) the multi-panel user interface object in the first direction in response to the first portion of the movement; and sliding (e.g., with the sliding unit 1516) the multi-panel user interface object in the second direction in response to the second portion of the movement.

In some embodiments, the processing unit 2508 is further configured to: after sliding the multi-panel user interface object in accordance with the movement of the first contact on the touch-sensitive surface unit 1504, detect (e.g., with the detecting unit 1510) lift-off of the first contact; and in response to detecting the lift-off of the first contact: in accordance with a determination that the movement of the first contact meets fourth movement criteria, continue to slide (e.g., with the sliding unit 1516) the multi-panel user interface object after the lift-off of the first contact, until the second panel of the multi-panel user interface object occupies an entirety of the first display region.

In some embodiments, the processing unit 2508 is further configured to: in response to detecting the lift-off of the first contact: in accordance with a determination that the movement of the first contact meets fifth movement criteria, reverse sliding of (e.g., with the sliding unit 1516) the multi-sided user interface object after the lift-off of the first contact, until the first panel of the multi-panel user interface object reoccupies the entirety of the first display region.

In some embodiments, the processing unit 2508 is further configured to: after sliding the multi-panel user interface object in accordance with the movement of the first contact on the touch-sensitive surface unit 1504, detect (e.g., with the detecting unit 1510) lift-off of the first contact; and in response to detecting the lift-off of the first contact, cease to slide (e.g., with the sliding unit 1516) the multi-panel user interface object after the lift-off of the first contact, wherein the first display region concurrently displays a part of the first panel of the multi-panel user interface object and a part of the second panel of the multi-panel user interface object.

In some embodiments, the processing unit 2508 is further configured to: detect (e.g., with the detecting unit 1510) lift-off of the first contact, wherein after lift-off of the first contact: in accordance with a determination that the movement of the first contact meets sixth movement criteria, the first live view ceases to be displayed (e.g., with the display unit 1502) in the first display region, and the second live view occupies an entirety of the first display region; and in accordance with a determination that the movement of the first contact meets seventh movement criteria, the first display region is split (e.g., with the display unit 1502) between the displaying a part of the first live view and a part of the second live view.

In some embodiments, the movement of the first contact is detected while video recording (e.g., with the recording unit 1518) through the first camera unit 1506-1 is in progress.

In some embodiments, the processing unit 2508 is further configured to: continue to record (e.g., with the recording unit 1518) video after detecting the movement of the first contact on the touch-sensitive surface unit 1504.

In some embodiments, continuing to record (e.g., with the recording unit 1518) video after detecting the movement of the first contact on the touch-sensitive surface unit 1504 includes: continuing to record (e.g., with the recording unit 1518) video captured by the first camera unit 1506-1 while moving the first live view and the second live view in accordance with the movement of the first contact.

In some embodiments, continuing to record (e.g., with the recording unit 1518) video after detecting the movement of the first contact on the touch-sensitive surface unit 1504 includes: ceasing to record (e.g., with the recording unit 1518) video captured by the first camera unit 1506-1 when the first live view captured by the first camera unit 1506-1 is no longer displayed in the first display region; and starting to record (e.g., with the recording unit 1518) video captured by the second camera unit 1506-2 when the second live view captured by the second camera unit 1506-2 is displayed in the first display region.

In some embodiments, continuing to record (e.g., with the recording unit 1518) video after detecting the movement of the first contact on the touch-sensitive surface unit 1504 includes: continuing to record (e.g., with the recording unit 1518) video as shown in the first display region, including recording (e.g., with the recording unit 1518) the movement of the first live view and the second live view.

In some embodiments, continuing to record (e.g., with the recording unit 1518) video after detecting the movement of the first contact on the touch-sensitive surface unit 1504 includes: continuing to record (e.g., with the recording unit 1518) video captured by the first camera unit 1506-1 while displaying the second live view captured by the second camera unit 1506-2.

In some embodiments, continuing to record (e.g., with the recording unit 1518) video after detecting the movement of the first contact on the touch-sensitive surface unit 1504 includes: concurrently recording (e.g., with the recording unit 1518) video captured by the first camera unit 1506-1 and captured by the second camera unit 1506-2.

In some embodiments, the processing unit 2508 is further configured to: detect (e.g., with the detecting unit 1510) activation of a stop-recording affordance while continuing to record (e.g., with the recording unit 1518) video after detecting the movement of the first contact on the touch-sensitive surface unit 1504, and in response to detecting activation of the stop-recording affordance, cease to record (e.g., with the recording unit 1518) video.

In some embodiments, wherein activation of the stop-recording affordance is detected while continuing to record (e.g., with the recording unit 1518) video captured by the first camera unit 1506-1, and wherein ceasing to record video includes ceasing to record (e.g., with the recording unit 1518) video captured by the first camera unit 1506-1.

In some embodiments, activation of the stop-recording affordance is detected while continuing to record (e.g., with the recording unit 1518) video captured by the second camera unit 1506-2 and wherein ceasing to record (e.g., with the recording unit 1518) video includes ceasing to record (e.g., with the recording unit 1518) video captured by the second camera unit 1506-2.

In some embodiments, the processing unit 2508 is further configured to: in response to detecting the movement of the first contact: in accordance with a determination that the movement of the first contact meets eighth movement criteria: change (e.g., with the changing unit 1520) an aspect ratio of the first live view or an aspect ratio of the first display region in accordance with the movement of the first contact.

In some embodiments, changing an aspect ratio of the first live view or an aspect ratio of the first display region in accordance with the movement of the first contact includes: in accordance with a determination that the movement of the first contact meets ninth movement criteria, switching (e.g., with the switching unit 1522) from a first aspect ratio to a second aspect ratio.

In some embodiments, changing an aspect ratio of the first live view or an aspect ratio of the first display region in accordance with the movement of the first contact includes: in accordance with a determination that the movement of the first contact meets tenth movement criteria, dynamically adjusting (e.g., with the adjusting unit 1524) the aspect ratio of the first live view or the first display region in accordance with the movement of the first contact.

In some embodiments, the movement of the first contact is in a first region on the touch-sensitive surface unit 1504 that corresponds to locations within the first display region, and the processing unit 1508 is further configured to: while displaying the first display region including the first live view captured by the first camera unit 1506-1, detect (e.g., with the detecting unit 1510) movement of a second contact in a second region on the touch-sensitive surface unit 1504 that corresponds to locations outside of the first display region; and in response to detecting the movement of the second contact in the second direction, switch (e.g., with the switching unit 1522) from a first media capture mode to a second media capture mode of the first camera unit 1506-1 in accordance with the movement of the second contact.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 14A-14F are, optionally, implemented by components depicted in FIGS. 1A-1B or FIG. 15. For example, detection operation 1404 and moving operation in operation 1406 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 16A-16H are flow diagrams illustrating a method 1600 of automatically detecting and prompting for user action(s) regarding an image recording mode in accordance with some embodiments. This method relates to capturing media and prompting the user to take action(s) associated with different media recording modes depending on which media recording mode the captured media is consistent with. Proactively prompting the user regarding appropriate actions to take based on a determination of media recording mode(s) that are consistent with the captured media enhances the operability of the device and makes the user-device interface more efficient (e.g., by reducing the number of inputs required to take appropriate actions with respect to captured media content, and helping the user to provide proper inputs and reducing user mistakes when operating/interacting with the device) which, additionally, reduces power usage and improves battery life of the device by enabling the user to use the device more quickly and efficiently.

The method 1600 is performed at an electronic device (e.g., device 300, FIG. 3, or portable multifunction device 100, FIG. 1A) with a display and one or more cameras. In some embodiments, the electronic device includes a touch-sensitive surface and one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1600 are, optionally, combined and/or the order of some operations is, optionally, changed.

The device displays (1602) a camera user interface (e.g., camera user interface 702) for recording media images in a plurality of media recording modes (e.g., the camera user interface provides options for recording in a single image recording mode, an image burst recording mode, a video recording mode, a panorama image recording mode, a slow-motion recording mode, etc.).

While displaying the camera user interface, the device captures (1604) media with one or more of the cameras. In some embodiments, "capturing" media refers to automatic, temporary, and real-time storage of media by the electronic device without active intervention from the user. Media that are captured by the camera are automatically stored (e.g., in a memory of the electronic device) for a predetermined duration (e.g., while the camera user interface is active, or for 24 hours after capture) and are automatically deleted or overwritten unless instructions are received from the user to mark the captured media for subsequent processing (e.g., marking, editing, compression, conversion, etc.) and/or persistent storage. In some embodiments, media that are marked for subsequent processing and/or persistent storage (e.g., in accordance with user input or a preconfigured device setting) are considered "recorded."

In response to capturing the media (1606): in accordance with a determination that the captured media is consistent with a first media recording mode of the plurality of media recording modes, the device displays a first prompt in the camera user interface that prompts a user to take one or more actions associated with the first media recording mode (e.g., when the captured images indicates that the camera is being panned horizontally with a uniform speed, the device displays a prompt to guide the user to steadily pan the camera to record a multi-image panorama in a panorama recording mode); and in accordance with a determination that the captured media is consistent with a second media recording mode of the plurality of media recording modes, the device displays a second prompt in the camera user interface that prompts the user to take one or more actions associated with the second media recording mode (e.g., when some frames in a video recorded under a video recording mode are blurry, the device displays a prompt asking the user whether the blurry portions of the video should be removed), wherein the first media recording mode is different from the second media recording mode. This is illustrated in FIGS. 7A-7E, where the device displays textual prompts 710 and 720 and panorama guide objects 708 and 714 in response to detecting that media capture is consistent with a panorama recording mode; and in FIGS. 7F-7G and 7I-7J, where the device displays textual prompts 722 and 726 in response to detecting that media capture is consistent with a video recording mode, for example.

In some embodiments, the first media recording mode is (1608) a panorama recording mode, e.g., as shown in FIGS. 7A-7E. In some embodiments, the second media recording mode is (1610) a video recording mode, e.g., as shown in FIGS. 7F-7J.

In some embodiments, the one or more actions associated with the first media recording mode include (1612) shifting a field of view of the camera to capture additional media for use in generation of a multi-image panorama (e.g., the device displays a horizontal guideline, a direction arrow, and a prompt "move the device to take a panorama", or "slow down", or "keep moving", etc.). This is illustrated in FIGS. 7A-7E, for example. Prompting the user to shift the field of view of the camera to capture additional media to generate a panorama based on a determination that the media already captured is consistent with the panorama mode enhances the operability of the device and makes the user-device interface more efficient (e.g., by reducing the number of user inputs required to generate a panorama, and helping the user to provide proper inputs and reducing user mistakes when operating/interacting with the device) which, additionally, reduces power usage and improves battery life of the device by enabling the user to use the device more quickly and efficiently.

In some embodiments, the one or more actions associated with the second media recording mode include (1614) confirming or rejecting a suggestion of content to delete (e.g., the device displays a sequence of frames and a prompt "Automatically delete these blurry frames?"). This is illustrated in FIG. 7I, for example. Prompting the user to confirm whether to remove blurry frames based on a determination that the media already captured is consistent with a video recording mode enhances the operability of the device and makes the user-device interface more efficient (e.g., by reducing the number of user inputs required to remove blurry frames in a recorded video, and helping the user to provide proper inputs and reducing user mistakes when operating/interacting with the device) which, additionally, reduces power usage and improves battery life of the device by enabling the user to use the device more quickly and efficiently.

In some embodiments, the device makes (1616) the determination that the captured media is consistent with the first (and/or second) media recording mode while capturing of the media is in progress. For example, while the user pans the camera horizontally with a uniform speed, the device makes a determination that the captured media is consistent with the panorama recording mode. Making a determination regarding which mode the already captured media is consistent with and which actions to prompt for while capture of the media is in progress enhances the operability of the device and makes the user-device interface more efficient (e.g., by reducing the number of user inputs and time required to generate media items of desired type and quality) which, additionally, reduces power usage and improves battery life of the device by enabling the user to use the device more quickly and efficiently.

In some embodiments, the device makes (1618) the determination that the captured media is consistent with the second (and/or first) media recording mode after capture of media is suspended or stopped (e.g., after a video is recorded, the device identifies blurry portions in the video, and prompts the user to confirm whether the identified blurry portions should be removed before the video is recorded (processed for persistent storage)). This is illustrated in FIGS. 7P-7R, for example. Making a determination regarding which mode the already captured media is consistent with and which actions to prompt for after capture of the media is suspended or stopped enhances the operability of the device and makes the user-device interface more efficient (e.g., by making the determination with more accurate, and helping the user to provide proper inputs) which, additionally, reduces power usage and improves battery life of the device by enabling the user to use the device more quickly and efficiently.

In some embodiments, the device determines (1620) that a first portion of the captured media is consistent with the first media recording mode and that a second portion of the captured media is consistent with the second media recording mode, wherein: the device displays the first prompt in the camera user interface with regard to the first portion of the captured media (e.g., as shown in FIGS. 7A-7E), and the device displays the second prompt in the camera user interface with regard to the second portion of the captured media (e.g., as shown in FIGS. 7F-7J). For example, the captured media includes a first sequence of frames that can be used to compose a panorama image, and a second sequence of frames that includes a few blurry frames. The device provides two prompts to the user: "Generate a panorama image based on these frames?" and "remove these frames from video?" Identifying multiple media recording modes and prompting for actions for the multiple recording modes based on different or the same portions of the captured media enhances the operability of the device and makes the user-device interface more efficient (e.g., by reducing the number of user inputs and time required to generate media items of desired types) which, additionally, reduces power usage and improves battery life of the device by enabling the user to use the device more quickly and efficiently.

In some embodiments, capturing of the media is (1622) automatically started, without requiring manual activation of a media capture affordance by a user (e.g., the media capture is started immediately after the camera user interface, optionally including a live view from one of the cameras, is displayed at the device). This is also illustrated in FIG. 7A, where media capture is automatically started when device is still and level. Starting the media capture without requiring manual activation of a media capture affordance enhances the operability of the device and makes the user-device interface more efficient (e.g., by reducing the number of user inputs required to capture media) which, additionally, reduces power usage and improves battery life of the device by enabling the user to use the device more quickly and efficiently.

In some embodiments, the one or more actions associated with the first (or second) media recording mode includes (1624) specifying a start of a media item to be recorded under the first (or second) media recording mode. For example, in some embodiments, the device determines that the captured media is consistent with a video recording mode (e.g., the captured images can be made into a continuous video), the device asks the user to specify a frame of the captured media to be the start of the video that will be recorded/stored based on the captured media. In another example, in some embodiments, the device determines that the captured media is consistent with a panorama recording mode (e.g., the captured images can be stitched into a multi-image panorama), the device asks the user to specify a frame of the captured media to be the start image of the panorama that will be recorded/stored based on the captured media. Allowing the user to specify the start of a media content to be recorded under an identified media recording mode gives the user more control over media recording, enhances the operability of the device and makes the user-device interface more efficient (e.g., by reducing the number of user inputs required to capture media) which, additionally, reduces power usage and improves battery life of the device by enabling the user to use the device more quickly and efficiently.

In some embodiments, in response to capturing the media (1626): in accordance with a determination that the captured media is consistent with the second (and/or first) media recording mode of the plurality of media recording modes, the device automatically identifies (e.g., without requiring a user input or intervention) a start of a media item to be recorded under the second (and/or first) media recording mode. For example, in some embodiments, the device determines that the captured media is consistent with a video recording mode (e.g., the captured images can be made into a continuous video), the device automatically identifies a frame of the captured media to be the start of the video that will be recorded/stored based on the captured media. In another example, in some embodiments, the device determines that the captured media is consistent with a panorama recording mode (e.g., the captured images can be stitched into a multi-image panorama), the device automatically identifies a frame of the captured media to be the start image of the panorama that will be recorded/stored based on the captured media. In some embodiments, the device automatically identifies the start of the media item based on analysis of the media items or other contextual information (e.g., movement characteristics of the camera, historical user behavior analysis, etc.). In some embodiments, the device identifies the start of the media item without specific user input that starts recording of a media item of a particular type. Automatically identifying the start of a media content to be recorded under an identified media recording mode enhances the operability of the device and makes the user-device interface more efficient (e.g., by reducing the number of user inputs required to capture media) which, additionally, reduces power usage and improves battery life of the device by enabling the user to use the device more quickly and efficiently.

In some embodiments, the device displays (1628) a live view (e.g., live view 704) from a first camera of the one or more cameras in the camera user interface, wherein the electronic device captures the media that corresponds to images in the live view (e.g., the camera user interface includes a live view from one of the cameras, or a split screen of live views from multiple cameras, and the device temporarily stores frame streams that are captured by the camera(s) that are providing the live view(s)). Displaying a live view from the camera to show the image that is being captured enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, one or more visual characteristics of the camera user interface indicates (1630) one or more media recording modes that are currently active at the electronic device (e.g., a flash or flicker of the live view indicates that a still photo is taken, an aspect ratio of the live view and/or an aspect ratio outline within the live view indicates whether a panorama mode or particular video mode (e.g., 4:3, square, etc.) is active, a running recording timer overlaid on the live view or the camera user interface indicates that video recording is in progress, the appearance of a shutter button or recording button indicates the active media recording mode, a state of a mode selection affordance in the camera user interface indicates the active media recording mode, etc.). Visually indicating the currently active media recording modes enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while (displaying the live view and) capturing the media (e.g., a plurality of media frames (e.g., images)) with one or more of the cameras: the device stores (1632) image data captured by the one or more cameras of the electronic device independent of the one or more media recording modes that are currently active at the electronic device (e.g., an image data stream is captured at a preset frame rate and a preset resolution (e.g., the highest frame rate and resolution within the camera's designed capability) irrespective of whether video recording or still photo modes are activated, and irrespective of which sub-modes of the video recording (e.g., slow-motion, standard 4:3, or square aspect ratio) or still photo (e.g., panorama, bursts, low-light, etc.)) are currently activated). Storing image data independently of the media recording modes that are currently active allows the possibility for post-processing to obtain other types of media items for media recording modes that were not active. This flexibility enhances the operability of the device and makes the user-device interface more efficient (e.g., by providing opportunity for post-processing to obtain additional media items, and reducing the number of user inputs required to obtain media items of desired types) which, additionally, reduces power usage and improves battery life of the device by enabling the user to use the device more quickly and efficiently.

In some embodiments, the device annotates (1634) the stored image data in accordance with the one or more media recording modes that are currently active at the electronic device (e.g., a timeline of the image data stream is annotated with mode activation events and mode deactivation events, such as start and stop of a particular video recording mode, snapping of a still photo, starting and stopping of a panorama photo, changing of capturing aspect ratio, switching of cameras). Annotating image data based on the media recording modes that are currently active enhances the operability of the device and makes the user-device interface more efficient (e.g., by providing opportunity for post-processing to obtain additional media items, and reducing the number of user inputs required to obtain media items of desired types) which, additionally, reduces power usage and improves battery life of the device by enabling the user to use the device more quickly and efficiently.

In some embodiments, the device receives (1636) an instruction to display the stored image data (e.g., receiving a request to launch a media review application (e.g., the "photos" application) from within the camera user interface while media capture is in progress or after media capture is terminated, or from an application launch interface after recording of media images is completed); and, in response to receiving the instruction to display the stored image data, the device displays a media summary of the stored image data, wherein: the media summary is generated from the stored image data based on annotations of the stored image data, and the media summary includes at least a first media item extracted from a first portion of the recorded image data in accordance with the first media recording mode that was activated at the time that the first portion of the image data was stored. For example, during automatic capturing of media, image data is captured at a resolution of 3264×2448, and a frame rate of 60 fps, irrespective of the current active image capturing mode(s). If a standard video capture mode is activated for a time period during the automatic capturing, a video clip with 1280×720 resolution and 25 fps is extracted from a portion of the stored image data that corresponds to the time period during which the standard video recording mode is active. Similarly, if a square photo mode is activated at a particular point during the automatic capturing (e.g., a user snaps a still photo with square aspect ratio during video recording), a still photo with a resolution of 2448×2448 is extracted from the stored image data that corresponds to the particular point on the image data timeline when the square photo mode is activated. This is also illustrated in FIGS. 7N-7O, where media summary 732 is displayed in response to a tap gesture by contact 713 on panorama review object 708 in the camera user interface 702. Displaying a media item based on annotation of image data that is associated with the media recording modes that were active enhances the operability of the device and makes the user-device interface more efficient (e.g., by reducing the number of user inputs required to view media items of desired types) which, additionally, reduces power usage and improves battery life of the device by enabling the user to use the device more quickly and efficiently.

In some embodiments, the media summary includes (1638) at least a second media item extracted from a second portion of the recorded image data in accordance with the second media recording mode that was not activated at the time that the second portion of the image data was stored. For example, in some embodiments, based on post-recording analysis of the recorded image data, the device determines that a panorama can be generated based on a portion of the recorded image data, and the device automatically generates the panorama even though the panorama recording mode was not active when the portion of the recorded image data was first captured by the device. Displaying a media item extracted from image data for a media recording modes that was not active at the time of media capture enhances the operability of the device and makes the user-device interface more efficient (e.g., by reducing the number of user inputs required to obtain and view media items of desired types) which, additionally, reduces power usage and improves battery life of the device by enabling the user to use the device more quickly and efficiently.

In some embodiments, the first media recording mode is (1640) a video recording mode, the first media item is a video clip extracted from the recorded image data, the second media recording mode is a panorama recording mode, and the second media item is a panorama image extracted from the recorded image data. Displaying a panorama and a video extracted from recorded image data in a summary of the recorded image data enhances the operability of the device and makes the user-device interface more efficient (e.g., by reducing the number of user inputs required to obtain and view media items of desired types) which, additionally, reduces power usage and improves battery life of the device by enabling the user to use the device more quickly and efficiently.

In some embodiments, the first media item and the second media item are (1642) extracted from the same portion of the recorded image data. Extracting a panorama and a video from the same portion of recorded image data enhances the operability of the device and makes the user-device interface more efficient (e.g., by reducing the number of user inputs required to obtain and view media items of desired types) which, additionally, reduces power usage and improves battery life of the device by enabling the user to use the device more quickly and efficiently.

In some embodiments, the device identifies (1644), based on image analysis of the second portion of the stored image data, continued horizontal motion of the electronic device during the capturing of media; and the device identifies the panorama image from the second portion of the stored image data that was captured during the continued horizontal motion of the electronic device. This is illustrated in FIGS. 8A-8D, for example. Automatically identifying a panorama based on image analysis of stored image data enhances the operability of the device and makes the user-device interface more efficient (e.g., by reducing the number of user inputs required to obtain and view media items of desired types) which, additionally, reduces power usage and improves battery life of the device by enabling the user to use the device more quickly and efficiently.

In some embodiments, while capturing media with one or more of the cameras (1646): the device detects continued horizontal motion of the electronic device while the second portion of the stored image data was captured; and the device annotates the second portion of the stored image data with a horizontal-motion event. The device identifies the panorama image from the second portion of the stored image data based on the horizontal-motion event annotation on the second portion of the stored image data. Automatically identifying a panorama based on image annotation of stored image data enhances the operability of the device and makes the user-device interface more efficient (e.g., by reducing the number of user inputs required to obtain and view media items of desired types) which, additionally, reduces power usage and improves battery life of the device by enabling the user to use the device more quickly and efficiently.

In some embodiments, the media summary includes (1648) at least a third media item extracted from a third portion of the stored image data in accordance with a third media recording mode that was not activated at the time that the third portion of the stored image data was captured. For example, media summary includes still image 742 that was captured when the still image recording mode was not active. Including an additional media item in the summary enhances the operability of the device and makes the user-device interface more efficient (e.g., by reducing the number of user inputs required to obtain and view media items of desired types) which, additionally, reduces power usage and improves battery life of the device by enabling the user to use the device more quickly and efficiently.

In some embodiments, the third media recording mode is (1650) a still image mode, and the third media item is a still image extracted from the third portion of the stored image data.

In some embodiments, the media summary includes (1652) one or more media groups; and a respective media group in the one or more media groups includes at least one video clip and at least one still image that have at least one common characteristic (e.g., similar recording timestamps, similar image features, etc.). In some embodiments, there are a plurality of media groups and a first media group has at least one video clip and one still image that share a first common characteristic, and a second media group has at least one video clip and one still image that share a second common characteristic that is different from the first characteristic. Including media groups (e.g., group with still image and video with a common characteristic) in the media summary enhances the operability of the device and makes the user-device interface more efficient (e.g., by reducing the number of user inputs required to obtain and view media items of desired characteristics) which, additionally, reduces power usage and improves battery life of the device by enabling the user to use the device more quickly and efficiently.

In some embodiments, the one or more media groups include (1654) a plurality of first media groups; the common characteristic is a period of time; the respective media group corresponds to a respective period of time of the stored image data; and the respective media group includes at least one video clip and at least one still image that are extracted from a portion of the stored image data that corresponds to the respective period of time. Including media groups (e.g., group with content having a common temporal characteristic) in the media summary enhances the operability of the device and makes the user-device interface more efficient (e.g., by reducing the number of user inputs required to obtain and view media items of desired temporal characteristics) which, additionally, reduces power usage and improves battery life of the device by enabling the user to use the device more quickly and efficiently.

In some embodiments, the one or more media groups include (1656) a plurality of second media groups; each second media group of the plurality of second media groups corresponds to a respective image feature identified in the stored image data (e.g., an identified face, person, landmark, etc.); and each second media group of the plurality of second media groups includes a plurality of media items that are extracted from one or more portions of the stored image data that include the respective image feature. Including media groups (e.g., group with still image and video with a common image feature) in the media summary enhances the operability of the device and makes the user-device interface more efficient (e.g., by reducing the number of user inputs required to obtain and view media items of desired image feature) which, additionally, reduces power usage and improves battery life of the device by enabling the user to use the device more quickly and efficiently.

In some embodiments, the one or more media groups include (1658) a plurality of third media groups; each third media group of the plurality of third media groups corresponds to a respective scene identified in the stored image data (e.g., a scene switch can be identified from sudden blurring of images that is caused by motion of the electronic device); and each third media group of the plurality of third media groups includes a plurality of media items that are extracted from the respective scene that corresponds to said each third media group. Including media groups (e.g., group with still image and video associated with a common scene) in the media summary enhances the operability of the device and makes the user-device interface more efficient (e.g., by reducing the number of user inputs required to obtain and view media items of desired scene) which, additionally, reduces power usage and improves battery life of the device by enabling the user to use the device more quickly and efficiently.

In some embodiments, displaying the media summary of the stored image data includes (1660): displaying a plurality of media groups in a scrollable window, wherein the scrollable window includes an active region (e.g., a central region of the window) and an inactive region (e.g., the peripheral region of the window); automatically playing a first video in a first media group while the first media group is displayed in the active region of the scrollable window; and ceasing to play the first video in the first media group when the first media group is scrolled out of the active region into the inactive region of the scrollable window. Automatically starting playback of content in a media group when the media group is scrolled into an active region in a user interface enhances the operability of the device and makes the user-device interface more efficient (e.g., by reducing the number of user inputs required to view media items of desired media group) which, additionally, reduces power usage and improves battery life of the device by enabling the user to use the device more quickly and efficiently.

In some embodiments, displaying the media summary of the stored image data includes (1662): receiving an input to scroll the scrollable window; and in response to receiving the input to scroll the scrollable window: moving a second media group from the inactive region into the active region of the scrollable window in accordance with the scroll input; and starting playback of a second video in the second media group when the second media group is moved into the active region from the inactive region of the scrollable window.

In some embodiments, the plurality of media groups correspond (1664) to different portions of a single video recording. Automatically starting playback of content in different portions of video when the media groups corresponding to the different portions of the video is scrolled into an active region in a user interface enhances the operability of the device and makes the user-device interface more efficient (e.g., by reducing the number of user inputs required to view desired portions of the video) which, additionally, reduces power usage and improves battery life of the device by enabling the user to use the device more quickly and efficiently.

In some embodiments, while displaying the media summary, the device provides (1666) the user with an option to edit an automatically-generated media item by expanding or reducing a range of captured media used to generate the automatically-generated media item (e.g., expand panorama or extend duration of video). Allowing the user to adjust the range of captured media used to generate a media item in the media summary enhances the operability of the device and makes the user-device interface more efficient (e.g., by reducing the number of user inputs required to generate media item desired content) which, additionally, reduces power usage and improves battery life of the device by enabling the user to use the device more quickly and efficiently.

It should be understood that the particular order in which the operations in FIGS. 16A-16H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1200, 1400, and 1800) are also applicable in an analogous manner to method 1600 described above with respect to FIGS. 16A-16H. For example, the contacts, gestures, user interface objects, various types of thresholds, focus selectors, live views, frame stream, captured media content, media items, and live view display object, affordances, and animations described above with reference to method 1600 optionally have one or more of the characteristics of the contacts, gestures, user interface objects, various types of thresholds, focus selectors, live views, frame stream, captured media content, media items, and live view display object, affordances, and animations described herein with reference to other methods described herein (e.g., methods 1000, 1200, 1400, and 1800). For brevity, these details are not repeated here.

Figure 17:
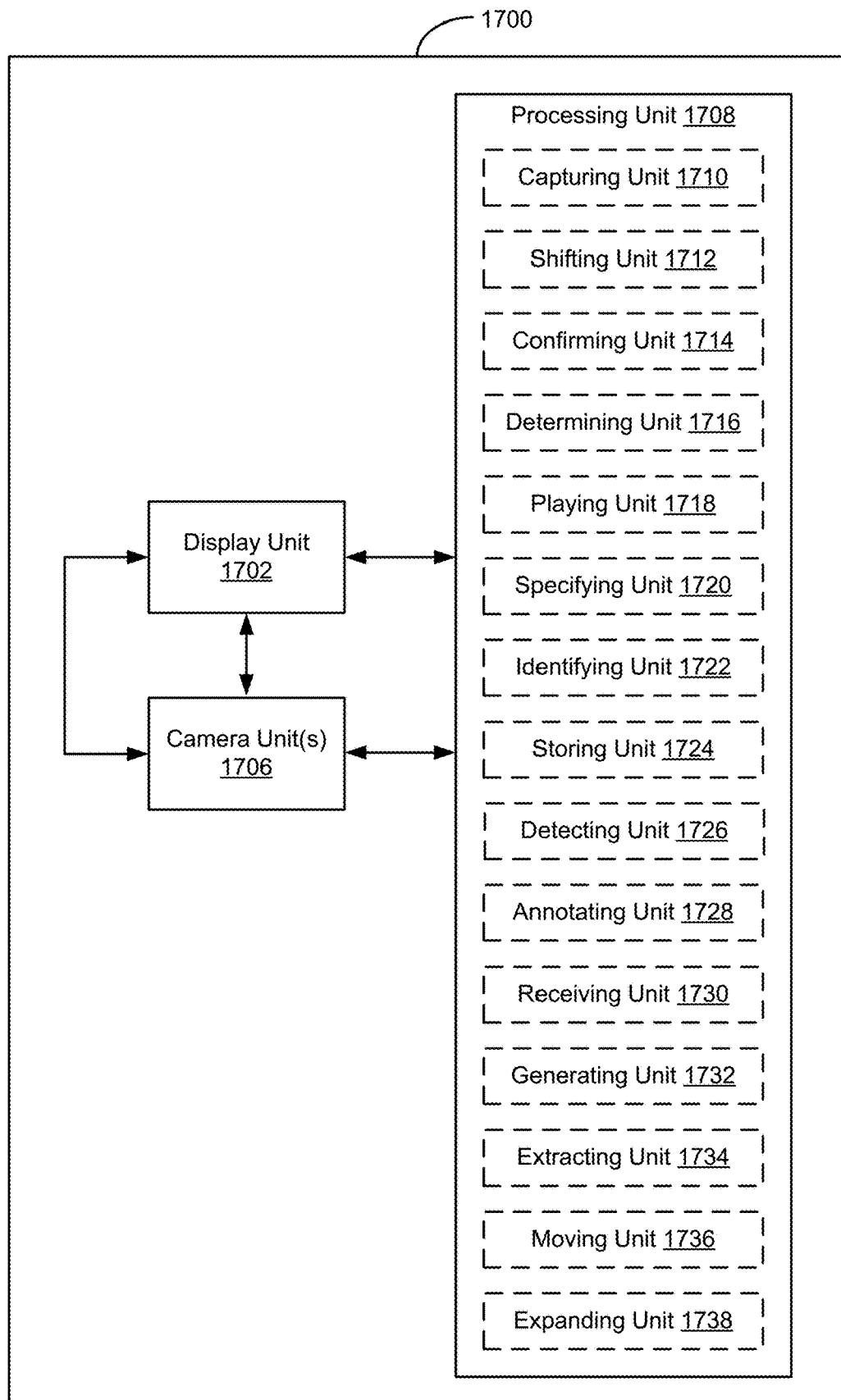
FIG. 17 is a functional block diagram of an electronic device in accordance with some embodiments.

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display user interfaces, one or more camera units 1706 configured to capture media, and a processing unit 1708 coupled to the display unit 1702 and the one or more camera units 1706. In some embodiments, the processing unit includes capturing unit 1710, shifting unit 1712, confirming unit 1714, determining unit 1716, playing unit 1718, specifying unit 1720, identifying unit 1722, storing unit 1724, detecting unit 1726, annotating unit 1728, receiving unit 1730, generating unit 1732, extracting unit 1734, moving unit 1736, and expanding unit 1738.

The processing unit 1708 is configured to: enable display of (e.g., with the display unit 1702) a camera user interface for recording media images in a plurality of media recording modes; while displaying the camera user interface, capture (e.g., with the capturing unit 1710) media with the one or more cameras units; and in response to capturing the media: in accordance with a determination that the captured media is consistent with a first media recording mode of the plurality of media recording modes, enable display of (e.g., with the display unit 1702) a first prompt in the camera user interface that prompts a user to take one or more actions associated with the first media recording mode; and in accordance with a determination that the captured media is consistent with a second media recording mode of the plurality of media recording modes, enable display of (e.g., with the display unit 1702) a second prompt in the camera user interface that prompts the user to take one or more actions associated with the second media recording mode, wherein the first media recording mode is different from the second media recording mode.

In some embodiments, the first media recording mode is a panorama recording mode.

In some embodiments, the second media recording mode is a video recording mode.

In some embodiments, the one or more actions associated with the first media recording mode include shifting (e.g., with the shifting unit 1712) a field of view of the camera to capture additional media for use in generation of a multi-image panorama.

In some embodiments, the one or more actions associated with the second media recording mode include confirming (e.g., with the confirming unit 1714) or rejecting a suggestion of content to delete.

In some embodiments, the device makes the determination (e.g., with the determining unit 1716) that the captured media is consistent with the first media recording mode while capturing of the media is in progress.

In some embodiments, the device makes the determination (e.g., with the determining unit 1716) that the captured media is consistent with the second media recording mode after capture (e.g., with the capturing unit 1710) of media is suspended or stopped.

In some embodiments, the processing unit 2508 is further configured to: determine (e.g., with the determining unit 1716) that a first portion of the captured media is consistent with the first media recording mode and that a second portion of the captured media is consistent with the second media recording mode, wherein: the device displays (e.g., with the display unit 1702) the first prompt in the camera user interface with regard to the first portion of the captured media, and the device displays (e.g., with the display unit 1702) the second prompt in the camera user interface with regard to the second portion of the captured media.

In some embodiments, capturing of the media is automatically started, without requiring manual activation of a media capture affordance by a user.

In some embodiments, the one or more actions associated with the first media recording mode includes specifying (e.g., with the specify unit 1720) a start of a media item to be recorded under the first media recording mode.

In some embodiments, the processing unit 2508 is further configured to: in response to capture (e.g., with the capturing unit 1710) the media: in accordance with a determination that the captured media is consistent with the second media recording mode of the plurality of media recording modes, automatically identify (e.g., with the identifying unit 1722) a start of a media item to be recorded under the second media recording mode.

In some embodiments, the processing unit 2508 is further configured to: enable display of (e.g., with the display unit 1702) a live view from a first camera unit of the one or more camera units 1706 in the camera user interface, wherein the electronic device captures the media that corresponds to images in the live view.

In some embodiments, one or more visual characteristics of the camera user interface indicates one or more media recording modes that are currently active at the electronic device.

In some embodiments, the processing unit 2508 is further configured to: while capturing the media with the one or more camera units 1706: store (e.g., with the storing unit 1724) image data captured by the one or more camera units 1706 of the electronic device independent of the one or more media recording modes that are currently active at the electronic device.

In some embodiments, the processing unit 2508 is further configured to: annotate (e.g., with the annotating unit 1728) the stored image data in accordance with the one or more media recording modes that are currently active at the electronic device.

In some embodiments, the processing unit 2508 is further configured to: receive (e.g., with the receiving unit 1730) an instruction to display the stored image data; and, in response to receiving the instruction to display the stored image data, enable display of (e.g., with the display unit 1702) a media summary of the stored image data, wherein: the media summary is generated (e.g., with the generating unit 1732) from the stored image data based on annotations of the stored image data, and the media summary includes at least a first media item extracted (e.g., with the extracting unit 1734) from a first portion of the recorded image data in accordance with the first media recording mode that was activated at the time that the first portion of the image data was stored.

In some embodiments, the media summary includes at least a second media item extracted (e.g., with the extracting unit 1734) from a second portion of the recorded image data in accordance with the second media recording mode that was not activated at the time that the second portion of the image data was stored.

In some embodiments, the first media recording mode is a video recording mode, the first media item is a video clip extracted (e.g., with the extracting unit 1734) from the recorded image data, the second media recording mode is a panorama recording mode, and the second media item is a panorama image extracted (e.g., with the extracting unit 1734) from the recorded image data.

In some embodiments, the first media item and the second media item are extracted (e.g., with the extracting unit 1734) from the same portion of the recorded image data.

In some embodiments, the processing unit 2508 is further configured to: identify (e.g., with the identifying unit 1722), based on image analysis of the second portion of the stored image data, continued horizontal motion of the electronic device during the capturing of media; and identify (e.g., with the identifying unit 1722) the panorama image from the second portion of the stored image data that was captured during the continued horizontal motion of the electronic device.

In some embodiments, the processing unit 2508 is further configured to: while capturing media with one or more of the camera units 1706: detect (e.g., with the detecting unit 1726) continued horizontal motion of the electronic device while the second portion of the stored image data was captured; and annotate (e.g., with the annotating unit 1728) the second portion of the stored image data with a horizontal-motion event; and identify (e.g., with the identifying unit 1722) the panorama image from the second portion of the stored image data based on the horizontal-motion event annotation on the second portion of the stored image data.

In some embodiments, the media summary includes at least a third media item extracted (e.g., with the extracting unit 1734) from a third portion of the stored image data in accordance with a third media recording mode that was not activated at the time that the third portion of the stored image data was captured.

In some embodiments, the third media recording mode is a still image mode, and the third media item is a still image extracted (e.g., with the extracting unit 1734) from the third portion of the stored image data.

In some embodiments, the media summary includes one or more media groups; and a respective media group in the one or more media groups includes at least one video clip and at least one still image that have at least one common characteristic.

In some embodiments, the one or more media groups include a plurality of first media groups; the common characteristic is a period of time; the respective media group corresponds to a respective period of time of the stored image data; and the respective media group includes at least one video clip and at least one still image that are extracted (e.g., with the extracting unit 1734) from a portion of the stored image data that corresponds to the respective period of time.

In some embodiments, the one or more media groups include a plurality of second media groups; each second media group of the plurality of second media groups corresponds to a respective image feature identified in the stored image data; and each second media group of the plurality of second media groups includes a plurality of media items that are extracted (e.g., with the extracting unit 1734) from one or more portions of the stored image data that include the respective image feature.

In some embodiments, the one or more media groups include a plurality of third media groups; each third media group of the plurality of third media groups corresponds to a respective scene identified in the stored image data; and each third media group of the plurality of third media groups includes a plurality of media items that are extracted (e.g., with the extracting unit 1734) from the respective scene that corresponds to said each third media group.

In some embodiments, displaying the media summary of the stored image data includes: displaying (e.g., with the playing unit 1718) a plurality of media groups in a scrollable window, wherein the scrollable window includes an active region and an inactive region; automatically playing (e.g., with the playing unit 1718) a first video in a first media group while the first media group is displayed in the active region of the scrollable window; and ceasing to play (e.g., with the playing unit 1718) the first video in the first media group when the first media group is scrolled out of the active region into the inactive region of the scrollable window.

In some embodiments, displaying the media summary of the stored image data includes: receiving (e.g., with the receiving unit 1730) an input to scroll the scrollable window; and in response to receiving the input to scroll the scrollable window: moving (e.g., with the moving unit 1736) a second media group from the inactive region into the active region of the scrollable window in accordance with the scroll input; and starting playback (e.g., with the playing unit 1718) of a second video in the second media group when the second media group is moved (e.g., with the moving unit 1736) into the active region from the inactive region of the scrollable window.

In some embodiments, the plurality of media groups correspond to different portions of a single video record.

In some embodiments, the processing unit 2508 is further configured to: while displaying the media summary, provide the user with an option to edit an automatically-generated media item by expanding (e.g., with the expanding unit 1738) or reducing a range of captured media used to generate the automatically-generated media item.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 16A-16H are, optionally, implemented by components depicted in FIGS. 1A-1B or FIG. 17. For example, determination operations in operations 1606 and 1620 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 18A-18D are flow diagrams illustrating a method 1800 of adjusting selected images and video clips from a video recording in accordance with some embodiments. This method relates to presentation of a sequence of media content that has a plurality of identified still images in a user interface. The user interface includes a representation of an identified still image, a timeline that corresponds to the sequence of media content, and a plurality of image-adjustment objects on the timeline. When a respective one of the media-adjustment objects is moved along the timeline, the device updates the identified still image that corresponds to the respective media-adjustment object in accordance with the movement of the respective media-adjustment object. Presenting respective media-adjustment objects that correspond to multiple identified still images of a sequence of media content along a timeline and automatically updating the identified still images based on movements of their corresponding image-adjustment objects along the timeline enhance the operability of the device and make the user-device interface more efficient (e.g., by reducing the number of inputs required to update the identified still images for the sequence of media content, and helping the user to provide proper inputs and reducing user mistakes when operating/interacting with the device) which, additionally, reduces power usage and improves battery life of the device by enabling the user to use the device more quickly and efficiently.

The method 1800 is performed at an electronic device (e.g., device 300, FIG. 3, or portable multifunction device 100, FIG. 1A) with a display. In some embodiments, the electronic device includes a touch-sensitive surface and one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1800 are, optionally, combined and/or the order of some operations is, optionally, changed.

The device displays (1802), on the display, a first user interface (e.g., timeline view user interface 935 in FIG. 9E)

for presenting a sequence of media content (e.g., a video, or a sequence of video clips, or a sequence of images) that has a plurality of identified still images (e.g., two or more individual frames identified from the sequence of media content that represent a subset of all frames in the sequence of media content), wherein the first user interface (e.g., timeline user interface 935) includes: a representation of a first still image (e.g., representation 932 of still image 908) (e.g., a first selected frame) from the sequence of media content; a timeline that corresponds to the sequence of media content (e.g., the timeline visually represent the sequential order by which subsequences or image within the sequence of media content are arranged; and a plurality of image-adjustment objects (e.g., image-adjustment objects 936, 938, 940, etc. in FIG. 9E) (e.g., each image-adjustment object corresponds to a segment or subsequence within the sequence of media content, and includes a representation of at least one still image selected from that segment or subsequence) (e.g., the image-adjustment objects are placed on the timeline according to their locations within the sequence of media content), wherein: a first image-adjustment object (e.g., image-adjustment object 936) has a first location on the timeline (e.g., the first image-adjustment object corresponds to a segment or subsequence within the sequence of media content at the first location on the timeline); and a second image-adjustment object (e.g., image-adjustment object 938) has a second location on the timeline that is different from the first location (e.g., the second image-adjustment object corresponds to a segment or subsequence within the sequence of media content at the second location on the timeline). In some embodiments, the first image-adjustment object and the second image-adjustment object correspond to two non-overlapping segments or subsequences of the sequence of media content. In some embodiments, the timeline has a graphical representation within the user interface (e.g., a straight line, a linear or curved stripe on which representations of the subsequences or images within the sequence of media content are placed according to their locations within the sequence of media content). In some embodiments, the timeline does not have its own graphical representation in the user interface and is illustrated by the relative positions of the representations of the subsequences or images within the sequence of media content (e.g., the relative positions are determined according to their locations within the sequence of media content) in the user interface.

While displaying the representation of the first still image (e.g., representation 932 of still image 908) (e.g., the first selected frame of the video), the device receives (1804) a request to move a respective image-adjustment object (e.g., image-adjustment object 936 or 938) of the plurality of image-adjustment objects in the timeline (e.g., the request is a select and drag input directed to one of the plurality of image-adjustment objects).

In response to receiving the request to move the respective image-adjustment object in the timeline (1806): in accordance with a determination that the respective image-adjustment object is the first image-adjustment object (e.g., image-adjustment object 936), the device moves the first image-adjustment object in the timeline to a first updated location in accordance with the request (e.g., as shown in FIGS. 9F-9H) (e.g., the adjustable frame selection object moves along the timeline in accordance with the movement of a cursor or a finger) and the device updates the representation of the first still image (e.g., representation 932 of image 908) to correspond to the first updated location of the first image-adjustment object (e.g., image-adjustment object 936) on the timeline; and in accordance with a determination that the respective image-adjustment object is the second image-adjustment object (e.g., as illustrated in FIGS. 9M-9O), the device moves the second image-adjustment object (e.g., image-adjustment object 938) along the timeline to a second updated location in accordance with the request (e.g., the adjustable frame selection object moves along the timeline in accordance with the movement of a cursor or a finger) and the device updates a representation of a second still image (e.g., representation 970 of still image 910) to correspond to the second updated location of the second image-adjustment object on the timeline.

In some embodiments, while displaying the first user interface, after receiving the request to move the respective image-adjustment object, the device receives (1808) a request to display a second user interface (e.g., a tap gesture on the "grid" button 906, as shown in FIG. 9Q) (e.g., the request includes selection/activation of an affordance for displaying the second user interface (e.g., a "grid view" button)), wherein: the second user interface (e.g., grid user interface 902 in FIG. 9S) includes respective representations of a plurality of media items within the sequence of media content, and the respective representations of the plurality of media items includes at least a subset of the plurality of identified still images (e.g., the second user interface includes an array of still images and/or video clips from the sequence of media content, arranged in a grid (two-dimensional array)); and in response to receiving the request to display the second user interface that includes the respective representations of the plurality of media items, the device displays the second user interface (and ceases to display the first user interface and/or timeline), wherein the respective representations of the plurality of media items include an updated still image that corresponds to an updated location of the respective image-adjustment object. This is illustrated in FIGS. 9Q-9S (e.g., images 908 and 910 have been updated in FIG. 9S as compared to FIG. 9A), for example. In some embodiments, during the transition from the first user interface (e.g., the timeline view) to the second user interface (e.g., the grid view), an animation (e.g., as shown in FIG. 9R) is displayed (e.g., the device displays an animation in which the plurality of image-adjustment objects arranged along a one-dimensional timeline transform into the respective representations of the plurality media items (e.g., the plurality of identified still images) in a two-dimensional grid). Displaying the second user interface to show the updated still images that correspond to updated locations of the image-adjustment objects in the timeline provide information regarding the internal state of the device and enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the first user interface for presenting the sequence of media content that has the plurality of identified still images, the device displays (1810) the second user interface (e.g., grid view user interface 902) that includes the respective representations of the plurality of media items, as shown in FIG. 9A. While displaying the second user interface that includes the respective representations of the plurality of media items, the device receives a request to display the first user interface for presenting the sequence of media content that has the plurality of identified still images (e.g., the request includes selection of an affordance for displaying the first user interface for the sequence of media content (e.g., a "timeline" button)). In response to receiving the request to display the first user interface for presenting the sequence of media content that has the plurality of identified still images, the device replaces display of the second user interface with display of the first user interface. This is shown in FIGS. 9A-9E, for example. In some embodiments, during the transition from the second user interface (e.g., the grid view) to the first user interface (e.g., the timeline view), an animation is displayed (e.g., the device displays an animation in which the respective representations of the plurality media items (e.g., the plurality of identified still images) in a two-dimensional grid transform into a plurality of image-adjustment objects linearly arranged along one-dimensional timeline). This is shown in FIGS. 9C and 9D, for example. In some embodiments, in response to an input directed to a respective representation of a media item shown in the grid view, an action is performed on the media item that corresponds to the respective representation of the media item (e.g., display an editing mode interface for editing the still image/a video that corresponds to the representation of the media item, and/or rate, tag, share, delete the media item). Allowing the user to switch from the grid view to the timeline view and back to the grid view enhances the operability of the device and makes the user-device interface more efficient (e.g., by reducing the number of user inputs to inspect stored content in different views) which, additionally, reduces power usage and improves battery life of the device by enabling the user to use the device more quickly and efficiently.

In some embodiments, prior to receiving the request to move the respective image-adjustment object, the device receives (1812) a request to select the second image-adjustment object (e.g., the request to move and the request to select the second image-adjustment object can be two distinct inputs (e.g., a tap and a swipe gesture directed to the second image-adjustment object), or a single continuous input (e.g., a swipe gesture directed to the second image-adjustment object)). In response to the request to select the second image-adjustment object, the device replaces display of the first still image with display of the second still image in the first user interface (prior to moving the second image-adjustment object in response to the request to move the second image-adjustment object). In FIG. 9M, the second image-adjustment object (e.g., image-adjustment object 938) is selected by focus selector 968, for example.

In some embodiments, in response to receiving the request to move the respective image-adjustment object in the timeline (1814): in accordance with a determination that the respective image-adjustment object is the first (or second) image-adjustment object: while moving the first (or second) image-adjustment object along the timeline to the first updated location in accordance with the request to move the respective image-adjustment object in the timeline, the device sequentially displays one or more still images selected from the sequence of media content that correspond to one or more current locations of the first (or second) image-adjustment object on the timeline during the movement (e.g., the displayed still images are a sequence of frames between the first (or the second) still image and the updated first (or second) still image). This is illustrated in FIGS. 9G, 9H, 9J, 9K, 9N, and 9O, for example. Providing live feedback (e.g., by showing still images selected from the sequence of media content) in accordance with the current location of the image-adjustment object on the timeline during movement of the image-adjustment object enhances the operability of the device and makes the user-device interface more efficient (e.g., by providing information regarding the internal state of the device, helping the user to provide proper inputs, and reducing user mistakes when using/interacting with the device) which, additionally, reduces power usage and improves battery life of the device by enabling the user to use the device more quickly and efficiently.

In some embodiments, the request to move the respective image-adjustment object includes (1816) a request to move the respective image-adjustment object such that the respective image-adjustment object passes another image-adjustment object of the plurality of image-adjustment objects in the timeline (and the device moves the respective image-adjustment object according to the request). Allowing the user to drag an image-adjustment object past another image-adjustment object on the timeline enhances the operability of the device and makes the user-device interface more efficient (e.g., by giving the user more freedom in choosing the desired still image, helping the user to provide proper inputs, and reducing the number of inputs needed to perform a desired operation) which, additionally, reduces power usage and improves battery life of the device by enabling the user to use the device more quickly and efficiently.

In some embodiments, the first image-adjustment object of the plurality of image-adjustment objects in the timeline includes (1818) a representation of the first still image (e.g., the representation is a reduced scale version (e.g., a thumbnail) of the first still image. In some embodiments, the reduced scale version of the first still image is displayed on the first image-adjustment object (e.g., on a face of the first image-adjustment object). For example, thumbnail of image 908 is displayed on image-adjustment object 936 in FIG. 9E. In some embodiments, the second image-adjustment object of the plurality of image-adjustment objects in the timeline includes a representation of the second still image (e.g., the representation is a reduced scale version (e.g., a thumbnail) of the second still image. In some embodiments, the reduced scale version of the second still image is displayed on the second image-adjustment object (e.g., on a face of the second image-adjustment object). For example, thumbnail of image 910 is displayed on image-adjustment object 938 in FIG. 9E. Displaying a corresponding still image in an image-adjustment object enhances the operability of the device and makes the user-device interface more efficient (e.g., by providing information regarding the image-adjustment object, helping the user to provide proper inputs, and reducing user mistakes when operating/interacting with the device) which, additionally, reduces power usage and improves battery life of the device by enabling the user to use the device more quickly and efficiently.

In some embodiments, in response to receiving the request to move the respective image-adjustment object in the timeline (1820): in accordance with a determination that the respective image-adjustment object is the first (or second) image-adjustment object: while moving the first (or second) image-adjustment object along the timeline to the first updated location in accordance with the request to move the respective image-adjustment object in the timeline, the device continuously updates the representation of the first (or second) still image on the first (or second) image-adjustment object to correspond to a current location of the first (or second) image-adjustment object on the timeline during the movement of the first (or second) image-adjustment object. This is illustrated in FIGS. 9G-9H and 9J-9K, where the thumbnails shown on image-adjustment objects 936 are updated when the image-adjustment object is moved along the timeline. This is also illustrated in FIGS. 9N-9O, where the thumbnails shown on image-adjustment objects 938 are updated when the image-adjustment object is moved along the timeline. Continuously updating the corresponding still image in an image-adjustment object enhances the operability of the device and makes the user-device interface more efficient (e.g., by providing updated information regarding the image-adjustment object, helping the user to provide proper inputs, and reducing user mistakes when operating/interacting with the device) which, additionally, reduces power usage and improves battery life of the device by enabling the user to use the device more quickly and efficiently.

In some embodiments, prior to displaying the first user interface for presenting the sequence of media content that has the plurality of identified still images (1822): the device records the sequence of media content; and during recording of the sequence of media content, the device identifies the plurality of still images (e.g., identifying occurs in response to user input (such as image selection input provided by a cursor or contact, such as input to take/select a photo during ongoing video recording) and/or automatically (such as at defined time intervals and/or using image processing techniques to identify representative images/frames for selection)). In some embodiments, marking of still images or video clips can be performed during media capture or recording, e.g., by tapping on a frame or the live view, or by taping-and-holding on a live view as shown in FIGS. 5A-5AG. Selecting the still images for the sequence of media content during recording of the media content enhances the operability of the device and makes the user-device interface more efficient (e.g., by reducing the number of user inputs required to identify the still images) which, additionally, reduces power usage and improves battery life of the device by enabling the user to use the device more quickly and efficiently.

In some embodiments, in response to receiving the request to move the respective image-adjustment object, the device adjusts (1824) an appearance of the respective image-adjustment object (e.g., to visually distinguish the respective image-adjustment object from the other image-adjustment objects of the plurality of image-adjustment objects in the timeline, such as by changing the width or another dimension of the respective image-adjustment object (e.g., as shown in FIGS. 9F, 9J, and 9M, where selected image-adjustment objects 936 and 938 appear to be wider than the non-selected image-adjustment objects) and/or highlighting the respective image adjustment object). In some embodiments, when the respective image-adjustment object is selected, the device displays an animation to indicate transition from an unselected state of the respective image-adjustment object to a selected state of the respective image-adjustment object (e.g., the respective image-adjustment object gradually becomes bigger and/or wider). Visually distinguishing a respective image-adjustment object when it is being moved in the timeline enhances the operability of the device and makes the user-device interface more efficient (e.g., by providing information regarding the image-adjustment object, helping the user to provide proper inputs, and reducing user mistakes when operating/interacting with the device) which, additionally, reduces power usage and improves battery life of the device by enabling the user to use the device more quickly and efficiently.

In some embodiments, the device displays (1826), on the timeline that corresponds to the sequence of media content, a first video-adjustment object (e.g., video-adjustment object 958 in FIG. 9E) (e.g., a first video-adjustment object of a plurality of video-adjustment objects) that corresponds to a first identified video segment from the sequence of media content (e.g., the video segment is identified in response to user input (such as video segment start and stop input provided by a cursor or contact, during ongoing video recording) and/or automatically (such as at defined time intervals and/or using image processing techniques to identify representative video segments for selection)). Including video-adjustment object on the timeline enhances the operability of the device and makes the user-device interface more efficient (e.g., by reducing the number of user inputs needed to select and adjust representative image/video segment in a sequence of media content) which, additionally, reduces power usage and improves battery life of the device by enabling the user to use the device more quickly and efficiently.

In some embodiments, prior to displaying the first user interface for the sequence of media content that has the plurality of identified still images (1828): the device captures the sequence of media content, and while capturing the sequence of media content, the device identifies one or more video segments that include the first identified video segment (e.g., identifying occurs in response to user input (such as video start/stop input provided by a cursor or contact during ongoing video capture or recording) and/or automatically (such as at defined time intervals and/or using image processing techniques to identify video for selection)). In some embodiments, marking of still images or video clips can be performed during media capture or recording, e.g., by tapping on a frame or the live view, or by taping-and-holding on a live view as shown in FIGS. 5A-5AG. Selecting the still images/video segments for the sequence of media content during recording of the media content enhances the operability of the device and makes the user-device interface more efficient (e.g., by reducing the number of user inputs required to identify the still images/video segments) which, additionally, reduces power usage and improves battery life of the device by enabling the user to use the device more quickly and efficiently.

In some embodiments, while displaying the first user interface, the device detects (1830) a request to edit the first video-adjustment object (e.g., a double click received while a focus selector is at the location that corresponds to the first video-adjustment object and/or a double tap at the location that corresponds to the first video-adjustment object). In response to detecting the request to edit the first video-adjustment object, the device displays a third user interface that includes at least one affordance for editing the first identified video segment that corresponds to the first video-adjustment object. Allowing the user to enter an editing interface from the timeline view enhances the operability of the device and makes the user-device interface more efficient (e.g., by reducing the number of user inputs required to edit stored content) which, additionally, reduces power usage and improves battery life of the device by enabling the user to use the device more quickly and efficiently.

In some embodiments, a visual characteristic of the first video-adjustment object corresponds (1832) to a length of the first video segment (e.g., the width of the first video-adjustment object corresponds to the duration of the first video segment and/or the distance between the left edge of the first video-adjustment object and the right edge of the first video-adjustment object on the timeline indicate the beginning point and the end point of the first video segment). For example, the distance between the left and right edges of video-adjustment object 958 in FIG. 9E corresponds to the duration of the video clip represented by video-adjustment object 958. Visually representing a length of a video segment using the video-adjustment object enhances the operability of the device and makes the user-device interface more efficient (e.g., by helping the user to provide proper inputs, and reducing user mistakes when operating/interacting with the device) which, additionally, reduces power usage and improves battery life of the device by enabling the user to use the device more quickly and efficiently.

In some embodiments, the device detects (1834) a request to move the first video-adjustment object in the timeline (e.g., the request is provided via an input that causes movement of a focus selector that selects and drags the first video-adjustment object along the timeline). In response to detecting the request to move the video-adjustment object in the timeline, the device adjusts a start time (and/or an end time) of the first identified video segment that corresponds to the first video-adjustment object. Allowing the user to move a video-adjustment object to adjust the start and/or end of a corresponding identified video segment for the sequence of media content enhances the operability of the device and makes the user-device interface more efficient (e.g., by reducing the number of user inputs required to identify the video segment) which, additionally, reduces power usage and improves battery life of the device by enabling the user to use the device more quickly and efficiently.

In some embodiments, in response to detecting the request to move the video-adjustment object in the timeline, the device maintains (1836) a duration of the first identified video segment while adjusting the start time (and/or an end time) of the first identified video segment that corresponds to the first video-adjustment object. Allowing the user to move a video-adjustment object to adjust the start and/or end of a corresponding identified video segment for the sequence of media content without changing the duration of the video segment enhances the operability of the device and makes the user-device interface more efficient (e.g., by reducing the number of user inputs required to identify the video segment with a proper duration) which, additionally, reduces power usage and improves battery life of the device by enabling the user to use the device more quickly and efficiently.

In some embodiments, the plurality of image-adjustment objects (and video-adjustment objects) have (1838) different orientations on the timeline (e.g., the image-adjustment objects and video-adjustment objects that are further from the center of the displayed timeline are more horizontally tilted), e.g., as shown in FIG. 9E. Showing the image-adjustment objects (and video adjustment-objects) on the timeline with different orientations enhances the operability of the device and makes the user-device interface more efficient (e.g., by better conveying location information of the identified still images/video segments relative to the timeline, helping the user to provide proper inputs, and reducing user mistakes when operating/interacting with the device) which, additionally, reduces power usage and improves battery life of the device by enabling the user to use the device more quickly and efficiently.

It should be understood that the particular order in which the operations in FIGS. 18A-18D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1200, 1400, and 1600) are also applicable in an analogous manner to method 1800 described above with respect to FIGS. 18A-18D. For example, the contacts, gestures, user interface objects, various types of thresholds, focus selectors, live views, frame stream, captured media content, media items, and live view display object, affordances, and animations described above with reference to method 1800 optionally have one or more of the characteristics of the contacts, gestures, user interface objects, various types of thresholds, focus selectors, live views, frame stream, captured media content, media items, and live view display object, affordances, and animations described herein with reference to other methods described herein (e.g., methods 1000, 1200, 1400, and 1600). For brevity, these details are not repeated here.

Figure 19:
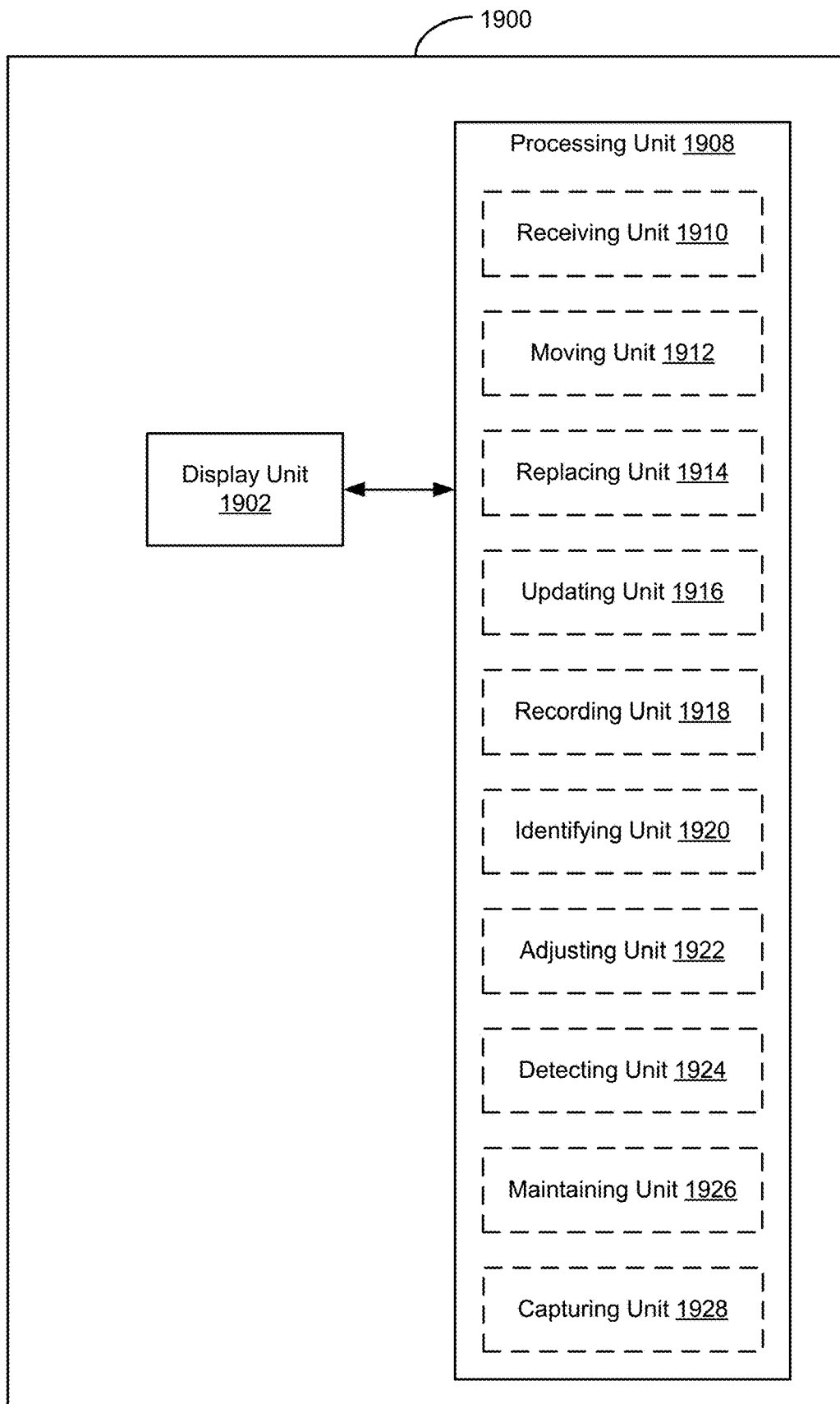
FIG. 19 is a functional block diagram of an electronic device in accordance with some embodiments.

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display user interfaces and a processing unit 1908 coupled to the display unit 1902. In some embodiments, the processing unit includes receiving unit 1910, moving unit 1912, replacing unit 1914, updating unit 1916, recording unit 1918, identifying unit 1920, adjusting unit 1922, detecting unit 1924, maintaining unit 1926, and capturing unit 1928.

The processing unit 1908 is configured to: enable display of (e.g., with the display unit 1902), on the display unit 1902, a first user interface for presenting a sequence of media content that has a plurality of identified still images, wherein the first user interface includes: a representation of a first still image from the sequence of media content; a timeline that corresponds to the sequence of media content; and a plurality of image-adjustment objects, wherein: a first image-adjustment object has a first location on the timeline; and a second image-adjustment object has a second location on the timeline that is different from the first location; while displaying the representation of the first still image, receive (e.g., with the receiving unit 1910) a request to move a respective image-adjustment object of the plurality of image-adjustment objects in the timeline; in response to receiving the request to move the respective image-adjustment object in the timeline: in accordance with a determination that the respective image-adjustment object is the first image-adjustment object, move (e.g., with the moving unit 1912) the first image-adjustment object in the timeline to a first updated location in accordance with the request and update (e.g., with the updating unit 1916) the representation of the first still image to correspond to the first updated location of the first image-adjustment object on the timeline; and in accordance with a determination that the respective image-adjustment object is the second image-adjustment object, move (e.g., with the moving unit 1912) the second image-adjustment object along the timeline to a second updated location in accordance with the request and update (e.g., with the updating unit 1916) a representation of a second still image to correspond to the second updated location of the second image-adjustment object on the timeline.

In some embodiments, the processing unit 2508 is further configured to: while displaying the first user interface, after receiving the request to move the respective image-adjustment object, receive (e.g., with the receiving unit 1910) a request to display a second user interface, wherein: the second user interface includes respective representations of a plurality of media items within the sequence of media content, and the respective representations of the plurality of media items includes at least a subset of the plurality of identified still images; and in response to receiving the request to display the second user interface that includes the respective representations of the plurality of media items, enable display of (e.g., with the display unit 1902) the second user interface, wherein the respective representations of the plurality of media items include an updated still image that corresponds to an updated location of the respective image-adjustment object.

In some embodiments, the processing unit 2508 is further configured to: prior to displaying the first user interface for presenting the sequence of media content that has the plurality of identified still images, enable display of (e.g., with the display unit 1902) the second user interface that includes the respective representations of the plurality of media items; while displaying the second user interface that includes the respective representations of the plurality of media items, receive (e.g., with the receiving unit 1910) a request to display the first user interface for presenting the sequence of media content that has the plurality of identified still images; and in response to receiving the request to display the first user interface for presenting the sequence of media content that has the plurality of identified still images, replace (e.g., with the replacing unit 1914) display of the second user interface with display of the first user interface.

In some embodiments, the processing unit 2508 is further configured to: prior to receiving the request to move the respective image-adjustment object, receive (e.g., with the receiving unit 1910) a request to select the second image-adjustment object; and in response to the request to select the second image-adjustment object, replace (e.g., with the replacing unit 1914) display of the first still image with display of the second still image in the first user interface.

In some embodiments, the processing unit 2508 is further configured to: in response to receiving the request to move the respective image-adjustment object in the timeline: in accordance with a determination that the respective image-adjustment object is the first image-adjustment object: while moving the first image-adjustment object along the timeline to the first updated location in accordance with the request to move the respective image-adjustment object in the timeline, sequentially enable display of (e.g., with the display unit 1902) one or more still images selected from the sequence of media content that correspond to one or more current locations of the first image-adjustment object on the timeline during the movement.

In some embodiments, the request to move the respective image-adjustment object includes a request to move the respective image-adjustment object such that the respective image-adjustment object passes another image-adjustment object of the plurality of image-adjustment objects in the timeline.

In some embodiments, the first image-adjustment object of the plurality of image-adjustment objects in the timeline includes a representation of the first still image; and the second image-adjustment object of the plurality of image-adjustment objects in the timeline includes a representation of the second still image.

In some embodiments, the processing unit 2508 is further configured to: in response to receiving the request to move the respective image-adjustment object in the timeline: in accordance with a determination that the respective image-adjustment object is the first image-adjustment object: while moving the first image-adjustment object along the timeline to the first updated location in accordance with the request to move the respective image-adjustment object in the timeline, continuously update (e.g., with the updating unit 1916) the representation of the first still image on the first image-adjustment object to correspond to a current location of the first image-adjustment object on the timeline during the movement of the first image-adjustment object.

In some embodiments, the processing unit 2508 is further configured to: prior to displaying the first user interface for presenting the sequence of media content that has the plurality of identified still images: record (e.g., with the recording unit 1918) the sequence of media content; and during recording of the sequence of media content, identify (e.g., with the identifying unit 1920) the plurality of still images.

In some embodiments, the processing unit 2508 is further configured to: in response to receiving the request to move the respective image-adjustment object, adjust (e.g., with the adjusting unit 1922) an appearance of the respective image-adjustment object.

In some embodiments, the processing unit 2508 is further configured to: enable display of (e.g., with the display unit 1902), on the timeline that corresponds to the sequence of media content, a first video-adjustment object that corresponds to a first identified video segment from the sequence of media content.

In some embodiments, the processing unit 2508 is further configured to: prior to displaying the first user interface for the sequence of media content that has the plurality of identified still images: capture (e.g., with the capturing unit 1928) the sequence of media content, and while capturing the sequence of media content, identify (e.g., with the identifying unit 1920) one or more video segments that include the first identified video segment.

In some embodiments, the processing unit 2508 is further configured to: while displaying the first user interface, detect (e.g., with the detecting unit 1924) a request to edit the first video-adjustment object; and in response to detecting the request to edit the first video-adjustment object, enable display of (e.g., with the display unit 1902) a third user interface that includes at least one affordance for editing the first identified video segment that corresponds to the first video-adjustment object.

In some embodiments, a visual characteristic of the first video-adjustment object corresponds to a length of the first video segment.

In some embodiments, the processing unit 2508 is further configured to: detect (e.g., with the detecting unit 1924) a request to move the first video-adjustment object in the timeline; and in response to detecting the request to move the video-adjustment object in the timeline, adjust (e.g., with the adjusting unit 1922) a start time of the first identified video segment that corresponds to the first video-adjustment object.

In some embodiments, the processing unit 2508 is further configured to: in response to detecting the request to move the video-adjustment object in the timeline, maintain (e.g., with the maintaining unit 1926) a duration of the first identified video segment while adjusting the start time of the first identified video segment that corresponds to the first video-adjustment object.

In some embodiments, the plurality of image-adjustment objects have different orientations on the timeline.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 18A-18D are, optionally, implemented by components depicted in FIGS. 1A-1B or FIG. 19. For example, receiving operation 1804 and moving operation 1806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device having a first camera and a second camera, the electronic device in communication with a display generation component:
   displaying, in a first display region of a camera user interface, a first live view from the first camera of the electronic device;
   while displaying the first live view from the first camera in the first display region of the camera user interface, detecting movement of a first user input; and
   in response to detecting the movement of the first user input:
      in accordance with a determination that the movement of the first user input meets first movement criteria:
         moving the first live view in the first display region in accordance with the movement of the first user input;
         displaying a second live view from the second camera of the electronic device in the first display region; and
         moving the second live view in the first display region in accordance with the movement of the first user input.

2. The method of claim 1, wherein:
the first live view is displayed on a first side of a multi-sided user interface object;
the second live view is displayed on a second side of the multi-sided user interface object; and
moving the first live view and the second live view in accordance with the movement of the first user input includes rotating the multi-sided user interface object in accordance with the movement of the first user input.

3. The method of claim 2, wherein:
the movement of the first user input includes a first portion of the movement in a first direction, and a second portion of the movement in a second direction opposite the first direction; and
rotating the multi-sided user interface object in accordance with the movement of the first user input includes:
   rotating the multi-sided user interface object in the first direction in response to the first portion of the movement; and
   rotating the multi-sided user interface object in the second direction in response to the second portion of the movement.

4. The method of claim 2, including:
after rotating the multi-sided user interface object in accordance with the first user input, detecting termination of the first user input; and
in response to detecting the termination of the first user input:
   in accordance with a determination that the movement of the first user input meets second movement criteria, continuing to rotate the multi-sided user interface object after the lift off termination of the first user input, until the second side of the multi-sided user interface object occupies an entirety of the first display region.

5. The method of claim 4, including:
in response to detecting the termination of the first user input:
   in accordance with a determination that the movement of the first user input meets third movement criteria, reversing rotation of the multi-sided user interface object after the termination of the first user input, until the first side of the multi-sided user interface object reoccupies the entirety of the first display region.

6. The method of claim 1, wherein:
the first live view is displayed in a first panel of a multi-panel user interface object;
the second live view is displayed in a second panel of the multi-panel user interface object; and
moving the first live view and the second live view in accordance with the movement of the first user input includes sliding the multi-panel user interface object in the first display region in accordance with the movement of the first user input.

7. The method of claim 6, wherein:
the movement of the first user input includes a first portion of the movement in a first direction, and a second portion of the movement in a second direction opposite the first direction; and
sliding the multi-panel user interface object in accordance with the movement of the first user input includes:

sliding the multi-panel user interface object in the first direction in response to the first portion of the movement; and sliding the multi-panel user interface object in the second direction in response to the second portion of the movement.

8. The method of claim 6, including:

after sliding the multi-panel user interface object in accordance with the movement of the first user input, detecting termination of the first user input; and in response to detecting the lift off termination of the first user input:

in accordance with a determination that the movement of the first user input meets fourth movement criteria, continuing to slide the multi-panel user interface object after the termination of the first user input, until the second panel of the multi-panel user interface object occupies an entirety of the first display region.

9. The method of claim 8, including:

in response to detecting the termination of the first user input:

in accordance with a determination that the movement of the first user input meets fifth movement criteria, reversing sliding of the multi-panel user interface object after the termination of the first user input, until the first panel of the multi-panel user interface object reoccupies the entirety of the first display region.

10. The method of claim 6, including:

after sliding the multi-panel user interface object in accordance with the movement of the first user input, detecting termination of the first user input; and in response to detecting the termination of the first user input, ceasing to slide the multi-panel user interface object after the termination of the first user input, wherein the first display region concurrently displays a part of the first panel of the multi-panel user interface object and a part of the second panel of the multi-panel user interface object.

11. The method of claim 1, including:

detecting termination of the first user input, wherein after termination of the first user input:

in accordance with a determination that the movement of the first user input meets sixth movement criteria, the first live view ceases to be displayed in the first display region, and the second live view occupies an entirety of the first display region; and in accordance with a determination that the movement of the first user input meets seventh movement criteria, the first display region is split between displaying a part of the first live view and a part of the second live view.

12. The method of claim 1, wherein:

the movement of the first user input is detected while video recording through the first camera is in progress.

13. The method of claim 12, including:

continuing to record video after detecting the movement of the first user input.

14. The method of claim 13, wherein continuing to record video after detecting the movement of the first user input includes:

continuing to record video captured by the first camera while moving the first live view and the second live view in accordance with the movement of the first user input.

15. The method of claim 13, wherein continuing to record video after detecting the movement of the first user input includes:

ceasing to record video captured by the first camera when the first live view captured by the first camera is no longer displayed in the first display region; and starting to record video captured by the second camera when the second live view captured by the second camera is displayed in the first display region.

16. The method of claim 13, wherein continuing to record video after detecting the movement of the first user input includes:

continuing to record video as shown in the first display region, including recording the movement of the first live view and the second live view.

17. The method of claim 13, wherein continuing to record video after detecting the movement of the first user input includes:

continuing to record video captured by the first camera while displaying the second live view captured by the second camera.

18. The method of claim 13, wherein continuing to record video after detecting the movement of the first user input includes:

concurrently recording video captured by the first camera and captured by the second camera.

19. The method of claim 13, including:

detecting activation of a stop-recording affordance while continuing to record video after detecting the movement of the first user input; and in response to detecting activation of the stop-recording affordance, ceasing to record video.

20. The method of claim 1, including:

in response to detecting the movement of the first user input:

in accordance with a determination that the movement of the first user input meets eighth movement criteria:

changing an aspect ratio of the first live view or an aspect ratio of the first display region in accordance with the movement of the first user input.

21. The method of claim 1, wherein the first user input is directed to locations within the first display region, and the method further includes:

while displaying the first display region including the first live view captured by the first camera, detecting movement of a second user input directed to locations outside of the first display region; and in response to detecting the movement of the second user input in a second direction, switching from a first media capture mode to a second media capture mode of the first camera in accordance with the movement of the second user input.

22. An electronic device, comprising:

a first camera;

a second camera;

one or more processors;

memory; and one or more programs, wherein the one or more programs are stored in the memory and configured to be executed by the one or more processors, the one or more programs including instructions for:

displaying, via a display generation component in communication with the electronic device, in a first display region of a camera user interface, a first live view from the first camera of the electronic device;

while displaying the first live view from the first camera in the first display region of the camera user interface, detecting movement of a first user input; and in response to detecting the movement of the first user input:
in accordance with a determination that the movement of the first user input meets first movement criteria:
moving the first live view in the first display region in accordance with the movement of the first user input;
displaying a second live view from the second camera of the electronic device in the first display region; and
moving the second live view in the first display region in accordance with the movement of the first user input.

23. The electronic device of claim 22, wherein:
the first live view is displayed on a first side of a multi-sided user interface object;
the second live view is displayed on a second side of the multi-sided user interface object; and
moving the first live view and the second live view in accordance with the movement of the first user input includes rotating the multi-sided user interface object in accordance with the movement of the first user input.

24. The electronic device of claim 23, wherein:
the movement of the first user input includes a first portion of the movement in a first direction, and a second portion of the movement in a second direction opposite the first direction; and
rotating the multi-sided user interface object in accordance with the movement of the first user input includes:
rotating the multi-sided user interface object in the first direction in response to the first portion of the movement; and
rotating the multi-sided user interface object in the second direction in response to the second portion of the movement.

25. The electronic device of claim 23, the one or more programs including instructions for:
after rotating the multi-sided user interface object in accordance with the first user input, detecting termination of the first user input; and
in response to detecting the termination of the first user input:
in accordance with a determination that the movement of the first user input meets second movement criteria, continuing to rotate the multi-sided user interface object after the termination of the first user input, until the second side of the multi-sided user interface object occupies an entirety of the first display region.

26. The electronic device of claim 22, wherein:
the first live view is displayed in a first panel of a multi-panel user interface object;
the second live view is displayed in a second panel of the multi-panel user interface object; and
moving the first live view and the second live view in accordance with the movement of the first user input includes sliding the multi-panel user interface object in the first display region in accordance with the movement of the first user input.

27. The electronic device of claim 26, wherein:
the movement of the first user input includes a first portion of the movement in a first direction, and a second portion of the movement in a second direction opposite the first direction; and
sliding the multi-panel user interface object in accordance with the movement of the first user input includes:
sliding the multi-panel user interface object in the first direction in response to the first portion of the movement; and
sliding the multi-panel user interface object in the second direction in response to the second portion of the movement.

28. The electronic device of claim 26, the one or more programs including instructions for:
after sliding the multi-panel user interface object in accordance with the movement of the first user input, detecting termination of the first user input; and
in response to detecting the termination of the first user input:
in accordance with a determination that the movement of the first user input meets fourth movement criteria, continuing to slide the multi-panel user interface object after the termination of the first user input, until the second panel of the multi-panel user interface object occupies an entirety of the first display region.

29. The electronic device of claim 26, the one or more programs including instructions for:
after sliding the multi-panel user interface object in accordance with the movement of the first user input, detecting termination of the first user input; and
in response to detecting the termination of the first user input, ceasing to slide the multi-panel user interface object after the termination of the first user input, wherein the first display region concurrently displays a part of the first panel of the multi-panel user interface object and a part of the second panel of the multi-panel user interface object.

30. The electronic device of claim 22, the one or more programs including instructions for:
detecting termination of the first user input, wherein after termination of the first user input:
in accordance with a determination that the movement of the first user input meets sixth movement criteria, the first live view ceases to be displayed in the first display region, and the second live view occupies an entirety of the first display region; and
in accordance with a determination that the movement of the first user input meets seventh movement criteria, the first display region is split between displaying a part of the first live view and a part of the second live view.

31. The electronic device of claim 22, wherein:
the movement of the first user input is detected while video recording through the first camera is in progress.

32. The electronic device of claim 31, the one or more programs including instructions for:
continuing to record video after detecting the movement of the first user input.

33. The electronic device of claim 22, the one or more programs including instructions for:
in response to detecting the movement of the first user input:
in accordance with a determination that the movement of the first user input meets eighth movement criteria:

changing an aspect ratio of the first live view or an aspect ratio of the first display region in accordance with the movement of the first user input.

34. The electronic device of claim 22, wherein the first user input is directed to locations within the first display region, and the one or more programs include instructions for:
   while displaying the first display region including the first live view captured by the first camera, detecting movement of a second user input directed to locations outside of the first display region; and
   in response to detecting the movement of the second user input in a second direction, switching from a first media capture mode to a second media capture mode of the first camera in accordance with the movement of the second user input.

35. A non-transitory computer readable storage medium storing one or more programs, the one or more programs comprising instructions that, when executed by an electronic device having a first camera and a second camera, cause the electronic device to:
   display, in a first display region of a camera user interface, a first live view from the first camera of the electronic device;
   while displaying the first live view from the first camera in the first display region of the camera user interface, detect movement of a first user input; and
   in response to detecting the movement of the first user input:
      in accordance with a determination that the movement of the first user input meets first movement criteria:
         move the first live view in the first display region in accordance with the movement of the first user input;
         display a second live view from the second camera of the electronic device in the first display region; and
         move the second live view in the first display region in accordance with the movement of the first user input.

36. The non-transitory computer readable storage medium of claim 35, wherein:
   the first live view is displayed on a first side of a multi-sided user interface object;
   the second live view is displayed on a second side of the multi-sided user interface object; and
   moving the first live view and the second live view in accordance with the movement of the first user input includes rotating the multi-sided user interface object in accordance with the movement of the first user input.

37. The non-transitory computer readable storage medium of claim 36, wherein:
   the movement of the first user input includes a first portion of the movement in a first direction, and a second portion of the movement in a second direction opposite the first direction; and
   rotating the multi-sided user interface object in accordance with the movement of the first user input includes:
      rotating the multi-sided user interface object in the first direction in response to the first portion of the movement; and
      rotating the multi-sided user interface object in the second direction in response to the second portion of the movement.

38. The non-transitory computer readable storage medium of claim 36, the one or more programs including instructions that cause the electronic device to:
   after rotating the multi-sided user interface object in accordance with the first user input, detect termination of the first user input; and
   in response to detecting the termination of the first user input:
      in accordance with a determination that the movement of the first user input meets second movement criteria, continue to rotate the multi-sided user interface object after the termination of the first user input, until the second side of the multi-sided user interface object occupies an entirety of the first display region.

39. The non-transitory computer readable storage medium of claim 35, wherein:
   the first live view is displayed in a first panel of a multi-panel user interface object;
   the second live view is displayed in a second panel of the multi-panel user interface object; and
   moving the first live view and the second live view in accordance with the movement of the first user input includes sliding the multi-panel user interface object in the first display region in accordance with the movement of the first user input.

40. The non-transitory computer readable storage medium of claim 39, wherein:
   the movement of the first user input includes a first portion of the movement in a first direction, and a second portion of the movement in a second direction opposite the first direction; and
   sliding the multi-panel user interface object in accordance with the movement of the first user input includes:
      sliding the multi-panel user interface object in the first direction in response to the first portion of the movement; and
      sliding the multi-panel user interface object in the second direction in response to the second portion of the movement.

41. The non-transitory computer readable storage medium of claim 39, the one or more programs including instructions that cause the electronic device to:
   after sliding the multi-panel user interface object in accordance with the movement of the first user input, detect termination of the first user input; and
   in response to detecting the termination of the first user input:
      in accordance with a determination that the movement of the first user input meets fourth movement criteria, continue to slide the multi-panel user interface object after the termination of the first user input, until the second panel of the multi-panel user interface object occupies an entirety of the first display region.

42. The non-transitory computer readable storage medium of claim 39, the one or more programs including instructions that cause the electronic device to:
   after sliding the multi-panel user interface object in accordance with the movement of the first user input, detect termination of the first user input; and
   in response to detecting the termination of the first user input, cease to slide the multi-panel user interface object after the termination of the first user input, wherein the first display region concurrently displays a part of the first panel of the multi-panel user interface object and a part of the second panel of the multi-panel user interface object.

43. The non-transitory computer readable storage medium of claim 35, the one or more programs including instructions that cause the electronic device to:
  detect termination of the first user input, wherein after termination of the first user input:
    in accordance with a determination that the movement of the first user input meets sixth movement criteria, the first live view ceases to be displayed in the first display region, and the second live view occupies an entirety of the first display region; and
    in accordance with a determination that the movement of the first user input meets seventh movement criteria, the first display region is split between displaying a part of the first live view and a part of the second live view.

44. The non-transitory computer readable storage medium of claim 35, wherein:
  the movement of the first user input is detected while video recording through the first camera is in progress.

45. The non-transitory computer readable storage medium of claim 44 the one or more programs including instructions that cause the electronic device to:
  continue to record video after detecting the movement of the first user input.

46. The non-transitory computer readable storage medium of claim 35, the one or more programs including instructions that cause the electronic device to:
  in response to detecting the movement of the first user input:
    in accordance with a determination that the movement of the first user input meets eighth movement criteria:
      change an aspect ratio of the first live view or an aspect ratio of the first display region in accordance with the movement of the first user input.

47. The non-transitory computer readable storage medium of claim 35, wherein the first user input is directed to locations within the first display region, and the one or more programs include instructions that cause the electronic device to:
  while displaying the first display region including the first live view captured by the first camera, detect movement of a second user input directed to locations outside of the first display region; and
  in response to detecting the movement of the second user input in a second direction, switch from a first media capture mode to a second media capture mode of the first camera in accordance with the movement of the second user input.

* * * * *